US009294009B2

(12) United States Patent
Hattori et al.

(10) Patent No.: US 9,294,009 B2
(45) Date of Patent: Mar. 22, 2016

(54) INVERTER APPARATUS INCLUDING CONTROL CIRCUIT EMPLOYING TWO-PHASE MODULATION CONTROL, AND INTERCONNECTION INVERTER SYSTEM INCLUDING THE INVERTER APPARATUS

(75) Inventors: Nobuyuki Hattori, Osaka (JP); Akihiro Ohori, Osaka (JP); Hiroki Munechika, Osaka (JP)

(73) Assignee: DAIHEN Corporation, Osaka (JP)

( * ) Notice: Subject to any disclaimer, the term of this patent is extended or adjusted under 35 U.S.C. 154(b) by 541 days.

(21) Appl. No.: 13/414,358

(22) Filed: Mar. 7, 2012

(65) Prior Publication Data

US 2012/0243276 A1   Sep. 27, 2012

(30) Foreign Application Priority Data

Mar. 24, 2011 (JP) .................................. 2011-66068
Jul. 1, 2011 (JP) ................................ 2011-146918
Jul. 14, 2011 (JP) ................................ 2011-155692
Oct. 4, 2011 (JP) ................................ 2011-219713

(51) Int. Cl.
 *H02M 7/5387* (2007.01)

(52) U.S. Cl.
 CPC .................................. *H02M 7/5387* (2013.01)

(58) Field of Classification Search
 CPC . H02M 7/48; H02M 7/5387; H02M 7/53873; H02M 7/53875; H02M 7/5395; H02M 2001/0025; H02M 2001/0048; H02M 2007/53876
 USPC ............. 363/16–17, 55, 56.01–56.02, 95–98, 363/131–132, 148; 323/271, 282–285, 351
 See application file for complete search history.

(56) References Cited

U.S. PATENT DOCUMENTS 4,352,154 A * 9/1982 Reiber ......................... 363/123
4,656,572 A * 4/1987 Caputo et al. ................... 363/41
5,610,806 A * 3/1997 Blasko ................ H02M 7/5395
  363/41

(Continued)

FOREIGN PATENT DOCUMENTS

JP   7-46855 A    2/1995
JP   7-147782 A   6/1995

(Continued)

OTHER PUBLICATIONS

Office Action issued in counterpart Japanese Patent Application, mailed May 26, 2015; 6 pages.

*Primary Examiner* — Timothy J Dole
*Assistant Examiner* — Ivan Laboy Andino
(74) *Attorney, Agent, or Firm* — Hamre, Schumann, Mueller & Larson, P.C.

(57) ABSTRACT

A control circuit reduces switching loss by periodically stopping switching elements, and reduces the difference between the time for which positive switching elements are in on state and the time for which negative switching elements are in on state. The control circuit includes a command value signal generator generating command value signals Xu1, Xv1, and Xw1 from line voltage command value signals Xuv, Xvw, and Xwu, and includes a PWM signal generator generating PWM signals by the command value signals Xu1, Xv1, and Xw1. The command value signals Xu1, Xv1, and Xw1 are continuously at "0" for a predetermined period, and are continuously at "2" for another period. This enables reducing the difference between the period for which the PWM signals are low and the period for which they are high.

7 Claims, 44 Drawing Sheets

(56) References Cited

U.S. PATENT DOCUMENTS

| | | | |
|---|---|---|---|
| 7,053,587 B2* | 5/2006 | Ito et al. | 318/801 |
| 2001/0015904 A1* | 8/2001 | Kimura et al. | 363/131 |
| 2003/0053323 A1* | 3/2003 | Kimura et al. | 363/98 |
| 2004/0004852 A1* | 1/2004 | Hsu | H02M 7/5387 363/132 |
| 2010/0110743 A1* | 5/2010 | Yamasaki | 363/132 |
| 2012/0194108 A1* | 8/2012 | Kasaoka | H02K 49/06 318/400.02 |

FOREIGN PATENT DOCUMENTS

| | | |
|---|---|---|
| JP | 2004-364351 A | 12/2004 |
| JP | 2005-124305 A | 5/2005 |
| JP | 2005-229716 A | 8/2005 |
| JP | 2009-27818 | 2/2009 |
| JP | 2010-68630 | 3/2010 |
| JP | 2010-136547 | 6/2010 |
| WO | WO 2008136072 A1 * 11/2008 | ............ H02M 7/48 |

* cited by examiner

FIG. 48 --PRIOR ART--
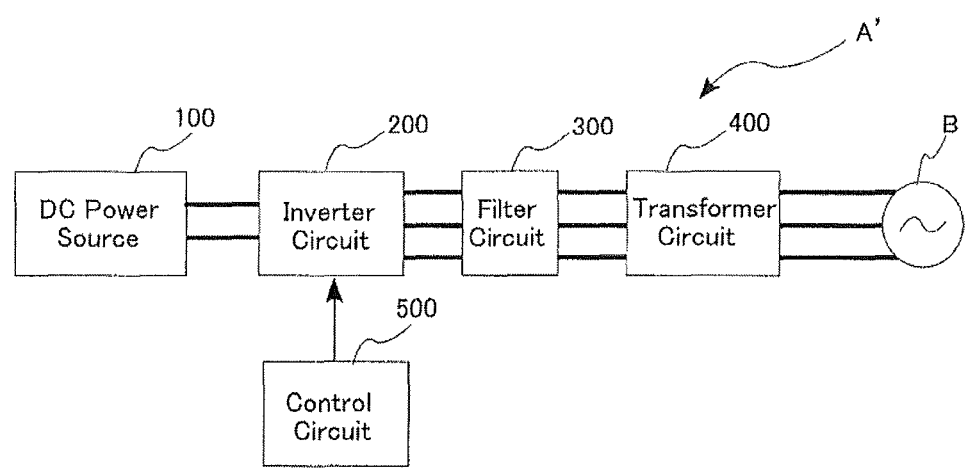

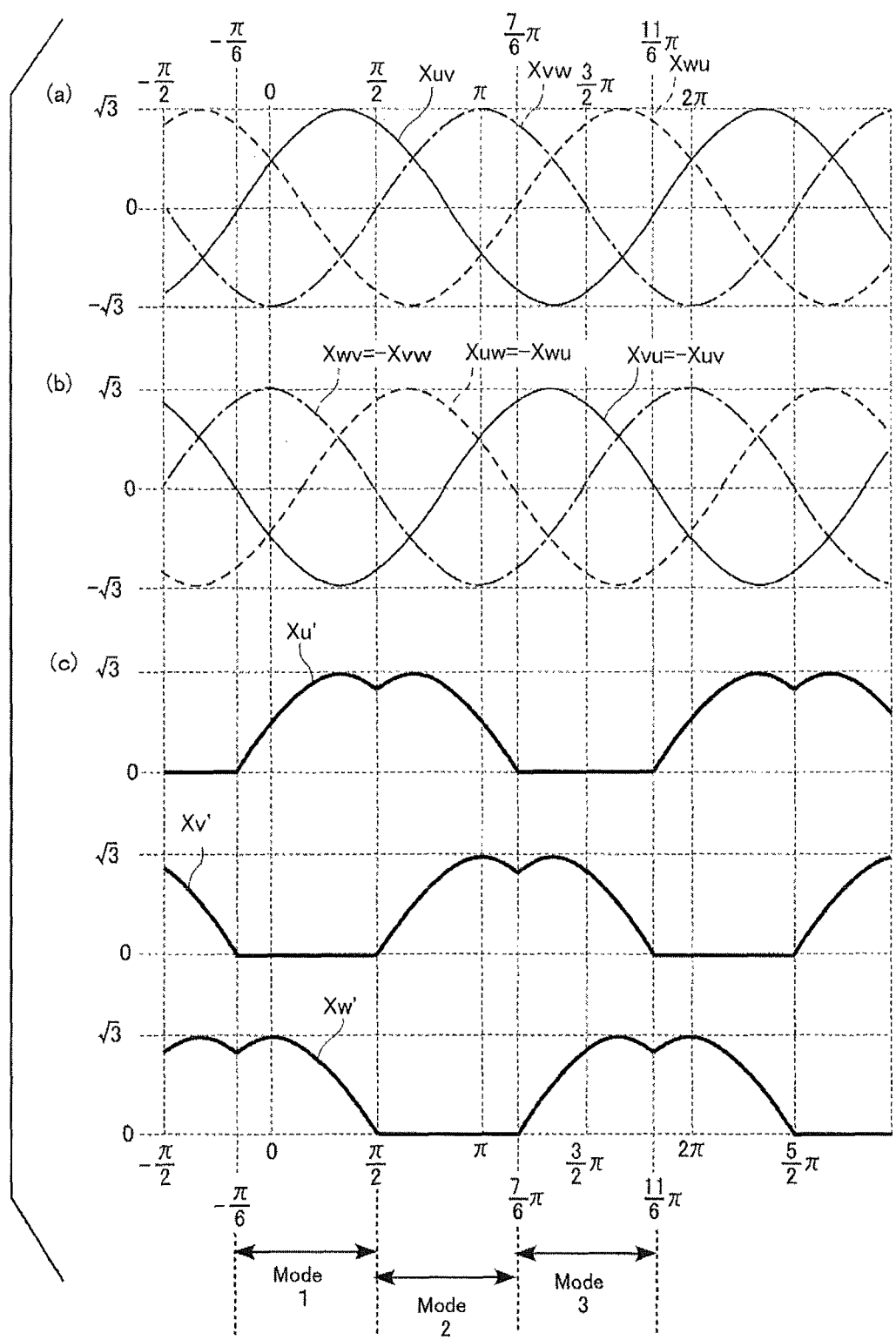
FIG. 49 --PRIOR ART--

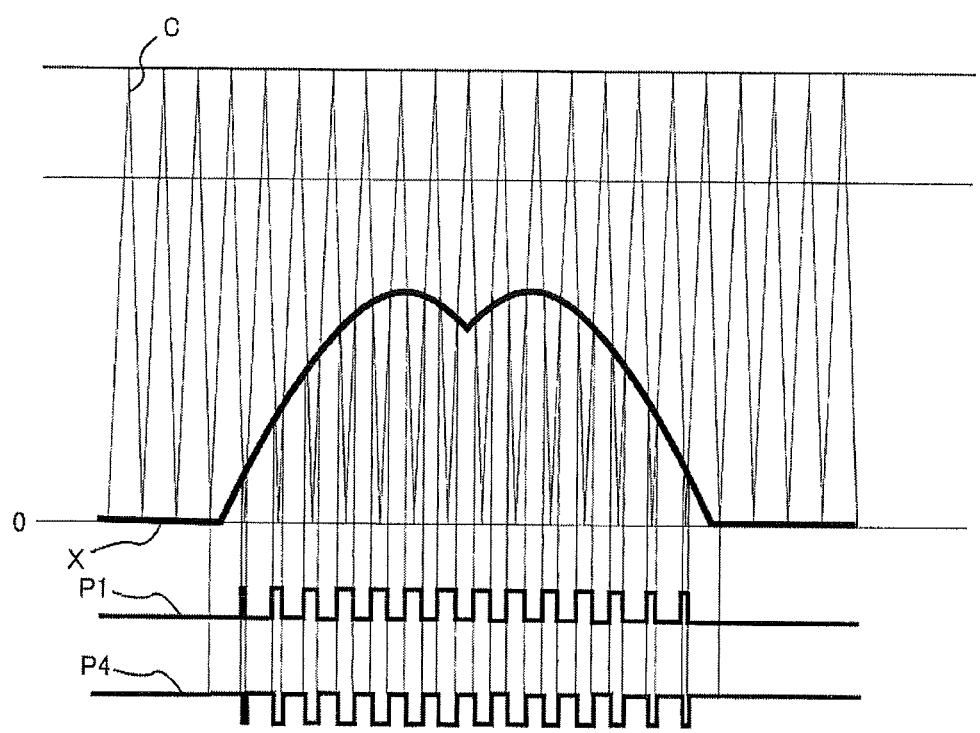
FIG. 50 --PRIOR ART--

INVERTER APPARATUS INCLUDING CONTROL CIRCUIT EMPLOYING TWO-PHASE MODULATION CONTROL, AND INTERCONNECTION INVERTER SYSTEM INCLUDING THE INVERTER APPARATUS

BACKGROUND OF THE INVENTION

1. Field of the Invention

The present invention relates to a control circuit for controlling a power conversion circuit using PWM signals, an inverter apparatus including the control circuit, and an interconnection inverter system including the inverter apparatus.

2. Description of the Related Art

In recent years, distributed power sources employing natural energy such as sunlight have tended to become increasingly prevalent. Interconnection inverter systems that have been developed include an inverter circuit for converting DC power generated by a distributed power source into AC power, and supply the converted AC power to a connected load or power system.

FIG. 48 is a block diagram for describing a general interconnection inverter system A' for supplying power to a three-phase power system B (hereinafter, abbreviated to "system B").

The interconnection inverter system A' includes a DC power source 100, an inverter circuit 200, a filter circuit 300, a transformer circuit 400, and a control circuit 500. The inverter circuit 200 is a three-phase full bridge inverter and converts a DC voltage that has been input from the DC power source 100 into an AC voltage by switching six switching elements between the on state and the off state. The control circuit 500 generates PWM signals for controlling the inverter circuit 200, based on signals input from various types of sensors. The inverter circuit 200 switches the switching elements between the on state and the off state based on the PWM signals input from the control circuit 500. It is this switching that is referred to when "switching" is mentioned hereinafter. The filter circuit 300 removes the high-frequency component resulting from switching from the AC voltage input from the inverter circuit 200. The transformer circuit 400 raises or lowers the AC voltage input from the filter circuit 300 so as to be at substantially the same level as the system voltage of the system B.

The power consumed by the switching of the switching elements is referred to as "switching loss", and this switching loss lowers the power conversion efficiency of the inverter circuit 200. A method for reducing switching loss has been developed in order to improve power conversion efficiency. For example, a method for reducing switching loss has been developed in which a period for which no pulse is generated is periodically provided in the PWM signals so as to periodically stop the switching.

In this method, so-called NVS (Neutral Voltage Shift) control is performed, which is control in which the neutral point potential of three phases is shifted at a ⅓-cycle interval, and the potential of each phase is fixed at a negative-side potential in each ⅓ cycle, thus stopping the switching in each phase for the period for which the potential is fixed at the negative-side potential. NVS control can reduce the number of times that switching is performed, thus enabling a reduction in switching loss. In this specification, the three phases are respectively referred to as the U phase, the V phase, and the W phase, with the phase of the system voltage in the V phase being delayed by $2\pi/3$ relative to the U phase, and the phase of the system voltage in the W phase being delayed by $4\pi/3$ (advanced by $2\pi/3$) relative to the U phase.

Specifically, NVS control is performed by generating command value signals (hereinafter, referred to as "NVS command value signals"), which have a special waveform that is "0" for ⅓ of the cycle, and controlling the inverter circuit 200 with PWM signals generated based on the NVS command value signals. The NVS command value signals are generated by switching a line voltage command value signal for specifying the waveform of the output line voltage of the interconnection inverter system A', a signal whose polarity is the inverse that of the line voltage command value signal, and a zero signal having the value "0". The line voltage command value signal is generated using the difference between phase voltage command value signals for specifying the waveforms of the phase voltages to be output by the interconnection inverter system A'.

FIG. 49 is a diagram for describing the waveform of NVS command value signals.

A waveform Xuv shown in (a) of FIG. 49 is the waveform of a line voltage command value signal Xuv for specifying the waveform of the U-phase line voltage relative to the V phase. The line voltage command value signal Xuv is a difference signal between a phase voltage command value signal Xu for specifying the waveform of the U-phase phase voltage and a phase voltage command value signal Xv for specifying the waveform of the V-phase phase voltage. Since the amplitude of the phase voltage command value signal Xu is "1", the amplitude of the line voltage command value signal Xuv is $\sqrt{3}$. Also, a waveform Xvw is the waveform of a line voltage command value signal Xvw for specifying the waveform of the V-phase line voltage relative to the W phase. The line voltage command value signal Xvw is a difference signal between the phase voltage command value signal Xv for specifying the waveform of the V-phase phase voltage and a phase voltage command value signal Xw for specifying the waveform of the W-phase phase voltage. Also, a waveform Xwu is the waveform of a line voltage command value signal Xwu for specifying the waveform of the W-phase line voltage relative to the U phase. The line voltage command value signal Xwu is a difference signal between the phase voltage command value signal Xw for specifying the waveform of the W-phase phase voltage and the phase voltage command value signal Xu for specifying the waveform of the U-phase phase voltage. In FIG. 49, the phase of the U-phase phase voltage command value signal Xu is used as the reference for illustration.

A waveform Xvu shown in (b) of FIG. 49 is the waveform of a signal Xvu whose polarity is the inverse of that of the line voltage command value signal Xuv. Also, a waveform Xwv is the waveform of a signal Xwv whose polarity is the inverse of that of the line voltage command value signal Xvw, and a waveform Xuw is the waveform of a signal Xuw whose polarity is the inverse of that of the line voltage command value signal Xwu.

A waveform Xu' shown in (c) of FIG. 49 is the waveform of a U-phase NVS command value signal Xu'. The NVS command value signal Xu' is generated by switching between the line voltage command value signal Xuv, the signal Xuw, and the zero signal. The waveform Xu' has the waveform Xuv for the period $-\pi/6 \leq \theta \leq \pi/2 (=3\pi/6)$, the waveform Xuw for the period $3\pi/6 \leq \theta \leq 7\pi/6$, and is "0" for the period $7\pi/6 \leq \theta \leq 11\pi/6$. Note that the phase of the phase voltage command value signal Xu is θ. Similarly, the waveform Xv', which is the waveform of the V-phase NVS command value signal Xv', is "0" for the period $-\pi/6 \leq \theta \leq \pi/2 (=3\pi/6)$, and has the waveform Xvw for the period $3\pi/6 \leq \theta \leq 7\pi/6$, and the waveform Xvu for the period $7\pi/6 \leq \theta \leq 11\pi/6$. Also, the waveform Xw', which is the waveform of the W-phase NVS command value signal Xw', has the waveform Xwv for the period −7π/6≤θ≤7π/2 (=3π/6), is "0" for the period 3π/6≤θ≤7π/6, and has the waveform Xwu for the period 7π/6≤θ≤11π/6. The waveform of the difference signal between the NVS command value signals Xu' and Xv' matches the waveform Xuv (see (a) of FIG. 49) of the line voltage command value signal Xuv. Accordingly, the interconnection inverter system A' can output a line voltage having the same waveform as that of the line voltage command value signal Xuv.

PWM signals for controlling the inverter circuit 200 are generated by comparing the NVS command value signals Xu', Xv', and Xw' with a carrier signal.

FIG. 50 is a diagram for describing a method for generating a U-phase PWM signal from the NVS command value signal Xu' and a carrier signal. In this figure, the NVS command value signal Xu' is indicated as waveform X, and the carrier signal is indicated as waveform C. The PWM signal is generated as a pulse signal that is at the high level for the period for which the NVS command value signal Xu' is higher than the carrier signal, and is at the low level for the period for which the NVS command value signal Xu' is lower than or equal to the carrier signal. A waveform P1 shown in this figure is the waveform of the U-phase PWM signal generated from the NVS command value signal Xu' and the carrier signal. The waveform P1 is at the high level for the period for which the waveform X is higher than the waveform C, and is at the low level for the period for which the waveform X is lower than or equal to the waveform C. The U-phase PWM signal is input to the U-phase positive-side switching elements to control the switching thereof. On the other hand, a PWM signal (see a waveform P4 shown in FIG. 50) whose polarity is the inverse of that of the U-phase PWM signal is input to the U-phase negative-side switching elements to control the switching thereof. Note that V-phase and W-phase PWM signals are also generated in a similar manner.

As shown by the waveform P1 in FIG. 50, the U-phase PWM signal (waveform P1) is continuously at the low level for the period for which the NVS command value signal Xu' (waveform X) is "0", and therefore the switching of the switching elements stops in this period. Accordingly, the number of times that the switching elements are switched is cut down to ⅔, thus enabling a reduction in switching loss.

PATENT LITERATURE

1: JP 2010-136547A
2: JP 2010-68630A
3: JP 2009-27818A

The above-described method has the problem that the duration of the on state is different between the positive-side switching elements and the negative-side switching elements. Specifically, in the period for which the NVS command value signal Xu' (waveform X) is "0", the PWM signal (waveform P1) input to the positive-side switching elements is continuously at the low level, and therefore the positive-side switching elements are fixed in the off state. On the other hand, the PWM signal (waveform P4) input to the negative-side switching elements is continuously at the high level, and therefore the negative-side switching elements are fixed in the on state. Accordingly, the time for which the positive-side switching elements are in the off state is longer, and the time for which the negative-side switching elements are in the on state is longer. Switching elements degrade due to heat generated when current flows. The negative-side switching elements are in the on state for a longer time and pass a current for a longer time, and therefore degrade to a greater extent that the positive-side switching elements. Accordingly, the negative-side switching elements have a shorter lifetime than the positive-side switching elements. Also, the design of cooling members is complex due to the need for more dissipation of the heat generated by the negative-side switching elements.

SUMMARY OF THE INVENTION

The present invention has been achieved in light of the above-described circumstances, and an object thereof is to provide a control circuit that can reduce switching loss by periodically stopping the switching of switching elements, and can reduce the difference between the time for which the positive-side switching elements are in the on state and the time for which the negative-side switching elements are in the on state.

In order to address the above-described problems, the present invention includes the following technical means.

A control circuit provided by a first aspect of the present invention is a control circuit for controlling driving of a plurality of switches in a power conversion circuit related to three-phase alternating current power with use of PWM signals, the PWM signals being generated and output such that a waveform of an alternating current phase voltage output from or input to the power conversion circuit is a waveform that is continuously at a predetermined lower limit voltage value for a predetermined period and is continuously at a predetermined upper limit voltage value for another predetermined period.

In a preferred embodiment of the present invention, the predetermined periods are each a period that is ⅙ of one cycle.

In a preferred embodiment of the present invention, the control circuit includes: a command value signal generator for generating a first command value signal having a one-cycle waveform that is at a predetermined upper limit value for a ⅙ period and is at a predetermined lower limit value for another ⅙ period, a second command value signal whose phase is delayed by 2π/3 relative to the first command value signal, and a third command value signal that is delayed by 4π/3 relative to the first command value signal; and a PWM signal generator for generating the PWM signals based on the command value signals.

In a preferred embodiment of the present invention, the one-cycle waveform of the first command value signal is "0" for a ⅙ period, a waveform obtained by shifting a waveform of a sine wave whose phase is in a section from 5π/3 to 2π upward by a predetermined value in the next ⅙ period, a waveform of a sine wave whose phase is in a section from π/3 to 2π/3 in the next ⅙ period, the predetermined value in the next ⅙ period, a waveform of a sine wave whose phase is in a section from 2π/3 to π in the next ⅙ period, and a waveform obtained by shifting a waveform of a sine wave whose phase is in a section from 4π/3 to 5π/3 upward by the predetermined value in the next ⅙ period.

In a preferred embodiment of the present invention, the command value signal generator generates, through the following method, the first to third command value signals using three phase voltage command value signals generated for specifying respective waveforms of three phases of phase voltages to be output from the power conversion circuit and using three line voltage command value signals that are difference signals between the phase voltage command value signals:

(a) the three phases are a U phase, a V phase that is delayed by 2π/3 relative to the U phase, and a W phase that is delayed by 4π/3 relative to the U phase; the phase voltage command value signals of the U phase, the V phase, and the W phase are Xu, Xv, and Xw respectively; and Xuv is a line voltage command value signal obtained by subtracting Xv from Xu, Xvw is a line voltage command value signal obtained by subtracting Xw from Xv, and Xwu is a line voltage command value signal obtained by subtracting Xu from Xw;

(b) in a case where the absolute value of Xuv is greater than the absolute value of Xvw and the absolute value of Xwu, if Xu is a positive value, the first command value signal Xu1 is set to Xuv, the second command value signal Xv1 is set to "0", and the third command value signal Xw1 is set to the negative value of Xvw;

(c) in a case where the absolute value of Xuv is greater than the absolute value of Xvw and the absolute value of Xwu, if Xu is a negative value, Xu1 is set to a value obtained by adding Xuv to the predetermined value, Xv1 is set to the predetermined value, and Xw1 is set to a value obtained by subtracting Xvw from the predetermined value;

(d) in a case where the absolute value of Xvw is greater than the absolute value of Xuv and the absolute value of Xwu, if Xv is a positive value, Xu1 is set to the negative value of Xwu, Xv1 is set to Xvw, and Xw1 is set to "0";

(e) in a case where the absolute value of Xvw is greater than the absolute value of Xuv and the absolute value of Xwu, if Xv is a negative value, Xu1 is set to a value obtained by subtracting Xwu from the predetermined value, Xv1 is set to a value obtained by adding Xvw to the predetermined value, and Xw1 is set to the predetermined value;

(f) in a case where the absolute value of Xwu is greater than the absolute value of Xuv and the absolute value of Xvw, if Xw is a positive value, Xu1 is set to "0", Xv1 is set to the negative value of Xuv, and Xw1 is set to Xwu; and (g) in a case where the absolute value of Xwu is greater than the absolute value of Xuv and the absolute value of Xvw, if Xw is a negative value, Xu1 is set to the predetermined value, Xv1 is set to a value obtained by subtracting Xuv from the predetermined value, and Xw1 is set to a value obtained by adding Xwu to the predetermined value.

In a preferred embodiment of the present invention, the one-cycle waveform of the first command value signal is "0" for a ⅙ period, a waveform obtained by shifting a waveform of a sine wave whose phase is in a section from $4\pi/3$ to $5\pi/3$ upward by a predetermined value in the next ⅙ period, a waveform of a sine wave whose phase is in a section from 0 to $\pi/3$ in the next ⅙ period, the predetermined value in the next ⅙ period, a waveform of a sine wave whose phase is in a section from $\pi/3$ to $2\pi/3$ in the next ⅙ period, and a waveform obtained by shifting a waveform of a sine wave whose phase is in a section from $\pi$ to $4\pi/3$ upward by the predetermined value in the next ⅙ period.

In a preferred embodiment of the present invention, the command value signal generator generates, through the following method, the first to third command value signals using three phase voltage command value signals generated for specifying respective waveforms of three phases of phase voltages to be output from the power conversion circuit and using three line voltage command value signals that are difference signals between the phase voltage command value signals:

(a) the three phases are a U phase, a V phase that is delayed by $2\pi/3$ relative to the U phase, and a W phase that is delayed by $4\pi/3$ relative to the U phase; the phase voltage command value signals of the U phase, the V phase, and the W phase are Xu, Xv, and Xw respectively; and Xuv is a line voltage command value signal obtained by subtracting Xv from Xu, Xvw is a line voltage command value signal obtained by subtracting Xw from Xv, and Xwu is a line voltage command value signal obtained by subtracting Xu from Xw;

(b) in a case where the absolute value of Xuv is greater than the absolute value of Xvw and the absolute value of Xwu, if Xu is a positive value, the first command value signal Xu2 is set to the predetermined value, the second command value signal Xv2 is set to a value obtained by subtracting Xuv from the predetermined value, and the third command value signal Xw2 is set to a value obtained by adding Xwu to the predetermined value;

(c) in a case where the absolute value of Xuv is greater than the absolute value of Xvw and the absolute value of Xwu, if Xu is a negative value, Xu2 is set to "0", Xv2 is set to the negative value of Xuv, and Xw2 is set to Xwu;

(d) in a case where the absolute value of Xvw is greater than the absolute value of Xuv and the absolute value of Xwu, if Xv is a positive value, Xu2 is set to a value obtained by adding Xuv to the predetermined value, Xv2 is set to the predetermined value, and Xw2 is set to a value obtained by subtracting Xvw from the predetermined value;

(e) in a case where the absolute value of Xvw is greater than the absolute value of Xuv and the absolute value of Xwu, if Xv is a negative value, Xu2 is set to Xuv, Xv2 is set to "0", and Xw2 is set to the negative value of Xvw;

(f) in a case where the absolute value of Xwu is greater than the absolute value of Xuv and the absolute value of Xvw, if Xw is a positive value, Xu2 is set to a value obtained by subtracting Xwu from the predetermined value, Xv2 is set to a value obtained by adding Xvw to the predetermined value, and Xw2 is set to the predetermined value; and (g) in a case where the absolute value of Xwu is greater than the absolute value of Xuv and the absolute value of Xvw, if Xw is a negative value, Xu2 is set to the negative value of Xwu, Xv2 is set to Xvw, and Xw2 is set to "0".

In a preferred embodiment of the present invention, the one-cycle waveform of the first command value signal is "0" for a ⅙ period, a waveform obtained by shifting a waveform of a sine wave whose phase is in a section from $3\pi/2$ to $11\pi/6$ upward by a predetermined value in the next ⅙ period, a waveform of a sine wave whose phase is in section front $\pi/6$ to $\pi/2$ in the next ⅙ period, the predetermined value in the next ⅙ period, a waveform of a sine wave whose phase is in a section from $\pi/2$ to $5\pi/6$ in the next ⅙ period, and a waveform obtained by shifting a waveform of a sine wave whose phase is in a section from $7\pi/6$ to $3\pi/2$ upward by the predetermined value in the next ⅙ period.

In a preferred embodiment of the present invention, the command value signal generator generates, through the following method, the first to third command value signals using three phase voltage command value signals generated for specifying respective waveforms of three phases of phase voltages to be output from the power conversion circuit and using three line voltage command value signals that are difference signals between the phase voltage command value signals:

(a) the three phases are a U phase, a V phase that is delayed by $2\pi/3$ relative to the U phase, and a W phase that is delayed by $4\pi/3$ relative to the U phase; the phase voltage command value signals of the U phase, the V phase, and the W phase are Xu, Xv, and Xw respectively; and Xuv is a line voltage command value signal obtained by subtracting Xv from Xu, Xvw is a line voltage command value signal obtained by subtracting Xw from Xv, and Xwu is a line voltage command value signal obtained by subtracting Xu from Xw;

(b) in a case where the absolute value of Xu is greater than the absolute value of Xv and the absolute value of Xw, if Xu is a positive value, the first command value signal Xu3 is set to the predetermined value, the second command value signal Xv3 is set to a value obtained by subtracting Xuv from the predetermined value, and the third command value signal Xw3 is set to a value obtained by adding Xwu to the predetermined value;

(c) in a case where the absolute value of Xu is greater than the absolute value of Xv and the absolute value of Xw, if Xu is a negative value, Xu3 is set to "0", Xv3 is set to the negative value of Xuv, and Xw3 is set to Xwu;

(d) in a case where the absolute value of Xv is greater than the absolute value of Xu and the absolute value of Xw, if Xv is a positive value, Xu3 is set to a value obtained by adding Xuv to the predetermined value, Xv3 is set to the predetermined value, and Xw3 is set to a value obtained by subtracting Xvw from the predetermined value;

(e) in a case where the absolute value of Xv is greater than the absolute value of Xu and the absolute value of Xw, if Xv is a negative value, Xu3 is set to Xuv, Xv3 is set to "0", and Xw3 is set to the negative value of Xvw;

(f) in a case where the absolute value of Xw is greater than the absolute value of Xu and the absolute value of Xv, if Xw is a positive value, Xu3 is set to a value obtained by subtracting Xwu from the predetermined value, Xv3 is set to a value obtained by adding Xvw to the predetermined value, and Xw3 is set to the predetermined value; and (g) in a case where the absolute value of Xw is greater than the absolute value of Xu and the absolute value of Xv, if Xw is a negative value, Xu3 is set to the negative value of Xwu, Xv3 is set to Xvw, and Xw3 is set to "0".

In a preferred embodiment of the present invention, the PWM signals are generated and output such that the waveform of the alternating current phase voltage output from or input to the power conversion circuit is a waveform that is continuously at the predetermined upper limit voltage value for a period that is $1/12$ of one cycle, is continuously at the predetermined lower limit voltage value for another $1/12$ period, is continuously at the upper limit voltage value for still another $1/12$ period, and is continuously at the lower limit voltage value for yet another $1/12$ period.

In a preferred embodiment of the present invention, the control circuit includes: a command value signal generator for generating a first command value signal having a one-cycle waveform that is "0" for a $1/12$ period, a waveform of a sine wave whose phase is in a section from 0 to $\pi/6$ in the next $1/12$ period, a waveform obtained by shifting a waveform of a sine wave whose phase is in a section from $11\pi/6$ to $2\pi$ upward by a predetermined value in the next $1/12$ period, the predetermined value in the next $1/12$ period, a waveform of a sine wave whose phase is in a section from $\pi/2$ to $2\pi/3$ in the next $1/12$ period, a waveform of a sine wave whose phase is in a section from $\pi/3$ to $\pi/2$ in the next $1/12$ period, the predetermined value in the next $1/12$ period, a waveform obtained by shifting a waveform of a sine wave whose phase is in a section from $\pi$ to $7\pi/6$ upward by the predetermined value in the next $1/12$ period, a waveform of a sine wave whose phase is in a section from $5\pi/6$ to $\pi$ in the next $1/12$ period, "0" for the next $1/12$ period, a waveform obtained by shifting a waveform of a sine wave whose phase is in a section from $3\pi/2$ to $5\pi/3$ upward by the predetermined value in the next $1/12$ period, and a waveform obtained by shifting a waveform of a sine wave whose phase is in a section from $4\pi/3$ to $3\pi/2$ upward by the predetermined value in the next $1/12$ period, a second command value signal whose phase is delayed by $2\pi/3$ relative to the first command value signal, and a third command value signal that is delayed by $4\pi/3$ relative to the first command value signal; and a PWM signal generator for generating the PWM signals based on the command value signals.

In a preferred embodiment of the present invention, the command value signal generator generates, through the following method, the first to third command value signals using three phase voltage command value signals generated for specifying respective waveforms of three phases of phase voltages to be output from the power conversion circuit and using three line voltage command value signals that are difference signals between the phase voltage command value signals:

(a) the three phases are a U phase, a V phase that is delayed by $2\pi/3$ relative to the U phase, and a W phase that is delayed by $4\pi/3$ relative to the U phase; the phase voltage command value signals of the U phase, the V phase, and the W phase are Xu, Xv, and Xw respectively; and Xuv is a line voltage command value signal obtained by subtracting Xv from Xu, Xvw is a line voltage command value signal obtained by subtracting Xw from Xv, and Xwu is a line voltage command value signal obtained by subtracting Xu from Xw;

(b) in a case where the magnitude of the absolute value of Xu is between the absolute value of Xv and the absolute value of Xw, if Xu is a positive value, the first command value signal Xu4 is set to the predetermined value, the second command value signal Xv4 is set to a value obtained by subtracting Xuv from the predetermined value, and the third command value signal Xw4 is set to a value obtained by adding Xwu to the predetermined value;

(c) in a case where the magnitude of the absolute value of Xu is between the absolute value of Xv and the absolute value of Xw, if Xu is a negative value, Xu4 is set to "0", Xv4 is set to the negative value of Xuv, and Xw4 is set to Xwu;

(d) in a case where the magnitude of the absolute value of Xv is between the absolute value of Xu and the absolute value of Xw, if Xv is a positive value, Xu4 is set to a value obtained by adding Xuv to the predetermined value, Xv4 is set to the predetermined value, and Xw4 is set to a value obtained by subtracting Xvw from the predetermined value;

(e) in a case where the magnitude of the absolute value of Xv is greater than the absolute value of Xu and the absolute value of Xw, if Xv is a negative value, Xu4 is set to Xuv, Xv4 is set to "0", and Xw4 is set to the negative value of Xvw;

(f) in a case where the magnitude of the absolute value of Xw is between the absolute value of Xu and the absolute value of Xv, if Xw is a positive value, Xu4 is set to a value obtained by subtracting Xwu from the predetermined value, Xv4 is set to a value obtained by adding Xvw to the predetermined value, and Xw4 is set to the predetermined value; and (g) in a case where the magnitude of the absolute value of Xw is between the absolute value of Xu and the absolute value of Xv, if Xw is a negative value, Xu4 is set to the negative value of Xwu, Xv4 is set to Xvw, and Xw4 is set to "0".

In a preferred embodiment of the present invention, the control circuit includes: a command value signal generator for generating a first command value signal that is a combination of a first signal and a second signal, a second command value signal that is a combination of a signal whose phase is delayed by $2\pi/3$ relative to the first signal and a signal whose phase is delayed by $2\pi/3$ relative to the second signal, and a third command value signal that is a combination of a signal whose phase is delayed by $4\pi/3$ relative to the first signal and a signal whose phase is delayed by $4\pi/3$ relative to the second signal; and a PWM signal generator for generating the PWM signals based on the command value signals, wherein the first signal has a one-cycle waveform that is a predetermined lower limit value in a $1/3$ period, a waveform obtained by shifting a waveform of a sine wave whose phase is in a section from 0 to $2\pi/3$ upward by the predetermined lower limit value in the next $1/3$ period, and a waveform obtained by shifting a waveform of a sine wave whose phase is in a section from $\pi/3$ to $\pi$ upward by the predetermined lower limit value in the remaining ⅓ period, and the second signal has a one-cycle waveform that is a predetermined upper limit value in a ⅓ period, a waveform obtained by shifting a waveform of a sine wave whose phase is in a section from π to 5π/3 upward by the predetermined upper limit value in the next ⅓ period, and a waveform obtained by shifting a waveform of a sine wave whose phase is in a section from 4π/3 to 2π upward by the predetermined upper limit value in the remaining ⅓ period.

In a preferred embodiment of the present invention, the command value signal generator generates a flag signal that alternates between a high level and a low level at a predetermined cycle, and generates the first command value signal by switching between the first signal and the second signal based on the flag signal.

In a preferred embodiment of the present invention, the command value signal generator generates, through the following method, the first to third command value signals using three line voltage command value signals that are difference signals between three phase voltage command value signals generated for specifying respective waveforms of three phases of phase voltages to be output from the power conversion circuit, and using the flag signal:

(a) the three phases are a U phase, a V phase that is delayed by 2π/3 relative to the U phase, and a W phase that is delayed by 4π/3 relative to the U phase; the phase voltage command value signals of the U phase, the V phase, and the W phase are Xu, Xv, and Xw respectively; and Xuv is a line voltage command value signal obtained by subtracting Xv from Xu, Xvw is a line voltage command value signal obtained by subtracting Xw from Xv, and Xwu is a line voltage command value signal obtained by subtracting Xu from Xw;

(b1) in a case where the flag signal is at the low level and the absolute value of Xuv is greater than the absolute value of Xvw and the absolute value of Xwu, if Xuv is a positive value, the first command value signal Xu5 is set to Xuv, the second command value signal Xv5 is set to "0", and the third command value signal Xw5 is set to the negative value of Xvw;

(c1) in a case where the flag signal is at the low level and the absolute value of Xuv is greater than the absolute value of Xvw and the absolute value of Xwu, if Xuv is a negative value, Xu5 is set to "0", Xv5 is set to the negative value of Xuv, and Xw5 is set to Xwu;

(d1) in a case where the flag signal is at the low level and the absolute value of Xvw is greater than the absolute value of Xuv and the absolute value of Xwu, if Xvw is a positive value, Xu5 is set to the negative value of Xwu, Xv5 is set to Xvw, and Xw5 is set to "0";

(e1) in a case where the flag signal is at the low level and the absolute value of Xvw is greater than the absolute value of Xuv and the absolute value of Xwu, if Xvw is a negative value, Xu5 is set to Xuv, Xv5 is set to "0", and Xw5 is set to the negative value of Xvw;

(f1) in a case where the flag signal is at the low level and the absolute value of Xwu is Greater than the absolute value of Xuv and the absolute value of Xvw, if Xwu is a positive value, Xu5 is set to "0", Xv5 is set to the negative value of Xuv, and Xw5 is set to Xwu;

(g1) in a case where the flag signal is at the low level and the absolute value of Xwu is greater than the absolute value of Xuv and the absolute value of Xvw, if Xwu is a negative value, Xu5 is set to the negative value of Xwu, Xv5 is set to Xvw, and Xw5 is set to "0";

(b2) in a case where the flag signal is at the high level and the absolute value of Xuv is greater than the absolute value of Xvw and the absolute value of Xwu, if Xuv is a positive value, Xu5 is set to the predetermined value, Xv5 is set to a value obtained by subtracting Xuv from the predetermined value, and Xw5 is set to a value obtained by adding Xwu to the predetermined value;

(c2) in a case where the flag signal is at the high level and the absolute value of Xuv is greater than the absolute value of Xvw and the absolute value of Xwu, if Xuv is a negative value, Xu5 is set to a value obtained by adding Xuv to the predetermined value, Xv5 is set to the predetermined value, and Xw5 is set to a value obtained by subtracting Xvw from the predetermined value;

(d2) in a case where the flag signal is at the high level and the absolute value of Xvw is greater than the absolute value of Xuv and the absolute value of Xwu, if Xvw is a positive value, Xu5 is set to a value obtained by adding Xuv to the predetermined value, Xv5 is set to the predetermined value, and Xw5 is set to a value obtained by subtracting Xvw from the predetermined value;

(e2) in a case where the flag signal is at the high level and the absolute value of Xvw is greater than the absolute value of Xuv and the absolute value of Xwu, if Xvw is a negative value, Xu5 is set to a value obtained by subtracting Xwu from the predetermined value, Xv5 is set to a value obtained by adding Xvw to the predetermined value, and Xw5 is set to the predetermined value;

(f2) in a case where the flag signal is at the high level and the absolute value of Xwu is greater than the absolute value of Xuv and the absolute value of Xvw, if Xwu is a positive value, Xu5 is set to a value obtained by subtracting Xwu from the predetermined value, Xv5 is set to a value obtained by adding Xvw to the predetermined value, and Xw5 is set to the predetermined value; and (g2) in a case where the flag signal is at the high level and the absolute value of Xwu is Greater than the absolute value of Xuv and the absolute value of Xvw, if Xwu is a negative value, Xu5 is set to the predetermined value, Xv5 is set to a value obtained by subtracting Xuv from the predetermined value, and Xw5 is set to a value obtained by adding Xwu to the predetermined value.

In a preferred embodiment of the present invention, the cycle of the flag signal is an even multiple of the cycle of the phase voltage command value signals.

In a preferred embodiment of the present invention, the frequency of the flag signal is a multiple of ¾ of the frequency of the phase voltage command value signals.

In a preferred embodiment of the present invention, the length of a period for which the flag signal is at the high level and the length of a period for which the flag signal is at the low level are the same.

In a preferred embodiment of the present invention, the PWM signal generator generates the PWM signals by comparing each of the three command value signals with a predetermined carrier signal.

In a preferred embodiment of the present invention, the carrier signal is a signal that changes between the predetermined upper limit value and the predetermined lower limit value.

An inverter apparatus provided by a second aspect of the present invention includes an inverter circuit serving as the power conversion circuit, and the control circuit provided by the first aspect of the present invention.

In a preferred embodiment of the present invention, the inverter circuit is a multilevel inverter circuit.

In a preferred embodiment of the present invention, the command value signal generator includes: a cycle setting unit that sets the cycle of the flag signal; and a duty cycle setting unit that sets a duty cycle, the duty cycle being the ratio of a period for which the flag signal is at the high level to the cycle of the flag signal.

In a preferred embodiment of the present invention, the command value signal generator further includes a duty cycle changer for changing the duty cycle set by the duty cycle setting unit.

In a preferred embodiment of the present invention, the multilevel inverter circuit is a three-level inverter circuit.

In a preferred embodiment of the present invention, the PWM signal generator includes: a first carrier signal generator for generating a first carrier signal that fluctuates between the predetermined upper limit value and an intermediate value that is between the predetermined upper limit value and the predetermined lower limit value; a second carrier signal generator for generating a second carrier signal that fluctuates between the intermediate value and the predetermined lower limit value; a first pulse generator for generating a first pulse signal by comparing the command value signals with the first carrier signal; a second pulse generator for generating a second pulse signal by comparing the command value signals with the second carrier signal; and a third pulse generator for generating a third pulse signal based on a NOR operation performed on the first pulse signal and the second pulse signal, and the PWM signal generator outputs the first pulse signal, the second pulse signal, and the third pulse signal as the PWM signals.

In a preferred embodiment of the present invention, the frequency of the first carrier signal and the frequency of the second carrier signal are the same.

In a preferred embodiment of the present invention, the multilevel inverter circuit is configured such that the voltage of each phase is any of the potential on a negative electrode side of a direct current power source, the potential on a positive electrode side, and an intermediate potential between the potential on the negative electrode side and the potential on the positive electrode side.

An interconnection inverter system according to a third aspect of the present invention includes the inverter apparatus provided by the second aspect of the present invention.

In a preferred embodiment of the present invention, a power source for supplying power to the inverter circuit includes a solar battery.

BRIEF DESCRIPTION OF THE DRAWINGS

FIG. 48 is a block diagram for describing a general interconnection inverter system.

FIG. 49 is a diagram for describing the waveform of NVS command value signals.

FIG. 50 is a diagram for describing a method for generating PWM signals from NVS command value signals and a carrier signal.

DETAILED DESCRIPTION OF THE PREFERRED EMBODIMENTS

Below is a specific description of a first embodiment of the present invention with reference to the drawings, taking the example of using a control circuit of the present invention in an interconnection inverter system.

First, a description of the basic concept of the present invention will be given.

Figure 1:
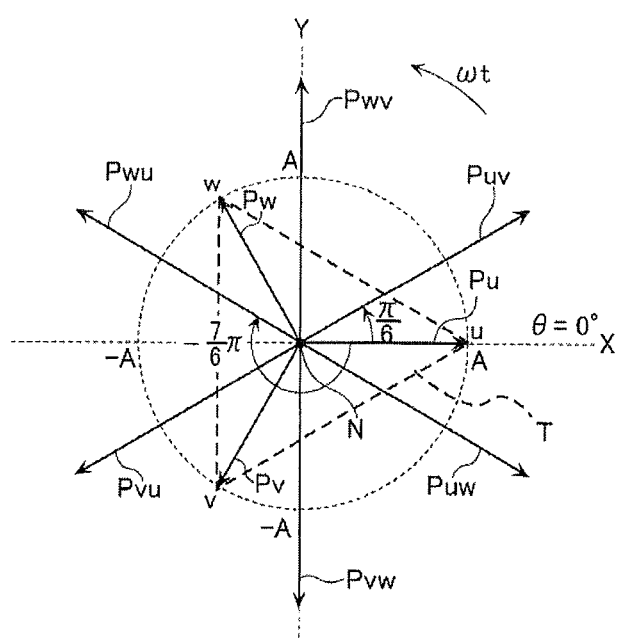
FIG. 1 is a diagram for using vectors to describe the phase voltage signal and line voltage signal of each phase of a three-phase current in the three-phase equilibrium state.

FIG. 1 is a diagram for using vectors to describe the phase voltage signal and line voltage signal of each phase of a three-phase current in the three-phase equilibrium state.

Letting the U-phase phase voltage signal be $Vu=A \cdot \sin(\omega t)$, the phase of the V phase is delayed by $2\pi/3$ relative to the U phase, and therefore the V-phase phase voltage signal is $Vv=A \cdot \sin(\omega t - 2\pi/3)$. Also, the phase of the W phase is delayed by $4\pi/3$ (advanced by $2\pi/3$) relative to the U phase, and therefore the W-phase phase voltage signal is $Vw=A \cdot \sin(\omega t - \pi/3)$. Also, the U-phase line voltage signal relative to the V phase is $Vuv=Vu-Vv=\sqrt{3} \cdot A \cdot \sin(\omega t + \pi/6)$, the V-phase line voltage signal relative to the W phase is $Vvw=Vv-Vw=\sqrt{3} \cdot A \cdot \sin(\omega t - \pi/2)$, and the W-phase line voltage signal relative to the U-phase is $Vwu=Vw-Vu=\sqrt{3} \cdot A \cdot \sin(\omega t - 7\pi/6)$.

In FIG. 1, phase voltage signals Vu, Vv, and Vw are expressed as vectors Pu, Pv, and Pw, and line voltage signals Vuv, Vvw, and Vwu are expressed as vectors Puv, Pvw, and Pwu. Also, the dashed line indicates an equilateral triangle T that connects the terminal points of the vectors Pu, Pv, and Pw whose origin is a neutral point N, and the vertices are respectively indicated as u, v, and w. This figure shows the state in which the X axis is the phase reference ($\theta=0°$), and the vector Pu corresponding to the U-phase phase voltage signal Vu conforms to the X axis. Also, the orientations of the vectors Pvu, Pwv, and Puw are the opposite of those of the vectors Puv, Pvw, and Pwu respectively. Accordingly, the signals Vvu, Vwv, and Vuw corresponding to the vectors Pvu, Pwv, and Puw are shifted by $\pi$ from the phases of the line voltage signals Vuv, Vvw, and Vwu respectively, that is to say, $Vvu=-Vuv=\sqrt{3} \cdot A \cdot \sin(\omega t + 7\pi/6)$, $Vwv=-Vvw=\sqrt{3} \cdot A \cdot \sin(\omega t + \pi/2)$, and $Vuw=-Vwu=\sqrt{3} \cdot A \cdot \sin(\omega t - \pi/6)$.

In FIG. 1, the state in which the vectors Pu, Pv, and Pw hold a $2\pi/3$ phase difference with each other and are rotated counterclockwise about the neutral point N by the angular velocity $\omega$ is the three-phase equilibrium state. In general, since the neutral point N is set at the reference voltage 0 [v], the phase voltage signals Vu, Vv, and Vw are orthogonal projections of the vectors Pu, Pv, and Pw respectively on the Y axis, and are sinusoidal signals whose phases are shifted from each other by $2\pi/3$ as described above.

Figure 2:
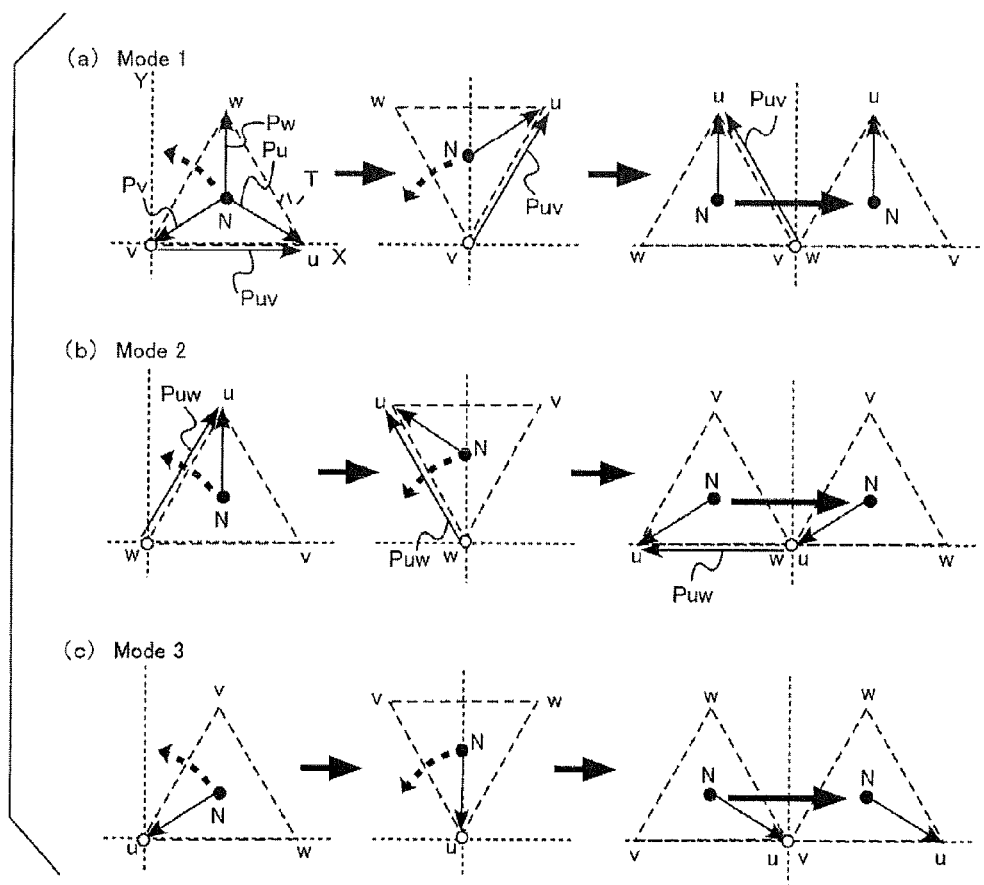
FIGS. 2A to 2C are diagrams for using vectors to describe the concept of NVS control.

FIGS. 2A to 2C are diagrams for, similarly to FIG. 1, using vectors to describe the concept of NVS control. In NVS control, the neutral point N is shifted at a ⅓-cycle interval instead of being fixed at 0 [v], and the potential of each phase is fixed at a negative-side potential (e.g., 0 [v]) in each ⅓ cycle.

FIGS. 2A to 2C show the neutral point N and the vector Pu, and the vectors Pv and Pw are not shown, with the exception of the diagram on the left in FIG. 2A. Also, the dashed line indicates an equilateral triangle T that connects the terminal points of the vectors Pu, Pv, and Pw whose origin is the neutral point N, and the vertices are respectively indicated as u, v, and w. Furthermore, the fixed vertices are marked by white circles in these figures.

FIG. 2A shows the state in which the angle that the vector Pu forms with the X axis (hereinafter, referred to as "angle $\theta$") changes from $-\pi/6$ to $\pi/2$. When $-\pi/6 \leq \theta \leq \pi/2$, the V-phase potential is fixed at 0 [v]. This state will be referred to as "mode 1". In mode 1, the vertex v of the equilateral triangle T is fixed at the origin, and the equilateral triangle T rotates counterclockwise (the direction indicated by the dashed line arrow in this figure, and the same follows hereinafter as well) about the vertex v by $2\pi/3$. The diagram on the left shows the state when $\theta=-\pi/6$, the diagram in the center shows the state when $\theta=\pi/6$, and the diagram on the right shows the state when $\theta=\pi/2$. When $\theta=\pi/2$, the W-phase potential is fixed at 0 (v). The diagram on the right shows that the fixed phase changes from the V phase to the W phase, and that the neutral point N shifts since the equilateral triangle T moves such that the vertex w conforms to the origin.

FIG. 2B shows the state in which the angle $\theta$ changes from $\pi/2$ to $7\pi/6$. When $\pi/2 \leq \theta \leq 7\pi/6$, the W-phase potential is fixed at 0 (v). This state will be referred to as "mode 2". In mode 2, the vertex w of the equilateral triangle T is fixed at the origin, and the equilateral triangle T rotates counterclockwise about the vertex w by $2\pi/3$. The diagram on the left shows the state when $\theta=\pi/2$, the diagram in the center shows the state when $\theta=5\pi/6$, and the diagram on the right shows the state when $\theta=7\pi/6$. The diagram on the left is the same as the diagram on the right in FIG. 2A after shifting of the neutral point. When $\theta=7\pi/6$, the U-phase potential is fixed at 0 [v]. The diagram on the right shows that the fixed phase changes from the W phase to the U phase, and that the neutral point N shifts since the equilateral triangle T moves such that the vertex u conforms to the origin.

FIG. 2C shows the state in which the angle θ changes from 7π/6 to 11π/6 (=−π/6). When 7π/6≤θ≤11π/6, the U-phase potential is fixed at 0 [v]. This state will be referred to as "mode 3". In mode 3, the vertex u of the equilateral triangle T is fixed at the origin, and the equilateral triangle T rotates counterclockwise about the vertex u by 2π/3. The diagram on the left shows the state when θ=7π/6, the diagram in the center shows the state when θ=3π/2, and the diagram on the right shows the state when θ=11π/6. The diagram on the left is the same as the diagram on the right in FIG. 2B after shifting of the neutral point. When θ=11π/6, the V-phase potential is fixed at 0 [v]. The diagram on the right shows that the fixed phase changes from the U phase to the V phase, and that the neutral point N shifts since the equilateral triangle T moves such that the vertex v conforms to the origin. The diagram on the right in FIG. 2C after shifting of the neutral point is the same as the diagram on the left in FIG. 2A. The modes 1 to 3 are subsequently repeated.

In the vector diagrams in FIGS. 2A to 2C, the phase voltages of the phases are represented by the Y coordinate of the vertices of the equilateral triangles T. For example, the U-phase phase voltage is represented by the Y coordinate of the vertex u. In mode 1, the vertex v is fixed at the origin, and therefore the U-phase phase voltage is the orthogonal projection of the vector pointing from the vertex v to the vertex u (i.e., the vector Puv obtained by subtracting the vector Pv from the vector Pu) onto the Y axis (see FIG. 2A). Accordingly, the U-phase phase voltage signal Vu' in NVS control in mode 1 is the U-phase line voltage signal Vuv relative to the V-phase.

Figure 28:
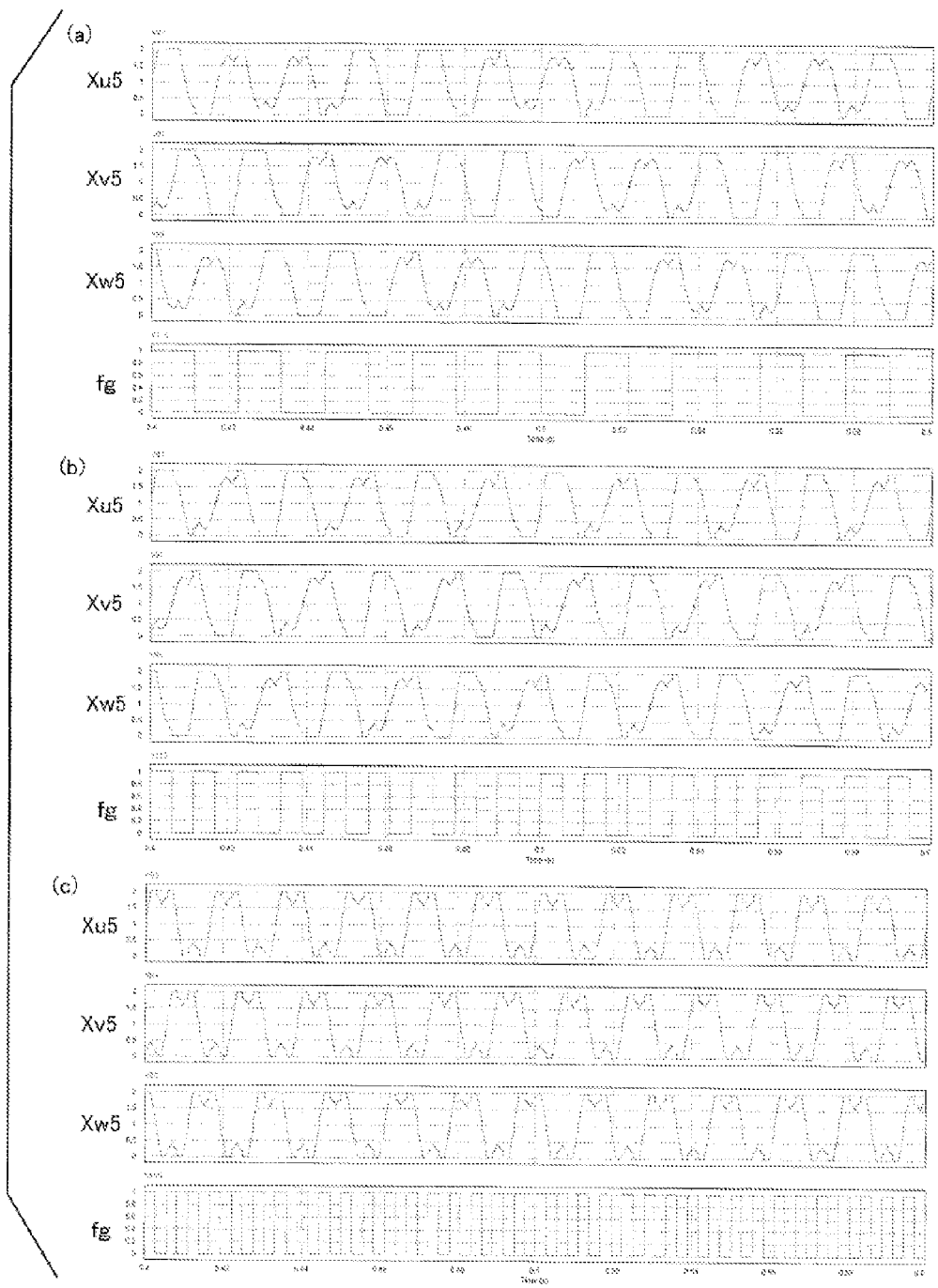
FIGS. 28A to 28C are diagrams for describing the results of simulating command value signals according to the fifth embodiment.
Figure 29:
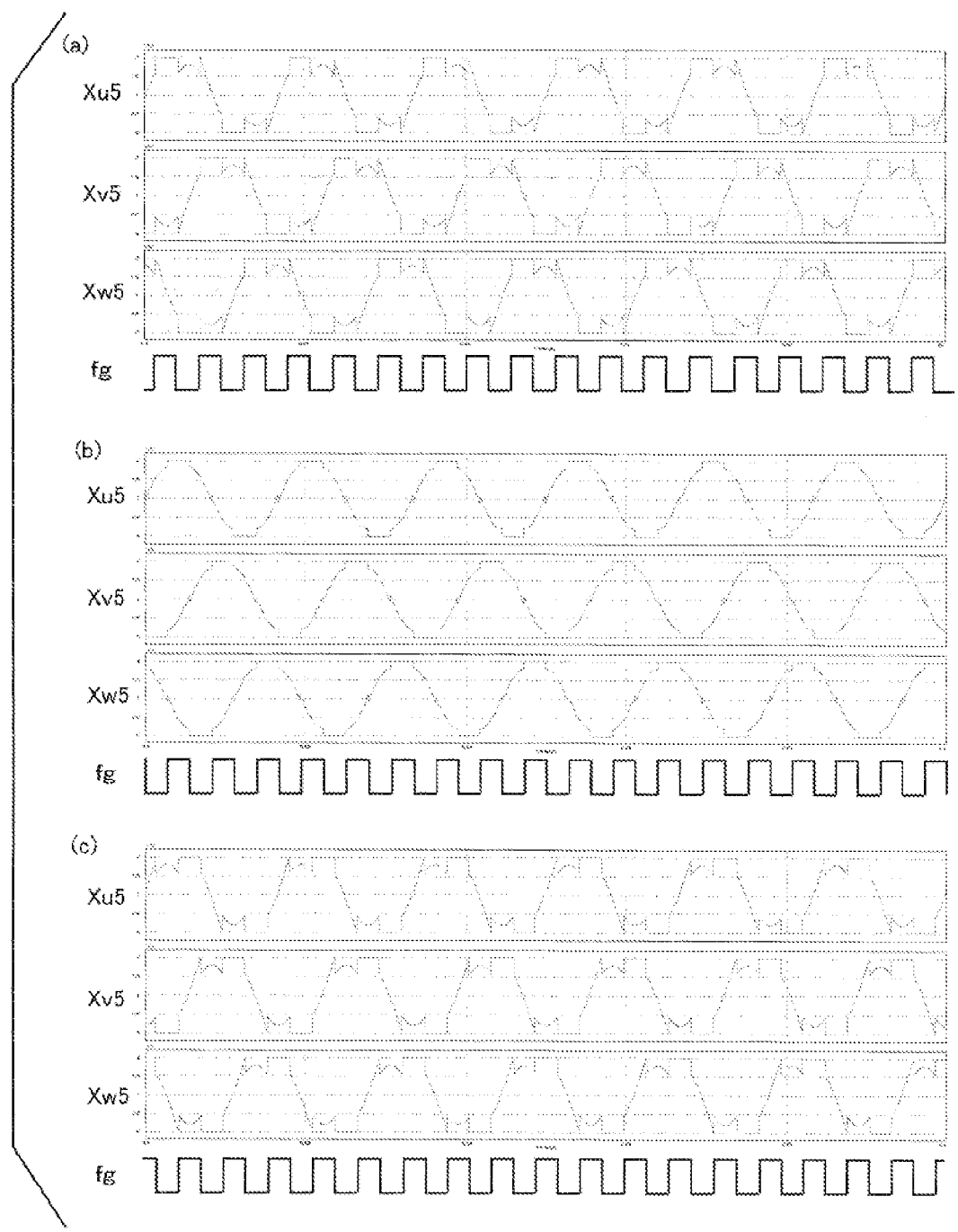
FIGS. 29A to 29C are diagrams for describing the results of simulating command value signals according to the fifth embodiment.
Figure 30:
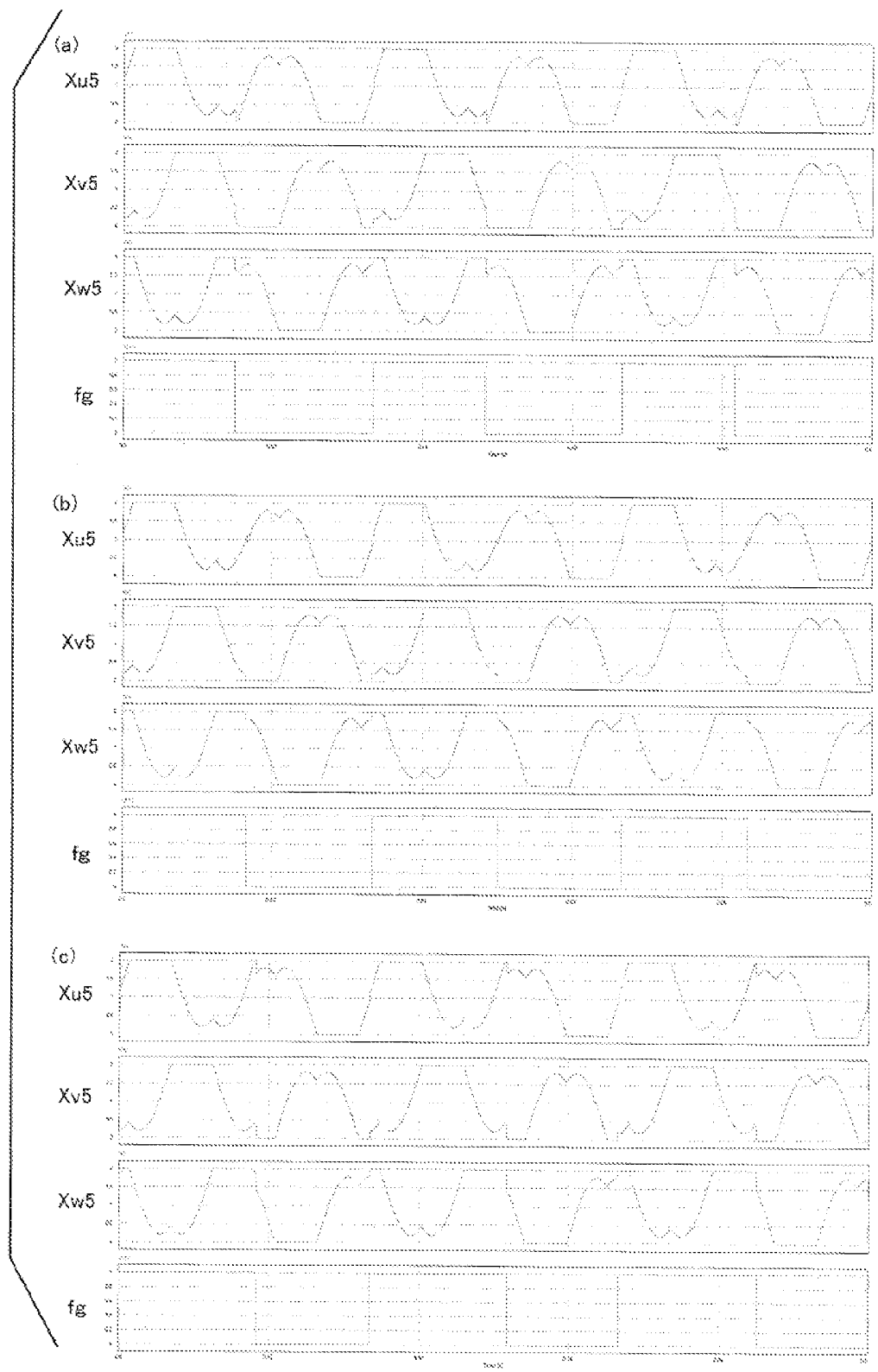
FIGS. 30A to 30C are diagrams for describing the results of simulating command value signals according to the fifth embodiment.

In mode 2, the vertex w is fixed at the origin, and therefore the U-phase phase voltage is the orthogonal projection of the vector pointing from the vertex w to the vertex u (i.e., the vector Puw obtained by subtracting the vector Pw from the vector Pu) onto the Y axis (see FIG. 28). Accordingly, the U-phase phase voltage signal Vu' in NVS control in mode 2 is the signal Vuw (=−Vwu). In mode 3, the vertex u is fixed at the origin, and therefore the U-phase phase voltage is "0" (see FIG. 2C). Accordingly, the U-phase phase voltage signal Vu' in NVS control in mode 3 is the zero signal with the value of "0".

Similarly, the V-phase phase voltage signal Vv' in NVS control is the zero signal in mode 1, the line voltage signal Vvw in mode 2, and the signal Vvu in mode 3. Also, the W-phase phase voltage signal Vw' in NVS control is the signal Vwv in mode 1, the zero signal in mode 2, and the line voltage signal Vwu in mode 3.

According to the above description, the NVS command value signal Xu' is generated by switching between the line voltage command value signal Xuv, the signal Xuw, and the zero signal according to the respective modes. The same follows for the NVS command value signals Xv' and Xw'. The waveforms of the generated NVS command value signals Xv', and Xw' are shown in (c) of FIG. 49.

As shown in (c) of FIG. 49, the NVS command value signals Xu', Xv', and Xw' are fixed at "0" for ⅓ of the cycle. Accordingly, the PWM signals that are generated by comparing the NVS command value signals Xu', Xv', and Xw' with the carrier signal is continuously at the low level or the high level for the period for which the NVS command value signals Xu', Xv', and Xw' are fixed at "0". Since the PWM signals are continuously at only either the low level or the high level, the problem arises that the duration of the on state is different between the positive-side switching elements and the negative-side switching elements.

In order to address this problem, it is sufficient to cause the duration of the low level and the duration of the high level to be the same length in the PWM signals. Specifically, it is sufficient that the command value signals for comparison with the carrier signal are fixed at the minimum value (e.g., "0") and the maximum value for the same duration instead of only being fixed at "0". Considering this is terms of vector diagrams similarly to FIGS. 2A to 2C, it is sufficient that the vertices of the equilateral triangles T are fixed at points at which the X coordinate is "0" and the Y coordinate is a predetermined value for the same duration as the vertices are fixed at the origin, instead of only being fixed at the origin.

FIGS. 3A to 3F are diagrams using vectors to describe the concept of control according to the first embodiment, and describe the case where the vertices of the equilateral triangles T are fixed at the origin and a point where the X coordinate is "0" and the Y coordinate is B (hereinafter, referred to as the "maximum point").

Figure 3:
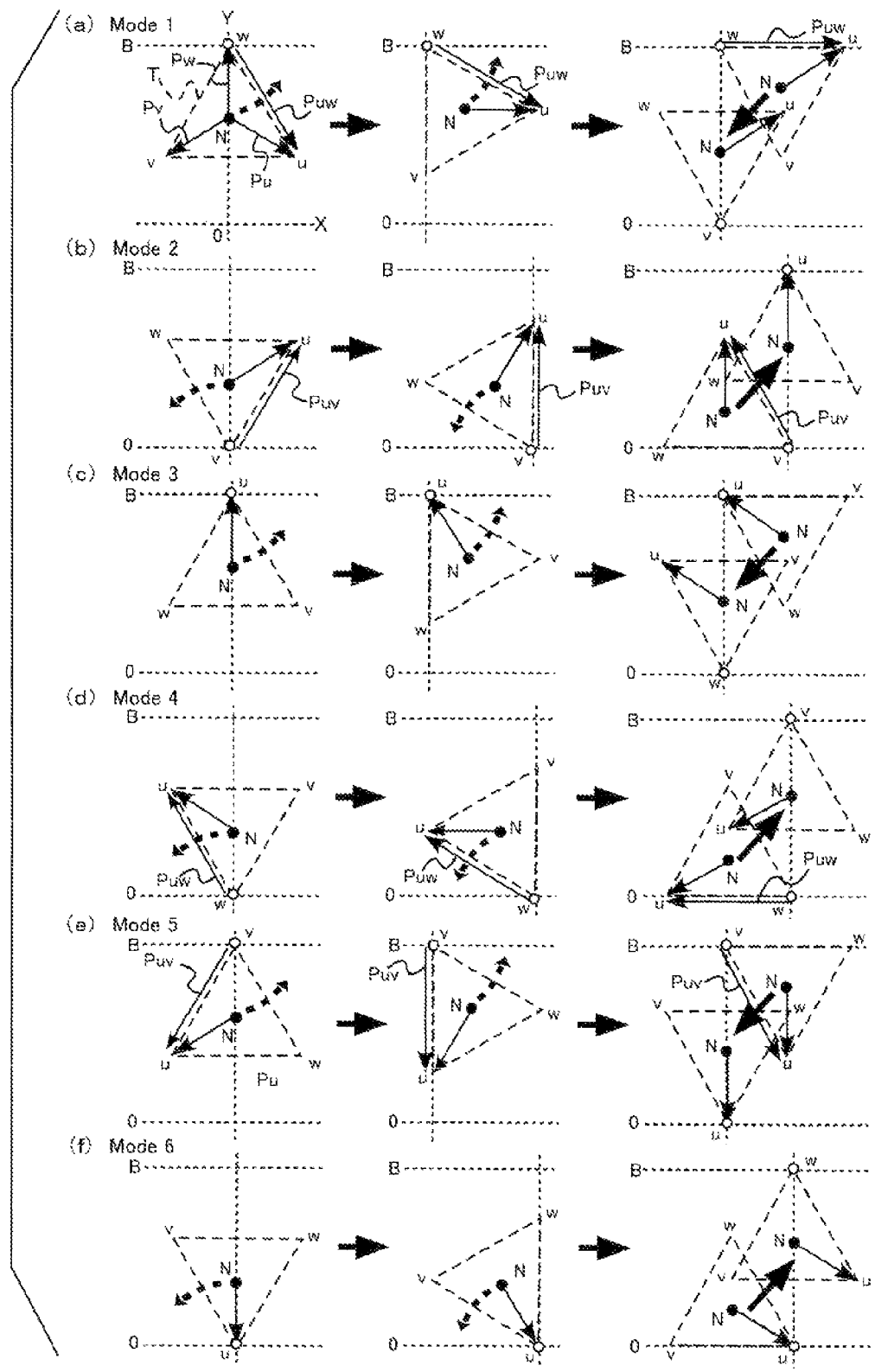
FIGS. 3A to 3F are diagrams for using vectors to describe the concept of control according to a first embodiment.

Similarly to FIGS. 2A to 2C, FIGS. 3A to 3F show the neutral point N, the vector Pu, and the equilateral triangle T, and the vectors Pv and Pw are not shown, with the exception of the diagram on the left in FIG. 3A. Also, the fixed vertices are marked by white circles in these figures.

FIG. 3A shows the state in which the angle θ (the angle that the vector Pu forms with the X axis) changes from −π/6 to π/6. When −π/6≤θ≤π/6, the vertex w of the equilateral triangle T is fixed at the maximum point, and the equilateral triangle T rotates counterclockwise (the direction indicated by the dashed line arrow in this figure, and the same follows hereinafter as well) about the vertex w by π/3. This state will be referred to as "mode 1". FIG. 3A shows that the W-phase potential is fixed at B in mode 1. The diagram on the left shows the state when θ=−π/6, the diagram in the center shows the state when θ=0, and the diagram on the right shows the state when θ=π/6. When θ=π/6, the neutral point N shifts since the equilateral triangle T moves such that the vertex v conforms to the origin. This shows a change from the state in which the W-phase potential is fixed at B to the state in which the V-phase potential is fixed at "0".

FIG. 3B shows the state in which the angle θ changes from π/6 to π/2 (=3π/6). When π/6≤θ≤π/2, the vertex v of the equilateral triangle T is fixed at the origin, and the equilateral triangle T rotates counterclockwise about the vertex v by π/3. This state will be referred to as "mode 2". FIG. 3B shows that the V-phase potential is fixed at "0" in mode 2. The diagram on the left shows the state when θ=π/6, the diagram in the center shows the state when θ=π/3 (=2π/6), and the diagram on the right shows the state when θ=π/2 (=3π/6). The diagram on the left is the same as the diagram on the right in FIG. 3A after shifting of the neutral point. When θ=π/2, the neutral point N shifts since the equilateral triangle T moves such that the vertex u conforms to the maximum point. This shows a change from the state in which the V-phase potential is fixed at "0" to the state in which the U-phase potential is fixed at B.

FIG. 3C shows the state in which the angle θ changes from π/2 (=3π/6) to 5π/6. When π/2≤θ≤5π/6, the vertex u of the equilateral triangle T is fixed at the maximum point, and the equilateral triangle T rotates counterclockwise about the vertex u by π/3. This state will be referred to as "mode 3". FIG. 3C shows that the U-phase potential is fixed at B in mode 3. The diagram on the left shows the state when θ=π/2 (=3π/6), the diagram in the center shows the state when θ=2π/3 (=4π/6), and the diagram on the right shows the state when θ=5π/6. The diagram on the left is the same as the diagram on the right in FIG. 3B after shifting of the neutral point. When θ=5π/6, the neutral point N shifts since the equilateral triangle T moves such that the vertex w conforms to the origin. This shows a change from the state in which the U-phase potential is fixed at B to the state in which the W-phase potential is fixed at "0".

FIG. 3D shows the state in which the angle θ changes from 5π/6 to 7π/6. When 5π/6≤θ≤7π/6, the vertex w of the equilateral triangle T is fixed at the origin, and the equilateral triangle T rotates counterclockwise about the vertex w by π/3. This state will be referred to as "mode 4". FIG. 3D shows that the W-phase potential is fixed at "0" in mode 4. The diagram on the left shows the state when θ=5π/6, the diagram in the center shows the state when θ=π (=6π/6), and the diagram on the right shows the state when θ=7π/6. The diagram on the left is the same as the diagram on the right in FIG. 3C after shifting of the neutral point. When θ=7π/6, the neutral point N shifts since the equilateral triangle T moves such that the vertex v conforms to the maximum point. This shows a change from the state in which the W-phase potential is fixed at "0" to the state in which the V-phase potential is fixed at B.

FIG. 3E shows the state in which the angle θ changes from 7π/6 to 3π/2 (=9π/6). When 7π/6≤θ≤3π/2, the vertex v of the equilateral triangle T is fixed at the maximum point, and the equilateral triangle T rotates counterclockwise about the vertex v by π/3. This state will be referred to as "mode 5". FIG. 3E shows that the V-phase potential is fixed at B in mode 5. The diagram on the left shows the state when θ=7π/6, the diagram in the center shows the state when θ=4π/3 (=8π/6), and the diagram on the right shows the state when θ=3π/2 (=9π/6). The diagram on the left is the same as the diagram on the right in FIG. 3D after shifting of the neutral point. When θ=3π/2, the neutral point N shifts since the equilateral triangle T moves such that the vertex u conforms to the origin. This shows a change from the state in which the V-phase potential is fixed at B to the state in which the U-phase potential is fixed at "0".

FIG. 3F shows the state in which the angle θ changes from 3π/2 (=9π/6) to 11π/6 (=-π/6). When 3π/2≤θ≤11π/6, the vertex u of the equilateral triangle T is fixed at the origin, and the equilateral triangle T rotates counterclockwise about the vertex u by π/3. This state will be referred to as "mode 6". FIG. 3F shows that the U-phase potential is fixed at "0" in mode 6. The diagram on the left shows the state when θ=3π/2 (=9π/6), the diagram in the center shows the state when θ=5π/3 (=10π/6), and the diagram on the right shows the state when θ=11π/6. The diagram on the left is the same as the diagram on the right in FIG. 3E after shifting of the neutral point. When θ=11π/6, the neutral point N shifts since the equilateral triangle T moves such that the vertex w conforms to the maximum point. This shows a change from the state in which the U-phase potential is fixed at "0" to the state in which the W-phase potential is fixed at B. The diagram on the right in FIG. 3F after shifting of the neutral point is the same as the diagram on the left in FIG. 3A. The modes 1 to 6 are subsequently repeated.

In the vector diagrams in FIGS. 3A to 3F, the phase voltages of the phases are represented by the Y coordinate of the vertices of the equilateral triangles T. For example, the U-phase phase voltage is represented by the Y coordinate of the vertex u. In mode 1, the vertex w is fixed at the maximum point, and therefore the U-phase phase voltage has the value obtained by adding B to the orthogonal projection of the vector Puw pointing from the vertex w to the vertex u onto the Y axis (see FIG. 3A). Accordingly, it is sufficient that the command value signal Xu1 for specifying the waveform of the U-phase phase voltage in mode 1 is the result of adding B to the signal Xuw (=-Xwu). In mode 2, the vertex v is fixed at the origin, and the U-phase phase voltage is therefore the orthogonal projection of the vector Puv pointing from the vertex v to the vertex u onto the Y axis (see FIG. 3B). Accordingly, it is sufficient that the command value signal Xu1 in mode 2 is the line voltage command value signal Xuv. In mode 3, the vertex u is fixed at the maximum point, and therefore the U-phase phase voltage is B (see FIG. 3C). Accordingly, it is sufficient that the command value signal Xu1 in mode 3 is the signal with the value of B. In mode 4, the vertex w is fixed at the origin, and therefore the U-phase phase voltage is the orthogonal projection of the vector Puw pointing from the vertex w to the vertex u onto the Y axis (see FIG. 3D). Accordingly, it is sufficient that the command value signal Xu1 in mode 4 is the signal Xuw (=-Xwu). In mode 5, the vertex v is fixed at the maximum point, and therefore the U-phase phase voltage has the value obtained by adding B to the orthogonal projection of the vector Puv pointing from the vertex v to the vertex u onto the Y axis (see FIG. 3S). Accordingly, it is sufficient that the command value signal Xu1 in mode 5 is the result of adding B to the line voltage command value signal Xuv. In mode 6, the vertex u is fixed at the origin, and therefore the U-phase phase voltage is "0" (see FIG. 3F). Accordingly, it is sufficient that the command value signal Xu1 in mode 6 is the zero signal with the value of "0".

Similarly, it is sufficient that the command value signal Xv1 for specifying the waveform of the V-phase phase voltage is the result of adding B to the line voltage command value signal Xvw in mode 1, the zero signal in mode 2, the result of adding B to the signal Xvu in mode 3, the line voltage command value signal Xvw in mode 4, the signal with the value of B in mode 5, and the signal Xvu in mode 6. Also, it is sufficient that the command value signal Xw1 for specifying the waveform of the W-phase phase voltage is the signal with the value of B in mode 1, the signal Xwv in mode 2, the result of adding B to the line voltage command value signal Xwu in mode 3, the zero signal in mode 4, the result of adding B to the signal Xwv in mode 5, and the line voltage command value signal Xwu in mode 6.

Figure 4:
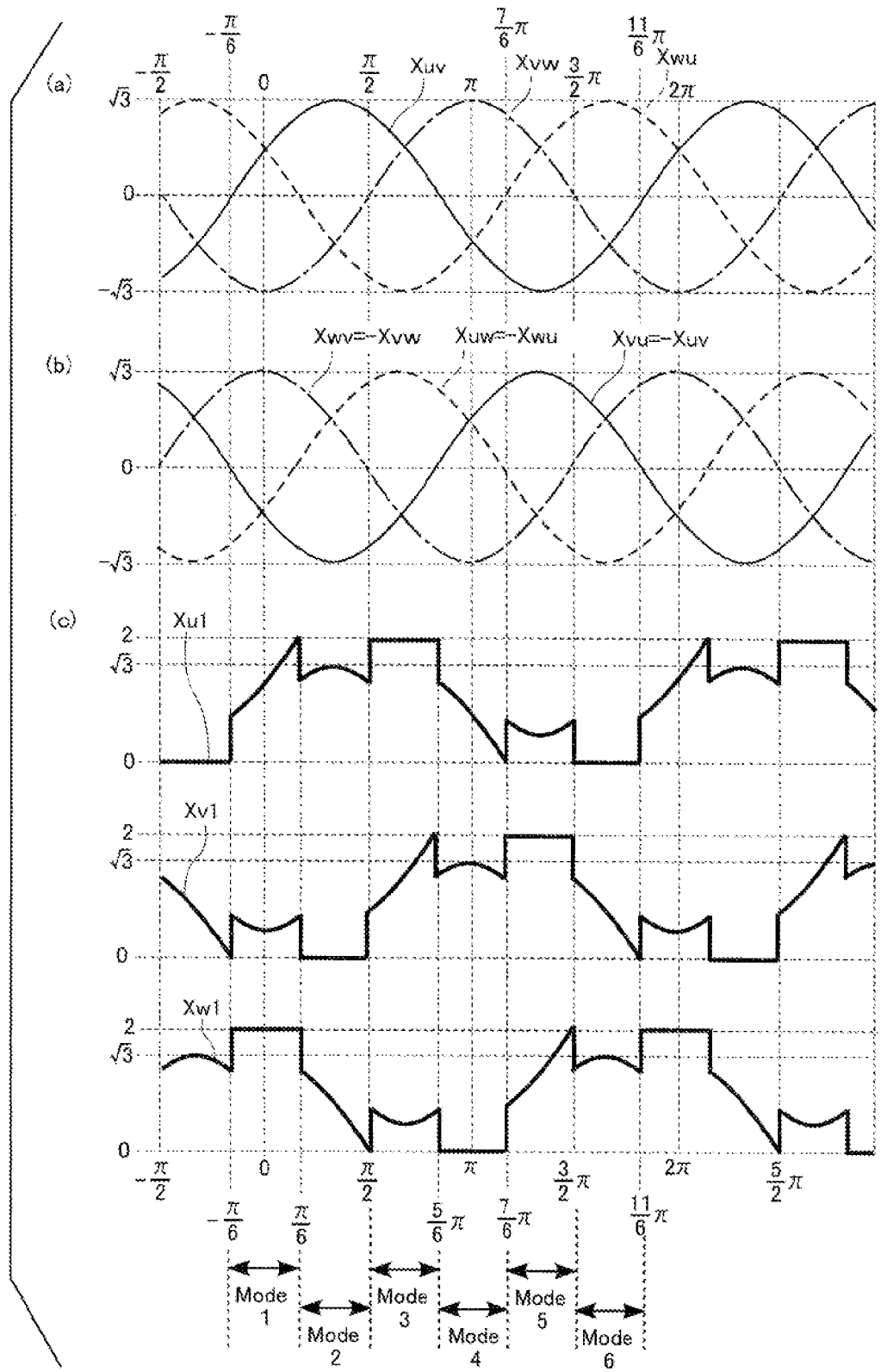
FIG. 4 is a diagram for describing the waveforms of command value signals according to the first embodiment.

FIG. 4 is a diagram for describing the waveforms of the command value signals Xu1, Xv1, and Xw1.

The waveforms Xuv, Xvw, and Xwu shown in (a) of FIG. 4 are the same as the waveforms Xuv, Xvw, and Xwu shown in (a) of FIG. 49, and the waveforms Xvu, Xwv, and Xuw shown in (h) of FIG. 4 are the same as the waveforms Xvu, Xwv, and Xuw shown in (b) of FIG. 49, and therefore descriptions thereof will not be given. In FIG. 4 as well, the phase of the phase voltage command value signal Xu is used as the reference for illustration. The angle θ in the descriptions given using the vector diagrams in FIGS. 3A to 3F and the like is the angle that the vector Pu forms with the X axis, and indicates the phase of the phase voltage command value signal Xu. Accordingly, the phases shown in FIG. 4 correspond to the θ.

The waveform Xu1 shown in (c) of FIG. 4 is the waveform of the U-phase command value signal Xu1. As was described with reference to FIGS. 3A to 3F, the command value signal Xu1 is generated through the modes 1 to 6. In FIG. 4, (c) shows the respective waveforms when B=2. The waveform Xu1 has the waveform obtained by shifting the waveform Xuw upward by "2" in mode 1 (-π/6≤θ≤π/6), the waveform Xuv in mode 2 (π/6≤θ≤π/2), the waveform fixed at "2" in mode 3 (π/2≤θ≤5π/6), the waveform Xuw in mode 4 (5π/6≤θ≤7π/6), the waveform obtained by shifting the waveform Xuv upward by "2" in mode 5 (7π/6≤θ≤3π/2), and the waveform fixed at "0" in mode 6 (3π/2≤θ≤11π/6). Similarly, the waveform Xv1 has the waveform obtained by shifting the waveform Xvw upward by "2" in mode 1, the waveform fixed at "0" in mode 2, the waveform obtained by shifting the waveform Xvu upward by "2" in mode 3, the waveform Xvw in mode 4, the waveform fixed at "2" in mode 5, and the waveform Xvu in mode 6. Also, the waveform Xw1 has the waveform fixed at "2" in mode 1, the waveform Xwv in mode 2, the waveform obtained by shifting the waveform Xwu upward by "2" in mode 3, the waveform fixed at "0" in mode 4, the waveform obtained by shifting the waveform Xwv upward by "2" in mode 5, and the waveform Xwu in mode 6.

The command value signals Xu1, Xv1, and Xw1 are fixed at "0" for ⅙ of the cycle, and are fixed at "2" for ⅙ of the cycle. Accordingly, the PWM signals are continuously at the low level (or the high level) for the period for which the command value signals Xu1, Xv1, and Xw1 are fixed at "0", and are continuously at the high level (or the low level) for the period for which the command value signals Xu1, Xv1, and Xw1 are fixed at "2". Since the low level duration and the high level duration of the PWM signals are the same, the durations of the on states are the same between the positive-side switching elements and the negative-side switching elements.

Next is a description of a control circuit that generates the above-described command value signals Xu1, Xv1, and Xw1 and outputs PWM signals based thereon to an inverter circuit.

Figure 5:
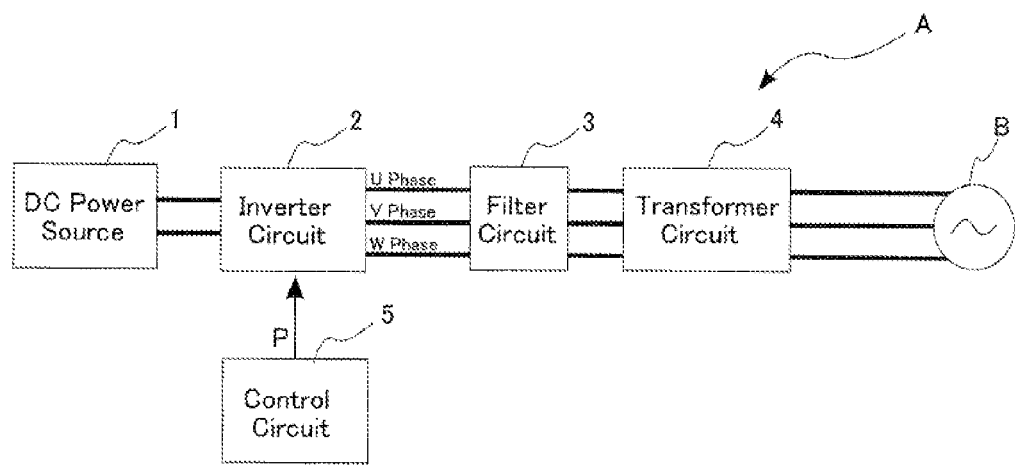
FIG. 5 is a block diagram for describing an interconnection inverter system including a control circuit according to the first embodiment.

FIG. 5 is a block diagram for describing an interconnection inverter system including a control circuit according to the present invention.

As shown in FIG. 5, an interconnection inverter system A includes a DC power source 1, an inverter circuit 2, a filter circuit 3, a transformer circuit 4, and a control circuit 5. The DC power source 1 is connected to the inverter circuit 2. The inverter circuit 2 is three-phase inverter, and the inverter circuit 2, the filter circuit 3, and the transformer circuit 4 are connected in series in the stated order via U-phase, V-phase, and W-phase output voltage output lines. The output lines are connected to a three-phase power system B (system B) via a switch (not shown). The control circuit 5 is connected to the inverter circuit 2. The interconnection inverter system A is connected to the system B by the switch, and is for converting DC power output by the DC power source 1 into AC power with the inverter circuit 2 and supplying the AC power to the system B. Note that the interconnection inverter system A is provided with various types of sensors, and the control circuit 5 performs control based on values detected by these sensors. However, the various types of sensors are not shown in FIG. 5. Also, the configuration of the interconnection inverter system A is not limited to such a configuration. For example, a tranformerless type of configuration is possible in which a DC/DC converter circuit is provided between the DC power source 1 and the inverter circuit 2, instead of providing the transformer circuit 4.

The DC power source 1 outputs DC power and includes a solar battery, for example. The solar battery generates DC power by converting solar energy into electrical energy. The DC power source 1 outputs the generated DC power to the inverter circuit 2. Note that the DC power source 1 is not limited to generating DC power using a solar battery. For example, the DC power source 1 may be a fuel battery, a storage battery, an electrical double layer capacitor, lithium ion battery, or the like. Also, the DC power source 1 may be an apparatus that converts AC power generated by a diesel engine generator, a micro gas turbine generator, a wind turbine generator, or the like into DC power and outputs the DC power.

The inverter circuit 2 is a three-phase full bridge inverter that includes six switching elements, and is for converting DC voltage input from the DC power source 1 into AC voltage by switching the switching elements between the on state and the off state based on PWM signals P input from the control circuit 5. Note that there are six PWM signals P that are input to the respective switching elements.

Figure 6:
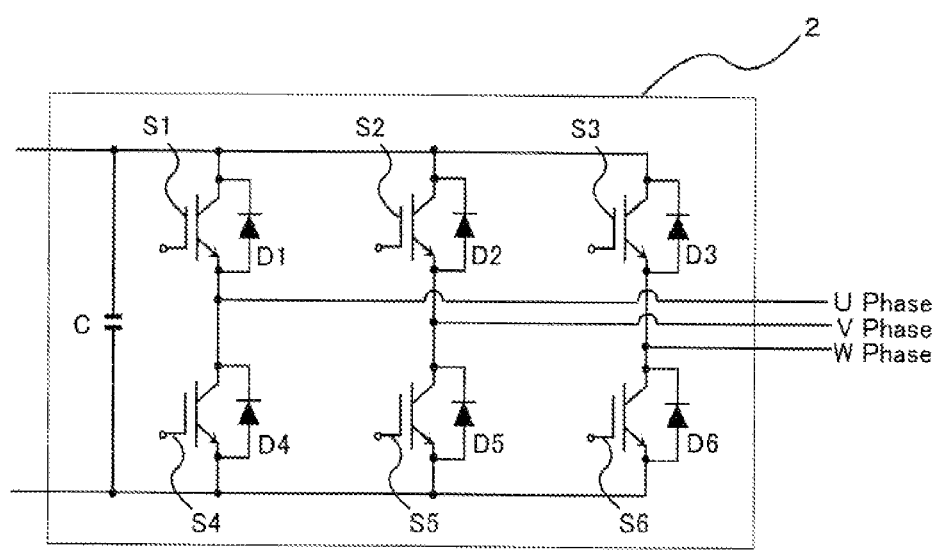
FIG. 6 is a circuit diagram for describing the internal configuration of an inverter circuit.

FIG. 6 is a circuit diagram for describing the internal configuration of the inverter circuit 2.

As shown in FIG. 6, the inverter circuit 2 includes six switching elements S1 to S6, flyback diodes D1 to D6, and a smoothing capacitor C. In the present embodiment, IGBTs (Insulated Gate Bipolar Transistors) are used as the switching elements S1 to S6. Note that the switching elements S1 to S6 are not limited to being IGBTs, and may be bipolar transistors, MOSFETs, reverse blocking thyristors, or the like. Also, there are no limitations on the type of the flyback diodes D1 to D6 and the type of the smoothing capacitor C.

The switching elements S1 and S4 are connected to each other in series, with the emitter terminal of the switching element S1 being connected to the collector terminal of the switching element S4. The collector terminal of the switching element S1 is connected to the positive electrode side of the DC power source 1, and the emitter terminal of the switching element S4 is connected to the negative electrode side of the DC power source 1, thus forming a bridge structure. Similarly, the switching elements S2 and S5 are connected to each other in series to form a bridge structure, and the switching elements S3 and S6 are connected to each other in series to form a bridge structure. The bridge structure formed by the switching elements S1 and S4 is the U-phase arm, the bridge structure formed by the switching elements S2 and S5 is the V-phase arm, and the bridge structure formed by the switching elements S3 and S6 is the W-phase arm. The connection point between the switching elements S1 and S4 in the U-phase arm is connected to the U-phase output line, the connection point between the switching elements S2 and S5 in the V-phase arm is connected to the V-phase output line, and the connection point between the switching elements S3 and S6 in the W-phase arm is connected to the W-phase output line. The PWM signals P output from the control circuit 5 are input to the base terminals of the respective switching elements S1 to S6.

The switching elements S1 to S6 are switched between the on state and the off state based on the PWM signals P. The two ends of each arm are respectively connected to the positive electrode and negative electrode of the DC power source 1, and therefore in the case where a positive-side switching element is in the on state and a negative-side switching element is in the off state, the potential of the output line for the corresponding phase is the positive-side potential of the DC power source 1. On the other hand, in the case where a positive-side switching element is in the oft state and a negative-side switching element is in the on state, the potential of the output line for the corresponding phase is the negative-side potential of the DC power source 1. Accordingly, a pulse-shaped voltage signal that switches between the positive-side potential and negative-side potential of the DC power source 1 is output from each of the output lines, and the line voltages, which are voltages between two output lines, are AC voltages.

The flyback diodes D1 to D6 are connected in anti-parallel between the collector terminals and the emitter terminals of the switching elements S1 to S6 respectively. Specifically, the anode terminals of the flyback diodes D1 to D6 are connected to the emitter terminals of the switching elements S1 to S6 respectively, and the cathode terminals of the flyback diodes D1 to D6 are connected to the collector terminals of the switching elements S1 to S6 respectively. Counter-electromotive force is generated due to switching in the switching elements S1 to S6. The flyback diodes D1 to D6 are for preventing an opposite-direction high voltage from being applied to the switching elements S1 to S6 due to the counter-electromotive force.

The smoothing capacitor C is for smoothing the DC voltage input from the DC power source 1.

Note that the configuration of the inverter circuit 2 is not limited to such a configuration. For example, the inverter circuit 2 may be a multilevel inverter such as a three-level inverter, or an inverter in which soft switching technology is applied. Also, the inverter circuit 2 is not limited to being a full bridge inverter, and may be a half bridge inverter.

The filter circuit 3 removes the high-frequency component resulting from switching from the AC voltage input from the inverter circuit 2. The filter circuit 3 includes a low-pass filter (not shown) that is made up of a reactor and a capacitor. An AC voltage from which the high-frequency component has been removed by the filter circuit 3 is output to the transformer circuit 4. Note that the filter circuit 3 is not limited to such a configuration, and it is sufficient to use a well-known filter circuit for removing the high-frequency component. The transformer circuit 4 raises or lowers the AC voltage output from the filter circuit 3 to substantially the same level as the system voltage of the system B.

The control circuit 5 is for generating the PWM signals P that control the switching of the switching elements in the inverter circuit 2. The control circuit 5 receives an input of detection signals from various types of sensors (not shown), and outputs the PWM signals P to the inverter circuit 2.

Based on the detection signals input from the various types of sensors, the control circuit 5 generates the command value signals Xu1, Xv1, and Xw1 for specifying the waveforms of the output voltages to be output by the interconnection inverter system A, and generates the PWM signals P based on the command value signals Xu1, Xv1, and Xw1. The inverter circuit 2 outputs voltage signals corresponding to the command value signals Xu1, Xv1, and Xw1 by switching the switching elements between the on and off states based on the PWM signals P that were input. The control circuit 5 controls the output current by changing the waveforms of the command value signals Xu1, Xv1, and Xw1 so as to change the output voltage signals of the inverter circuit 2. Accordingly, the control circuit 5 performs various types of feedback control. Note that the control circuit 5 also has, for example, configuration for stopping the operation of the inverter circuit 2 upon detecting a current surge, a ground fault, a short circuit, isolated operation, or the like, and a configuration for following the maximum power, but these configurations are not shown in FIG. 5 and will not be described since they are not related to the description of the present invention.

Next is a detailed description of the internal configuration of the control circuit 5 and the method of generating the command value signals Xu1, Xv1, and Xw1 and the PWM signals P with reference to FIGS. 7 to 10.

Figure 7:
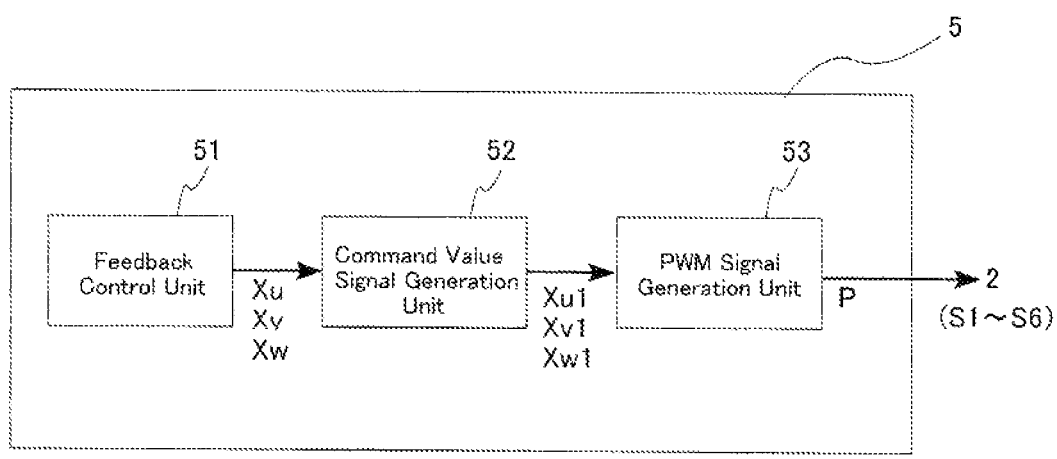
FIG. 7 is a block diagram for describing internal configuration of the control circuit.

FIG. 7 is a block diagram for describing the internal configuration of the control circuit 5.

The control circuit 5 includes a feedback control unit 51, a command value signal generation unit 52, and a PWM signal generation unit 53.

The feedback control unit 51 performs feedback control based on the deviation between detection signals input from various types of sensors and target values that have been set in advance, generates the phase voltage command value signals Xu, Xv, and Xw for specifying the waveforms of the phase voltages to be output by the interconnection inverter system A, and outputs them to the command value signal generation unit 52. Details of the feedback control performed by the feedback control unit 51 will not be described here. The feedback control performed by the feedback control unit 51 may be control of the output current and output voltage output by the interconnection inverter system A as well as the output active power and the output reactive power, or may be control of the DC; voltage output from the DC power source 1.

Based on the phase voltage command value signals Xu, Xv, and Xw input from the feedback control unit 51, the command value signal generation unit 52 generates the command value signals Xu1, Xv1, and Xw1, and outputs them to the PWM signal generation unit 53. The command value signals Xu1, Xv1, and Xw1 are signals for actually specifying the waveforms of the phase voltages to be output by the interconnection inverter system A. The waveforms of the command value signals Xu1, Xv1, and Xw1 are waveforms having special shapes as shown by the waveforms Xu1, Xv1, and Xw1 in (c) of FIG. 4. In other words, the command value signal generation unit 52 converts the phase voltage command value signals Xu, Xv, and Xw into the command value signals Xu1, Xv1, and Xw1.

The command value signal generation unit 52 generates the line voltage command value signals Xuv, Xvw, and Xwu from the phase voltage command value signals Xu, Xv, and Xw. Specifically, the line voltage command value signal Xuv is generated using the difference between the phase voltage command value signals Xu and Xv, the line voltage command value signal Xvw is generated using the difference between the phase voltage command value signals Xv and Xw, and the line voltage command value signal Xwu is generated using the difference between the phase voltage command value signals Xw and Xu. The line voltage command value signals Xuv, Xvw, and Xwu are signals for specifying the waveform of the line voltages to be output by the interconnection inverter system A.

Also, the command value signal generation unit 52 generates the signals Xvu, Xwv, and Xuw, having polarities that are the inverse of those of line voltage command value signals Xuv, Xvw, and Xwu. Note that instead of inverting the polarities, a configuration is possible in which the signal Xvu is generated using the difference between the phase voltage command value signals Xv and Xu, the signal Xwv is generated using the difference between the phase voltage command value signals Xw and Xv, and the signal Xuw is generated using the difference between the phase voltage command value signals Xu and Xw.

The command value signal generation unit 52 generates the command value signals Xu1, Xv1, and Xw1 using the line voltage command value signals Xuv, Xvw, and Xwu, the signals Xvu, Xwv, and Xuw, a zero signal having the value of "0", and a signal having the value of "2". In the present embodiment, the amplitude of the phase voltage command value signals Xu, Xv, and Xw is "1" in order for standardization, and therefore the amplitude of the line voltage command value signals Xuv, Xvw, and Xwu is $\sqrt{3}$ (see (a) of FIG. 4). The upper limit value of the command value signals Xu1, Xv1, and Xw1 needs to be set to a value greater than or equal to the amplitude of the line voltage command value signals Xuv, Xvw, and Xwu. Accordingly, this upper limit value is "2" in the present embodiment, and therefore a signal having the value of "2" is used. Note that since the upper limit value needs only be a value greater than or equal to the amplitude of the line voltage command value signals Xuv, Xvw, and Xwu, the upper limit value is set to a predetermined value greater than or equal to $\sqrt{3}$ in accordance with the modulation factor that is to be set. The amplitude of the later-described carrier signal is set according to the upper limit value.

Figure 8:
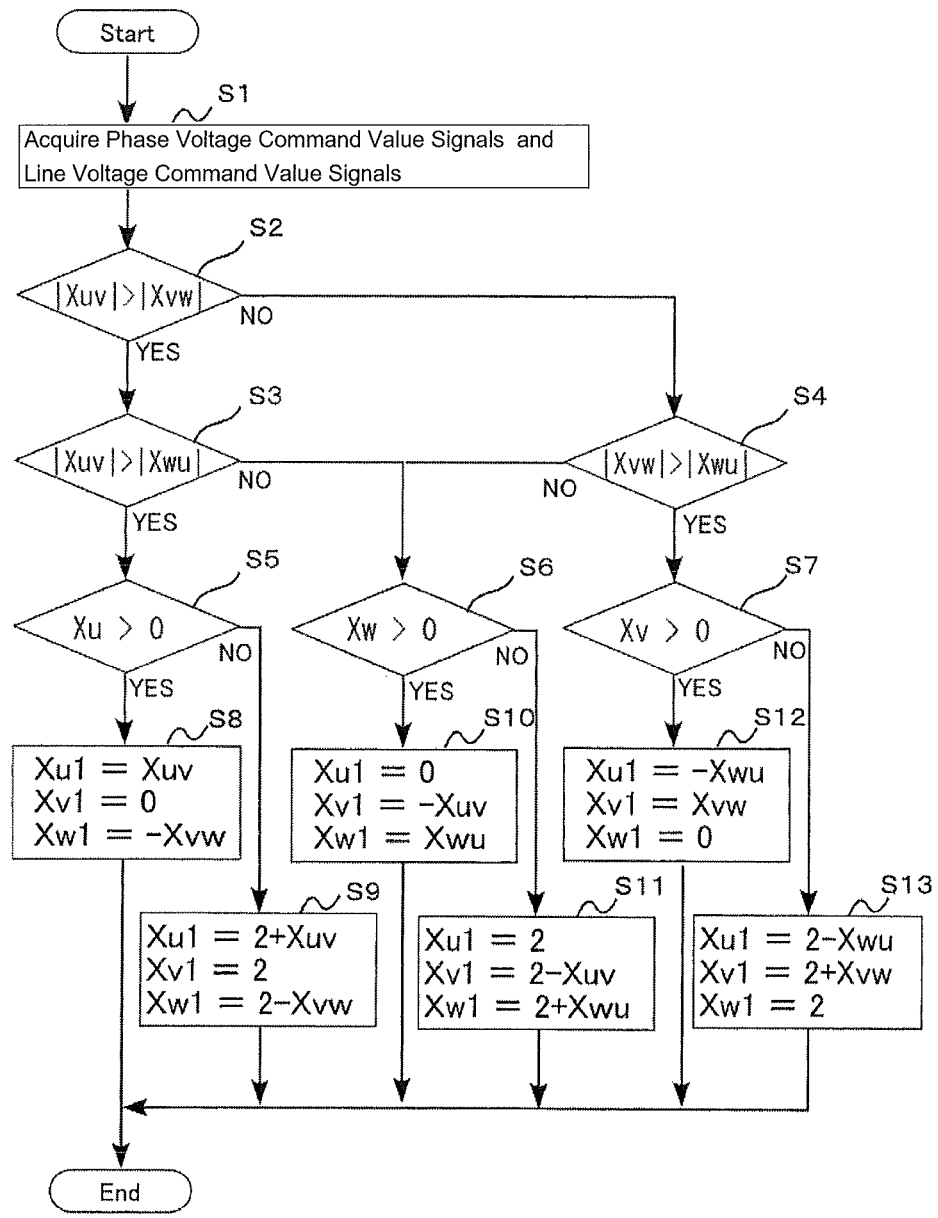
FIG. 8 is a flowchart for describing command value signal generation processing according to the first embodiment.

FIG. 8 is a flowchart for describing processing performed by the command value signal generation unit 52 for generating the command value signals Xu1, Xv1, and Xw1 from the line voltage command value signals Xuv, Xvw, and Xwu (hereinafter, referred to as "command value signal generation processing"). The command value signal generation processing is executed at a predetermined time.

First, the phase voltage command value signals Xu, Xv, and Xw and the line voltage command value signals Xuv, Xvw, and Xwu are acquired (step S1). Next, it is determined whether the absolute value of Xuv is greater than the absolute value of Xvw (step S2). If the absolute value of Xuv is greater (step S2: YES), it is determined whether the absolute value of Xuv is greater than the absolute value of Xwu (step S3). If the absolute value of Xuv is greater (step S3: YES), that is to say, if the absolute value of Xuv is the greatest, the procedure proceeds to step S5. On the other hand, if the absolute value of Xuv is less than or equal to the absolute value of Xwu (step S3: NO), that is to say, if the absolute value of Xwu is the greatest, the procedure proceeds to step S6. If the absolute value of Xuv is less than or equal to the absolute value of Xvw in step S2 (step S2: NO), it is determined whether the absolute value of Xvw is greater than the absolute value of Xwu (step S4). If the absolute value of Xvw is greater (step S4: YES), that is to say, if the absolute value of Xvw is the greatest, the procedure proceeds to step S7. On the other hand, if the absolute value of Xvw is less than or equal to the absolute value of Xwu (step S4: NO), that is to say, if the absolute value of Xwu is the greatest, the procedure proceeds to step S6. In steps S2 to S4, it is determined which of Xuv, Xvw, and Xwu has the greatest absolute value.

If it is determined that the absolute value of Xuv is the greatest, and the procedure proceeds to step S5, it is then determined whether the value of Xu is positive (step S5). If the value of Xu is positive (step S5: YES), the command value signal Xu1 is set to Xuv, the command value signal Xv1 is set to "0", and the command value signal Xw1 is set to the negative value of Xvw (step S8). On the other hand, if Xu is less than or equal to "0" (step S5: NO), Xu1 is set to the value obtained by adding Xuv to "2", Xv1 is set to "2", and Xw1 is set to the value obtained by subtracting Xvw from "2" (step S9).

If it is determined that the absolute value of Xwu is the greatest, and the procedure proceeds to step S6, it is then determined whether the value of Xw is positive (step S6). If the value of Xw is positive (step S6: YES), Xu1 is set to "0", Xv1 is set to the negative value of Xuv, and Xw1 is set to Xwu (step S10). On the other hand, if Xw is less than or equal to "0" (step S6: NO), Xu1 is set to "2", Xv1 is set to the value obtained by subtracting Xuv from "2", and Xw1 is set to the value obtained by adding Xwu to "2" (step S11).

If it is determined that the absolute value of Xvw is the greatest, and the procedure proceeds to step S7, it is then determined whether the value of Xv is positive (step S7). If the value of Xv is positive (step S7: YES), the value of Xu1 is set to the negative value of Xwu, Xv1 is set to Xvw, and Xw1 is set to "0" (step S12). On the other hand, if Xv is less than or equal to "0" (step S7: NO), Xu1 is set to the value obtained by subtracting Xwu from "2", Xv1 is set to the value obtained by adding Xvw to "2", and Xw1 is set to "2" (step S13).

In other words, in the command value signal generation processing, it is determined which of the line voltage command value signals Xuv, Xvw, and Xwu has the greatest absolute value, it is determined whether the phase voltage command value signal corresponding to the line voltage command value signal having the greatest absolute value is positive or negative, and the command value signals Xu1, Xv1, and Xw1 are determined in accordance with the result of that determination. In other words, it is determined which of the modes among those in the vector diagrams of FIGS. 3A to 3F is the current mode, and the command value signals Xu1, Xv1, and Xw1 of the respective phases are determined so as to correspond to the vector diagram with the mode determined to be the current mode.

In the case of mode 1 state shown in FIG. 3A, the length of the orthogonal projection of the side vw connecting the vertices v and w of the equilateral triangle T on the Y axis is greater than or equal to the length of the orthogonal projection of the other sides wu and uv on the Y axis. In other words, the length of the orthogonal projection of the vector Pvw on the Y axis is greater than or equal to the length of the orthogonal projections of the vectors Pwu and Puv on the Y axis (these vectors are not shown). This shows that the absolute value of the line voltage command value signal Xvw is greater than or equal to the absolute values of the line voltage command value signals Xwu and Xuv. Also, in the case of the mode 1 state, the Y coordinate of the vector Pv is a negative value. This shows that the phase voltage command value signal Xv has a negative value. In other words, in the mode 1 state, the absolute value of the line voltage command value signal Xvw is the greatest, and the phase voltage command value signal Xv has a negative value.

Also, in the case of the mode 1 state, the Y coordinate of the vertex u of the equilateral triangle T has the value obtained by adding the Y coordinate of the vector Puw to B (B being "2" hereinafter since the case where B="2" is described in FIG. 8), that is to say, the value obtained by subtracting the Y coordinate of the vector Pwu from "2". This shows that the phase voltage command value signal Xu1 has the value obtained by subtracting the line voltage command value signal Xwu from "2". Also, the Y coordinate of the vertex v of the equilateral triangle T has the value obtained by adding the Y coordinate of the vector Pvw to "2". This shows that the phase voltage command value signal Xv1 has the value obtained by adding the line voltage command value signal Xvw to "2". Also, since the vertex w of the equilateral triangle T is fixed at the maximum point, the Y coordinate of the vertex w is fixed at "2". This shows that the phase voltage command value signal Xw1 has the value of "2".

Accordingly, in the flowchart shown in FIG. 8, the case where the absolute value of Xvw is the greatest and Xv has a negative value (step S7: NO) is the mode 1 state, and in this case, Xu1 is set to the value obtained by subtracting Xwu from "2", Xv1 is set to the value obtained by adding Xvw to "2", and Xw1 is set to "2" (step S13).

Similarly, in the case of the mode 2 state shown in FIG. 3B, the length of the orthogonal projection of the vector Puv on the Y axis is the greatest, and the Y coordinate of the vector Pu has a positive value. In other words, the absolute value of the line voltage command value signal Xuv is the greatest, and the phase voltage command value signal Xu has a positive value (step S5: YES in FIG. 8). In this case, the Y coordinates of the vertices u, v, and w are respectively the value of the Y coordinate of the vector Puv, "0", and the negative value of the Y coordinate of the vector Pvw. Accordingly, Xu1 is set to Xuv, Xv1 is set to "0", and Xw1 is set to the negative value of Xvw (step S8 in FIG. 8).

In the case of the mode 3 state shown in FIG. 3C, the length of the orthogonal projection of the vector Pwu on the Y axis is the greatest, and the Y coordinate of the vector Pw has a negative value. In other words, the absolute value of the line voltage command value signal Xwu is the greatest, and the phase voltage command value signal Xw has a negative value (step S6: NO in FIG. 8). In this case, the Y coordinates of the vertices u, v, and w are respectively "2", the value obtained by subtracting the Y coordinate of the vector Puv from "2", and the value obtained by adding the Y coordinate of the vector Pwu to "2". Accordingly, Xu1 is set to "2", Xv1 is set to the value obtained by subtracting Xuv from "2", and Xw1 is set to the value obtained by adding Xwu to "2" (step S11 in FIG. 8).

In the case of the mode 4 state shown in FIG. 3D, the length of the orthogonal projection of the vector Pvw on the Y axis is the greatest, and the Y coordinate of the vector Pv has a positive value. In other words, the absolute value of the line voltage command value signal Xvw is the greatest, and the phase voltage command value signal Xv has a positive value (step S7: YES in FIG. 8). In this case, the Y coordinates of the vertices u, v, and w are respectively the negative value of the Y coordinate of the vector Pwu, the value of the Y coordinate of the vector Pvw, and "0". Accordingly, Xu1 is set to the negative value of Xwu, Xv1 is set to Xvw, and Xw1 is set to "0" (step S12 in FIG. 8).

In the case of the mode 5 state shown in FIG. 3E, the length of the orthogonal projection of the vector Puv on the Y axis is the greatest, and the Y coordinate of the vector Pu has a negative value. In other words, the absolute value of the line voltage command value signal Xuv is the greatest, and the phase voltage command value signal Xu has a negative value (step S5: NO in FIG. 8). In this case, the Y coordinates of the vertices u, v, and w are respectively the value obtained by adding the Y coordinate of the vector Puv to "2", "2", and the value obtained by subtracting the Y coordinate of the vector Pvw from "2". Accordingly, Xu1 is set to the value obtained by adding Xuv to "2", Xv1 is set to "2", and Xw1 is set to the value obtained by subtracting Xvw from "2" (step S9 in FIG. 8).

In the case of the mode 6 state shown in FIG. 3F, the length of the orthogonal projection of the vector Pwu on the Y axis is the greatest, and the Y coordinate of the vector Pw has a positive value. In other words, the absolute value of the line voltage command value signal Xwu is the greatest, and the phase voltage command value signal Xw has a positive value (step S6: YES in FIG. 8). In this case, the Y coordinates of the vertices u, v, and w are respectively "0", the negative value of the Y coordinate of the vector Puv, the value of the Y coordinate of the vector Pwu. Accordingly, Xu1 is set to "0", Xv1 is set to the negative value of Xuv, and Xw1 is set to Xwu (step S10 in FIG. 8).

The waveforms of the command value signals Xu1, Xv1, and Xw1 generated in the command value signal generation processing are the waveforms Xu1, Xv1, and Xw1 shown in (c) of FIG. 4. Specifically, in mode 1, the procedure in the flowchart of FIG. 8 proceeds to step S13, and therefore the waveform Xu1 is the waveform obtained by shifting the waveform Xuw (see (b) of FIG. 4) upward by "2", the waveform Xv1 is the waveform obtained by shifting the waveform Xvw (see (a) of FIG. 4) upward by "2", and the waveform Xw1 is the waveform fixed at "2". Also, in mode 2, the procedure in the flowchart of FIG. 8 proceeds step S8, and therefore the waveform Xu1 is the waveform Xuv, the waveform Xv1 is the waveform fixed at "0", and the waveform Xw1 is the waveform Xwv. In mode 3, the procedure in the flowchart of FIG. 8 proceeds to step S11, and therefore the waveform Xu1 is the waveform fixed at "2", the waveform Xv1 is the waveform obtained by shifting the waveform Xvu upward by "2", and the waveform Xw1 is the waveform obtained by shifting the waveform Xvu upward by "2". In mode 4, the procedure in the flowchart of FIG. 8 proceeds to step S12, and therefore the waveform Xu1 is the waveform Xuw, the waveform Xv1 is the waveform Xvw, and the waveform Xw1 is the waveform fixed at "0". In mode 5, the procedure in the flowchart of FIG. 8 proceeds to step S9, and therefore the waveform Xu1 is the waveform obtained by shifting the waveform Xuv upward by "2", the waveform Xv1 is the waveform fixed at "2", and the waveform Xw1 is the waveform obtained by shifting the waveform Xwv upward by "2". In mode 6, the procedure in the flowchart of FIG. 8 proceeds to step S10, and therefore the waveform Xu1 is the waveform fixed at "0", the waveform Xv1 is the waveform Xvu, and the waveform Xw1 is the waveform Xwu.

Note that the flowchart shown in FIG. 8 is one example of command value signal generation processing, and there is no limitation to this example. For example, a configuration is possible in which, using the fact that the line voltage command value signals Xuv, Xvw, and Xwu are respectively calculated using differences between the phase voltage command value signals Xu, Xv, and Xw, the command value signals Xu1, Xv1, and Xw1 in steps S8 to S13 are calculated using the phase voltage command value signals Xu, Xv, and Xw. For example, in the case of step S8, a configuration is possible in which Xu1=Xu−Xv, Xv1=0, and Xv1=Xw−Xv, and in the case of step S9, Xu1=2+Xu−Xv, Xv1=2, and Xw1=2+Xw−Xv.

Also, the command value signals Xu1, Xv1, and Xw1 may be generated in accordance with the phase of the U-phase phase voltage command value signal Xu.

Figure 9:
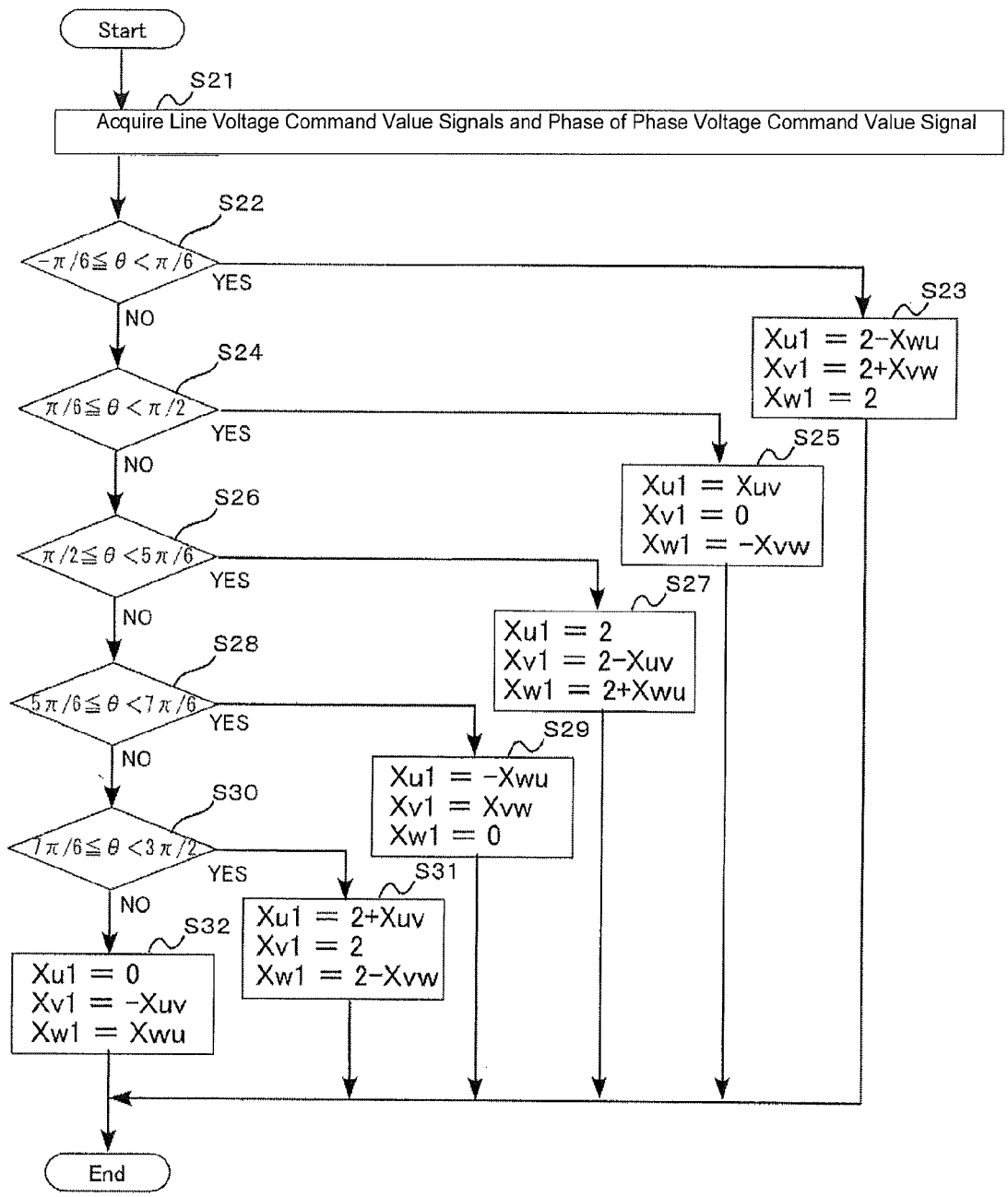
FIG. 9 is a flowchart for describing other command value signal generation processing.

FIG. 9 is a flowchart for describing other command value signal generation processing. In this command value signal generation processing, the command value signals Xu1, Xv1, and Xw1 are generated in accordance with the phase of the phase voltage command value signal Xu.

First, the line voltage command value signals Xuv, Xvw, and Xwu and the phase θ of the phase voltage command value signal Xu are acquired (step S21). The phase θ is adjusted such that $-\pi/6 \leq \theta < 11\pi/6$. Next, it is determined whether the phase θ is greater than or equal to $-\pi/6$ and less than $\pi/6$ (step S22). If the phase θ falls within this range (step S22: YES), Xu1 is set to the value obtained by subtracting Xwu from "2", Xv1 is set to the value obtained by adding Xvw to "2", and Xw1 is set to "2" (step S23). In other words, if $-\pi/6 \leq \theta < \pi/6$, it is determined that the current mode is mode 1 among those in the vector diagrams of FIGS. 3A to 3F, and the command value signals of the respective phases are determined so as to correspond to the mode 1 vector diagram.

If the phase θ does not fall within the range in step S22 (step S22: NO), it is determined whether the phase θ is greater than or equal to $\pi/6$ and less than $\pi/2$ (step S24). If the phase θ falls within this range (step S24: YES), Xu1 is set to Xuv, Xv1 is set to "0", and Xw1 is set to the negative value of Xvw (step S25). In other words, if $\pi/6 \leq \theta < \pi/2$, it is determined that the current mode is mode 2 among those in the vector diagrams of FIGS. 3A to 3F, and the command value signals of the respective phases are determined so as to correspond to the mode 2 vector diagram.

If the phase θ does not fall within the range in step S24 (step S24: NO), it is determined whether the phase θ is greater than or equal to $\pi/2$ and less than $5\pi/6$ (step S26). If the phase θ falls within this range (step S26: YES), Xu1 is set to "2", Xv1 is set to the value obtained by subtracting Xuv from "2", and Xw1 is set to the value obtained by adding Xwu to "2" (step S27). In other words, if $\pi/2 \leq \theta < 5\pi/6$, it is determined that the current mode is mode 3 among those in the vector diagrams of FIGS. 3A to 3F, and the command value signals of the respective phases are determined so as to correspond to the mode 3 vector diagram.

If the phase θ does not fall within the range in step S26 (step S26: NO), it is determined whether the phase θ is greater than or equal to $5\pi/6$ and less than $7\pi/6$ (step S28). If the phase θ falls within this range (step S28: YES), Xu1 is set to the negative value of Xwu, Xv1 is set to Xvw, and Xw1 is set to "0" (step S29). In other words, it $5\pi/6 \leq \theta < 7\pi/6$, it is determined that the current mode is mode 4 among those in the vector diagrams of FIGS. 3A to 3F, and the command value signals of the respective phases are determined so as to correspond to the mode 4 vector diagram.

If the phase θ does not fall within the range in step S28 (step S28: NO), it is determined whether the phase θ is greater than or equal to $7\pi/6$ and less than $3\pi/2$ (step S30). If the phase θ falls within this range (step S30: YES), Xu1 is set to the value obtained by adding Xuv to "2", Xv1 is set to "2", and Xw1 is set to the value obtained by subtracting Xvw from "2" (step S31). In other words, if $7\pi/6 \leq \theta < 3\pi/2$, it is determined that the current mode is mode 5 among those in the vector diagrams of FIGS. 3A to 3F, and the command value signals of the respective phases are determined so as to correspond to the mode 5 vector diagram.

If the phase θ does not fall within the range in step S30 (step S30: NO), that is to say, if the phase θ is greater than or equal to $7\pi/6$ and less than $11\pi/6$, Xu1 is set to "0", Xv1 is set to the negative value of Xuv, and Xw1 is set to Xwu (step S32). In other words, if $7\pi/6 \leq \theta < 11\pi/6$, it is determined that the current mode is mode 6 among those in the vector diagrams of FIGS. 3A to 3F, and the command value signals of the respective phases are determined so as to correspond to the mode 6 vector diagram.

Note that the command value signal generation unit 52 is not limited to generating the command value signals Xu1, Xv1, and Xw1 separately. A configuration is possible in which, for example, the command value signal generation unit 52 generates only the command value signal Xu1, outputs a signal obtained by delaying the phase of the command value signal Xu1 by $2\pi/3$ as the command value signal Xv1, and outputs a signal obtained by delaying the phase of the command value signal Xu1 by $4\pi/3$ as the command value signal Xw1.

Returning to FIG. 7, the PWM signal generation unit 53 generates the PWM signals P based on a carrier signal (e.g., a triangular wave signal), which is generated internally and has a predetermined frequency (e.g., 4 kHz), and the command value signals Xu1, Xv1, and Xw1 input from the command value signal generation unit 52, and outputs the generated PWM signals P to the inverter circuit 2. The PWM signal generation unit 53 sets the lower limit value to the lower limit value of the command value signals Xu1, Xv1, and Xw1 (i.e., "0"), sets the upper limit value to the upper limit value of the command value signals Xu1, Xv1, and Xw1 (i.e., "2"), and outputs a triangular wave signal that varies therebetween as the carrier signal. Note that although the upper limit value and the lower limit value of the carrier signal are set so as to conform to the upper limit value and the lower limit value of the command value signals Xu1, Xv1, and Xw1 in the present embodiment, there is no limitation to this. For example, the amplitude of the carrier signal may be smaller than the amplitude of the command value signals Xu1, Xv1, and Xw1. Note that since overmodulation occurs and the precision of demodulation becomes poor in this case, it is desirable to set the upper limit value and lower limit value so as to conform to those described above.

The PWM signal generation unit 53 generates a pulse signal that is at the high level for the period for which the command value signal Xu1 is greater than or equal to the carrier signal and is at the low level for the period for which the command value signal Xu1 is less than the carrier signal, as the PWM signal P1 to be input to the switching element S1 of the inverter circuit 2 (see FIG. 6). Note that when the PWM signal P1 is generated, pulses having a pulse width lower than a predetermined pulse width are eliminated. Accordingly, even if the carrier signal is "0" for the period for which the command value signal Xu1 is fixed at "0", the PWM signal P1 is continuously at the low level instead of momentarily rising to the high level. Similarly, the PWM signal generation unit 53 generates the PWM signal P2 to be input to the switching element S2 by comparing the command value signal Xv1 and the carrier signal, and generates the PWM signal P3 to be input to the switching element S3 by comparing the command value signal Xw1 and the carrier signal. Also, the PWM signal generation unit 53 generates the PWM signals P4, P5, and P6 to be input to the switching elements S4, S5, and S6 respectively by inverting the polarities of the PWM signals P1, P2, and P3. The generated PWM signals P1 to P6 are input to the base terminals of the corresponding switching elements S1 to S6 of the inverter circuit 2.

Figure 10:
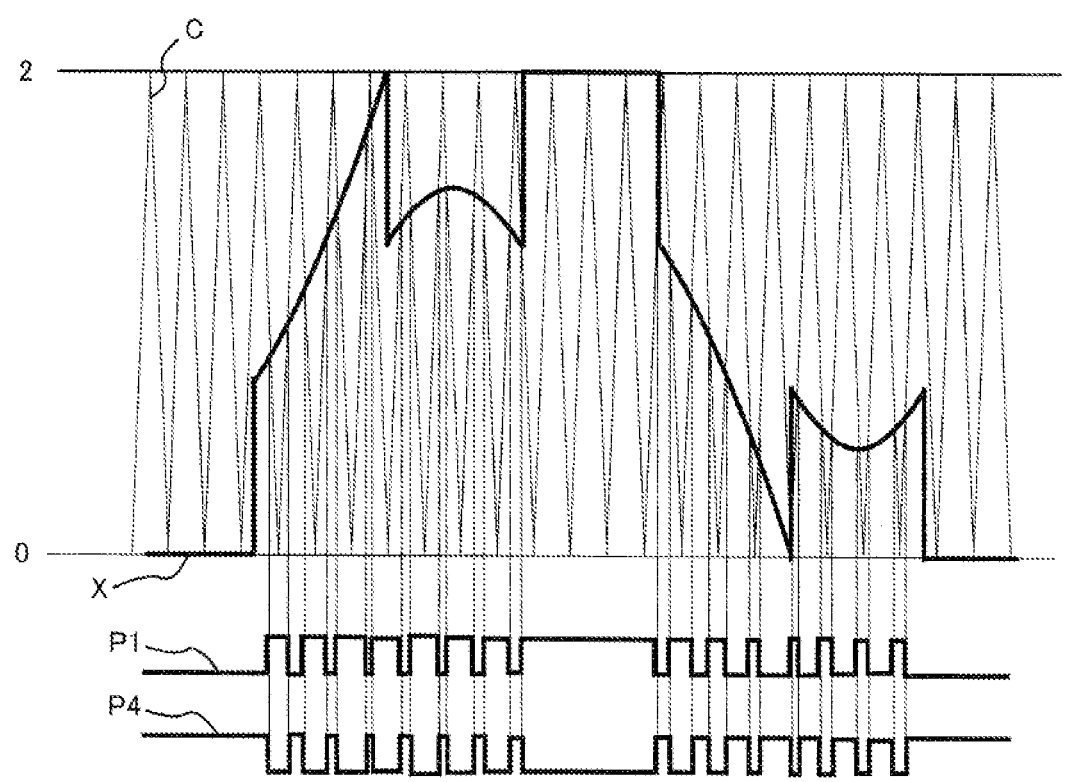
FIG. 10 is a diagram for describing a method for generating PWM signals from command value signals and a carrier signal.

FIG. 10 is a diagram for describing a method for generating the PWM signals P1 and P4 from the command value signal Xu1 and a carrier signal. In this figure, the command value signal Xu1 is indicated by the waveform X, the carrier signal is indicated by the waveform C, and the PWM signals P1 and P4 are indicated by the waveforms P1 and P4. In FIG. 10, the waveform P1 is at the high level for the period for which the waveform X is higher than or equal to the waveform C, and is at the low level for the period for which the waveform X is lower than the waveform C. Also, the waveform P4 is a waveform whose polarity is the inverse of that of the waveform P1.

Note that the configuration of the PWM signal generation unit 53 is not limited to that described above. Another method may be used as long as it enables generating the PWM signals P from the command value signals Xu1, Xv1, and Xw1. For example, the carrier signal may be a sawtooth signal instead of a triangular wave signal. Also, a method other than a method using comparison with a carrier signal may be used. Furthermore, a configuration is possible in which pulse widths (pulse widths for the line voltage) are calculated from the line voltage command value signals Xuv, Xvw, and Xwu using a PWM hold method, the pulse widths for the line voltage are converted into pulse widths for the phase voltage using a predetermined algorithm, and the PWM signals P are generated based on the pulse widths for the phase voltage (see JP 2010-68630A).

Note that the control circuit 5 may be realized as an analog circuit, or may be realized as a digital circuit. Also, a configuration is possible in which the processes performed by the various units are designed as a program, and a computer is caused to function as the control circuit 5 by being caused to execute the program. Also, a configuration is possible in which the program is recorded on a recording medium, and a computer is caused to load the program. Note that there are cases where the inverter circuit 2 and the control circuit 5 are collectively referred to as an inverter apparatus in the following.

In the present embodiment, the command value signal generation unit 52 of the control circuit command value signal generation unit 5 outputs the command value signals Xu1, Xv1, and Xw1 having the waveforms shown in (c) of FIG. 4, and the PWM signal generation unit 53 generates the PWM signals P based on the command value signals Xu1, Xv1, and Xw1, and outputs the PWM signals P to the inverter circuit 2. The inverter circuit 2 performs switching of the switching elements S1 to S6 based on the PWM signals P. Accordingly, the DC power output by the DC power source 1 is converted into AC power and then output.

The waveforms of the phase voltage signals Vu1, Vv1, and Vw1 output by the interconnection inverter system A are the same as the waveforms of the command value signals Xu1, Xv1, and Xw1 shown in (c) of FIG. 4. As is clearly shown in FIG. 4, the difference signal between the command value signals Xu1 and Xv1 matches the line voltage command value signal Xuv. For example, in mode 1, since Xu1=2−Xwu and Xv1=2+Xvw, and Xwu=√(3)·sin(ωt−7π/6) and Xvw=√(3)·sin(ωt−π/2), the difference between them is Xu1−Xv1=2−Xwu−2−Xvw=−√(3)·sin(ωt−7π/6)−√(3)·sin(t−π/2)=√(3)·sin(ωt−π/6)=Xuv. In other words, the fact that the difference signal between the command value signals Xu1 and Xv1 matches the line voltage command value signal Xuv can be confirmed by calculation as well. In modes 2 to 6 as well, it can be similarly confirmed that Xu1−Xv1=Xuv. Similarly, the difference signal between the command value signals Xv1 and Xw1 matches the line voltage command value signal Xvw, and the difference signal between the command value signals Xw1 and Xu1 matches the line voltage command value signal Xwu. Accordingly, the waveforms of the line voltage signals Vuv, Vvw, and Vwu, which are the difference signals obtained from the phase voltage signals Vu1, Vv1, and Vw1, are the same as the waveforms Xuv, Xvw, and Xwu of the line voltage command value signals Xuv, Xvw, and Xwu shown in (a) of FIG. 4. In other words, the line voltage signals Vuv, Vvw, and Vwu are sinusoidal signals that are in three-phase equilibrium, and therefore can be synchronized with the system voltage of the system B. Accordingly, the AC power output by the interconnection inverter system A can be supplied to the system B.

As shown by the waveform P1 in FIG. 10, the PWM signal P1 is continuously at the low level for the period for which the command value signal Xu1 (waveform X) is fixed at "0", and is continuously at the high level for the period for which the command value signal Xu1 is fixed at "2". Switching of the switching element S1 is stopped in these periods. Accordingly, the number of times that the switching element is switched is cut down, thus enabling a reduction in switching loss. Also, the time for which the PWM signal P1 is continuously at the high level and the time for which the PWM signal P1 is continuously at the low level are the same. Also, the PWM signal P4 is obtained by inverting the polarity of the PWM signal P1. Accordingly, the time for which the PWM signal P1 is continuously at the high level and the time for which the PWM signal P4 is continuously at the high level are the same. The time for which the switching element S1 is in the on state and the time for which the switching element S4 is in the on state are therefore the same. Accordingly, degradation of the switching element S1 and the switching element S4 progresses in the same manner, and the lifetime is the same for both. Also, the amount of heat generated is the same for both of them, thus facilitating the design of a cooling member.

The feedback control unit 51 and the PWM signal generation unit 53 of the control circuit 5 of the present embodiment are in common with those of the conventional control circuit 500 (see FIG. 48). The control circuit 5 can therefore be realized by merely adding the command value signal generation unit 52 to the conventional control circuit 500.

Although the case where the lower limit value is "0" and the upper limit value is "2" for the command value signals Xu1, Xv1, and Xw1 is described in the above embodiment, there is no limitation to this. For example, the command value signals Xu1, Xv1, and Xw1 may be generated such that the lower limit value is "−1" and the upper limit value is "1". In this case, the lower limit value and the upper limit value of the carrier signal used by the PWM signal generation unit 53 also need to be set in accordance with the lower limit value and the upper limit value of the command value signals Xu1, Xv1, and Xw1.

Although the case where the negative electrode of the DC power source 1 is grounded and the potential of the negative electrode is "0" is described in the above embodiment, there is no limitation to this. The present invention is applicable to, for example, the case where the positive electrode of the DC power source 1 is grounded and the potential of the positive electrode is "0", and the case where the potential of the positive electrode is a positive potential and the potential of the negative electrode is a negative potential.

Although the command value signals Xu1, Xv1, and Xw1 having the waveforms Xu1, Xv1, and Xw1 shown in (c) of FIG. 4 are generated in order to perform the control of the inverter circuit 2 in the above embodiment, there is no limitation to this. Command value signals having other waveforms may be generated in order to perform the control of the inverter circuit 2. Control methods for generating command value signals having other waveforms will be described below as second to fourth embodiments. The command value signals of the second embodiment are denoted by Xu2, Xv2, and Xw2, the command value signals of the third embodiment are denoted by Xu3, Xv3, and Xw3, and the command value signals of the fourth embodiment are denoted by Xu4, Xv4, and Xw4. The second to fourth embodiments differ from the first embodiment only with respect to the command value signal generation processing performed by the command value signal generation unit 52. Other aspects of the configuration will not be described since they are the same as those in the first embodiment.

FIGS. 11A to 11F are diagrams for using vectors to describe the concept of control according to the second embodiment.

Similarly to the concept of control in the first embodiment shown in FIGS. 3A to 3F, in the concept of control in the second embodiment shown in FIGS. 11A to 11F, the vertices of the equilateral triangles T are fixed at the origin and a maximum point (the point where the X coordinate is "0" and the Y coordinate is B). However, the vertices that are fixed are different between the second embodiment and the first embodiment. Similarly to FIGS. 3A to 3F, FIGS. 11A to 11F show the neutral point N, the vector Pu, and the equilateral triangle T, and the vectors Pv and Pw are not shown, with the exception of the diagram on the left in FIG. 11A. Also, the fixed vertices are marked by white circles in these figures.

Figure 11:
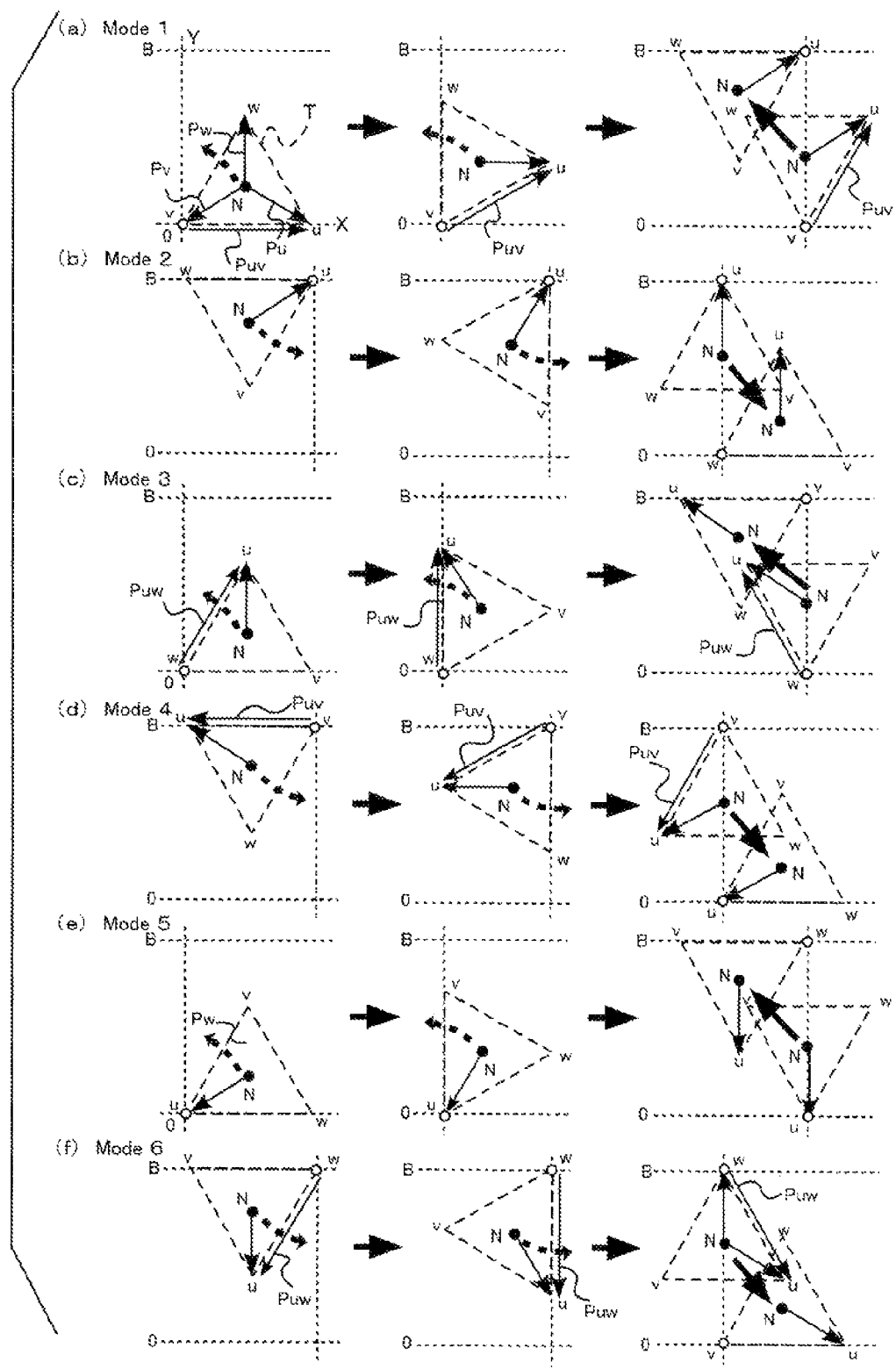
FIGS. 11A to 11F are diagrams for using vectors to describe the concept of control according to a second embodiment.

FIG. 11A shows the state in which the angle θ (the angle that the vector Pu forms with the X axis) changes from −π/6 to π/6. When −π/6≤θ≤π/6, the vertex v of the equilateral triangle T is fixed at the origin, and the equilateral triangle T rotates counterclockwise (the direction indicated by the dashed line arrow in this figure, and the same follows hereinafter as well) about the vertex v by π/3. This state will be referred to as "mode 1". FIG. 11A shows that the V-phase potential is fixed at "0" in mode 1. The diagram on the left shows the state when θ=−π/6, the diagram in the center shows the state when θ=0, and the diagram on the right shows the state when θ=π/6. When θ=π/6, the neutral point N shifts since the equilateral triangle T moves such that the vertex u conforms to the maximum point. This shows a change from the state in which the V-phase potential is fixed at "0" to the state in which the U-phase potential is fixed at B.

FIG. 11B shows the state in which the angle θ changes from π/6 to π/2 (=3π/6). When π/6≤θ≤π/2, the vertex u of the equilateral triangle T is fixed at the maximum point, and the equilateral triangle T rotates counterclockwise about the vertex u by π/3. This state will be referred to as "mode 2". FIG. 11B shows that the U-phase potential is fixed at B in mode 2. The diagram on the left shows the state when θ=π/6, the diagram in the center shows the state when θ=π/3 (=2π/6), and the diagram on the right shows the state when θ=π/2 (=3π/6). The diagram on the left is the same as the diagram on the right in FIG. 11A after shifting of the neutral point. When θ=π/2, the neutral point N shifts since the equilateral triangle T moves such that the vertex w conforms to the origin. This shows a change from the state in which the U-phase potential is fixed at B to the state in which the W-phase potential is fixed at "0".

FIG. 11C shows the state in which the angle θ changes from π/2 (=3π/6) to 5π/6. When π/2≤θ≤5π/6, the vertex w of the equilateral triangle T is fixed at the origin, and the equilateral triangle T rotates counterclockwise about the vertex w by π/3. This state will be referred to as "mode 3". FIG. 11C shows that the W-phase potential is fixed at "0" in mode 3. The diagram on the left shows the state when θ=π/2 (=3π/6), the diagram in the center shows the state when θ=2π/3 (=4π/6), and the diagram on the right shows the state when θ=5π/6. The diagram on the left is the same as the diagram on the right in FIG. 11B after shifting of the neutral point. When θ=5π/6, the neutral point N shifts since the equilateral triangle T moves such that the vertex v conforms to the maximum point. This shows a change from the state in which the W-phase potential is fixed at "0" to the state in which the V-phase potential is fixed at B.

FIG. 11D shows the state in which the angle θ changes from 5π/6 to 7π/6. When 5π/6≤θ≤7π/6, the vertex v of the equilateral triangle T is fixed at the maximum point, and the equilateral triangle rotates counterclockwise about the vertex v by π/3. This state will be referred to as "mode 4". FIG. 11D shows that the V-phase potential is fixed at B in mode 4. The diagram on the left shows the state when θ=5π/6, the diagram in the center shows the state when θ=π (=6π/6), and the diagram on the right shows the state when θ=7π/6. The diagram on the left is the same as the diagram on the right in FIG. 11C after shifting of the neutral point. When θ=7π/6, the neutral point N shifts since the equilateral triangle T moves such that the vertex u conforms to the origin. This shows a change from the state in which the V-phase potential is fixed at B to the state in which the U-phase potential is fixed at "0".

FIG. 11E shows the state in which the angle θ changes from 7π/6 to 3π/2 (=9π/6). When 7π/6≤θ≤3π/2, the vertex u of the equilateral triangle T is fixed at the origin, and the equilateral triangle T rotates counterclockwise about the vertex u by π/3. This state will be referred to as "mode 5". FIG. 11E shows that the U-phase potential is fixed at "0" in mode 5. The diagram on the left shows the state when θ=7π/6, the diagram in the center shows the state when θ=4π/3 (=8π/6), and the diagram on the right shows the state when θ3π/2 (=9π/6). The diagram on the left is the same as the diagram on the right in FIG. 11D after shifting of the neutral point. When θ=3π/2, the neutral point N shifts since the equilateral triangle T moves such that the vertex w conforms to the maximum point. This shows a change from the state in which the U-phase potential is fixed at "0" to the state in which the W-phase potential is fixed at B.

FIG. 11F shows the state in which the angle θ changes from 3π/2 (=9π/6) to 11π/6 (=-π/6). When 3π/2≤θ≤11π/6, the vertex w of the equilateral triangle T is fixed at the maximum point, and the equilateral triangle T rotates counterclockwise about the vertex w by π/3. This state will be referred to as "mode 6". FIG. 11F shows that the W-phase potential is fixed at B in mode 6. The diagram on the left shows the state when θ=3π/2 (=9π/6), the diagram in the center shows the state when θ=5π/3 (=10π/6), and the diagram on the right shows the state when θ=11π/6. The diagram on the left is the same as the diagram on the right in FIG. 11E after shifting of the neutral point. When θ=11π/6, the neutral point N shifts since the equilateral triangle T moves such that the vertex v conforms to the origin. This shows a change from the state in which the W-phase potential is fixed at B to the state in which the V-phase potential is fixed at "0". The diagram on the right in FIG. 11F after shifting of the neutral point is the same as the diagram on the left in FIG. 11A. The modes 1 to 6 are subsequently repeated.

In the vector diagrams in FIGS. 11A to 11F, the phase voltages of the phases are represented by the Y coordinate of the vertices of the equilateral triangles T. In mode 1, the vertex v is fixed at the origin, and therefore the U-phase phase voltage is the orthogonal projection of the vector Puv pointing from the vertex v to the vertex u onto the Y axis (see FIG. 11A). Accordingly, it is sufficient that the command value signal Xu2 in mode 1 is the line voltage command value signal Xuv. In mode 2, the vertex u is fixed at the maximum point, and therefore the U-phase phase voltage is B (see FIG. 11B). Accordingly, it is sufficient that the command value signal Xu2 in mode 2 is the signal with the value of B. In mode 3, the vertex w is fixed at the origin, and therefore the U-phase phase voltage is the orthogonal projection of the vector Puw pointing from the vertex w to the vertex u onto the Y axis (see FIG. 11C). Accordingly, it is sufficient that the command value signal Xu2 in mode 3 is the signal Xuw (=-Xwu). In mode 4, the vertex v is fixed at the maximum point, and therefore the U-phase phase voltage has the value obtained by adding B to the orthogonal projection of the vector Puv pointing from the vertex v to the vertex u onto the Y axis (see FIG. 11D). Accordingly, it is sufficient that the command value signal Xu2 in mode 4 is the result of adding B to the line voltage command value signal Xuv. In mode 5, the vertex u is fixed at the origin, and therefore the U-phase phase voltage is "0" (see FIG. 11E). Accordingly, it is sufficient that the command value signal Xu2 in mode 5 is the zero signal with the value of "0". In mode 6, the vertex w is fixed at the maximum point, and therefore the U-phase phase voltage has the value obtained by adding B to the orthogonal projection of the vector Puw pointing from the vertex w to the vertex u onto the Y axis (see FIG. 11F). Accordingly, it is sufficient that the command value signal Xu2 in mode 6 is the result of adding B to the signal Xuw (=-Xwu).

Similarly, it is sufficient that the V-phase command value signal Xv2 is the zero signal in mode 1, the result of adding B to the signal Xvu in mode 2, the line voltage command value signal Xvw in mode 3, the signal with the value of B in mode 4, the signal Xvu in mode 5, and the result of adding B to the line voltage command value signal Xvw in mode 6. Also, it is sufficient that the W-phase command value signal Xw2 is the signal Xwv in mode 1, the result of adding B to the line voltage command value signal Xwu in mode 2, the zero signal in mode 3, the result of adding B to the signal Xwv in mode 4, the line voltage command value signal Xwu in mode 5, and the signal with the value of B in mode 6.

Figure 12:
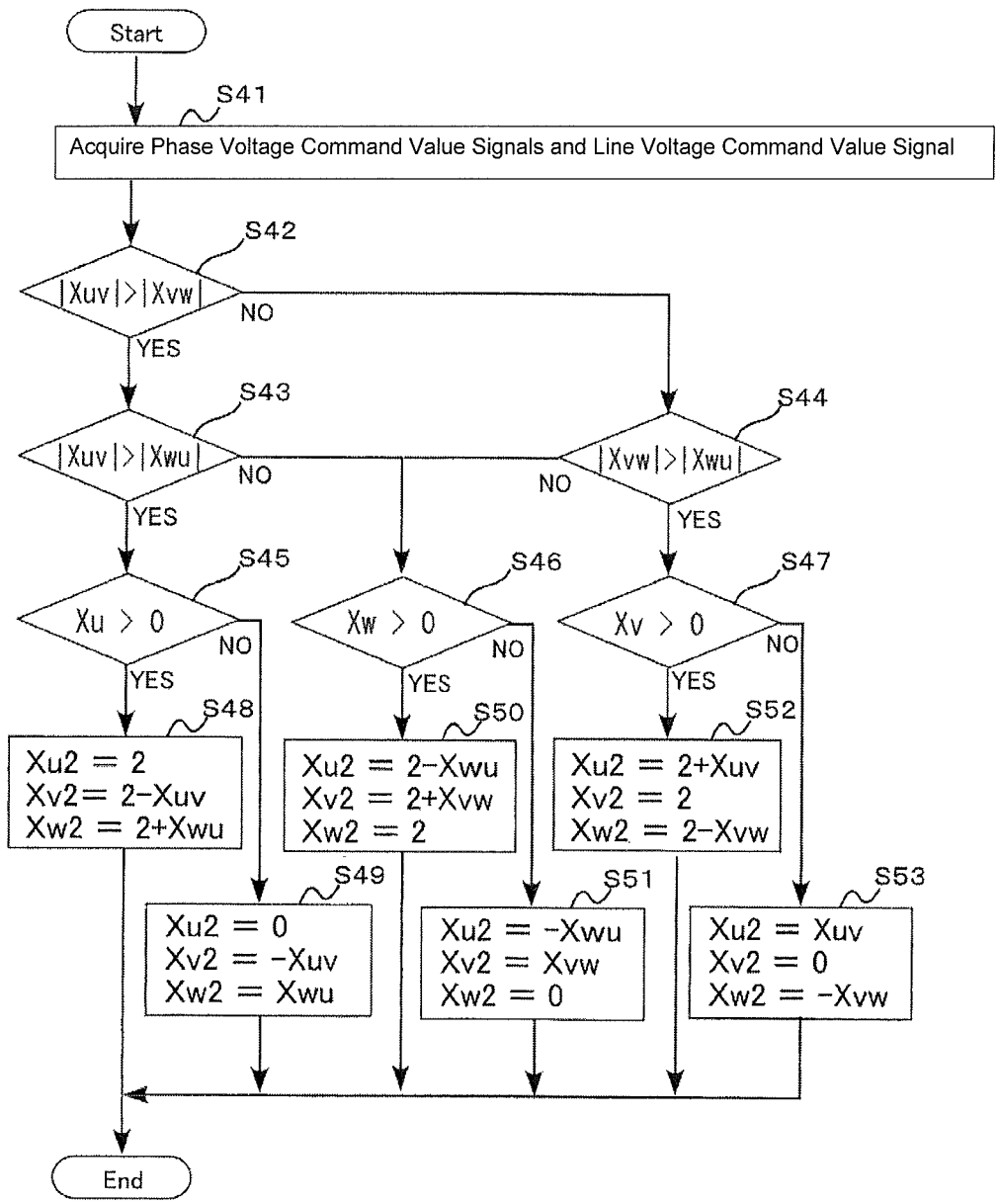
FIG. 12 is a flowchart for describing command value signal generation processing according to the second embodiment.

FIG. 12 is a flowchart for describing command value signal generation processing performed by the command value signal generation unit 52 according to the second embodiment. The command value signal generation processing is executed at a predetermined time.

In the flowchart of this figure, steps S41 to S47 are the same as steps S1 to S7 of the flowchart of command value signal generation processing according to the first embodiment (see FIG. 8). A detailed description of steps S41 to S47 will therefore not be given. In steps S41 to S47, it is determined which of the line voltage command value signals Xuv, Xvw, and Xwu has the greatest absolute value, and it is determined whether the phase voltage command value signal corresponding to the line voltage command value signal having the greatest absolute value is positive or negative. Then, in steps S48 to S53, the command value signals Xu2, Xv2, and Xw2 are determined in accordance with the result of that determination. In other words, it is determined which of the modes among those in the vector diagrams of FIGS. 11A to 11F is the current mode, and the command value signals Xu2, Xv2, and Xw2 of the respective phases are determined so as to correspond to the vector diagram with the mode determined to be the current mode.

If it is determined that the absolute value of Xuv is the greatest and that the value of Xu is positive (step S45: YES), the command value signal Xu2 is set to "2", the command value signal Xv2 is set to the value obtained by subtracting Xuv from "2", and the command value signal Xw2 is set to the value obtained by adding Xwu to "2" (step S48). If it is determined that the absolute value of Xuv is the greatest and that the value of Xu is negative (step S45: NO), the command value signal Xu2 is set to "0", the command value signal Xv2 is set to the negative value of Xuv, and the command value signal Xw2 is set to Xwu (step S49). If it is determined that the absolute value of Xwu is the greatest and that the value of Xw is positive (step S46: YES), the command value signal Xu2 is set to the value obtained by subtracting Xwu from "2", the command value signal Xv2 is set to the value obtained by adding Xvw to "2", and the command value signal Xw2 is set to "2" (step S50). If it is determined that the absolute value of Xwu is the greatest and that the value of Xw is negative (step S46: NO), the command value signal Xu2 is set to the negative value of Xwu, the command value signal Xv2 is set to Xvw, and the command value signal Xw2 is set to "0" (step S51). If it is determined that the absolute value of Xvw is the greatest and that the value of Xv is positive (step S47: YES), the command value signal Xu2 is set to the value obtained by adding Xuv to "2", the command value signal Xv2 is set to "2", and the command value signal Xw2 is set to the value obtained by subtracting Xvw from "2" (step S52). If it is determined that the absolute value of Xvw is the greatest and that the value of Xv is negative (step S47: NO), the command value signal Xu2 is set to Xuv, the command value signal Xv2 is set to "0", and the command value signal Xw2 is set to the negative value of Xvw (step S53).

In the case of the mode 1 state shown in FIG. 11A, the length of the orthogonal projection of the vector Pvw on the Y axis is the greatest, and the Y coordinate of the vector Pv has a negative value. In other words, the absolute value of the line voltage command value signal Xvw is the greatest, and the phase voltage command value signal Xv has a negative value (step S47: NO in FIG. 12). In this case, the Y coordinates of the vertices u, v, and w are respectively the value of the Y coordinate of the vector Puv, "0", and the negative value of the Y coordinate of the vector Pvw. Accordingly, Xu2 is set to Xuv, Xv2 is set to "0", and Xw2 is set to the negative value of Xvw (step S12 in FIG. 53).

Similarly, in the case of the mode 2 state shown in FIG. 11B, the length of the orthogonal projection of the vector Puv on the Y axis is the greatest, and the Y coordinate of the vector Pu has a positive value. In other words, the absolute value of the line voltage command value signal Xuv is the greatest, and the phase voltage command value signal Xu has a positive value (step S45: YES in FIG. 12). In this case, the Y coordinates of the vertices u, v, and w are respectively B (B being "2" hereinafter since the case where B="2" is described in FIG. 12), the value obtained by adding the Y coordinate of the vector Puv to "2" (that is to say, the value obtained by subtracting the Y coordinate of the vector Puv from "2"), and the value obtained by adding the Y coordinate of the vector Pwu to "2". Accordingly, Xu2 is set to "2", Xv2 is set to the value obtained by subtracting Xuv from "2", and Xw2 is set to the value obtained by adding Xwu to "2" (step S48 in FIG. 12).

In the case of the mode 3 state shown in FIG. 11C, the length of the orthogonal projection of the vector Pwu on the Y axis is the greatest, and the Y coordinate of the vector Pw has a negative value. In other words, the absolute value of the line voltage command value signal Xwu is the greatest, and the phase voltage command value signal Xw has a negative value (step S46: NO in FIG. 12). In this case, the Y coordinates of the vertices u, v, and w are respectively the negative value of the Y coordinate of the vector Pwu, the value of the Y coordinate of the vector Pvw, and "0". Accordingly, Xu2 is set to the negative value of Xwu, Xv2 is set to Xvw, and Xw2 is set to "0" (step S51 in FIG. 12).

In the case of the mode 4 state shown in FIG. 11D, the length of the orthogonal projection of the vector Pvw on the Y axis is the greatest, and the Y coordinate of the vector Pv has a positive value. In other words, the absolute value of the line voltage command value signal Xvw is the greatest, and the phase voltage command value signal XV has a positive value (step S47: YES in FIG. 12). In this case, the Y coordinates of the vertices u, v, and w are respectively the value obtained by adding the Y coordinate of the vector Puv to "2", "2", and the value obtained by subtracting the Y coordinate of the vector Pvw from "2". Accordingly, Xu2 is set to the value obtained by adding Xuv to "2", Xv2 is set to "2", and Xw2 is set to the value obtained by subtracting Xvw from "2" (step S52 in FIG. 12).

In the case of the mode 5 state shown in FIG. 11E, the length of the orthogonal projection of the vector Puv on the Y axis is the greatest, and the Y coordinate of the vector Pu has a negative value. In other words, the absolute value of the line voltage command value signal Xuv is the greatest, and the phase voltage command value signal Xu has a negative value (step S45: NO in FIG. 12). In this case, the Y coordinates of the vertices u, v, and w are respectively "0", the negative value of the Y coordinate of the vector Puv, the value of the Y coordinate of the vector Pwu. Accordingly, Xu2 is set to "0", Xv2 is set to the negative value of Xuv, and Xw2 is set to Xwu (step S49 in FIG. 12).

In the case of the mode 6 state shown in FIG. 11F, the length of the orthogonal projection of the vector Pwu on the Y axis is the greatest, and the Y coordinate of the vector Pw has a positive value. In other words, the absolute value of the line voltage command value signal Xwu is the greatest, and the phase voltage command value signal Xw has a positive value (step S46: YES in FIG. 12). In this case, the Y coordinates of the vertices u, v, and w are respectively the value obtained by subtracting the Y coordinate of the vector Pwu from "2", the value obtained by adding the Y coordinate of the vector Pvw to "2", and "2". Accordingly, Xu2 is set to the value obtained by subtracting Xwu from "2", Xv2 is set to the value obtained by adding Xvw to "2", and Xw2 is set to "2" (step S50 in FIG. 12).

Note that the flowchart shown in FIG. 12 is one example of command value signal generation processing, and there is no limitation to this example.

Figure 13:
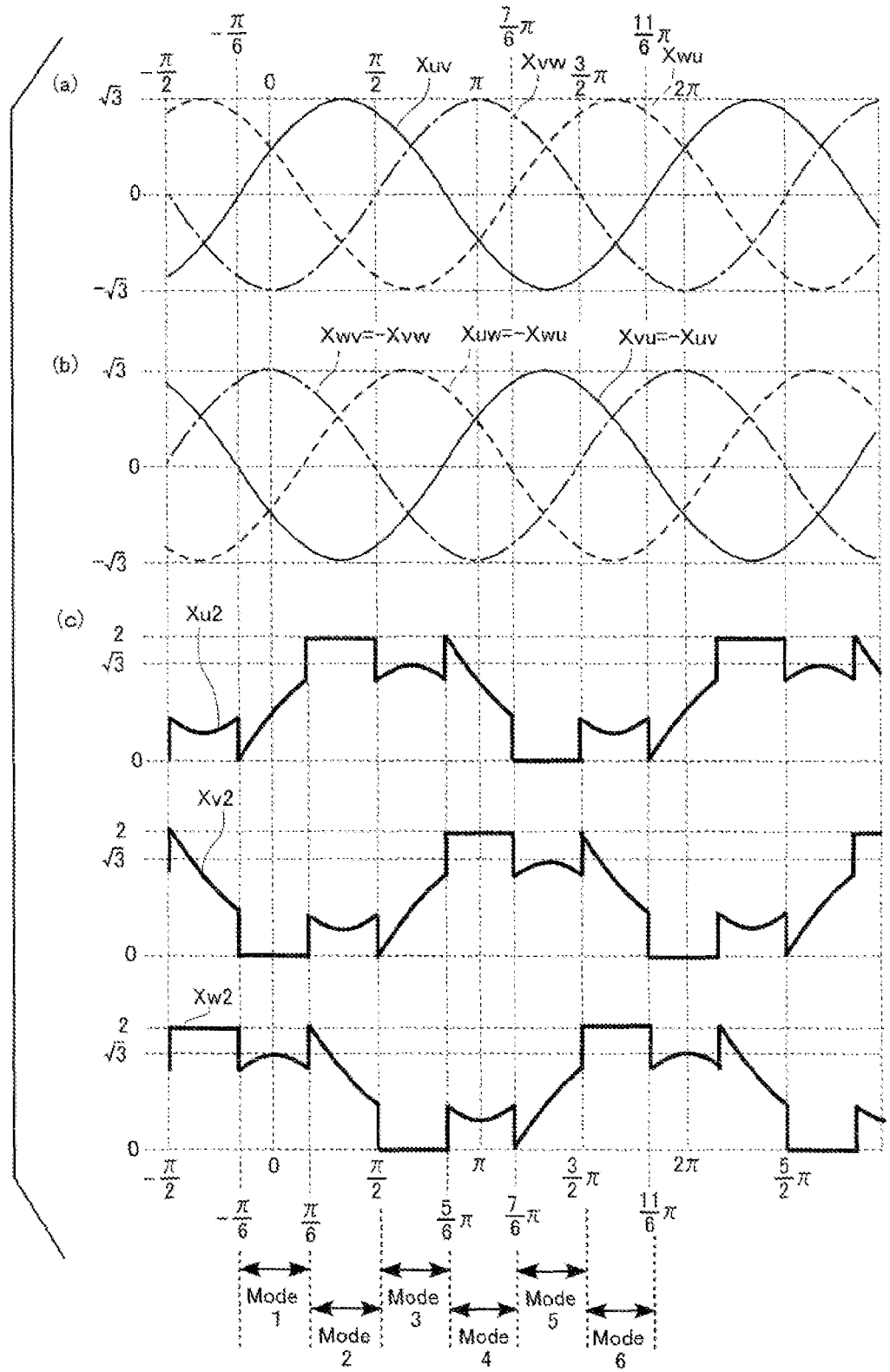
FIG. 13 is a diagram for describing the waveforms of command value signals according to the second embodiment.

The waveforms of the command value signals Xu2, Xv2, and Xw2 generated in the command value signal generation processing of the second embodiment are the waveforms Xu2, Xv2, and Xw2 shown in (c) of FIG. 13.

FIG. 13 is a diagram for describing the waveforms of the command value signals Xu2, Xv2, and Xw2.

The waveforms Xuv, Xvw, and Xwu shown in (a) of FIG. 13 are the same as the waveforms Xuv, Xvw, and Xwu shown in (a) of FIG. 49, and the waveforms Xvu, Xwv, and Xuw shown in (b) of FIG. 13 are the same as the waveforms Xvu, Xwv, and Xuw shown in (b) of FIG. 49, and therefore descriptions thereof will not be given. In FIG. 13 as well, the phase of the phase voltage command value signal Xu is used as the reference for illustration.

The waveforms Xu2, Xv2, and Xw2 shown in (c) of FIG. 13 are the waveforms of the command value signals Xu2, Xv2, and Xw2 respectively. As was described with reference to FIGS. 11A to 11F and FIG. 12, the command value signals Xu2, Xv2, and Xw2 are generated through the modes 1 to 6. In FIG. 13, (c) shows the respective waveforms when B=2.

In mode 1 ($-\pi/6 \leq \theta \leq \pi/6$), the procedure in the flowchart of FIG. 12 proceeds to step S53, and therefore the waveform Xu2 is the waveform Xuv (see (a) of FIG. 13), the waveform Xv2 is the waveform fixed at "0", and the waveform Xw2 is the waveform Xwv (see (b) of FIG. 13). Also, in mode 2 ($\pi/6 \leq \theta \leq \pi/2$), the procedure in the flowchart of FIG. 12 proceeds to step S48, and therefore the waveform Xu2 is the waveform fixed at "2", the waveform Xv2 is the waveform obtained by shifting the waveform Xvu upward by "2", and the waveform Xw2 is the waveform obtained by shifting the waveform Xwu upward by "2". In mode 3 ($\pi/2 \leq \theta \leq 5\pi/6$), the procedure in the flowchart of FIG. 12 proceeds to step S51, and therefore the waveform Xu2 is the waveform Xuw, the waveform Xv2 is the waveform Xvw, and the waveform Xw2 is the waveform fixed at "0". In mode 4 ($5\pi/6 \leq \theta \leq 7\pi/6$), the procedure in the flowchart of FIG. 12 proceeds to step S52, and therefore the waveform Xu2 is the waveform obtained by shifting the waveform Xuv upward by "2", the waveform Xv2 is the waveform fixed at "2", and the waveform Xw2 is the waveform obtained by shifting the waveform Xwv upward by "2". In mode 5 ($7\pi/6 \leq \theta \leq 3\pi/2$), the procedure in the flowchart of FIG. 12 proceeds to step S49, and therefore the waveform Xu2 is the waveform fixed at "0", the waveform Xv2 is the waveform Xvu, and the waveform Xw2 is the waveform Xwu. In mode 6 ($3\pi/2 \leq \theta \leq 11\pi/6$), the procedure in the flowchart of FIG. 12 proceeds to step S50, and therefore the waveform Xu2 is the waveform obtained by shifting the waveform Xuw upward by "2", the waveform Xv2 is the waveform obtained by shifting the waveform Xvw upward by "2", and the waveform Xw2 is the waveform fixed at "2".

As is clearly shown in FIG. 13, the difference signal between the command value signals Xu2 and Xv2, the difference signal between Xv2 and Xw2, and the difference signal between Xw2 and Xu2 match the line voltage command value signals Xuv, Xvw, and Xwu respectively. Accordingly, the waveform of the line voltage signal Vuv, which is the difference signal between the phase voltage signals Vu2 and Vv2 output by the interconnection inverter system A, the waveform of the line voltage signal Vvw, which is the difference signal between Vv2 and Vw2, and the waveform of the line voltage signal Vwu, which is the difference signal between Vw2 and Vu2, are the same as the waveforms Xuv, Xvw, and Xwu shown in (a) of FIG. 13. In other words, the line voltage signals Vuv, Vvw, and Vwu are sinusoidal signals that are in three-phase equilibrium, and therefore can be synchronized with the system voltage of the system B. Accordingly, the AC power output by the interconnection inverter system A can be supplied to the system B.

Also, the command value signals Xu2, Xv2, and Xw2 are fixed at "0" for ⅙ of the cycle, and are fixed at "2" for ⅙ of the cycle (see the waveforms Xu2, Xv2, and Xw2 in (c) of FIG. 13). This enables achieving an effect similar to that of the first embodiment.

Similarly to the first embodiment, there are no limitations on the lower limit value and the upper limit value of the command value signals Xu2, Xv2, and Xw2 in the second embodiment as well. For example, the command value signals Xu2, Xv2, and Xw2 may be generated such that the lower limit value is "−1" and the upper limit value is "1". In this case, the lower limit value and the upper limit value of the carrier signal used by the PWM signal generation unit 53 also need to be set in accordance with the lower limit value and the upper limit value of the command value signals Xu2, Xv2, and Xw2.

Next is a description of the third embodiment.

FIGS. 14A to 14F are diagrams for using vectors to describe the concept of control according to the third embodiment.

Similarly to the concept of control in the first embodiment shown in FIGS. 3A to 3F, in the concept of control in the third embodiment shown in FIGS. 14A to 14F, the vertices of the equilateral triangles T are fixed at the origin and a maximum point (the point where the X coordinate is "0" and the Y coordinate is B). However, the timing according to which the fixed vertices are switched is different between the third embodiment and the first embodiment. Similarly to FIGS. 3A to 3F, FIGS. 14A to 14F show the neutral point N, the vector Pu, and the equilateral triangle T, and the vectors Pv and Pw are not shown, with the exception of the diagram on the left in FIG. 14A. Also, the fixed vertices are marked by white circles in these figures.

Figure 14:
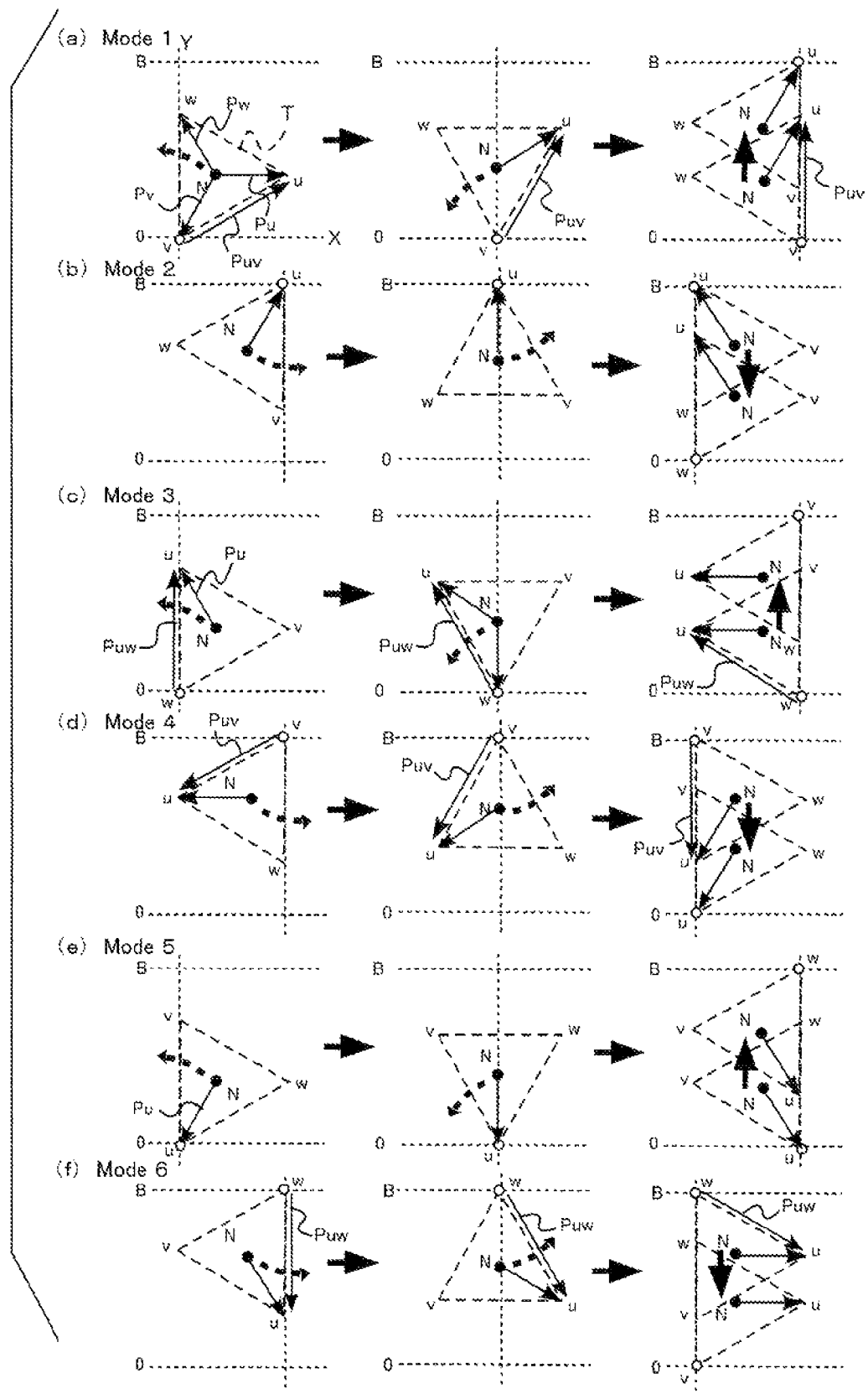
FIGS. 14A to 14F are diagrams for using vectors to describe the concept of control according to a third embodiment.

FIG. 14A shows the state in which the angle θ (the angle that the vector Pu forms with the X axis) changes from 0 to $\pi/3$. When $0 \leq \theta \leq \pi/3$, the vertex v of the equilateral triangle T is fixed at the origin, and the equilateral triangle T rotates counterclockwise (the direction indicated by the dashed line arrow in this figure, and the same follows hereinafter as well) about the vertex v by $\pi/3$. This state will be referred to as "mode 1". FIG. 14A shows that the V-phase potential is fixed at "0" in mode 1. The diagram on the left shows the state when θ=0, the diagram in the center shows the state when θ=$\pi/6$, and the diagram on the right shows the state when θ=$\pi/3$. When θ=$\pi/3$, the neutral point N shifts since the equilateral triangle T moves such that the vertex u conforms to the maximum point. This shows a change from the state in which the V-phase potential is fixed at "0" to the state in which the U-phase potential is fixed at B.

FIG. 14B shows the state in which the angle θ changes from $\pi/3$ to $2\pi/3$. When $\pi/3 \leq \theta \leq 2\pi/3$, the vertex u of the equilateral triangle T is fixed at the maximum point, and the equilateral triangle T rotates counterclockwise about the vertex u by $\pi/3$. This state will be referred to as "mode 2". FIG. 14B shows that the U-phase potential is fixed at B in mode 2. The diagram on the left shows the state when θ=$\pi/3$, the diagram in the center shows the state when θ=$\pi/2$, and the diagram on the right shows the state when θ=$2\pi/3$. The diagram on the left is the same as the diagram on the right in FIG. 14A after shifting of the neutral point. When θ=$2\pi/3$, the neutral point N shifts since the equilateral triangle T moves such that the vertex w conforms to the origin. This shows a change from the state in which the U-phase potential is fixed at B to the state in which the W-phase potential is fixed at "0".

FIG. 14C shows the state in which the angle θ changes from $2\pi/3$ to $\pi$ (=$3\pi/3$). When $2\pi/3 \leq \theta \leq \pi$, the vertex w of the equilateral triangle T is fixed at the origin, and the equilateral triangle T rotates counterclockwise about the vertex w by $\pi/3$. This state will be referred to as "mode 3". FIG. 14C shows that the W-phase potential is fixed at "0" in mode 3. The diagram on the left shows the state when θ=$2\pi/3$, the diagram in the center shows the state when θ=$5\pi/6$, and the diagram on the right shows the state when θ=$\pi$. The diagram on the left is the same as the diagram on the right in FIG. 14B after shifting of the neutral point. When θ=$\pi$, the neutral point N shifts since the equilateral triangle T moves such that the vertex v conforms to the maximum point. This shows a change from the state in which the W-phase potential is fixed at "0" to the state in which the V-phase potential is fixed at B.

FIG. 14D shows the state in which the angle θ changes from π to 4π/3. When π≤θ≤4π/3, the vertex v of the equilateral triangle T is fixed at the maximum point, and the equilateral triangle T rotates counterclockwise about the vertex v by π/3. This state will be referred to as "mode 4". FIG. 14D shows that the V-phase potential is fixed at B in mode 4. The diagram on the left shows the state when θ=π, the diagram in the center shows the state when θ=7π/6, and the diagram on the right shows the state when θ=4π/3. The diagram on the left is the same as the diagram on the right in FIG. 14C after shifting of the neutral point. When θ=4π/3, the neutral point N shifts since the equilateral triangle T moves such that the vertex u conforms to the origin. This shows a change from the state in which the V-phase potential is fixed at B to the state in which the U-phase potential is fixed at "0".

FIG. 14E shows the state in which the angle θ changes from 4π/3 to 5π/3. When 4π/3≤θ≤5π/3, the vertex u of the equilateral triangle T is fixed at the origin, and the equilateral triangle T rotates counterclockwise about the vertex u by π/3. This state will be referred to as "mode 5". FIG. 14E shows that the U-phase potential is fixed at "0" in mode 5. The diagram on the left shows the state when θ=4π/3, the diagram in the center shows the state when θ=3π/2 (=9π/6), and the diagram on the right shows the state when θ=5π/3. The diagram on the left is the same as the diagram on the right in FIG. 14D after shifting of the neutral point. When θ=5π/3, the neutral point N shifts since the equilateral triangle T moves such that the vertex w conforms to the maximum point. This shows a change from the state in which the U-phase potential is fixed at "0" to the state in which the W-phase potential is fixed at B.

FIG. 14F shows the state in which the angle θ changes from 5π/3 to 2π (=6π/3=0). When 5π/3≤θ≤2π, the vertex w of the equilateral triangle T is fixed at the maximum point, and the equilateral triangle T rotates counterclockwise about the vertex w by π/3. This state will be referred to as "mode 6". FIG. 14F shows that the W-phase potential is fixed at B in mode 6. The diagram on the left shows the state when θ=5π/3, the diagram in the center shows the state when θ=11π/6, and the diagram on the right shows the state when θ=2π. The diagram on the left is the same as the diagram on the right in FIG. 14E after shifting of the neutral point. When θ=2π, the neutral point N shifts since the equilateral triangle T moves such that the vertex v conforms to the origin. This shows a change from the state in which the W-phase potential is fixed at B to the state in which the V-phase potential is fixed at "0". The diagram on the right in FIG. 14F after shifting of the neutral point is the same as the diagram on the left in FIG. 14A. The modes 1 to 6 are subsequently repeated.

In the vector diagrams in FIGS. 14A to 14F, the phase voltages of the phases are represented by the Y coordinate of the vertices of the equilateral triangles T. In mode 1, the vertex v is fixed at the origin, and therefore the U-phase phase voltage is the orthogonal projection of the vector Puv pointing from the vertex v to the vertex u onto the Y axis (see FIG. 14A). Accordingly, it is sufficient that the command value signal Xu3 in mode 1 is the line voltage command value signal Xuv. In mode 2, the vertex u is fixed at the maximum point, and therefore the U-phase phase voltage is B (see FIG. 14B). Accordingly, it is sufficient that the command value signal Xu3 in mode 2 is the signal with the value of B. In mode 3, the vertex w is fixed at the origin, and therefore the U-phase phase voltage is the orthogonal projection of the vector Puw pointing from the vertex w to the vertex u onto the Y axis (see FIG. 14C). Accordingly, it is sufficient that the command value signal. Xu3 in mode 3 is the signal Xuw (=−Xwu). In mode 4, the vertex v is fixed at the maximum point, and therefore the U-phase phase voltage has the value obtained by adding B to the orthogonal projection of the vector Puv pointing from the vertex v to the vertex u onto the Y axis (see FIG. 14D). Accordingly, it is sufficient that the command value signal Xu3 in mode 4 is the result of adding B to the line voltage command value signal Xuv. In mode 5, the vertex u is fixed at the origin, and therefore the U-phase phase voltage is "0" (see FIG. 14E). Accordingly, it is sufficient that the command value signal Xu3 in mode 5 is the zero signal with the value of "0". In mode 6, the vertex w is fixed at the maximum point, and therefore the U-phase phase voltage has the value obtained by adding B to the orthogonal projection of the vector Puw pointing from the vertex w to the vertex u onto the Y axis (see FIG. 14F). Accordingly, it is sufficient that the command value signal. Xu3 for specifying the waveform of the U-phase phase voltage in mode 6 is the result of adding B to the signal Xuw (=−Xwu).

Similarly, it is sufficient that the V-phase command value signal Xv3 is the zero signal in mode 1, the result of adding B to the signal Xvu in mode 2, the line voltage command value signal Xvw in mode 3, the signal with the value of B in mode 4, the signal Xvu in mode 5, and the result of adding B to the line voltage command value signal Xvw in mode 6. Also, it is sufficient that the W-phase command value signal Xw3 is the signal Xwv in mode 1, the result of adding B to the line voltage command value signal Xwu in mode 2, the zero signal in mode 3, the result of adding B to the signal Xwv in mode 4, the line voltage command value signal Xwu in mode 5, and the signal with the value of B in mode 6.

Figure 15:
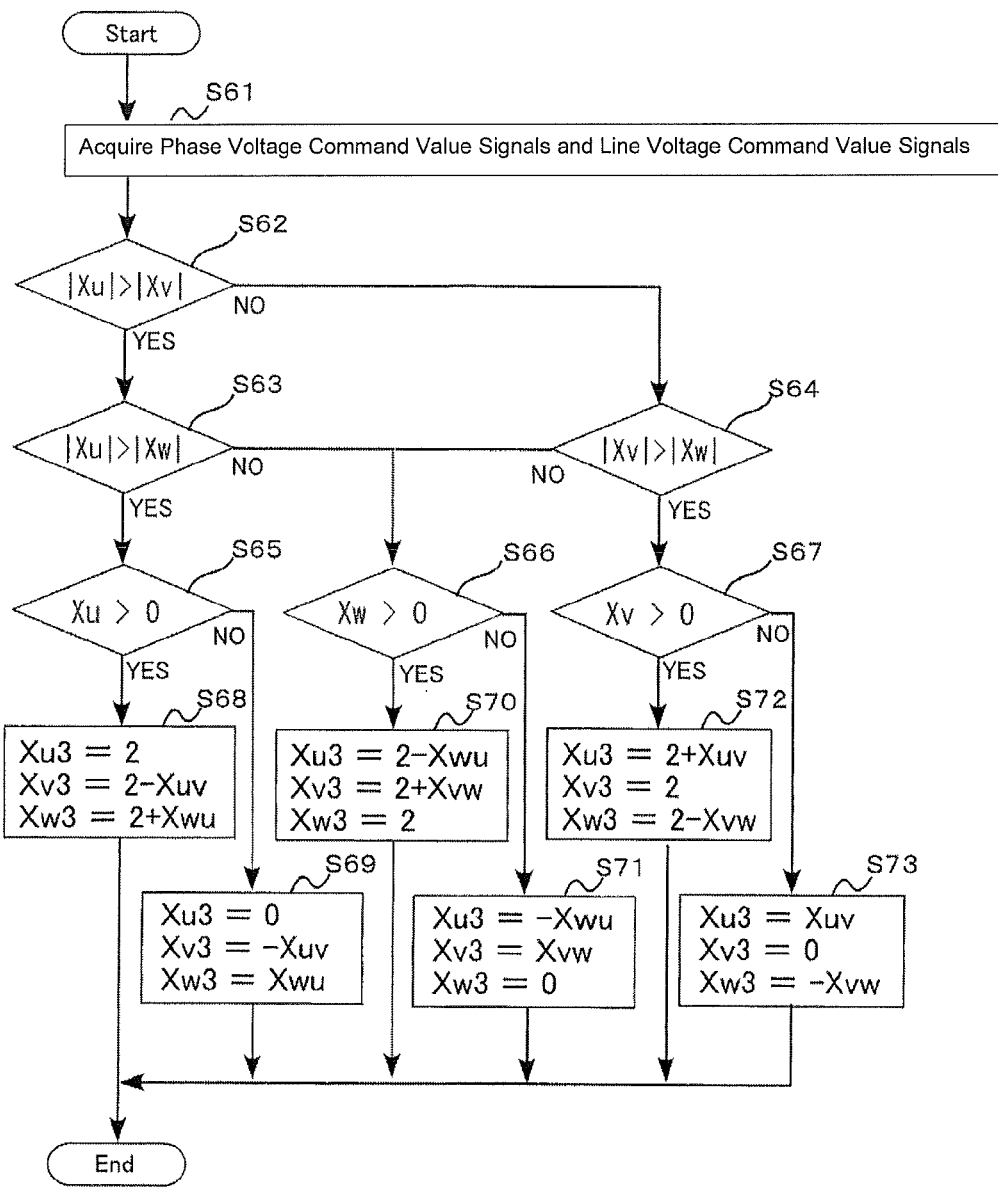
FIG. 15 is a flowchart for describing command value signal generation processing according to the third embodiment.

FIG. 15 is a flowchart for describing command value signal generation processing performed by the command value signal generation unit 52 according to the third embodiment. The command value signal generation processing is executed at a predetermined time.

The flowchart of FIG. 15 differs from the flowchart of the command value signal generation processing according to the first embodiment (see FIG. 8) in that it is determined which of the phase voltage command value signals Xu, Xv, and Xw has the greatest absolute value in steps S62 to S64.

First, the phase voltage command value signals Xu, Xv, and Xw and the line voltage command value signals Xuv, Xvw, and Xwu are acquired (step S61). Next, it is determined whether the absolute value of Xu is greater than the absolute value of Xv (step S62). If the absolute value of Xu is greater (step S62: YES), it is determined whether the absolute value of Xu is greater than the absolute value of Xw (step S63). If the absolute value of Xu is greater (step S63: YES), that is to say, if the absolute value of Xu is the greatest, the procedure proceeds to step S5. On the other hand, if the absolute value of Xu is less than or equal to the absolute value of Xw (step S63: NO), that is to say, if the absolute value of Xw is the greatest, the procedure proceeds to step S66. If the absolute value of Xu is less than or equal to the absolute value of Xv in step S62 (step S62: NO), it is determined whether the absolute value of Xv is greater than the absolute value of Xw (step S64). If the absolute value of Xv is greater (step S64: YES), that is to say, if the absolute value of Xv is the greatest, the procedure proceeds to step S67. On the other hand, if the absolute value of Xv is less than or equal to the absolute value of Xw (step S64: NO), that is to say, if the absolute value of Xw is the greatest, the procedure proceeds to step S66. In steps S62 to S64, it is determined which of Xu, Xv, and Xw has the greatest absolute value.

If it is determined that the absolute value of Xu is the greatest, and the procedure proceeds to step S65, it is then determined whether the value of Xu is positive (step S65). If the value of Xu is positive (step S65: YES), the command value signal Xu3 is set to "2", the command value signal Xv3 is set to the value obtained by subtracting Xuv from "2", and the command value signal Xw3 is set to the value obtained by adding Xwu to "2" (step S68). On the other hand, if Xu is less than or equal to "0" (step S65: NO), Xu3 is set to "0", Xv3 is set to the negative value of Xuv, and Xw3 is set to Xwu (step S69).

If it is determined that the absolute value of Xw is the greatest, and the procedure proceeds to step S66, it is then determined whether the value of Xw is positive (step S66). If the value of Xw is positive (step S66: YES), Xu3 is set to the value obtained by subtracting Xwu from "2", Xv3 is set to the value obtained by adding Xvw to "2", and Xw3 is set to "2" (step S70). On the other hand, if Xw is less than or equal to "0" (step S66: NO), Xu3 is set to the negative value of Xwu, Xv3 is set to Xvw, and Xw3 is set to "0" (step S71).

If it is determined that the absolute value of Xv is the greatest, and the procedure proceeds to step S67, it is then determined whether the value of Xv is positive (step S67). If the value of Xv is positive (step S67: YES), Xu3 is set to the value obtained by adding Xuv to "2", Xv3 is set to "2", and Xw3 is set to the value obtained by subtracting Xvw from "2" (step S72). On the other hand, if Xv is less than or equal to "0" (step S67: NO), Xu3 is set to Xuv, Xv3 is set to "0", and Xw3 is set to the negative value of Xvw (step S73).

In other words, in the command value signal generation processing of the third embodiment, it is determined which of the phase voltage command value signals Xu, Xv, and Xw has the greatest absolute value, it is determined whether the phase voltage command value signal having the greatest absolute value is positive or negative, and the command value signals Xu3, Xv3, and Xw3 are determined in accordance with the result of that determination. In other words, it is determined which of the modes among those in the vector diagrams of FIGS. 14A to 14F is the current mode, and the command value signals Xu3, Xv3, and Xw3 of the respective phases are determined so as to correspond to the vector diagram with the mode determined to be the current mode.

In the case of the mode 1 state shown in FIG. 14A, the length of the orthogonal projection of the vector Pv on the Y axis is the greatest, and the Y coordinate of the vector Pv has a negative value. In other words, the absolute value of the phase voltage command value signal Xv is the greatest, and the phase voltage command value signal Xv has a negative value (step S67: NO in FIG. 15). In this case, the Y coordinates of the vertices u, v, and w are respectively the value of the Y coordinate of the vector Puv, "0", and the negative value of the Y coordinate of the vector Pvw. Accordingly, Xu3 is set to Xuv, Xv3 is set to "0", and Xw3 is set to the negative value of Xvw (step S73 in FIG. 15).

In the case of the mode 2 state shown in FIG. 14B, the length of the orthogonal projection of the vector Pu on the Y axis is the greatest, and the Y coordinate of the vector Pu has a positive value. In other words, the absolute value of the phase voltage command value signal Xu is the greatest, and the phase voltage command value signal Xu has a positive value (step S65: YES in FIG. 15). In this case, the Y coordinates of the vertices u, v, and w are respectively B (B being "2" hereinafter since the case where B="2" is described in FIG. 15), the value obtained by adding the Y coordinate of the vector Pvu to "2" (that is to say, the value obtained by subtracting the Y coordinate of the vector Puv from "2"), and the value obtained by adding the Y coordinate of the vector Pwu to "2". Accordingly, Xu3 is set to "2", Xv3 is set to the value obtained by subtracting Xuv from "2", and Xw3 is set to the value obtained by adding Xwu to "2" (step S68 in FIG. 15).

In the case of the mode 3 state shown in FIG. 14C, the length of the orthogonal projection of the vector Pw on the Y axis is the greatest, and the Y coordinate of the vector Pw has a negative value. In other words, the absolute value of the phase voltage command value signal Xw is the greatest, and the phase voltage command value signal Xw has a negative value (step S66: NO in FIG. 15). In this case, the Y coordinates of the vertices u, v, and w are respectively the negative value of the Y coordinate of the vector Pwu, the value of the Y coordinate of the vector Pvw, and "0". Accordingly, Xu3 is set to the negative value of Xwu, Xv3 is set to Xvw, and Xw3 is set to "0" (step S71 in FIG. 15).

In the case of the mode 4 state shown in FIG. 14D, the length of the orthogonal projection of the vector Pv on the Y axis is the greatest, and the Y coordinate of the vector Pv has a positive value. In other words, the absolute value of the phase voltage command value signal Xv is the greatest, and the phase voltage command value signal Xv has a positive value (step S67: YES in FIG. 15). In this case, the Y coordinates of the vertices u, v, and w are respectively the value obtained by adding the Y coordinate of the vector Puv to "2", "2", and the value obtained by subtracting the Y coordinate of the vector Pvw from "2". Accordingly, Xu3 is set to the value obtained by adding Xuv to "2", Xv3 is set to "2", and Xw3 is set to the value obtained by subtracting Xvw from "2" (step S72 in FIG. 15).

In the case of the mode 5 state shown in FIG. 14E, the length of the orthogonal projection of the vector Pu on the Y axis is the greatest, and the Y coordinate of the vector Pu has a negative value. In other words, the absolute value of the phase voltage command value signal Xu is the greatest, and the phase voltage command value signal Xu has a negative value (step S65: NO in FIG. 15). In this case, the Y coordinates of the vertices u, v, and w are respectively "0", the negative value of the Y coordinate of the vector Puv, the value of the Y coordinate of the vector Pwu. Accordingly, Xu3 is set to "0", Xv3 is set to the negative value of Xuv, and Xw3 is set to Xwu (step S69 in FIG. 15).

In the case of the mode 6 state shown in FIG. 14F, the length of the orthogonal projection of the vector Pw on the Y axis is the greatest, and the Y coordinate of the vector Pw has a positive value. In other words, the absolute value of the phase voltage command value signal Xw is the greatest, and the phase voltage command value signal Xw has a positive value (step S66: YES in FIG. 15). In this case, the Y coordinates of the vertices u, v, and w are respectively the value obtained by subtracting the Y coordinate of the vector Pwu from "2", the value obtained by adding the Y coordinate of the vector Pvw to "2", and "2". Accordingly, Xu3 is set to the value obtained by subtracting Xwu from "2", Xv3 is set to the value obtained by adding Xvw to "2", and Xw3 is set to "2" (step S70 in FIG. 15).

Note that the flowchart shown in FIG. 15 is one example of command value signal generation processing, and there is no limitation to this example.

Figure 16:
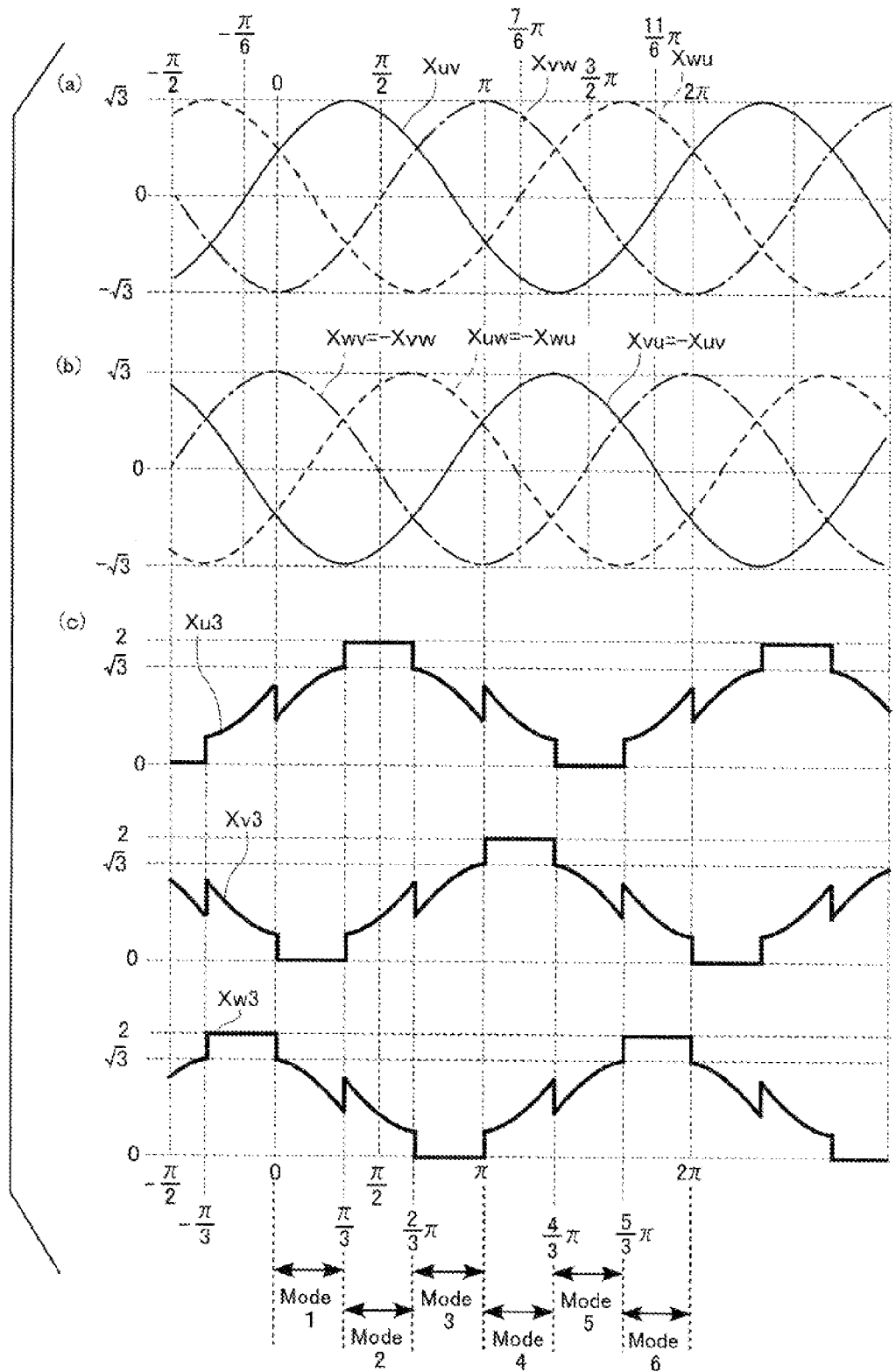
FIG. 16 is a diagram for describing the waveforms of command value signals according to the third embodiment.
Figure 17:
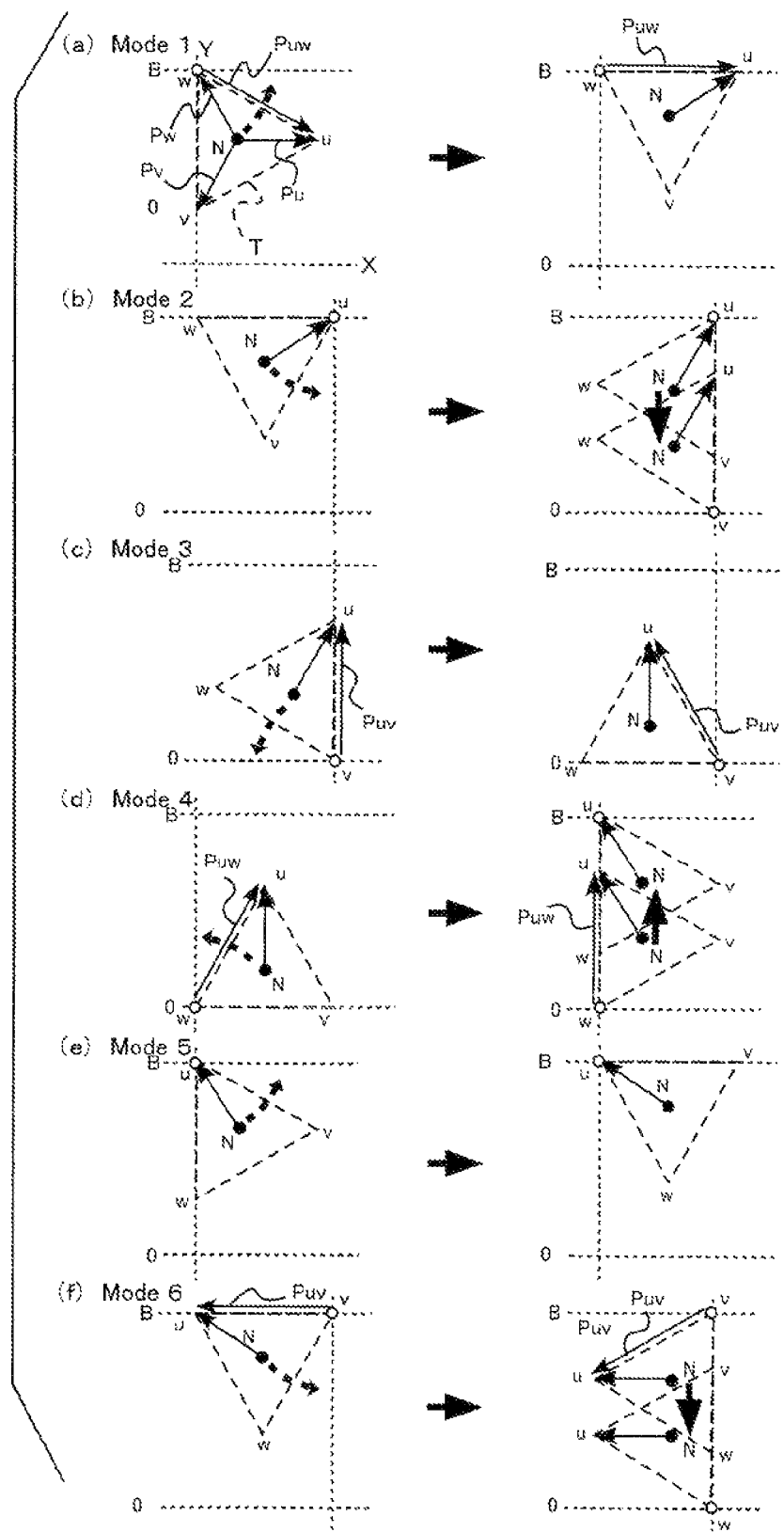
FIGS. 17A to 17F are diagrams for using vectors to describe the concept of control according to a fourth embodiment.
Figure 18:
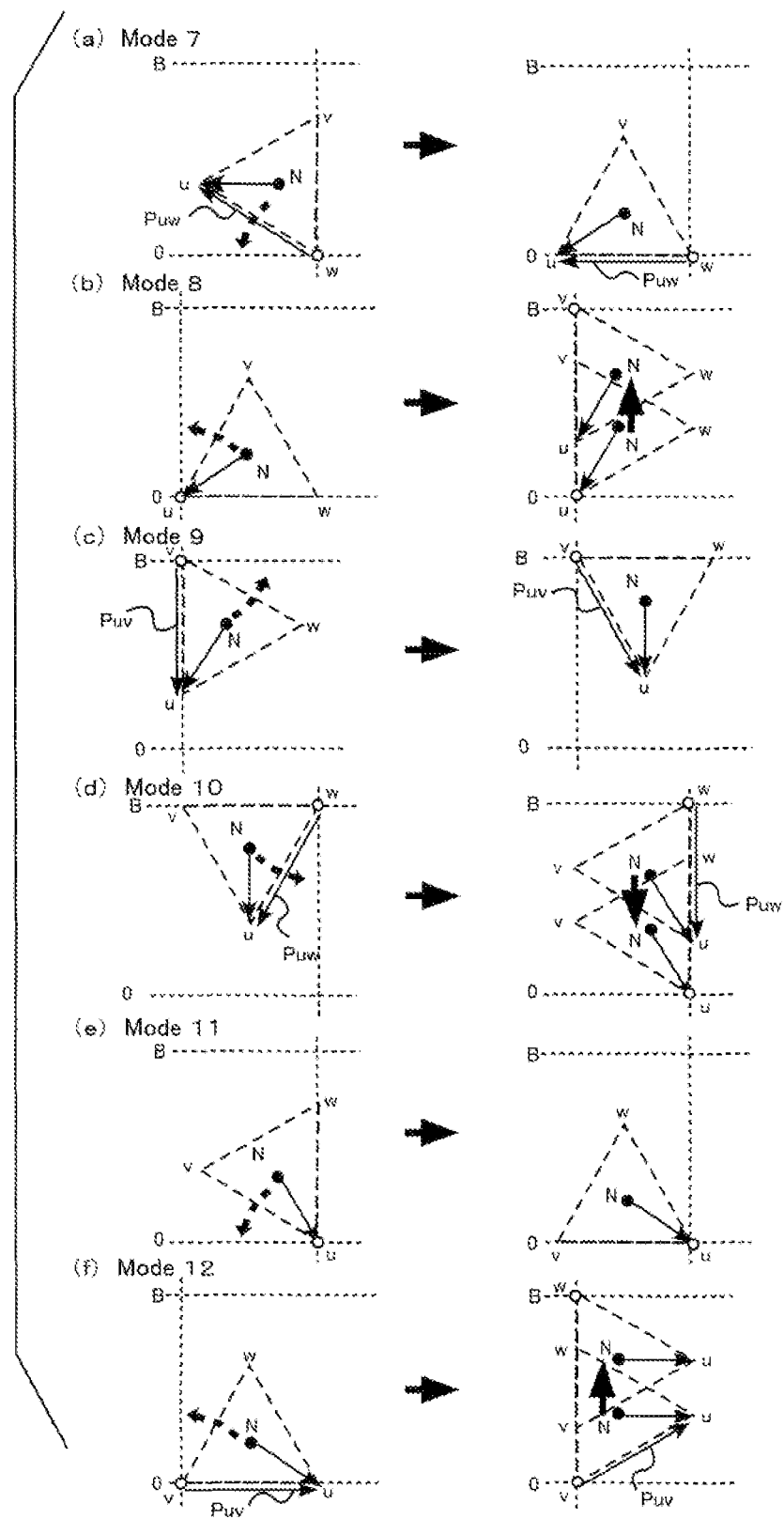
FIGS. 18A to 18F are diagrams for using vectors to describe the concept of control according to the fourth embodiment.

The waveforms of the command value signals Xu3, Xv3, and Xw3 generated in the command value signal generation processing of the third embodiment are the waveforms Xu3, Xv3, and Xw3 shown in (c) of FIG. 16.

FIG. 16 is a diagram for describing the waveforms of the command value signals Xu3, Xv3, and Xw3.

The waveforms Xuv, Xvw, and Xwu shown in (a) of FIG. 16 are the same as the waveforms Xuv, Xvw, and Xwu shown in (a) of FIG. 49, and the waveforms Xvu, Xwv, and Xuw shown in (b) of FIG. 16 are the same as the waveforms Xvu, Xwv, and Xuw shown in (b) of FIG. 49, and therefore descriptions thereof will not be given. In FIG. 16 as well, the phase of the phase voltage command value signal Xu is used as the reference for illustration.

The waveforms Xu3, Xv3, and Xw3 shown in (c) of FIG. 16 are the waveforms of the command value signals Xu3, Xv3, and Xw3 respectively. As was described with reference to FIGS. 14A to 14F and FIG. 15, the command value signals Xu3, Xv3, and Xw3 are generated through the modes 1 to 6. In FIG. 16, (c) shows the respective waveforms when B=2.

In mode 1 ($0 \leq \theta \leq \pi/3$), the procedure in the flowchart of FIG. 15 proceeds to step S73, and therefore the waveform Xu3 is the waveform Xuv (see (a) of FIG. 16), the waveform Xv3 is the waveform fixed at "0", and the waveform Xw3 is the waveform Xwv (see (b) of FIG. 16). Also, in mode 2 ($\pi/3 \leq \theta \leq 2\pi/3$), the procedure in the flowchart of FIG. 15 proceeds to step S68, and therefore the waveform Xu3 is the waveform fixed at "2", the waveform. Xv3 is the waveform obtained by shifting the waveform Xvu upward by "2", and the waveform Xw3 is the waveform obtained by shifting the waveform Xwu upward by "2". In mode 3 ($2\pi/3 \leq \theta \leq \pi$), the procedure in the flowchart of FIG. 15 proceeds to step S71, and therefore the waveform Xu3 is the waveform Xuw, the waveform Xv3 is the waveform Xvw, and the waveform Xw3 is the waveform fixed at "0". In mode 4 ($\pi \leq \theta \leq 4\pi/3$), the procedure in the flowchart of FIG. 15 proceeds to step S72, and therefore the waveform Xu3 is the waveform obtained by shifting the waveform Xuv upward by "2", the waveform Xv3 is the waveform fixed at "2", and the waveform Xw3 is the waveform obtained by shifting the waveform Xwv upward by "2". In mode 5 ($4\pi/3 \leq \theta \leq 5\pi/3$), the procedure in the flowchart of FIG. 15 proceeds to step S69, and therefore the waveform Xu3 is the waveform fixed at "0", the waveform Xv3 is the waveform Xvu, and the waveform Xw3 is the waveform Xwu. In mode 6 ($5\pi/3 \leq \theta \leq 2\pi$), the procedure in the flowchart of FIG. 15 proceeds to step S70, and therefore the waveform Xu3 is the waveform obtained by shifting the waveform Xuw upward by "2", the waveform Xv3 is the waveform obtained by shifting the waveform Xvw upward by "2", and the waveform Xw3 is the waveform fixed at "2".

As is clearly shown in FIG. 16, the difference signal between the command value signals Xu3 and Xv3, the difference signal between Xv3 and Xw3, and the difference signal between Xw3 and Xu3 match the line voltage command value signals Xuv, Xvw, and Xwu respectively. Accordingly, the waveform of the line voltage signal Vuv, which is the difference signal between the phase voltage signals Vu3 and Vv3 output by the interconnection inverter system A, the waveform of the line voltage signal Vvw, which is the difference signal between Vv3 and Vw3, and the waveform of the line voltage signal Vwu, which is the difference signal between Vw3 and Vu3, are the same as the waveforms Xuv, Xvw, and Xwu shown in (a) of FIG. 16. In other words, the line voltage signals Vuv, Vvw, and Vwu are sinusoidal signals that are in three-phase equilibrium, and therefore can be synchronized with the system voltage of the system B. Accordingly, the AC power output by the interconnection inverter system A can be supplied to the system B.

Also, the command value signals Xu3, Xv3, and Xw3 are fixed at "0" for ⅙ of the cycle, and are fixed at "2" for ⅙ of the cycle (see the waveforms Xu3, Xv3, and Xw3 in (c) of FIG. 16). This enables achieving an effect similar to that of the first embodiment.

Similarly to the first embodiment, there are no limitations on the lower limit value and the upper limit value of the command value signals Xu3, Xv3, and Xw3 in the third embodiment as well. For example, the command value signals Xu3, Xv3, and Xw3 may be generated such that the lower limit value is "−1" and the upper limit value is "1". In this case, the lower limit value and the upper limit value of the carrier signal used by the PWM signal generation unit 53 also need to be set in accordance with the lower limit value and the upper limit value of the command value signals Xu3, Xv3, and Xw3.

Although the case where the cycle of the command value signal is divided into six modes is described in the first to third embodiments, there is no limitation to this. For example, a configuration is possible in which the cycle of the command value signal is divided into 12 modes, and the phase that is fixed is changed when the mode switches. In this case as well, the command value signal is fixed at the lower limit value in two modes and fixed at the upper limit value in two modes. Accordingly, the time for which the generated PWM signals are continuously at the high level and the time for which they are continuously at the low level are the same, and therefore the time for which the positive-side switching elements are in the on state and the time for which the negative-side switching elements are in the on state can be made the same. Accordingly, an effect similar to that of the first to third embodiments can be achieved in this case as well. The same follows for the case of dividing the cycle of the command value signal into 24 modes, the case of dividing it into 36 modes, and the like. Note that since there are cases where switching is necessary when the mode switches, the number of times that switching is performed increases when the number of modes increases. Accordingly, a lower number of modes is better, and the first to third embodiments having six modes are more effective.

The case of dividing the cycle of the command value signal into 12 modes will be described below as the fourth embodiment.

FIGS. 17A to 18F are diagrams for using vectors to describe the concept of control according to the fourth embodiment.

Similarly to the concept of control in the first embodiment shown in FIGS. 3A to 3F, in the concept of control in the fourth embodiment shown in FIGS. 17A to 18F, the vertices of the equilateral triangles T are fixed at the origin and a maximum point (the point where the X coordinate is "0" and the Y coordinate is B). However, the Liming according to which the fixed vertices are switched is different between the fourth embodiment and the first embodiment. Similarly to FIGS. 3A to 3F, FIGS. 17A to 18F show the neutral point N, the vector Pu, and the equilateral triangle T, and the vectors Pv and Pw are not shown, with the exception of the diagram on the left in FIG. 17A. Also, the fixed vertices are marked by white circles in these figures.

FIG. 17A shows the state in which the angle θ (the angle that the vector Pu forms with the X axis) changes from 0 to π/6. When $0 \leq \theta \leq \pi/6$, the vertex w of the equilateral triangle T is fixed at the maximum point, and the equilateral triangle T rotates counterclockwise (the direction indicated by the dashed line arrow in this figure, and the same follows hereinafter as well) about the vertex w by π/6. This state will be referred to as "mode 1". FIG. 17A shows that the W-phase potential is fixed at B in mode 1. The diagram on the left shows the state when θ=0, and the diagram on the right shows the state when θ=π/6.

FIG. 17B shows the state in which the angle θ changes from π/6 to π/3 (=2π/6). When $\pi/6 \leq \theta \leq \pi/3$, the vertex u of the equilateral triangle T is fixed at the maximum point, and the equilateral triangle T rotates counterclockwise about the vertex u by π/6. This state will be referred to as "mode 2". FIG. 17B shows that the U-phase potential is fixed at B in mode 2. The diagram on the left shows the state when θ=π/6, and the diagram on the right shows the state when θ=π/3. The diagram on the left is the same as the diagram on the right in FIG. 17A, with the exception that the point fixed at the maximum point was changed from the vertex w to the vertex u. When θ=π/3, the neutral point N shifts since the equilateral triangle T moves such that the vertex v conforms to the origin. This shows a change from the state in which the U-phase potential is fixed at B to the state in which the V-phase potential is fixed at "0".

FIG. 17C shows the state in which the angle θ changes from π/3 to π/2 (=3π/6). When π/3≤θ≤π/2, the vertex v of the equilateral triangle T is fixed at the origin, and the equilateral triangle T rotates counterclockwise about the vertex v by π/6. This state will be referred to as "mode 3". FIG. 17C shows that the V-phase potential is fixed at "0" in mode 3. The diagram on the left shows the state when θ=π/3, and the diagram on the right shows the state when θ=π/2.

FIG. 17D shows the state in which the angle θ changes from π/2 to 2π/3 (=4π/6). When π/2≤θ≤2π/3, the vertex w of the equilateral triangle T is fixed at the origin, and the equilateral triangle T rotates counterclockwise about the vertex w by π/6. This state will be referred to as "mode 4". FIG. 17D shows that the W-phase potential is fixed at "0" in mode 4. The diagram on the left shows the state when θ=π/2, and the diagram on the right shows the state when θ=2π/3. The diagram on the left is the same as the diagram on the right in FIG. 17C, with the exception that the point fixed at the origin was changed from the vertex v to the vertex w. When θ=2π/3, the neutral point N shifts since the equilateral triangle T moves such that the vertex u conforms to the maximum point. This shows a change from the state in which the W-phase potential is fixed at "0" to the state in which the U-phase potential is fixed at B.

FIG. 17E shows the state in which the angle θ changes from 2π/3 to 5π/6. When 2π/3≤θ≤5π/6, the vertex u of the equilateral triangle T is fixed at the maximum point, and the equilateral triangle T rotates counterclockwise about the vertex u by π/6. This state will be referred to as "mode 5". FIG. 17E shows that the U-phase potential is fixed at B in mode 5. The diagram on the left shows the state when θ=2π/3, and the diagram on the right shows the state when θ=5π/6.

FIG. 17F shows the state in which the angle θ changes from 5π/6 to π (=6π/6). When 5π/6≤θ≤π, the vertex v of the equilateral triangle T is fixed at the maximum point, and the equilateral triangle T rotates counterclockwise about the vertex v by π/6. This state will be referred to as "mode 6". FIG. 17F shows that the V-phase potential is fixed at B in mode 6. The diagram on the left shows the state when θ=5π/6, and the diagram on the right shows the state when θ=π. The diagram on the left is the same as the diagram on the right in FIG. 17E, with the exception that the point fixed at the maximum point was changed from the vertex u to the vertex v. When θ=π, the neutral point N shifts since the equilateral triangle T moves such that the vertex w conforms to the origin. This shows a change from the state in which the V-phase potential is fixed at B to the state in which the W-phase potential is fixed at "0".

FIG. 18A shows the state in which the angle θ changes from π to 7π/6. When π≤θ≤7π/6, the vertex w of the equilateral triangle T is fixed at the origin, and the equilateral triangle T rotates counterclockwise about the vertex w by π/6. This state will be referred to as "mode 7". FIG. 18A shows that the W-phase potential is fixed at "0" in mode 7. The diagram on the left shows the state when θ=π, and the diagram on the right shows the state when θ=7π/6.

FIG. 18B shows the state in which the angle θ changes from 7π/6 to 4π/3 (=8π/6). When 7π/6≤θ≤4π/3, the vertex u of the equilateral triangle T is fixed at the origin, and the equilateral triangle rotates counterclockwise about the vertex u by π/6. This state will be referred to as "mode 8". FIG. 18B shows that the U-phase potential is fixed at "0" in mode 8. The diagram on the left shows the state when θ=7π/6, and the diagram on the right shows the state when θ=4π/3. The diagram on the left is the same as the diagram on the right in FIG. 18A, with the exception that the point fixed at the origin was changed from the vertex w to the vertex u. When θ=4π/3, the neutral point N shifts since the equilateral triangle T moves such that the vertex v conforms to the maximum point. This shows a change from the state in which the U-phase potential is fixed at "0" to the state in which the V-phase potential is fixed at B.

FIG. 18C shows the state in which the angle θ changes from 4π/3 to 3π/2 (=9π/6). When 4π/3≤θ≤3π/2, the vertex v of the equilateral triangle T is fixed at the maximum point, and the equilateral triangle T rotates counterclockwise about the vertex v by π/6. This state will be referred to as "mode 9". FIG. 18C shows that the V-phase potential is fixed at B in mode 9. The diagram on the left shows the state when θ=4π/3, and the diagram on the right shows the state when θ=3π/2.

FIG. 18D shows the state in which the angle θ changes from 3π/2 to 5π/3 (=10π/6). When 3π/2≤θ≤5π/3, the vertex w of the equilateral triangle T is fixed at the maximum point, and the equilateral triangle T rotates counterclockwise about the vertex w by π/6. This state will be referred to as "mode 10". FIG. 18D shows that the W-phase potential is fixed at B in mode 10. The diagram on the left shows the state when θ=3π/2, and the diagram on the right shows the state when θ=5π/3. The diagram on the left is the same as the diagram on the right in FIG. 18C, with the exception that the point fixed at the maximum point was changed from the vertex v to the vertex w. When θ=5π/3, the neutral point N shifts since the equilateral triangle T moves such that the vertex u conforms to the origin. This shows a change from the state in which the W-phase potential is fixed at B to the state in which the U-phase potential is fixed at "0".

FIG. 18E shows the state in which the angle θ changes from 5π/3 to 11π/6. When 5π/3≤θ≤11π/6, the vertex u of the equilateral triangle T is fixed at the origin, and the equilateral triangle T rotates counterclockwise about the vertex u by π/6. This state will be referred to as "mode 11". FIG. 18E shows that the U-phase potential is fixed at "0" in mode 11. The diagram on the left shows the state when θ=5π/3, and the diagram on the right shows the state when θ=11π/6.

FIG. 18F shows the state in which the angle θ changes from 11π/6 to 2π (=12π/6). When 11π/6≤θ≤2π, the vertex v of the equilateral triangle T is fixed at the origin, and the equilateral triangle rotates counterclockwise about the vertex v by π/6. This state will be referred to as "mode 12". FIG. 18F shows that the V-phase potential is fixed at "0" in mode 12. The diagram on the left shows the state when θ=11π/6, and the diagram on the right shows the state when θ=2π. The diagram on the left is the same as the diagram on the right in FIG. 18E, with the exception that the point fixed at the origin was changed from the vertex u to the vertex v. When θ=2π, the neutral point N shifts since the equilateral triangle T moves such that the vertex w conforms to the maximum point. This shows a change from the state in which the V-phase potential is fixed at "0" to the state in which the W-phase potential is fixed at B. The diagram on the right in FIG. 18F after shifting of the neutral point is the same as the diagram on the left in FIG. 17A. The modes 1 to 12 are subsequently repeated.

In the vector diagrams in FIGS. 17A to 18E, the phase voltages of the phases are represented by the Y coordinate of the vertices of the equilateral triangles T. In mode 1, the vertex w is fixed at the maximum point, and therefore the U-phase phase voltage has the value obtained by adding B to the orthogonal projection of the vector Puw pointing from the vertex w to the vertex u onto the Y axis (see FIG. 17A). Accordingly, it is sufficient that the command value signal Xu4 in mode 1 is the result of adding B to the signal Xuw (=−Xwu). In mode 2, the vertex u is fixed at the maximum point, and therefore the U-phase phase voltage is B (see FIG. 17B). Accordingly, it is sufficient that the command value signal Xu4 in mode 2 is the signal with the value of B. In mode 3, the vertex v is fixed at the origin, and therefore the U-phase phase voltage is the orthogonal projection of the vector Puv pointing from the vertex v to the vertex u onto the Y axis (see FIG. 17C). Accordingly, it is sufficient that the command value signal Xu4 in mode 3 is the line voltage command value signal Xuv. In mode 4, the vertex w is fixed at the origin, and therefore the U-phase phase voltage is the orthogonal projection of the vector Puw pointing from the vertex w to the vertex u onto the Y axis (see FIG. 17D). Accordingly, it is sufficient that the command value signal Xu4 in mode 4 is the signal Xuw. In mode 5, the vertex u is fixed at the maximum point, and therefore the U-phase phase voltage is B (see FIG. 17E). Accordingly, it is sufficient that the command value signal Xu4 in mode 5 is the signal with the value of B. In mode 6, the vertex v is fixed at the maximum point, and therefore the U-phase phase voltage has the value obtained by adding B to the orthogonal projection of the vector Puv pointing from the vertex v to the vertex u onto the Y axis (see FIG. 17F). Accordingly, it is sufficient that the command value signal Xu4 in mode 6 is the result of adding B to the line voltage command value signal Xuv.

In mode 7, the vertex w is fixed at the origin, and therefore the U-phase phase voltage is the orthogonal projection of the vector Puw pointing from the vertex w to the vertex u onto the Y axis (see FIG. 18A). Accordingly, it is sufficient that the command value signal Xu4 in mode 7 is the signal Xuw. In mode 8, the vertex u is fixed at the origin, and therefore the U-phase phase voltage is "0" (see FIG. 18B). Accordingly, it is sufficient that the command value signal Xu4 in mode 8 is the zero signal with the value of "0". In mode 9, the vertex v is fixed at the maximum point, and therefore the U-phase phase voltage has the value obtained by adding B to the orthogonal projection of the vector Puv pointing from the vertex v to the vertex u onto the Y axis (see FIG. 18C). Accordingly, it is sufficient that the command value signal Xu4 in mode 9 is the value obtained by adding B to the line voltage command value signal Xuv. In mode 10, the vertex w is fixed at the maximum point, and therefore the U-phase phase voltage has the value obtained by adding B to the orthogonal projection of the vector Puw pointing from the vertex w to the vertex u onto the Y axis (see FIG. 18D). Accordingly, it is sufficient that the command value signal Xu4 in mode 10 is the value obtained by adding B to the signal Xuw. In mode 11, the vertex u is fixed at the origin, and therefore the U-phase phase voltage is "0" (see FIG. 18E). Accordingly, it is sufficient that the command value signal Xu4 in mode 11 is the zero signal with the value of "0". In mode 12, the vertex v is fixed at the origin, and therefore the U-phase phase voltage is the orthogonal projection of the vector Puv pointing from the vertex v to the vertex u onto the Y axis (see FIG. 18F). Accordingly, it is sufficient that the command value signal Xu4 in mode 12 is the line voltage command value signal Xuv.

Similarly, it is sufficient that the V-phase command value signal Xv4 is the result of adding B to the line voltage command value signal Xvw in mode 1, the result of adding B to the signal Xvu in mode 2, the zero signal in mode 3, the line voltage command value signal Xvw in mode 4, the result of adding B to the signal Xvu in mode 5, the signal with the value of B in mode 6, the line voltage command value signal Xvw in mode 7, the signal Xvu in mode 8, the signal with the value of B in mode 9, the value obtained by adding B to the line voltage command value signal Xvw in mode 10, the signal Xvu in mode 11, and the zero signal in mode 12. Also, it is sufficient that the W-phase command value signal Xw4 is the signal with the value of B in mode 1, the result of adding B to the line voltage command value signal Xwu in mode 2, the signal Xwv in mode 3, the zero signal in mode 4, the line voltage command value signal Xwu in mode 4, the result of adding B to the line voltage command value signal Xwu in mode 5, the result of adding B to the signal Xwv in mode 6, the zero signal in mode 7, the line voltage command value signal Xwu in mode 8, the result of adding B to the signal Xwv in mode 9, the signal with the value of B in mode 10, the line voltage command value signal Xwu in mode 11, and the signal Xwv in mode 12.

Figure 19:
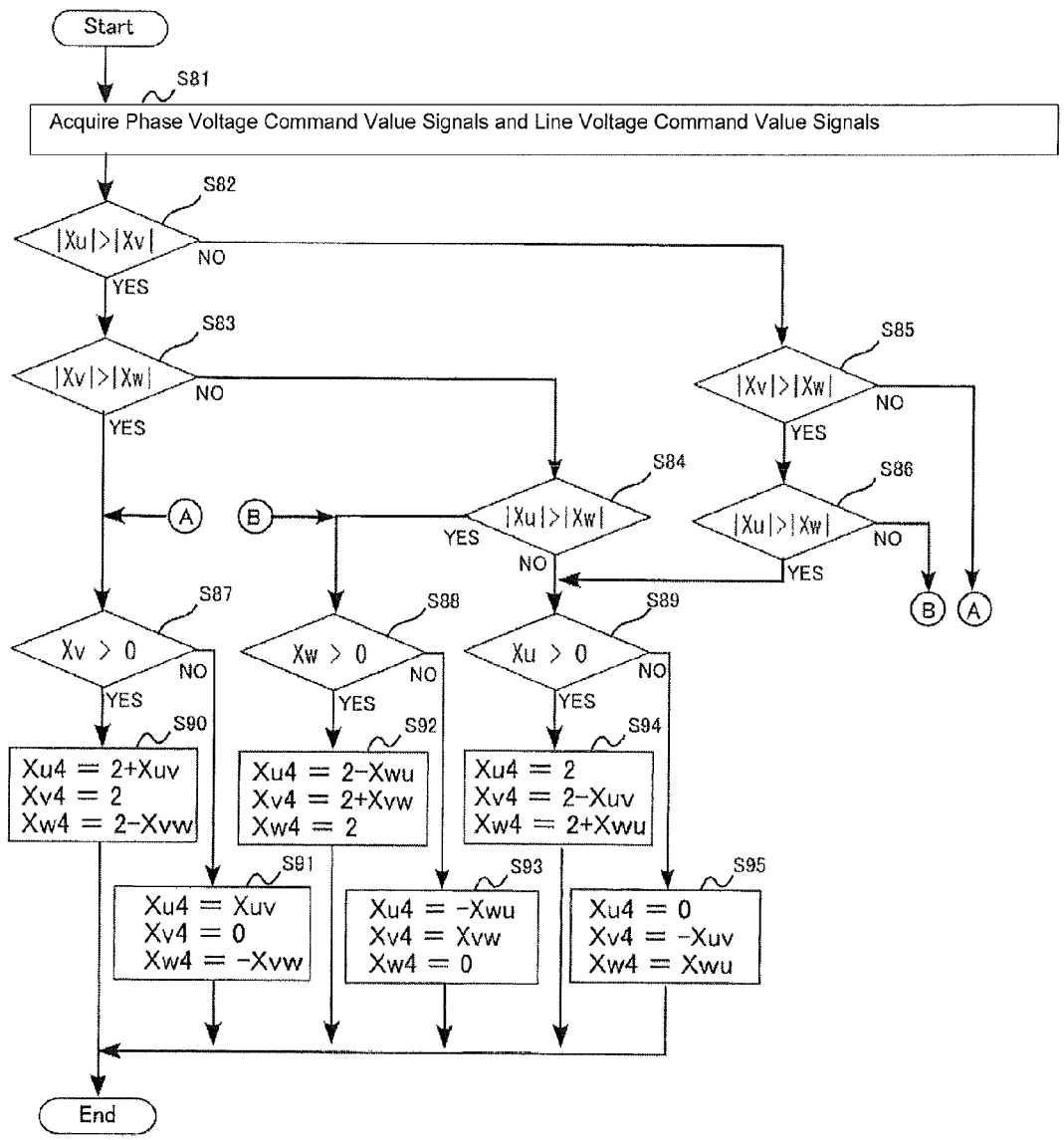
FIG. 19 is a flowchart for describing command value signal generation processing according to the fourth embodiment.

FIG. 19 is a flowchart for describing command value signal generation processing performed by the command value signal generation unit 52 according to the fourth embodiment. The command value signal generation processing is executed at a predetermined time.

The flowchart of FIG. 19 differs from the flowchart of the command value signal generation processing according to the first embodiment (see FIG. 8) in that it is determined which of the phase voltage command value signals Xu, Xv, and Xw has the absolute value with the intermediate magnitude in steps S81 to S86.

First, the phase voltage command value signals Xu, Xv, and Xw and the line voltage command value signals Xuv, Xvw, and Xwu are acquired (step S81). Next, it is determined whether the absolute value of Xu is greater than the absolute value of Xv (step S82). If the absolute value of Xu is greater (step S82: YES), it is determined whether the absolute value of Xv is greater than the absolute value of Xw (step S83). If the absolute value of Xv is greater (step S83: YES), that is to say, if the absolute value of Xv has the intermediate magnitude, the procedure proceeds to step S87. On the other hand, if the absolute value of Xv is less than or equal to the absolute value of Xw (step S83: NO), it is determined whether the absolute value of Xu is greater than the absolute value of Xw (step S84). If the absolute value of Xu is greater (step S84: YES), that is to say, if the absolute value of Xw has the intermediate magnitude, the procedure proceeds to step S88. On the other hand, if the absolute value of Xu is less than or equal to the absolute value of Xw (step S84: NO), that is to say, if the absolute value of Xu has the intermediate magnitude, the procedure proceeds to step S89. If the absolute value of Xu is less than or equal to the absolute value of Xv in step S82 (step S82: NO), it is determined whether the absolute value of Xv is greater than the absolute value of Xw (step S85). If the absolute value of Xv is greater (step S85: YES), it is determined whether the absolute value of Xu is greater than the absolute value of Xw (step S86). If the absolute value of Xu is Greater (step S86: YES), that is to say, if the absolute value of Xu has the intermediate magnitude, the procedure proceeds to step S89. On the other hand, if the absolute value of Xu is less than or equal to the absolute value of Xw (step S86: NO), that is to say, if the absolute value of Xw has the intermediate magnitude, the procedure proceeds to step S88. If the absolute value of Xv is less than or equal to the absolute value of Xw in step S85 (step S85: NO), that is to say, if the absolute value of Xv has the intermediate magnitude, the procedure proceeds to step S87. In steps S82 to S86, it is determined which of Xu, Xv, and Xw has the absolute value with the intermediate magnitude.

If it is determined that the absolute value of Xv has the intermediate magnitude, and the procedure proceeds to step S87, it is then determined whether the value of Xv is positive (step S87). If the value of Xv is positive (step S87: YES), the value of the command value signal Xu4 is set to the value obtained by adding Xuv to "2", the command value signal Xv4 is set to "2", and the command value signal Xw4 is set to the value obtained by subtracting Xvw from "2" (step S90). On the other hand, if Xv is less than or equal to "0" (step S87: NO), Xu4 is set to Xuv, Xv4 is set to "0", and Xw4 is set to the negative value of Xvw (step S91).

If it is determined that the absolute value of Xw has the intermediate magnitude, and the procedure proceeds to step S88, it is then determined whether the value of Xw is positive (step S88). If the value of Xw is positive (step S88: YES), Xu4 is set to the value obtained by subtracting Xwu from "2", Xv4 is set to the value obtained by adding Xvw to "2", and Xw4 is set to "2" (step S92). On the other hand, if Xw is less than or equal to "0" (step S88: NO), Xu4 is set to the negative value of Xwu, Xv4 is set to Xvw, and Xw4 is set to "0" (step S93).

If it is determined that the absolute value of Xu has the intermediate magnitude, and the procedure proceeds to step S89, it is then determined whether the value of Xu is positive (step S89). If the value of Xu is positive (step S89: YES), Xu4 is set to "2", Xv4 is set to the value obtained by subtracting Xuv from "2", and Xw4 is set to the value obtained by adding Xwu to "2" (step S94). On the other hand, if Xv is less than or equal to "0" (step S89: NO), Xu4 is set to "0", Xv4 is set to the negative value of Xuv, and Xw4 is set to Xwu (step S95).

In other words, in the command value signal generation processing of the fourth embodiment, it is determined which of the phase voltage command value signals Xu, Xv, and Xw has the absolute value with the intermediate magnitude, it is determined whether the phase voltage command value signal having the absolute value with the intermediate magnitude is positive or negative, and the command value signals Xu4, Xv4, and Xw4 are determined in accordance with the result of that determination. In other words, it is determined which of the modes among those in the vector diagrams of FIGS. 17A to 18F is the current mode, and the command value signals Xu4, Xv4, and Xw4 of the respective phases are determined so as to correspond to the vector diagram with the mode determined to be the current mode.

In the case of the mode 1 state shown in FIG. 17A, the length of the orthogonal projection of the vector Pw on the Y axis has the intermediate magnitude, and the Y coordinate of the vector Pw has a positive value. In other words, the absolute value of the phase voltage command value signal Xw has the intermediate magnitude, and the phase voltage command value signal Xw has a positive value (step S88: YES in FIG. 19). In this case, the Y coordinates of the vertices u, v, and w are respectively the value obtained by adding the value of the Y coordinate of the vector Puw to B (B being "2" hereinafter since the case where B="2" is described in FIG. 19) (that is to say, the value obtained by subtracting the Y coordinate of the vector Pwu from "2"), the value obtained by adding the Y coordinate of the vector Pvw to "2", and "2". Accordingly, Xu4 is set to the value obtained by subtracting Xwu from "2", Xv4 is set to the value obtained by adding Xvw to "2", and Xw4 is set to "2" (step S92 in FIG. 19).

In the case of the mode 2 state shown in FIG. 17B, the length of the orthogonal projection of the vector Pu on the Y axis has the intermediate magnitude, and the Y coordinate of the vector Pu has a positive value. In other words, the absolute value of the phase voltage command value signal Xu has the intermediate magnitude, and the phase voltage command value signal Xu has a positive value (step S89: YES in FIG. 19). In this case, the Y coordinates of the vertices u, v, and w are respectively "2", the value obtained by subtracting the Y coordinate of the vector Puv from "2", and the value obtained by adding the Y coordinate of the vector Pwu to "2". Accordingly, Xu4 is set to "2", Xv4 is set to the value obtained by subtracting Xuv from "2", and Xw4 is set to the value obtained by adding Xwu to "2" (step S94 in FIG. 19).

In the case of the mode 3 state shown in FIG. 17C, the length of the orthogonal projection of the vector Pv on the Y axis has the intermediate magnitude, and the Y coordinate of the vector Pv has a negative value. In other words, the absolute value of the phase voltage command value signal Xv has the intermediate magnitude, and the phase voltage command value signal Xv has a negative value (step S87: NO in FIG. 19). In this case, the Y coordinates of the vertices u, v, and w are respectively the value of the Y coordinate of the vector Puv, "0", and the negative value of the Y coordinate of the vector Pvw. Accordingly, Xu4 is set to Xuv, Xv4 is set to "0", and Xw4 is set to the negative value of Xvw (step S91 in FIG. 19).

In the case of the mode 4 state shown in FIG. 17D, the length of the orthogonal projection of the vector Pw on the Y axis has the intermediate magnitude, and the Y coordinate of the vector Pw has a negative value. In other words, the absolute value of the phase voltage command value signal Xw has the intermediate magnitude, and the phase voltage command value signal Xw has a negative value (step S88: NO in FIG. 19). In this case, the Y coordinates of the vertices u, v, and w are respectively the negative value of the Y coordinate of the vector Pwu, the value of the Y coordinate of the vector Pvw, and "0". Accordingly, Xu4 is set to the negative value of Xwu, Xv4 is set to Xvw, and Xw4 is set to "0" (step S93 in FIG. 19).

In the case of the mode 5 state shown in FIG. 17E, the length of the orthogonal projection of the vector Pu on the Y axis has the intermediate magnitude, and the Y coordinate of the vector Pu has a positive value. In other words, the absolute value of the phase voltage command value signal Xu has the intermediate magnitude, and the phase voltage command value signal Xu has a positive value (step S89: YES in FIG. 19). In this case, the Y coordinates of the vertices u, v, and w are respectively "2", the value obtained by subtracting the Y coordinate of the vector Puv from "2", and the value obtained by adding the Y coordinate of the vector Pwu to "2". Accordingly, Xu4 is set to "2", Xv4 is set to the value obtained by subtracting Xuv from "2", and Xw4 is set to the value obtained by adding Xwu to "2" (step S94 in FIG. 19).

In the case of the mode 6 state shown in FIG. 17F, the length of the orthogonal projection of the vector Pv on the Y axis has the intermediate magnitude, and the Y coordinate of the vector Pv has a positive value. In other words, the absolute value of the phase voltage command value signal Xv has the intermediate magnitude, and the phase voltage command value signal Xv has a positive value (step S87: YES in FIG. 19). In this case, the Y coordinates of the vertices u, v, and w are respectively the value obtained by adding the Y coordinate of the vector Puv to "2", "2", and the value obtained by subtracting the Y coordinate of the vector Pvw from "2". Accordingly, Xu4 is set to the value obtained by adding Xuv to "2", Xv4 is set to "2", and Xw4 is set to the value obtained by subtracting Xvw from "2" (step S90 in FIG. 19).

In the case of the mode 7 state shown in FIG. 18A, the length of the orthogonal projection of the vector Pw on the Y axis has the intermediate magnitude, and the Y coordinate of the vector Pw has a negative value. In other words, the absolute value of the phase voltage command value signal Xw has the intermediate magnitude, and the phase voltage command value signal Xw has a negative value (step S88: NO in FIG.

19). In this case, the Y coordinates of the vertices u, v, and w are respectively the negative value of the Y coordinate of the vector Pwu, the value of the Y coordinate of the vector Pvw, and "0". Accordingly, Xu4 is set to the negative value of Xwu, Xv4 is set to Xvw, and Xw4 is set to "0" (step S93 in FIG. 19).

In the case of the mode 8 state shown in FIG. 18B, the length of the orthogonal projection of the vector Pu on the Y axis has the intermediate magnitude, and the Y coordinate of the vector Pu has a negative value. In other words, the absolute value of the phase voltage command value signal Xu has the intermediate magnitude, and the phase voltage command value signal Xu has a negative value (step S89: NO in FIG. 19). In this case, the Y coordinates of the vertices u, v, and w are respectively "0", the negative value of the Y coordinate of the vector Puv, the value of the Y coordinate of the vector Pwu. Accordingly, Xu4 is set to "0", Xv4 is set to the negative value of Xuv, and Xw4 is set to Xwu (step S95 in FIG. 19).

In the case of the mode 9 state shown in FIG. 18C, the length of the orthogonal projection of the vector Pv on the Y axis has the intermediate magnitude, and the Y coordinate of the vector Pv has a positive value. In other words, the absolute value of the phase voltage command value signal Xv has the intermediate magnitude, and the phase voltage command value signal Xv has a positive value (step S87: YES in FIG. 19). In this case, the Y coordinates of the vertices u, v, and w are respectively the value obtained by adding the Y coordinate of the vector Puv to "2", "2", and the value obtained by subtracting the Y coordinate of the vector Pvw from "2". Accordingly, Xu4 is set to the value obtained by adding Xuv to "2", Xv4 is set to "2", and Xw4 is set to the value obtained by subtracting Xvw from "2" (step S90 in FIG. 19).

In the case of the mode 10 state shown in FIG. 18D, the length of the orthogonal projection of the vector Pw on the Y axis has the intermediate magnitude, and the Y coordinate of the vector Pw has a positive value. In other words, the absolute value of the phase voltage command value signal Xw has the intermediate magnitude, and the phase voltage command value signal Xw has a positive value (step S88: YES in FIG. 19). In this case, the Y coordinates of the vertices u, v, and are respectively the value obtained by subtracting the Y coordinate of the vector Pwu from "2", the value obtained by adding the Y coordinate of the vector Pvw to "2", and "2". Accordingly, Xu4 is set to the value obtained by subtracting Xwu from "2", Xv4 is set to the value obtained by adding Xvw to "2", and Xw4 is set to "2" (step S92 in FIG. 19).

In the case of the made 11 state shown in FIG. 18E, the length of the orthogonal projection of the vector Pu on the Y axis has the intermediate magnitude, and the Y coordinate of the vector Pu has a negative value. In other words, the absolute value of the phase voltage command value signal Xu has the intermediate magnitude, and the phase voltage command value signal Xu has a negative value (step S89: NO in FIG. 19). In this case, the Y coordinates of the vertices u, v, and w are respectively "0", the negative value of the Y coordinate of the vector Puv, the value of the Y coordinate of the vector Pwu. Accordingly, Xu4 is set to "0", Xv4 is set to the negative value of Xuv, and Xw4 is set to Xwu (step S95 in FIG. 19).

In the case of the mode 12 state shown in FIG. 18F, the length of the orthogonal projection of the vector Pv on the Y axis has the intermediate magnitude, and the Y coordinate of the vector Pv has a negative value. In other words, the absolute value of the phase voltage command value signal Xv has the intermediate magnitude, and the phase voltage command value signal Xv has a negative value (step S87: NO in FIG. 19). In this case, the Y coordinates of the vertices u, v, and w are respectively the value of the Y coordinate of the vector Puv, "0", and the negative value of the Y coordinate of the vector Pvw. Accordingly, Xu4 is set to Xuv, Xv4 is set to "0", and Xw4 is set to the negative value of Xvw (step S91 in FIG. 19).

Note that the flowchart shown in FIG. 19 is one example of command value signal generation processing, and there is no limitation to this example.

Figure 20:
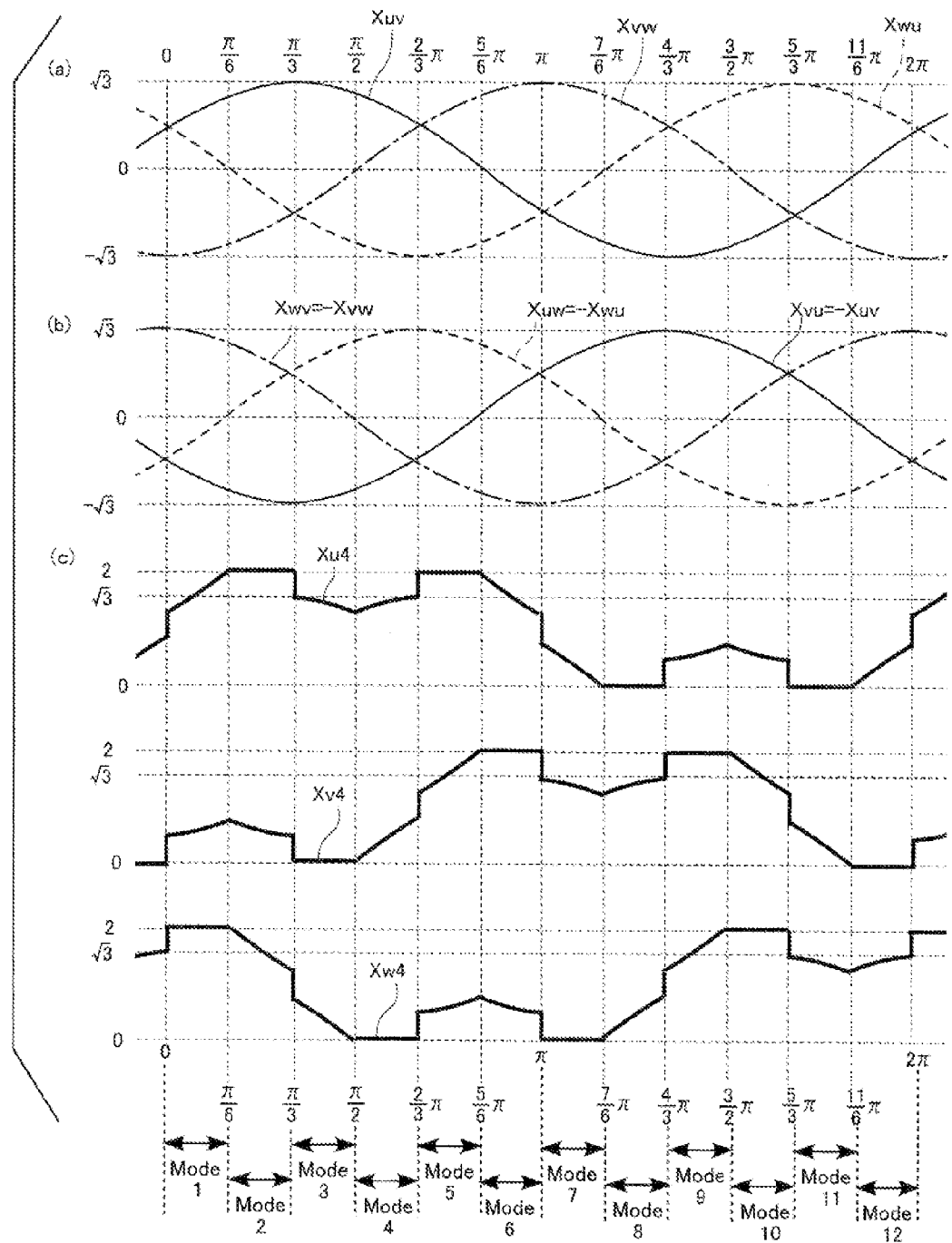
FIG. 20 is a diagram for describing the waveforms of command value signals according to the fourth embodiment.

The waveforms of the command value signals Xu4, Xv4, and Xw4 generated in the command value signal generation processing of the fourth embodiment are the waveforms Xu4, Xv4, and Xw4 shown in (c) of FIG. 20.

FIG. 20 is a diagram for describing the waveforms of the command value signals Xu4, Xv4, and Xw4.

The waveforms Xuv, Xvw, and Xwu shown in (a) of FIG. 20 are the same as the waveforms Xuv, Xvw, and Xwu shown in (a) of FIG. 49, and the waveforms Xvu, Xwv, and Xuw shown in (b) of FIG. 20 are the same as the waveforms Xvu, Xwv, and Xuw shown in (b) of FIG. 49, and therefore descriptions thereof will not be given. In FIG. 20 as well, the phase of the phase voltage command value signal Xu is used as the reference for illustration.

The waveforms Xu4, Xv4, and Xw4 shown in (c) of FIG. 20 are the waveforms of the command value signals Xu4, Xv4, and Xw4 respectively. As was described with reference to FIGS. 17A to 17F, 18A to 18F, and 19, the command value signals Xu4, Xv4, and Xw4 are generated through the modes 1 to 12. In FIG. 20, (c) shows the respective waveforms when B=2.

In mode 1 ($0 \le \theta \le \pi/6$), the procedure in the flowchart of FIG. 19 proceeds to step S92, and therefore the waveform Xu4 is the waveform obtained by shifting the Xuw (see (b) of FIG. 20) upward by "2", the waveform Xv4 is the waveform obtained by shifting the waveform Xvw (see (a) of FIG. 20) upward by "2", and the waveform Xw4 is the waveform fixed at "2". Also, in mode 2 ($\pi/6 \le \theta \le \pi/3$), the procedure in the flowchart of FIG. 19 proceeds to step S94, and therefore the waveform Xu4 is the waveform fixed at "2", the waveform Xv4 is the waveform obtained by shifting the waveform Xvu upward by "2", and the waveform Xw4 is the waveform obtained by shifting the waveform. Xwu upward by "2". In mode 3 ($\pi/3 \le \theta \le \pi/2$), the procedure in the flowchart of FIG. 19 proceeds to step S91, and therefore the waveform Xu4 is the waveform Xuv, the waveform Xv4 is the waveform fixed at "0", and the waveform Xw4 is the waveform Xwv. In mode 4 ($\pi/2 \le \theta \le 2\pi/3$), the procedure in the flowchart of FIG. 19 proceeds to step S93, and therefore the waveform Xu4 is the waveform Xuw, the waveform Xv4 is the waveform Xvw, and the waveform Xw4 is the waveform fixed at "0". In mode 5 ($2\pi/3 \le \theta \le 5\pi/6$), the procedure in the flowchart of FIG. 19 proceeds to step S94, and therefore the waveform Xu4 is the waveform fixed at "2", the waveform Xv4 is the waveform obtained by shifting the waveform Xvu upward by "2", and the waveform Xw4 is the waveform obtained by shifting the waveform Xwu upward by "2". In mode 6 ($5\pi/6 \le \theta \le \pi$), the procedure in the flowchart of FIG. 19 proceeds to step S90, and therefore the waveform Xu4 is the waveform obtained by shifting the waveform Xuv upward by "2", the waveform Xv4 is the waveform fixed at "2", and the waveform Xw4 is the waveform obtained by shifting the waveform Xwv upward by "2".

In mode 7 ($\pi \le \theta \le 7\pi/6$), the procedure in the flowchart of FIG. 19 proceeds to step S93, and therefore the waveform Xu4 is the waveform Xuw, the waveform Xv4 is the waveform Xvw, and the waveform Xw4 is the waveform fixed at "0". In mode 8 ($7\pi/6 \le \theta \le 4\pi/3$), the procedure in the flowchart of FIG. 19 proceeds to step S95, and therefore the waveform Xu4 is the waveform fixed at "0", the waveform Xv4 is the waveform Xvu, and the waveform Xw4 is the waveform Xwu. In mode 9 ($4\pi/3 \le \theta \le 3\pi/2$), the procedure in the flowchart of FIG. 19 proceeds to step S90, and therefore the waveform Xu4 is the waveform obtained by shifting the waveform Xuv upward by "2", the waveform Xv4 is the waveform fixed at "2", and the waveform Xw4 is the waveform obtained by shifting the waveform Xwv upward by "2". In mode 10 ($3\pi/2 \le \theta \le 5\pi/3$), the procedure in the flowchart of FIG. 19 proceeds to step S92, and therefore the waveform Xu4 is the waveform obtained by shifting the waveform Xuw upward by "2", the waveform Xv4 is the waveform obtained by shifting the waveform Xvw upward by "2", and the waveform Xw4 is the waveform fixed at "2". In mode 11 ($5\pi/3 \le \theta \le 11\pi/6$), the procedure in the flowchart of FIG. 19 proceeds to step S95, and therefore the waveform Xu4 is the waveform fixed at "0", the waveform Xv4 is the waveform Xvu, and the waveform Xw4 is the waveform Xwu. In mode 12 ($11\pi/6 \le \theta \le 2\pi$), the procedure in the flowchart of FIG. 19 proceeds to step S91, and therefore the waveform Xu4 is the waveform Xuv, the waveform Xv4 is the waveform fixed at "0", and the waveform Xw4 is the waveform Xwv.

As is clearly shown in FIG. 20, the difference signal between the command value signals Xu4 and Xv4, the difference signal between Xv4 and Xw4, and the difference signal between Xw4 and Xu4 match the line voltage command value signals Xuv, Xvw, and Xwu respectively. Accordingly, the waveform of the line voltage signal Vuv, which is the difference signal between the phase voltage signals Vu4 and Vv4 output by the interconnection inverter system A, the waveform of the line voltage signal Vvw, which is the difference signal between Vv4 and Vw4, and the waveform of the line voltage signal Vwu, which is the difference signal between Vw4 and Vu4, are the same as the waveforms Xuv, Xvw, and Xwu shown in (a) of FIG. 20. In other words, the line voltage signals Vuv, Vvw, and Vwu are sinusoidal signals that are in three-phase equilibrium, and therefore can be synchronized with the system voltage of the system B. Accordingly, the AC power output by the interconnection inverter system A can be supplied to the system B.

Also, the command value signals Xu4, Xv4, and Xw4 are fixed at "0" for ⅙ of the cycle, and are fixed at "2" for ⅙ of the cycle (see the waveforms Xu4, Xv4, and Xw4 in (c) of FIG. 20). This enables achieving an effect similar to that of the first embodiment.

Similarly to the first embodiment, there are no limitations on the lower limit value and the upper limit value of the command value signals Xu4, Xv4, and Xw4 in the fourth embodiment as well. For example, the command value signals Xu4, Xv4, and Xw4 may be generated such that the lower limit value is "−1" and the upper limit value is "1". In this case, the lower limit value and the upper limit value of the carrier signal used by the PWM signal generation unit 53 also need to be set in accordance with the lower limit value and the upper limit value of the command value signals Xu4, Xv4, and Xw4.

Next, a control method for generating command value signals having waveforms different from those in the first to fourth embodiments will be described below as a fifth embodiment. The command value signals of the fifth embodiment are denoted by Xu5, Xv5, and Xw5. The fifth embodiment differs from the first embodiment only with respect to the command value signal generation processing. Other aspects of the configuration will not be described since they are the same as those in the first embodiment.

The command value, signals Xu5, Xv5, and Xw5 of the fifth embodiment are signals whose waveforms are combinations of those of NVS command value signals Xu', Xv', and Xw' (see (c) of FIG. 49) and signals (hereinafter, referred to as "second signals") Xu", Xv", and Xw" (see (c) of later-described FIG. 23) having waveforms obtained by inverting the polarities of the waveforms of the NVS command value signals Xu', Xv', and Xw' and shifting them upward by a predetermined value. Note that the "NVS command value signals" will be referred to as "first signals" hereinafter.

Figure 21:
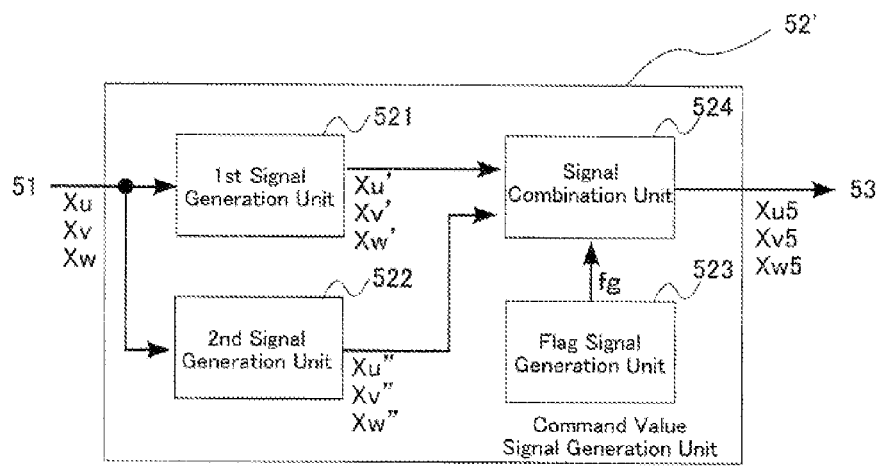
FIG. 21 is a block diagram for describing the internal configuration of a command value signal generation unit according to a fifth embodiment.

FIG. 21 is a block diagram for describing the internal configuration of a command value signal generation unit according to the fifth embodiment.

As shown in FIG. 21, a command value signal generation unit 52' includes a first signal generation unit 521, a second signal generation unit 522, a flag signal generation unit 523, and a signal combination unit 524.

The first signal generation unit 521 generates the first signals Xu', Xv', and Xw'. The first signal generation unit 521 generates the first signals Xu', Xv', and Xw' based on the phase voltage command value signals Xu, Xv, and Xw input from the feedback control unit 51, and outputs the first signals Xu', Xv', and Xw' to the signal combination unit 524. The first signal generation unit 521 generates the line voltage command value signals Xuv, Xvw, and Xwu from the phase voltage command value signals Xu, Xv, and Xw, and generates the signals Xvu, Xwv, and Xuw whose polarities are the inverse of those the line voltage command value signals Xuv, Xvw, and Xwu. The first signal generation unit 521 generates the first signal Xu' from the line voltage command value signal Xuv, the signal Xuw, and the zero signal, generates the first signal Xv' from the line voltage command value signal Xvw, the signal Xvu, and the zero signal, and generates the first signal Xw' from the line voltage command value signal Xwu, the signal Xwv, and the zero signal (see FIG. 49).

The waveforms Xu', Xv', and Xw' of the first signals (NVS command value signals) Xu', Xv', and Xw' are those shown in (c) of FIG. 49. Specifically, the waveform Xu' is the waveform Xuv in mode 1 ($-\pi/6 \le \theta \le \pi/2$ ($=3\pi/6$)), the waveform Xuw in mode 2 ($\pi/2 \le \theta \le 7\pi/6$), and the waveform fixed at "0" in mode 3 ($7\pi/6 \le \theta \le 11\pi/6$). Also, the waveform Xv' is the waveform fixed at "0" in mode 1, the waveform Xvw in mode 2, and the waveform Xvu in mode 3. Furthermore, the waveform Xw' is the waveform Xwv in mode 1, the waveform fixed at "0" in mode 2, and the waveform Xwu in mode 3.

The second signal Generation unit 522 generates the second signals Xu", Xv", and Xw". The second signal generation unit 522 generates the second signals Xu", Xv", and Xw" based on the phase voltage command value signals Xu, Xv, and Xw input from the feedback control unit 51, and outputs the second signals Xu", Xv", and Xw" to the signal combination unit 524. The second signal generation unit 522 generates the line voltage command value signals Xuv, Xvw, and Xwu from the phase voltage command value signals Xu, Xv, and Xw, and generates the signals Xvu, Xwv, and Xuw whose polarities are the inverse of those the line voltage command value signals Xuv, Xvw, and Xwu. The second signal generation unit 522 generates the second signals Xu", Xv", and Xw" using the line voltage command value signals Xuv, Xvw, and Xwu and the signals Xvu, Xwv, and Xuw.

Figure 22:
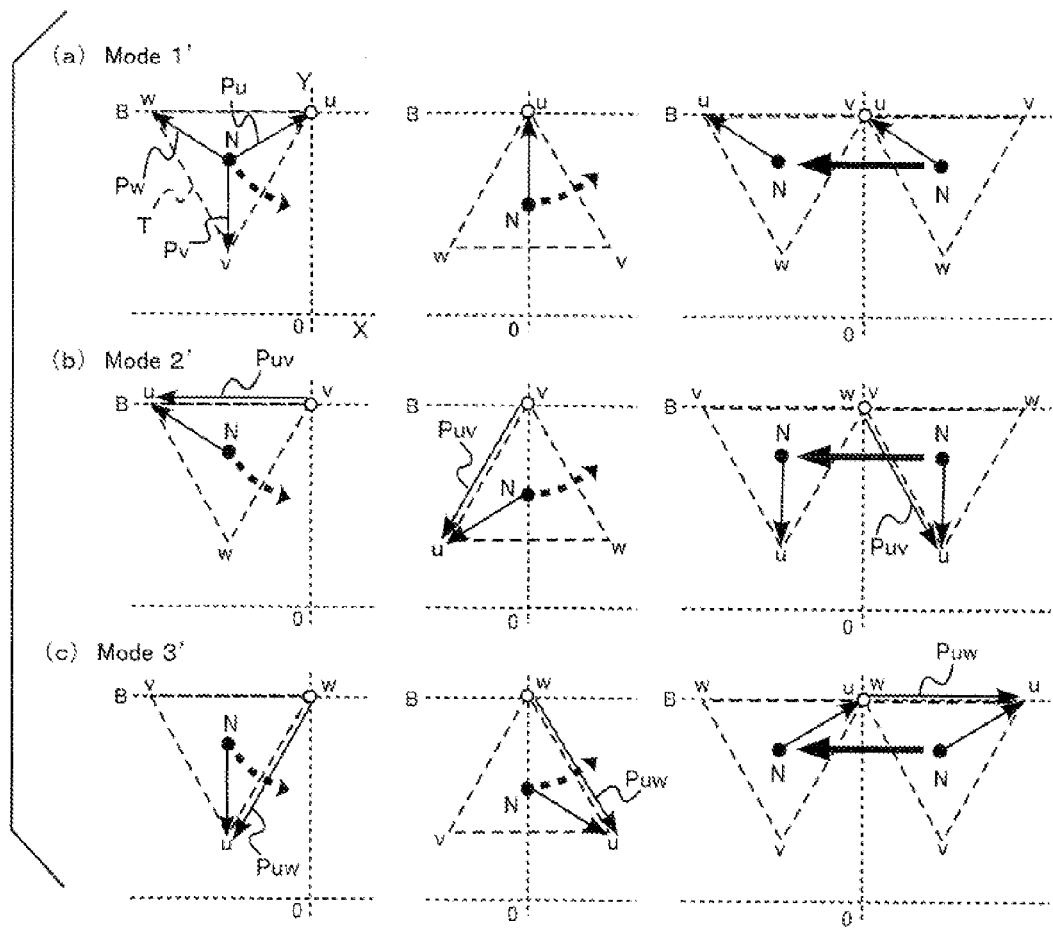
FIGS. 22A to 22C are diagrams for using vectors to describe the concept of control according to the fifth embodiment.

FIGS. 22A to 22C are diagrams for using vectors to describe the concept of the second signals Xu", Xv", and Xw". Similarly to the vector diagrams illustrating the concept of the generation of the first signals Xu', Xv', and Xw' (see FIGS. 2A to 2C), FIGS. 22A to 22C show the neutral point N, the vector Pu, and the equilateral triangle T, and the vectors Pv and Pw are not shown, with the exception of the diagram on the left in FIG. 22A. Also, the fixed vertices are marked by white circles in these figures. Whereas the vertices of the equilateral triangles T are fixed at the origin in the vector diagrams of FIGS. 2A to 2C, the vertices of the equilateral triangles T are fixed at the maximum point in the vector diagrams of FIGS. 22A to 22C FIG. 22A shows the state in which the angle θ (the angle that the vector Pu forms with the X axis) changes from π/6 to 5π/6. When π/6≤θ≤5π/6, the U-phase potential is fixed at B. This state will be referred to as "mode 1'". In mode 1', the vertex u of the equilateral triangle T is fixed at the maximum point, and the equilateral triangle T rotates counterclockwise (the direction indicated by the dashed line arrow in this figure, and the same follows hereinafter as well) about the vertex u by 2π/3. The diagram on the left shows the state when θ=π/6, the diagram in the center shows the state when θ=π/2 (=3π/6), and the diagram on the right shows the state when θ=5π/6. When θ=5π/6, the V-phase potential is fixed at B. The diagram on the right shows that the fixed phase changes from the U phase to the V phase, and that the neutral point N shifts since the equilateral triangle T moves such that the vertex v conforms to the maximum point.

FIG. 22B shows the state in which the angle θ changes from 5π/6 to 3π/2 (=9π/6). When, 5π/6≤θ≤3π/2, the V-phase potential is fixed at B. This state will be referred to as "mode 2'". In mode 2', the vertex v of the equilateral triangle T is fixed at the maximum point, and the equilateral triangle T rotates counterclockwise about the vertex v by 2π/3. The diagram on the left shows the state when θ=5π/6, the diagram in the center shows the state when θ=7π/6, and the diagram on the right shows the state when θ=3π/2 (=9π/6). The diagram on the left is the same as the diagram on the right in FIG. 22A after shifting of the neutral point. When θ=3π/2, the W-phase potential is fixed at B. The diagram on the right shows that the fixed phase changes from the V phase to the W phase, and that the neutral point N shifts since the equilateral triangle T moves such that the vertex w conforms to the maximum point.

FIG. 22C shows the state in which the angle θ changes from 3π/2 (=9π/6) to 13π/6 (=π/6). When 3π/2≤θ≤13π/6, the W-phase potential is fixed at B. This state will be referred to as "mode 3'". In mode 3', the vertex w of the equilateral triangle T is fixed at the maximum point, and the equilateral triangle T rotates counterclockwise about the vertex w by 2π/3. The diagram on the left shows the state when θ=3π/2 (=9π/6), the diagram in the center shows the state when θ=11π/6, and the diagram on the right shows the state when θ=13π/6. The diagram on the left is the same as the diagram on the right in FIG. 22B after shifting of the neutral point. When θ=13π/6, the U-phase potential is fixed at B. The diagram on the right shows that the fixed phase changes from the W phase to the U phase, and that the neutral point N shifts since the equilateral triangle T moves such that the vertex u conforms to the maximum point. The diagram on the right in FIG. 22C after shifting of the neutral point is the same as the diagram on the left in FIG. 22A. The modes 1' to 3' are subsequently repeated.

In the vector diagrams in FIGS. 22A to 22C, the phase voltages of the phases are represented by the Y coordinate of the vertices of the equilateral triangles T. In mode 1', the vertex u is fixed at the maximum point, and therefore the U-phase phase voltage is B (see FIG. 22A). Accordingly, it is sufficient that the U-phase second signal Xu" in mode 1' is the signal with the value of B.

In mode 2', the vertex v is fixed at the maximum point, and therefore the U-phase phase voltage has the value obtained by adding B to the orthogonal projection of the vector Puv pointing from the vertex v to the vertex u onto the Y axis (see FIG. 22B). Accordingly, it is sufficient that the U-phase second signal Xu" in mode 2' is the result of adding B to the line voltage command value signal Xuv. In mode 3', the vertex w is fixed at the maximum point, and therefore the U-phase phase voltage has the value obtained by adding B to the orthogonal projection of the vector Puw pointing from the vertex w to the vertex u onto the Y axis (see FIG. 22C). Accordingly, it is sufficient that the U-phase second signal Xu" in mode 3' is the result of adding B to the signal Xuw (=−Xwu).

Similarly, it is sufficient that the V-phase second signal Xv" is the result of adding B to the signal Xvu in mode 1', the signal with the value of B in mode 2', and the result of adding B to the line voltage command value signal Xvw in mode 3'. Also, it is sufficient that the W-phase second signal Xw" is the result of adding B to the line voltage command value signal Xwu in mode 1', the result of adding B to the signal Xwv in mode 2', and the signal with the value of B in mode 3'.

Figure 23:
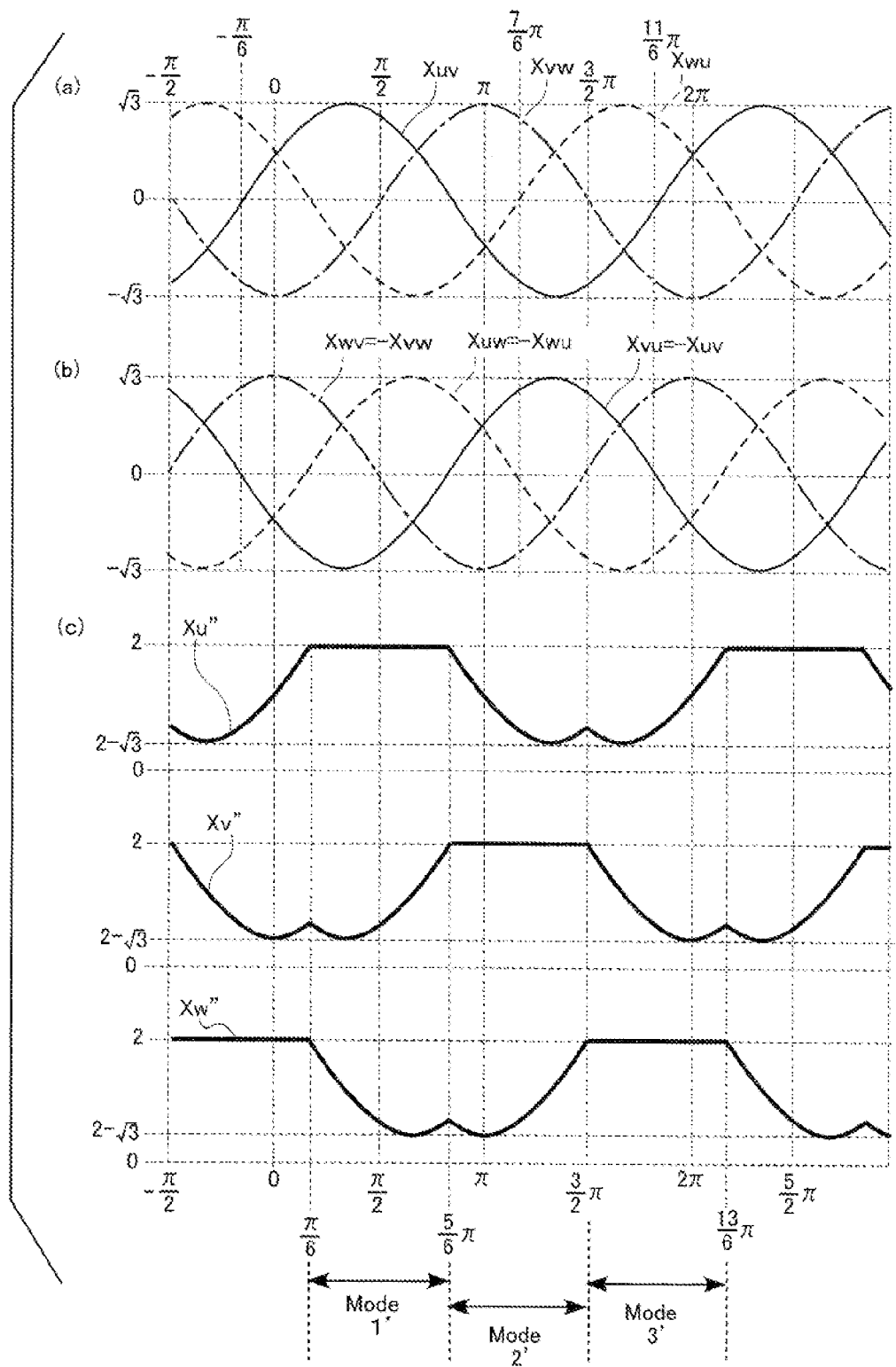
FIG. 23 is a diagram for describing the waveforms of command value signals according to the fifth embodiment.

FIG. 23 is a diagram illustrating the waveforms of the second signals Xu", Xv", and Xw".

The waveforms Xuv, Xvw, and Xwu shown in (a) of FIG. 23 are the same as the waveforms Xuv, Xvw, and Xwu shown in (a) of FIG. 49, and the waveforms Xvu, Xwv, and Xuw shown in (b) of FIG. 23 are the same as the waveforms Xvu, Xwv, and Xuw shown in (b) of FIG. 49, and therefore descriptions thereof will not be given. In FIG. 23 as well, the phase of the phase voltage command value signal Xu is used as the reference for illustration.

The waveforms Xu", Xv", and Xw" shown in of FIG. 23 are the waveforms of the second signals Xu", Xv" and Xw" respectively. As was described with reference to FIG. 22, the second signals Xu", Xv", and Xw" are generated through the modes 1' to 3'. In FIG. 23, (c) shows the respective waveforms when B=2.

The U-phase second signal Xu" is generated by switching between the result of adding "2" to the line voltage command value signal Xuv, the result of adding "2" to the signal Xuw, and the signal with the value of "2". The waveform Xu" is the waveform fixed at "2" in mode 1' (π/6≤θ≤5π/6), the waveform obtained by shifting the waveform Xuv upward by "2" in mode 2' (5π/6≤θ≤3π/2 (=9π/6)), and the waveform obtained by shifting the waveform Xuw upward by "2" in mode 3' (3π/2≤θ≤3π/6). Note that the phase of the phase voltage command value signal Xu is 0.

Similarly, the V-phase second signal Xv" is generated by switching between the result of adding "2" to the line voltage command value signal Xvw, the result of adding "2" to the signal Xvu, and the signal with the value of "2". The waveform Xv" is the waveform obtained by shifting the waveform Xvu upward by "2" in mode 1', the waveform fixed at "2" in mode 2', and the waveform obtained by shifting the waveform Xvw upward by "2" in mode 3'.

Also, the W-phase second signal Xw" is generated by switching between the result of adding "2" to the line voltage command value signal Xwu, the result of adding "2" to the signal Xwv, and the signal with the value of "2". The waveform Xw" is the waveform obtained by shifting the waveform Xwu upward by "2" in mode 1', the waveform obtained by shifting the waveform Xwv upward by "2" in mode 2', and the waveform fixed at "2" in mode 3'.

Returning to FIG. 21, the flag signal generation unit 523 generates a flag signal fg for switching the first signal and the second signal. The flag signal fg is a signal that switches between "0" (low level) and "1" (high level) at a predetermined cycle. In the present embodiment, the cycle of the flag signal fg is double the cycle (½ the frequency) of the cycle of the first signals Xu', Xv', and Xw' and the second signals Xu", Xv", and Xw", and the "0" period and the "1" period are the same length.

The signal combination unit 524 generates command value signals Xu5, Xv5, and Xw5 by combining the first signals Xu', Xv', and Xw' input from the first signal generation unit 521 and the second signals Xu", Xv", and Xw" input from the second signal generation unit 522. The signal combination unit 524 switches the first signals Xu', Xv', and Xw' and the second signals Xu", Xv", and Xw" based on the flag signal fg input from the flag signal Generation unit 523. Specifically, the signal combination unit 524 outputs the second signals Xu", Xv" and Xw" while the flag signal fg is "1", and outputs the first signals Xu', Xv', and Xw' while the flag signal fg is "0". The signals output from the signal combination unit 524 are output to the PWM signal generation unit 53 as the command value signals Xu5, Xv5, and Xw5.

Figure 24:
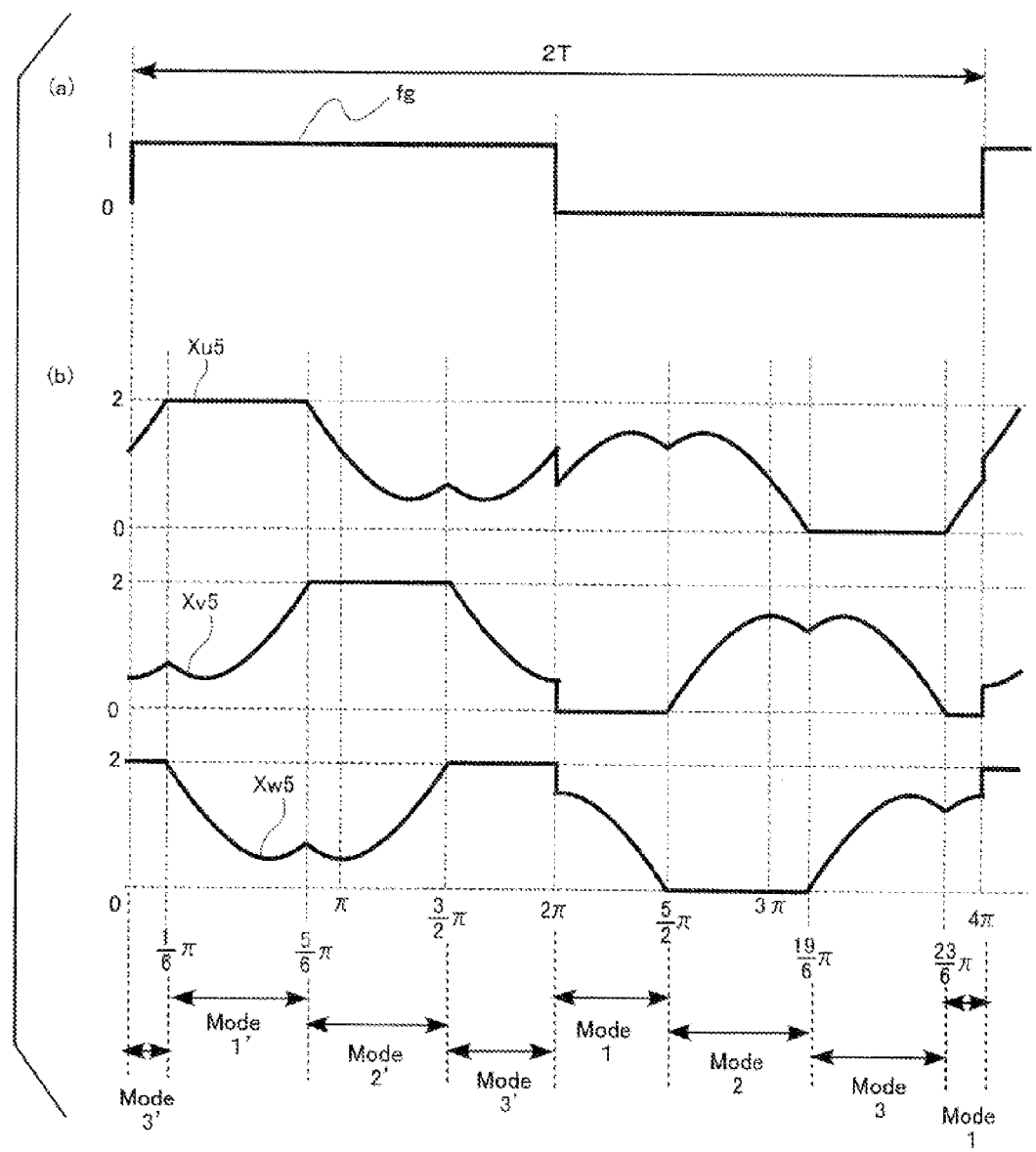
FIG. 24 is a diagram for describing the waveforms of command value signals according to the fifth embodiment.

FIG. 24 is a diagram for describing the waveforms of the command value signals Xu5, Xv5, and Xw5.

The waveform fg shown in of FIG. 24 is the waveform of the flag signal fg. The cycle of the flag signal fg is double the cycle of the first signals Xu', Xv', and Xw' and the second signals Xu", Xv", and Xw". The cycle of the first signal Xu" is matched to the cycle of the phase voltage command value signal Xu (hereinafter, this cycle will be referred to as "T", and it should be noted that T=⅙ [s] for example, since the cycle T is matched to the cycle of the system voltage), and therefore the cycle of the flag signal fg is double the cycle T (i.e. 2T). Also, in the present embodiment, the phase θ of the phase voltage command value signal Xu is used as the reference, and the flag signal fg is switched to "1" when θ=0. Accordingly, the flag signal fg is switched to "0" when θ=2π, and switched to "1" when θ=4π.

The waveform Xu5 shown in (b) of FIG. 24 is the waveform of the U-phase command value signal Xu5. In the 0≤θ≤2π period, the flag signal fg is "1", and therefore the command value signal Xu5 is the second signal Xu", and in the 2π≤θ≤4π period, the flag signal fg is "0", and therefore the command value signal Xu5 is the first signal Xu'. Accordingly, the waveform Xu5 is the waveform Xu" (see (c) of FIG. 23) in the 0≤θ≤2π period, and is the waveform Xu' (see (c) of FIG. 49) in the 2π≤θ≤4π period.

Similarly, the waveform Xv5 of the V-phase command value signal Xv5 is the waveform Xv" in the 0≤θ≤2π period, and is the waveform Xv' in the 2π≤θ≤4π period. Also, the waveform Xw5 of the W-phase command value signal Xw5 is the waveform Xw" in the 0≤θ≤2π period, and is the waveform Xw' in the 2π≤θ≤4π period.

The difference signal between the command value signals Xu5 and Xv5 is the difference signal between the second signals Xu" and Xv" in the 0≤θ≤2π period, and is the difference signal between the first signals Xu' and Xv' in the 2π≤θ≤4π period. The difference signal between the second signals Xu" and Xv" matches the line voltage command value signal Xuv (see (a) of FIG. 23). Also, the difference signal between the first signals Xu' and Xv' matches the line voltage command value signal Xuv (see (a) of FIG. 49). Accordingly, the difference signal between the command value signals Xu5 and Xv5 matches the line voltage command value signal Xuv. Similarly, the difference signal between the command value signals Xv5 and Xw5 matches the line voltage command value signal Xvw, and the difference signal between the command value signals Xw5 and Xu5 matches the line voltage command value signal Xwu. Accordingly, the waveform of the line voltage signal Vuv, which is the difference signal between the phase voltage signals Vu4 and Vv4 output by the interconnection inverter system A, the waveform of the line voltage signal Vvw, which is the difference signal between Vv4 and Vw4, and the waveform of the line voltage signal Vwu, which is the difference signal between Vw4 and Vu4, are the same as the waveforms Xuv, Xvw, and Xwu shown in (a) of FIG. 23 and (a) of FIG. 49. In other words, the line voltage signals Vuv, Vvw, and Vwu are sinusoidal signals that are in three-phase equilibrium, and therefore can be synchronized with the system voltage of the system B. Accordingly, the AC power output by the interconnection inverter system A can be supplied to the system B.

Figure 25:
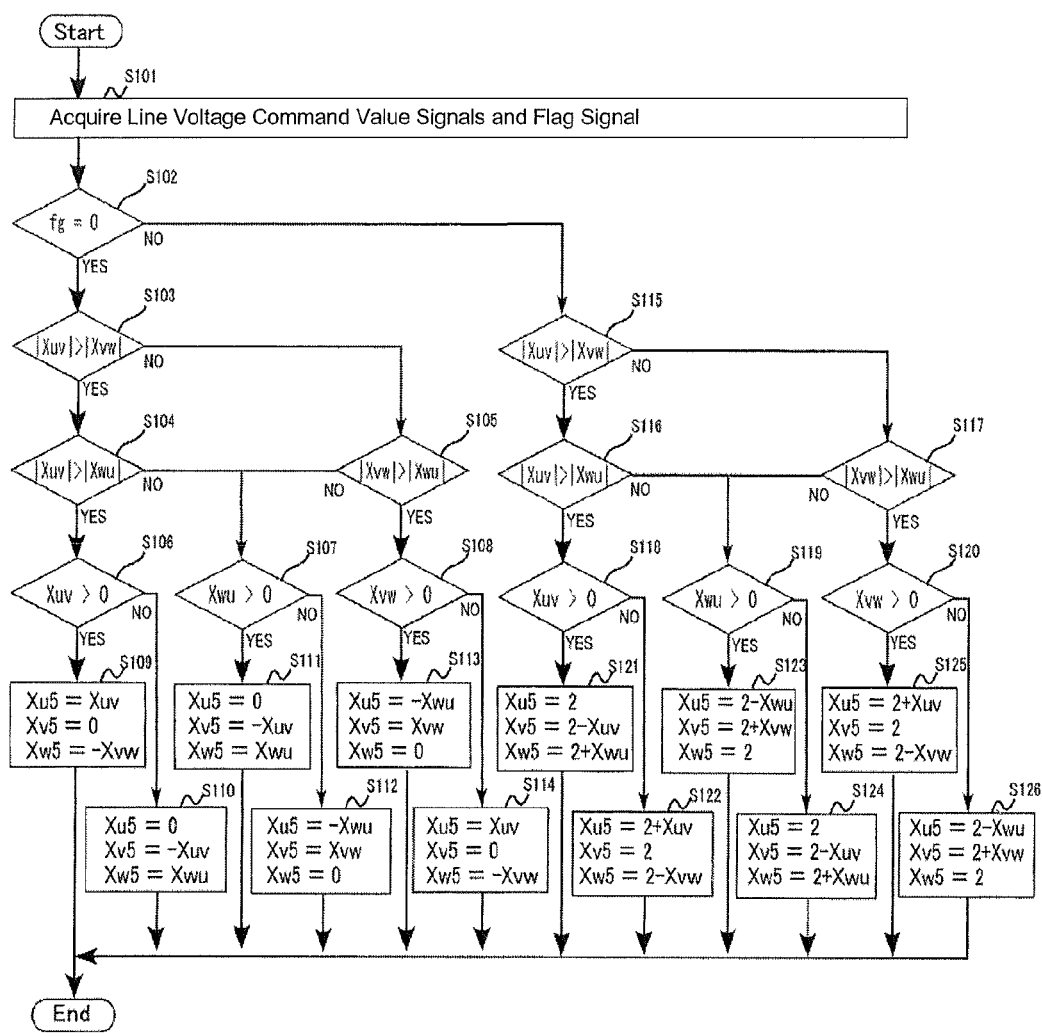
FIG. 25 is a flowchart for describing command value signal generation processing according to the fifth embodiment.
Figure 26:
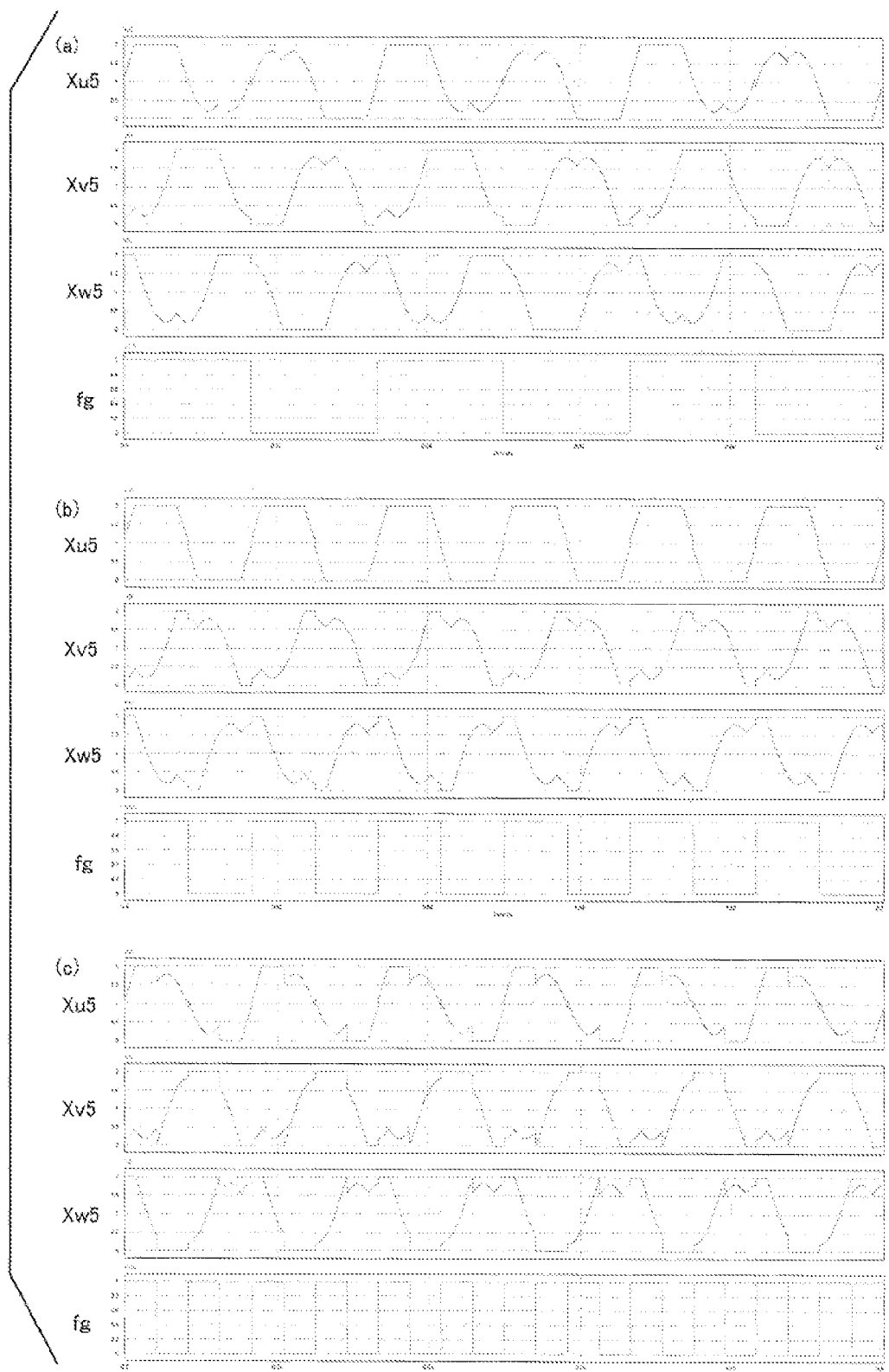
FIGS. 26A to 26C are diagrams for describing the results of simulating command value signals according to the fifth embodiment.
Figure 27:
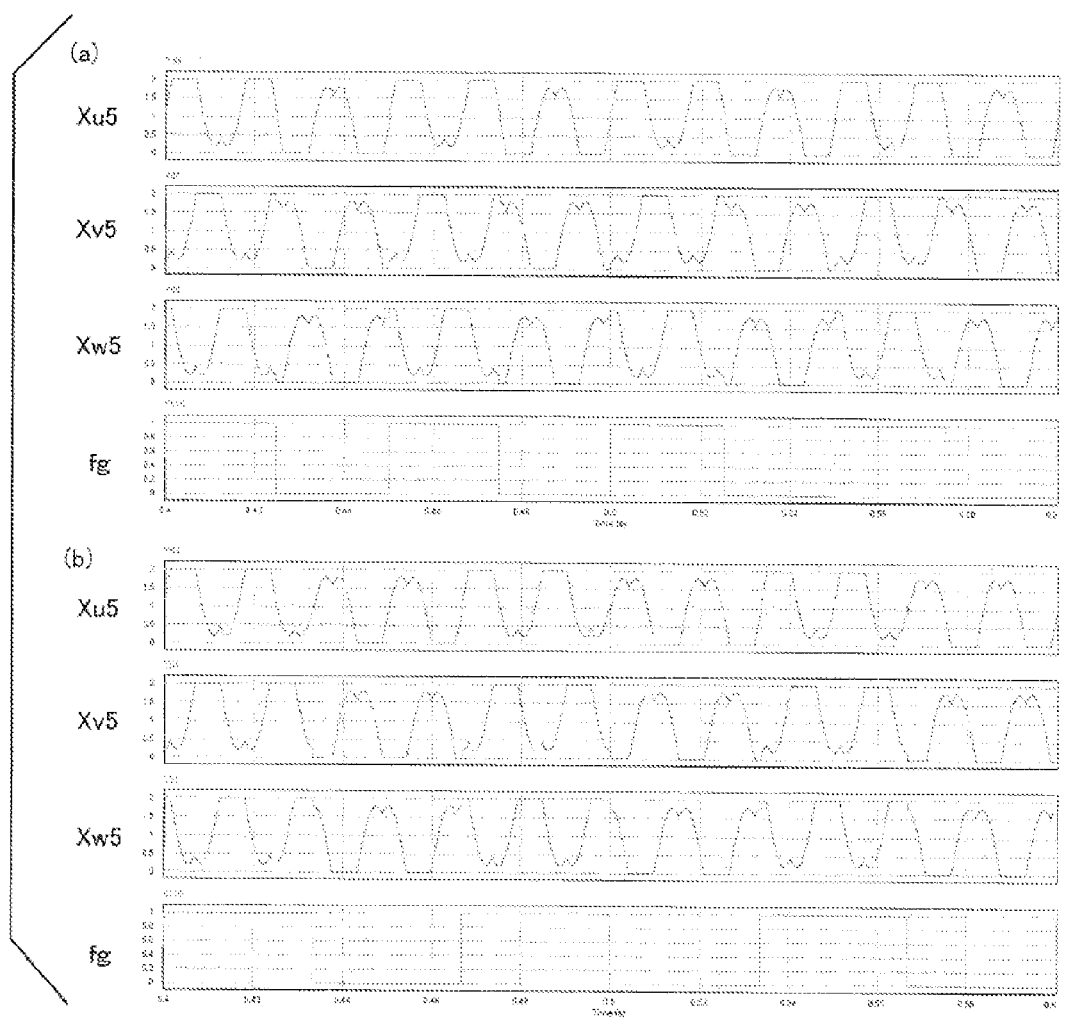
FIGS. 27A and 27B are diagrams for describing the results of simulating command value signals according to the fifth embodiment.

FIG. 25 is a flowchart for describing command value signal generation processing performed by the command value signal generation unit 52' according to the fifth embodiment. The command value signal generation processing is executed at a predetermined time.

First, the line voltage command value signals Xuv, Xvw, and Xwu and the flag signal fg are acquired (step S101). Next, it is determined whether fg is "0" (step S102). If fg is "0" (step S102: YES), the procedure proceeds to step S103, and processing for generating the first signals Xu', Xv', and Xw' is performed (steps S103 to S114). On the other hand, if fg is not "0" (step S102: NO), that is to say, if fg is "1", the procedure proceeds to step S115, and processing for generating the second signals Xu", Xv", and Xw" is performed (steps S115 to S126).

Steps S103 to S105 and steps S115 to S117 are both the same as steps S2 to S4 in the flowchart of command value signal generation processing according to the first embodiment (see FIG. 8). In other words, in these steps it is determined which of the line voltage command value signals Xuv, Xvw, and Xwu has the greatest absolute value.

If it is determined that fg is "0" in step S102, and that the absolute value of Xuv is the greatest (step S102: YES, S103: YES, and S104: YES), it is determined whether the value of Xuv is positive (step S106). If the value of Xuv is positive (step S106: YES), the command value signal Xu5 is set to Xuv, the command value signal Xv5 is set to "0", and the command value signal Xw5 is set to the negative value of Xvw (step S109). On the other hand, if Xuv is less than or equal to "0" (step S106: NO), Xu5 is set to "0", Xv5 is set to the negative value of Xuv, and Xw5 is set to Xwu (step S110).

If it is determined that fg is "0" in step S102, and that the absolute value of Xwu is the greatest (step S102: YES, and then S103: YES and S104: NO, or then S103: NO and S105: NO), it is determined whether the value of Xwu is positive (step S107). If the value of Xwu is positive (step S107: YES), Xu5 is set to "0", Xv5 is set to the negative value of Xuv, and Xw5 is set to Xwu (step S111). On the other hand, if Xwu is less than or equal to "0" (step S107: NO), Xu5 is set to negative value of Xwu, Xv5 is set to Xvw, and Xw5 is set to "0" (step S112).

If it is determined that fg is "0" in step S102, and that the absolute value of Xvw is the greatest (step S102: YES, S103: NO, and S105: YES), it is determined whether the value of Xvw is positive (step S108). If the value of Xvw is positive (step S108: YES), Xu5 is set to the negative value of Xwu, Xv5 is set to Xvw, and Xw5 is set to "0" (step S113). On the other hand, if Xvw is less than or equal to "0" (step S108: NO), Xu5 is set to Xuv, Xv5 is set to "0", and Xw5 is set to the negative value of Xvw (step S114).

If it is determined that fg is "1" in step S102, and that the absolute value of Xuv is the greatest (step S102: NO, S115: YES, and S116: YES), it is determined whether the value of Xuv is positive (step S118). If the value of Xuv is positive (step S118: YES), Xu5 is set to "2", Xv5 is set to the value obtained by subtracting Xuv from "2", and Xw5 is set to the value obtained by adding Xwu to "2" (step S121). On the other hand, if Xuv is less than or equal to "0" (step S118: NO), Xu5 is set to the value obtained by adding Xuv to "2", Xv5 is set to "2", and Xw5 is set to the value obtained by subtracting Xvw from "2" (step S122).

If it is determined that fg is "1" in step S102, and that the absolute value of Xwu is the greatest (step S102: NO, and then S115: YES and S116: NO, or then S115: NO and S117: NO), it is determined whether the value of Xwu is positive (step S119). If the value of Xwu is positive (step S119: YES), Xu5 is set to the value obtained by subtracting Xwu from "2", Xv5 is set to the value obtained by adding Xvw to "2", and Xw5 is set to "2" (step S123). On the other hand, if Xwu is less than or equal to "0" (step S119: NO), Xu5 is set to "2", Xv5 is set to the value obtained by subtracting Xuv from "2", and Xw5 is set to the value obtained by adding Xwu to "2" (step S124).

If it is determined that fg is "1" in step S102, and that the absolute value of Xvw is the greatest (step S102: NO, S115: NO, and S117: YES), it is determined whether the value of Xvw is positive (step S120). If the value of Xvw is positive (step S120: YES), Xu5 is set to the value obtained by adding Xuv to "2", Xv5 is set to "2", and Xw5 is set to the value obtained by subtracting Xvw from "2" (step S125). On the other hand, if Xvw is lens than or equal to "0" (step S120: NO), Xu5 is set to the value obtained by subtracting Xwu from "2", Xv5 is set to the value obtained by adding Xvw to "2", and Xw5 is set to "2" (step S126).

In other words, in the command value signal generation processing, it is determined whether fg is "0" or "1", it is determined which of the line voltage command value signals Xuv, Xvw, and Xwu has the greatest absolute value, it is determined whether the phase voltage command value signal having the greatest absolute value is positive or negative, and the command value signals Xu5, Xv5, and Xw5 are determined in accordance with the result of that determination. In other words, it is determined which of the modes among the modes 1 to 3 in the vector diagrams of FIGS. 2A to 2C and the modes 1' to 3' in the vector diagrams of FIGS. 22A to 22C is the current mode, and the command value signals Xu5, Xv5, and Xw5 of the respective phases are determined so as to correspond to the vector diagram with the mode determined to be the current mode.

In the case of the period from the left diagram to the center diagram (hereinafter, referred to as the "first-half portion" of the mode 1 state shown in FIG. 2A, the length of the orthogonal projection of the vector Pvw on the Y axis is the greatest, and the Y coordinate of the vector Pvw has a negative value. In other words, the absolute value of the line voltage command value signal Xvw is the greatest, and the line voltage command value signal Xvw has a negative value (step S108: NO in FIG. 25). In this case, the Y coordinates of the vertices u, v, and w are respectively the value of the Y coordinate of the vector Puv, "0", and the negative value of the Y coordinate of the vector Pvw. Accordingly, Xu5 is set to Xuv, Xv5 is set to "0", and Xw5 is set to the negative value of Xvw (step S114 in FIG. 25).

In the case of the period from the center diagram to the right diagram (hereinafter, referred to as the "last-half portion" of the mode 1 state shown in FIG. 2A, the length of the orthogonal projection of the vector Puv on the Y axis is the greatest, and the Y coordinate of the vector Puv has a positive value. In other words, the absolute value of the line voltage command value signal Xuv is the greatest, and the line voltage command value signal Xuv has a positive value (step S106: YES in FIG. 25). In this case as well, the Y coordinates of the vertices u, v, and w are respectively the value of the Y coordinate of the vector Puv, "0", and the negative value of the Y coordinate of the vector Pvw. Accordingly, Xu5 is set to Xuv, Xv5 is set to "0", and Xw5 is set to the negative value of Xvw (step S109 in FIG. 25).

In the case of the first-half portion of the mode 2 state shown in FIG. 2B, the length of the orthogonal projection of the vector Pwu on the Y axis is the greatest, and the Y coordinate of the vector Pwu has a negative value. In other words, the absolute value of the line voltage command value signal Xwu is the greatest, and the line voltage command value signal Xwu has a negative value (step S107: NO in FIG. 25). In this case, the Y coordinates of the vertices u, v, and w are respectively the negative value of the Y coordinate of the vector Pwu, the value of the Y coordinate of the vector Pvw, and "0". Accordingly, Xu5 is set to the negative value of Xwu, Xv5 is set to Xvw, and Xw5 is set to "0" (step S112 in FIG. 25).

In the case of the last-half portion of the mode 2 state shown in FIG. 2B, the length of the orthogonal projection of the vector Pvw on the Y axis is the greatest, and the Y coordinate of the vector Pvw has a positive value. In other words, the absolute value of the line voltage command value signal Xvw is the greatest, and the line voltage command value signal Xvw has a positive value (step S108: YES in FIG. 25). In this case as well, the Y coordinates of the vertices u, v, and w are respectively the negative value of the Y coordinate of the vector Pwu, the value of the Y coordinate of the vector Pvw, and "0". Accordingly, Xu5 is set to the negative value of Xwu, Xv5 is set to Xvw, and Xw5 is set to "0" (step S113 in FIG. 25).

In the case of the first-half portion of the mode 3 state shown in FIG. 2C, the length of the orthogonal projection of the vector Puv on the Y axis is the greatest, and the Y coordinate of the vector Puv has a negative value. In other words, the absolute value of the line voltage command value signal Xuv is the greatest, and the line voltage command value signal Xuv has a negative value (step S106: NO in FIG. 25). In this case, the Y coordinates of the vertices u, v, and w are respectively "0", the negative value of the Y coordinate of the vector Puv, and the value of the Y coordinate of the vector Pwu. Accordingly, Xu5 is set to "0", Xv5 is set to the negative value of Xuv, and Xw5 is set to Xwu (step S110 in FIG. 25).

In the case of the last-half portion of the mode 3 state shown in FIG. 2C, the length of the orthogonal projection of the vector Pwu on the Y axis is the greatest, and the Y coordinate of the vector Pwu has a positive value. In other words, the absolute value of the line voltage command value signal Xwu is the greatest, and the line voltage command value signal Xwu has a positive value (step S107: YES in FIG. 25). In this case as well, the Y coordinates of the vertices u, v, and w are respectively "0", the negative value of the Y coordinate of the vector Puv, the value of the Y coordinate of the vector Pwu. Accordingly, Xu5 is set to "0", Xv5 is set to the negative value of Xuv, and Xw5 is set to Xwu (step S111 in FIG. 25).

In the case of the first-half portion of the mode 1' state shown in FIG. 22A, the length of the orthogonal projection of the vector Puv on the Y axis is the greatest, and the Y coordinate of the vector Puv has a positive value. In other words, the absolute value of the line voltage command value signal Xuv is the greatest, and the line voltage command value signal Xuv has a positive value (step S118: YES in FIG. 25). In this case, the Y coordinates of the vertices u, v, and w are respectively "2", the value obtained by subtracting the Y coordinate of the vector Puv from "2", and the value obtained by adding the Y coordinate of the vector Pwu to "2". Accordingly, Xu5 is set to "2", Xv5 is set to the value obtained by subtracting Xuv from "2", and Xw5 is set to the value obtained by adding Xwu to "2" (step S121 in FIG. 25).

In the case of the last-half portion of the mode 1' state shown in FIG. 22A, the length of the orthogonal projection of the vector Pwu on the Y axis is the greatest, and the Y coordinate of the vector Pwu has a negative value. In other words, the absolute value of the line voltage command value signal Xwu is the greatest, and the line voltage command value signal Xwu has a negative value (step S119: NO in FIG. 25). In this case as well, the Y coordinates of the vertices u, v, and w are respectively "2", the value obtained by subtracting the Y coordinate of the vector Puv from "2", and the value obtained by adding the Y coordinate of the vector Pwu to "2". Accordingly, Xu5 is set to "2", Xv5 is set to the value obtained by subtracting Xuv from "2", and Xw5 is set to the value obtained by adding Xwu to "2" (step S124 in FIG. 25).

In the case of the first-half portion of the mode 2' state shown in FIG. 22B, the length of the orthogonal projection of the vector Pvw on the Y axis is the greatest, and the Y coordinate of the vector Pvw has a positive value. In other words, the absolute value of the line voltage command value signal Xvw is the greatest, and the line voltage command value signal Xvw has a positive value (step S120: YES in FIG. 25). In this case, the Y coordinates of the vertices u, v, and w are respectively the value obtained by adding the Y coordinate of the vector Puv to "2", "2", and the value obtained by subtracting the Y coordinate of the vector Pvw from "2". Accordingly, Xu5 is set to the value obtained by adding Xuv to "2", Xv5 is set to "2", and Xw5 is set to the value obtained by subtracting Xvw from "2" (step S125 in FIG. 25).

In the case of the last-half portion of the mode 2' state shown in FIG. 22B, the length of the orthogonal projection of the vector Puv on the Y axis is the greatest, and the Y coordinate of the vector Puv has a negative value. In other words, the absolute value of the line voltage command value signal Xuv is the greatest, and the line voltage command value signal Xuv has a negative value (step S118: NO in FIG. 25). In this case as well, the Y coordinates of the vertices u, v, and w are respectively the value obtained by adding the Y coordinate of the vector Puv to "2", "2", and the value obtained by subtracting the Y coordinate of the vector Pvw from "2". Accordingly, Xu5 is set to the value obtained by adding Xuv to "2", Xv5 is set to "2", and Xw5 is set to the value obtained by subtracting Xvw from "2" (step S122 in FIG. 25).

In the case of the first-half portion of the mode 3' state shown in FIG. 22C, the length of the orthogonal projection of the vector Pwu on the Y axis is the greatest, and the Y coordinate of the vector Pwu has a positive value. In other words, the absolute value of the line voltage command value signal Xwu is the greatest, and the line voltage command value signal Xwu has a positive value (step S119: YES in FIG. 25). In this case, the Y coordinates of the vertices u, v, and w are respectively the value obtained by subtracting the Y coordinate of the vector Pwu from "2", the value obtained by adding the Y coordinate of the vector Pvw to "2", and "2". Accordingly, Xu5 is set to the value obtained by subtracting Xwu from "2", Xv5 is set to the value obtained by adding Xvw to "2", and Xw5 is set to "2" (step S123 in FIG. 25).

In the case of the last-half portion of the mode 3' state shown in FIG. 22C, the length of the orthogonal projection of the vector Pvw on the Y axis is the greatest, and the Y coordinate of the vector Pvw has a negative value. In other words, the absolute value of the line voltage command value signal Xvw is the greatest, and the line voltage command value signal Xvw has a negative value (step S120: NO in FIG. 25). In this case as well, the Y coordinates of the vertices u, v, and w are respectively the value obtained by subtracting the Y coordinate of the vector Pwu from "2", the value obtained by adding the Y coordinate of the vector Pvw to "2", and "2". Accordingly, Xu5 is set to the value obtained by subtracting Xwu from "2", Xv5 is set to the value obtained by adding Xvw to "2", and Xw5 is set to "2" (step S126 in FIG. 25).

The waveforms of the command value signals Xu5, Xv5, and Xw5 generated in the command value signal generation processing are the waveforms Xu5, Xv5, and Xw5 shown in (b) of FIG. 24. Specifically, in mode 1', the procedure in the flowchart of FIG. 25 proceeds to step S121 or S124, and therefore the waveform Xu5 is the waveform fixed at "2", the waveform Xv5 is the waveform obtained by shifting the waveform Xvu (see (b) of FIG. 23) upward by "2", and the waveform Xw5 is the waveform obtained by shifting the waveform Xwu (see (a) of FIG. 23) upward by "2". In mode 2', the procedure in the flowchart of FIG. 25 proceeds to step S122 or S125, and therefore the waveform Xu5 is the waveform obtained by shifting the waveform Xuv upward by "2", the waveform Xv5 is the waveform fixed at "2", and the waveform Xw5 is the waveform obtained by shifting the waveform Xwv upward by "2". In mode 3', the procedure in the flowchart of FIG. 25 proceeds to step S123 or step S126, and therefore the waveform Xu5 is the waveform obtained by shifting the waveform Xuw upward by "2", the waveform Xv5 is the waveform obtained by shifting the waveform Xvw upward by "2", and the waveform Xw5 is the waveform fixed at "2". In mode 1, the procedure in the flowchart of FIG. 25 proceeds to step S109 or S114, and therefore the waveform Xu5 is the waveform Xuv (see (a) of FIG. 49), the waveform Xv5 is the waveform fixed at "0", and the waveform Xw5 is the waveform Xwv (see (b) of FIG. 49). In mode 2, the procedure in the flowchart of FIG. 25 proceeds to step S112 or S113, and therefore the waveform Xu5 is the waveform Xuw, the waveform Xv5 is the waveform Xvw, and the waveform Xw5 is the waveform fixed at "0". In mode 3, the procedure in the flowchart of FIG. 25 proceeds to step S110 or S111, and therefore the waveform Xu5 is the waveform fixed at "0", the waveform Xv5 is the waveform Xvu, and the waveform Xw5 is the waveform Xwu.

Note that the flowchart shown in FIG. 25 is one example of command value signal generation processing, and there is no limitation to this example.

As shown in (b) of FIG. 24, the command value signals Xu5, Xv5, and Xw5 are cyclical signals that are fixed at "0" in a predetermined period and at "2" in another predetermined period. Accordingly, the PWM signals that are generated by comparing the command value signals Xu5, Xv5, and Xw5 with the carrier signal are continuously at the low level or the high level for the periods for which the command value signals Xu5, Xv5, and Xw5 are fixed at "0" or "2". The switching of the switching elements is stopped in these periods, thus enabling reducing the number of times that switching is performed and reducing switching loss. Also, the PWM signals have both a continuous period at the low level and a continuous period at the high level, thus creating a period for which the positive-side switching elements are continuously in the on state and a period for which the negative-side switching elements are continuously in the on state. This enables reducing the difference between the time for which the positive-side switching elements are in the on state and the time for which the negative-side switching elements are in the on state, compared to the case where only either the positive-side switching elements or the negative-side switching elements have a continuous on state period. Accordingly, it is possible to suppress an unbalance in the progression of degradation in the positive-side switching elements and the negative-side switching elements. It is also possible to reduce the level of complexity in the design of cooling members.

Similarly to the first embodiment, there are no limitations on the lower limit value and the upper limit value of the command value signals Xu5, Xv5, and Xw5 in the fifth embodiment as well. For example, the command value signals Xu5, Xv5, and Xw5 may be generated such that the lower limit value is "−1" and the upper limit value is "1". In this case, the lower limit value and the upper limit value of the carrier signal used by the PWM signal generation unit 53 also need to be set in accordance with the lower limit value and the upper limit value of the command value signals Xu5, Xv5, and Xw5.

In the fifth embodiment, the period for which the command value signals Xu5, Xv5, and Xw5 are fixed at "0" and the period for which they are fixed at "2" are both a period equal to ⅙ of the cycle. Accordingly, the time for which the positive-side switching elements are in the on state and the time for which the negative-side switching elements are in the on state are the same. However, the period for which the command value signals Xu5, Xv5, and Xw5 are fixed at "0" and the period for which they are fixed at "2" fall out of conformity depending on the cycle, duty cycle (the ratio of the high level period to the cycle), and phase (the time when switching to "1" is performed) of the flag signal fg.

FIGS. 26A to 30C are diagrams for describing the results of simulating the command value signals Xu5, Xv5, and Xw5. FIGS. 26A to 28C show the waveforms of the command value signals Xu5, Xv5, and Xw5 and the waveform of the flag signal fg in the case where the duty cycle and phase of the flag signal fg were fixed and the phase thereof was changed.

FIG. 26A shows waveforms in the case where the cycle of the flag signal fg is 2T (=1/30 [s], i.e., a frequency of 30 Hz), FIG. 26B shows waveforms in the case where the cycle of the flag signal fg is T (=1/60 [s], i.e., a frequency of 60 Hz), and FIG. 26C shows waveforms in the case where the cycle of the flag signal fg is 0.5T (=1/12 [s], i.e., a frequency of 120 Hz). The phase of the flag signal fg was matched to the phase θ of the phase voltage command value signal Xu (i.e., the flag signal fg is switched to "1" when θ=0). Also, the duty cycle of the flag signal fg is "0.5".

The waveforms shown in FIG. 26A match the waveforms shown in FIG. 24 since the conditions are the same as those in FIG. 24.

The cycle of the flag signal fg in FIG. 26B is half of that in the case of FIG. 26A, and therefore the waveforms shown in FIG. 26B are combinations of the 0≤θ≤π period portion of the waveforms in (c) of FIG. 23 and the π≤θ≤2π period portion of the waveforms in (c) of FIG. 49. Compared to the waveforms in FIG. 26A, in this case the period for which the command value signal Xu5 is fixed at "0" and the period for which it is fixed at "2" are longer, and the period for which the command value signals Xv5 and Xw5 are fixed at "0" and the period for which they are fixed at "2" are shorter. However, for each of the command value signals Xu5, Xv5, and Xw5, the period for which the signal is fixed at "0" and the period for which it is fixed at "2" are the same. In this case as well, the time for which the positive-side switching elements are in the on state and the time for which the negative-side switching elements are in the on state are the same. However, the time for which switching is stopped is different between the U-phase switching elements and the V-phase and W-phase switching elements.

The cycle of the flag signal fg in FIG. 26C is ¼ of that in the case of FIG. 26A, and therefore the waveforms shown in FIG. 26C are combinations of the 0≤θ≤π/2 period portion of the waveforms in (c) of FIG. 23, the π/2≤θ≤π period portion of the waveforms in (c) of FIG. 49, the π≤θ≤3π/2 period portion of the waveforms in (c) of FIG. 23, and the 3π/2≤θ≤2π period portion of the waveforms in (c) of FIG. 49. In this case, the period for which the command value signal Xu5 is fixed at "0" and the period for which it is fixed at "2" are the same, but the period for which the command value signals Xv5 and Xw5 are fixed at "0" and the period for which they are fixed at "2" fall out of conformity. In this case, with respect to the V-phase and the W-phase, the time for which the positive-side switching elements are in the on state and the time for which the negative-side switching elements are in the on state are not the same, but it is possible to reduce the difference between the time for which the positive-side switching elements are in the on state and the time for which the negative-side switching elements are in the on state, compared to the case where only either the positive-side switching elements or the negative-side switching elements have a continuous on state period.

FIGS. 27A and 27B show cases where the cycle of the flag signal fg is higher than that in FIG. 26A (the case shown in FIG. 24). FIG. 27A shows waveforms in the case where the cycle of the flag signal fg is 3T (=1/20 [s], i.e. a frequency of 20 Hz), and FIG. 27B shows waveforms in the case where the cycle of the flag signal fg is 4T (=1/15 [s], i.e., a frequency of 15 Hz). The phase of the flag signal fg was matched to the phase θ of the phase voltage command value signal Xu (i.e., the flag signal fg is switched to "1" when θ=0). Also, the duty cycle of the flag signal fg is "0.5".

The cycle of the flag signal fg in FIG. 27A is 1.5 times that in the case of FIG. 26A, and therefore the waveforms shown in FIG. 27A are combinations of the 0≤θ≤3π period portion of the waveforms in (c) of FIG. 23 and the π≤θ≤3π period portion of the waveforms in (c) of FIG. 49. In this case, for each of the command value signals Xu5, Xv5, and Xw5, the period for which the signal is fixed at "0" and the period for which it is fixed at "2" are the same. In this case as well, the time for which the positive-side switching elements are in the on state and the time for which the negative-side switching elements are in the on state are the same. However, the time for which switching is stopped is different between the U-phase switching elements and the V-phase and W-phase switching elements.

The cycle of the flag signal fg in FIG. 27B is double that in the case of FIG. 26A, and therefore the waveforms shown in FIG. 27B are combinations of the 0≤θ≤4π period portion of the waveforms in (c) of FIG. 23 and the 0≤θ≤4π period portion of the waveforms in (c) of FIG. 49. Compared to the waveforms in FIG. 26A, in this case the period for which the command value signals Xu5, Xv5, and Xw5 are fixed at "0" and the period for which they are fixed at "2" are both a period equal to ⅙ of the cycle. Accordingly, the time for which the positive-side switching elements are in the on state and the time for which the negative-side switching elements are in the on state are the same.

As shown in FIGS. 26A to 27B, the waveforms of the command value signals Xu5, Xv5, and Xw5 are different from each other. In particular, the difference between the waveforms is prominent in the case where the cycle is T (see FIG. 26B) and the like. If the waveforms of the command value signals Xu5, Xv5, and Xw5 are different from each other, there are cases where the influence of error voltage resulting from dead time inserted when generating the PWM signals differs between the phases. In order to resolve this problem, it is sufficient to make the waveforms of the command value signals Xu5, Xv5, and Xw5 the same.

FIGS. 28A to 28C are diagrams for describing the case where the waveforms of the command value signals Xu5, Xv5, and Xw5 are the same. In these figures, the phase of the flag signal fg is matched to the phase θ of the phase voltage command value signal Xu. Also, the duty cycle of the flag signal fg is "0.5".

In the case where the cycle of the flag signal fg is 4T/3 (=1/45 [s], i.e., a frequency of 45 Hz), the waveforms of the command value signals Xu5, Xv5, and Xw5 are the same.

FIG. 28A shows waveforms in the case where the cycle of the flag signal fg is 4T/3. These waveforms are combinations of the $0 \leq \theta \leq 4\pi/3$ period portion of the waveforms in (c) of FIG. 23, the $4\pi/3 \leq \theta \leq 8\pi/3$ period portion of the waveforms in (c) of FIG. 49, the $2\pi/3 \leq \theta \leq 2\pi$ period portion of the waveforms in (c) of FIG. 23, the $0 \leq \theta \leq 4\pi/3$ period portion of the waveforms in (c) of FIG. 49, the $4\pi/3 \leq \theta \leq 8\pi/3$ period portion of the waveforms in (c) of FIG. 23, and the $2\pi/3 \leq \theta \leq 2\pi$ period portion of the waveforms in (c) of FIG. 49. In this case, the waveforms of the command value signals Xu5, Xv5, and Xw5 are the same. The waveforms of the command value signals Xu5, Xv5, and Xw5 are the same also in the case where the frequency of the flag signal fg is a multiple of ¾T (45 Hz) (i.e., ½T (90 Hz), ¼T (135 Hz), 3/T (180 Hz), and the like). FIG. 28B shows waveforms in the case where the frequency of the flag signal fg is ½T, and FIG. 28C shows waveforms in the case where the frequency of the flag signal fg is 3/T.

In the case where the frequency of the flag signal fg is 3/T, and the duty cycle is "0.5", the waveforms of the command value signals Xu5, Xv5, and Xw5 change if the phase of the flag signal fg is changed, and become specific waveforms in a predetermined case.

FIGS. 29A to 29C show the waveforms of the command value signals Xu5, Xv5, and Xw5 in the case where the frequency and duty cycle of the flag signal fg are fixed at 3/T (the cycle is T/3) and "0.5" respectively, and the phase of the flag signal fg is changed.

FIG. 29A shows the waveforms of the command value signals Xu5, Xv5, and Xw5 in the case where the phase of the flag signal fg is delayed by $\pi/6$ (the case where the flag signal fg switches to "1" when $\theta = \pi/6$). In this case, the waveforms of the command value signals Xu5, Xv5, and Xw5 are the same as the waveforms of the command value signals Xu2, Xv2, and Xw2 in the second embodiment (see FIG. 13). FIG. 29B shows the waveforms of the command value signals Xu5, Xv5, and Xw5 in the case where the phase of the flag signal fg is delayed by n/3 (the case where the flag signal fg switches to "1" when $\theta = \pi/3$). In this case, the waveforms of the command value signals Xu5, Xv5, and Xw5 are the same as the waveforms of the command value signals Xu3, Xv3, and Xw3 in the third embodiment (see FIG. 16). FIG. 29C shows the waveforms of the command value signals Xu5, Xv5, and Xw5 in the case where the phase of the flag signal fg is delayed by $\pi/2$ (the case where the flag signal fg switches to "1" when $\theta = \pi/2$). In this case, the waveforms of the command value signals Xu5, Xv5, and Xw5 are the same as the waveforms of the command value signals Xu1, Xv1, and Xw1 in the first embodiment (see FIG. 4). In other words, the command value signals of the first to third embodiments are the same as the command value signals Xu5, Xv5, and Xw5 of the fifth embodiment under specific conditions (the cycle of the flag signal fg is ⅓ the cycle of the phase voltage command value signal Xu, the duty cycle is "0.5", and the phase is delayed by $\pi/6$, $\pi/3$, and $\pi/2$ with respect to the phase of the phase voltage command value signal Xu). Note that the flag signal fg is delayed by $\pi/6$, $\pi/3$, and $\pi/2$ since the phase $\theta$ of the phase voltage command value signal Xu is used as a reference, but if the cycle of the flag signal fg is used as a reference, the phase is delayed by $\pi/2$, $\pi$, and $3\pi/2$. It should also be noted that the waveforms shown in FIG. 28C are the waveforms of the command value signals Xu5, Xv5, and Xw5 in the case where the phase of the flag signal fg is not changed (the case where the flag signal fg is switched to "1" when $\theta = 0$), which are the same as the waveforms of the command value signals Xu4, Xv4, and Xw4 in the fourth embodiment (see FIG. 20).

Note that the cycle (frequency) of the flag signal fg is not limited to those described above. In the case where the duty cycle is "0.5", the waveforms of the command value signals Xu5, Xv5, and Xw5 differ according to the cycle of the flag signal fg, but a period for which they are fixed at "2" and a period for which they are fixed at "0" are created. Accordingly, a period for which the positive-side switching elements are continuously in the on state and a period for which the negative-side switching elements are continuously in the on state are created, thus enabling reducing the difference between the time for which the positive-side switching elements are in the on state and the time for which the negative-side switching elements are in the on state, compared to the case where only either the positive-side switching elements or the negative-side switching elements have a continuous on state period.

In the case where the duty cycle is "0.5", and the cycle of the flag signal fg is nT (n being a natural number), that is to say, is a multiple of the cycle T of the phase voltage command value signal Xu, the period for which the command value signals Xu5, Xv5, and Xw5 are fixed at "0" and the period for which they are fixed at "2" are the same, and the time for which the positive-side switching elements are in the on state and the time for which the negative-side switching elements are in the on state are the same. Also, in the case where the duty cycle is "0.5", and the cycle of the flag signal fg is 2nT (n being a natural number), that is to say, is an even multiple of the cycle T of the phase voltage command value signal Xu, the period for which the command value signals Xu5, Xv5, and Xw5 are fixed at "0" and the period for which they are fixed at "2" are both a period equal to ⅙ the cycle. In this case, the time for which the positive-side switching elements are in the on state and the time for which the negative-side switching elements are in the on state are the same, and furthermore the times for which the U-phase, V-phase, and W-phase switching elements are in the on state are the same.

Although the waveforms of the command value signals Xu5, Xv5, and Xw5 differ according to the phase of the flag signal fg, a period for which they are fixed at "2" and a period at which they are fixed at "0" are created if the duty cycle is "0.5". Accordingly, a period for which the positive-side switching elements are continuously in the on state and a period for which the negative-side switching elements are continuously in the on state are created, thus enabling reducing the difference between the time for which the positive-side switching elements are in the on state and the time for which the negative-side switching elements are in the on state, compared to the case where only either the positive-side switching elements or the negative-side switching elements have a continuous on state period.

Although the case where the duty cycle of the flag signal fg is "0.5" is described above, there is no limitation to this. The period for which the command value signals Xu5, Xv5, and Xw5 are fixed at "0" and a period for which they are fixed at "2" differ from each other depending on the duty cycle of the flag signal fg.

FIGS. 30A to 30C show the waveforms of the command value signals Xu5, Xv5, and Xw5 and the waveform of the flag signal fg in the case where the cycle and phase of the flag signal fg were fixed and the duty cycle thereof was changed. FIG. 30A shows waveforms in the case where the duty cycle of the flag signal fg is "0.45", FIG. 30B shows waveforms in the case where the duty cycle of the flag signal fg is "0.5", and FIG. 30C shows waveforms in the case where the duty cycle of the flag signal fg is "0.55". The phase of the flag signal fg is matched to the phase $\theta$ of the phase voltage command value signal Xu. Also, the cycle of the flag signal fg is 2T (=1/30 [s], i.e., a frequency of 30 Hz).

The waveforms shown in FIG. 30B match the waveforms shown in FIG. 24 since the conditions are the same as those in FIG. 24.

The duty cycle of the flag signal fg in FIG. 30A is lower than that in the case of FIG. 30B, and therefore the waveforms shown in FIG. 30A are combinations of the $0 \le \theta \le 1.8\pi$ ($=4\pi \cdot 0.45$) period portion of the waveforms in (c) of FIG. 23 and the $1.8\pi \le \theta \le 4\pi$ period portion of the waveforms in (c) of FIG. 49. Compared to the waveforms in FIG. 30B, in this case the period for which the command value signals Xu5 and Xv5 are fixed at "0" is longer, and the period for which the command value signal Xw5 is fixed at "2" is shorter. Accordingly, for each of the command value signals Xu5, Xv5, and Xw5, the period for which the signal is fixed at "0" is longer than the period for which the signal is fixed at "2". In this case, the time for which the positive-side switching elements are in the on state and the time for which the negative-side switching elements are in the on state are not the same, but it is possible to reduce the difference between the time for which the positive-side switching elements are in the on state and the time for which the negative-side switching elements are in the on state, compared to the case where only either the positive-side switching elements or the negative-side switching elements have a continuous on state period.

The duty cycle of the flag signal fg in FIG. 30C is greater than that in the case of FIG. 30B, and therefore the waveforms shown in FIG. 30C are combinations of the $0 \le \theta \le 2.2\pi$ ($=4\pi \cdot 0.55$) period portion of the waveforms in (c) of FIG. 23 and the $2.2\pi \le \theta \le 4\pi$ period portion of the waveforms in (c) of FIG. 49. Compared to the waveforms in FIG. 30B, in this case the period for which the command value signals Xu5 and Xw5 are fixed at "2" is longer, and the period for which the command value signal Xv5 is fixed at "0" is shorter. Accordingly, for each of the command value signals Xu5, Xv5, and Xw5, the period for which the signal is fixed at "0" is shorter than the period for which the signal is fixed at "2". In this case, the time for which the positive-side switching elements are in the on state and the time for which the negative-side switching elements are in the on state are not the same, but it is possible to reduce the difference between the time for which the positive-side switching elements are in the on state and the time for which the negative-side switching elements are in the on state, compared to the case where only either the positive-side switching elements or the negative-side switching elements have a continuous on state period.

Note that the duty cycle of the flag signal fg is not limited to those described above. The waveforms of the command value signals Xu5, Xv5, and Xw5 differ from each other depending on the duty cycle of the flag signal fg. The lower the duty cycle, the greater the degree to which the period for which the command value signals Xu5, Xv5, and Xw5 are fixed at "0" is longer than the period for which they are fixed at "2", and if the duty cycle is too low, a period for which the signals are fixed at "2" is not created. Also, the higher the duty cycle, the greater the degree to which the period for which the command value signals Xu5, Xv5, and Xw5 are fixed at "0" is shorter than the period for which they are fixed at "2", and if the duty cycle is too high, a period for which the signals are fixed at "0" is not created. Accordingly, the closer the duty cycle of the flag signal fg is to "0.5", the better, and it is most desirable that the duty cycle of the flag signal fg is set to "0.5".

Although a control circuit for controlling an inverter circuit of an interconnection inverter system is described in the first to fifth embodiments, there is no limitation to this. The present invention is also applicable to a control circuit for controlling an inverter circuit of another system. The present invention is furthermore applicable to a control circuit other than one for controlling an inverter circuit that converts DC power into AC power. For example, the present invention is also applicable to a control circuit for controlling a converter circuit for converting AC power into DC power, a power conversion circuit that employs three-phase AC power, and the like. Even when the present invention is applied to such control circuits, it is possible to reduce switching loss by periodically stopping the switching of switching elements, and make the time for which the positive-side switching elements are in the on state and the time for which the negative-side switching elements are in the on state the same.

As described above, the waveforms of the command value signals Xu5, Xv5, and Xw5 of the fifth embodiment can be changed by changing the cycle, duty cycle, and phase of the flag signal fg. Also, while the flag signal fg is at "1", any one of the command value signals Xu5, Xv5, and Xw5 is fixed at "2", and while the flag signal fg is at "0", any one of the command value signals Xu5, Xv5, and Xw5 is fixed at "0". Accordingly, the lengths of the period for which one of the command value signals Xu5, Xv5, and Xw5 is fixed at "2" and the period for which one of the command value signals Xu5, Xv5, and Xw5 is fixed at "0" change according to the cycle of the flag signal fg. Also, the ratio of the lengths of the period for which the signals are fixed at "2" and the period for which the signals are fixed at "0" changes according to the duty cycle of the flag signal fg. Using this configuration, the intermediate potential of a multilevel inverter can be controlled by changing the cycle and duty cycle of the flag signal fg. The following describes the case of using the waveforms of the command value signals Xu5, Xv5, and Xw5 in a multilevel inverter as a sixth embodiment.

The interconnection inverter system of the sixth embodiment differs from the interconnection inverter system A of the first to fifth embodiments with respect to the configuration of the inverter circuit. The configuration of the control circuit also differs due to the difference in the configuration of the inverter circuit.

Figure 31:
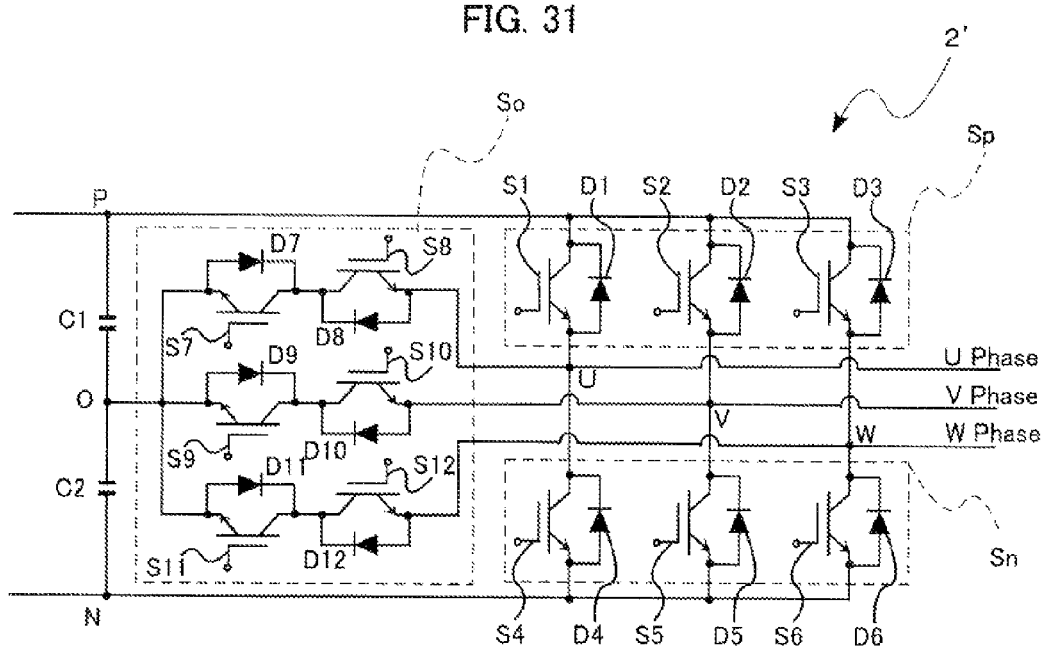
FIG. 31 is a circuit diagram for describing the internal configuration of an inverter circuit according to a sixth embodiment.

FIG. 31 is a circuit diagram for describing the internal configuration of the inverter circuit of the sixth embodiment. The same reference numerals have been given to elements in this figure that are the same as or similar to those in the inverter circuit 2 shown in FIG. 6.

An inverter circuit 2' shown in FIG. 31 is a three-level inverter circuit and differs from the inverter circuit 2 shown in FIG. 6 in that the inverter circuit 2' is configured such that the output phase voltage can be any of three types of potentials, namely the potential "0" of the negative electrode of the DC power source 1, the potential "E" of the positive electrode, or the intermediate potential "(½)E" between them.

The inverter circuit 2' includes 12 switching elements S1 to S12, 12 flyback diodes D1 to D12, and two voltage dividing capacitors C1 and C2. In the present embodiment, IGBTs (Insulated Gate Bipolar Transistors) are used as the switching elements S1 to S12. Note that the switching elements S1 to S12 are not limited to being IGBTs, and may be bipolar transistors, MOSFETs, reverse blocking thyristors, or the like. Also, there are no limitations on the type of the flyback diodes D1 to D12 and the type of the voltage dividing capacitors C1 and C2.

The voltage dividing capacitors C1 and C2 have the same capacitance and divide DC voltage input from the DC power source 1. The voltage dividing capacitor C1 and the voltage dividing capacitor C2 are connected to each other in series at a point O, and are connected in parallel between a point P for connection to the positive electrode of the DC power source 1 and a point N for connection to the negative electrode. The potential at the point N is "0" since the negative electrode of the DC power source 1 is grounded. Letting the potential of the positive electrode of the DC power source 1, that is to say, the potential at the point P be "E", the potential at the point O is "(½)E", which is the intermediate potential between the potential "0" at the point N and the potential "E" at the point P.

If the switching elements connected to the point O are in the on state, there are cases where the potential at the point O changes transiently due to the flow of current between the point O and the system B. In other words, the potential at the point O changes, rather than being fixed. If the potential at the point O undergoes a large change, there are cases where the waveform of the output phase voltage is disrupted, and the ability to perform appropriate control is lost. In the present embodiment, the cycle of the flag signal fg is set such that the amplitude of the change in the potential at the point O is set to a desired value. There are also cases where there is a desire to set to the potential at the point O to a desired potential. In the present embodiment, the duty cycle of the flag signal fg is set such that the central potential of the change in the potential at the point O is set to a desired value.

The switching elements S1 and S4 are connected to each other in series, with the emitter terminal of the switching element S1 being connected to the collector terminal of the switching element S4. The collector terminal of the switching element S1 is connected to the point P, and the emitter terminal of the switching element S4 is connected to the point N, thus forming a bridge structure. Similarly, the switching elements S2 and S5 are connected to each other in series to form a bridge structure, and the switching elements S3 and S6 are connected to each other in series to form a bridge structure. Since the switching elements S1, S2, and S3 are connected to the positive electrode side of the DC power source 1, there are cases where the switching elements S1, S2, and S3 will be referred to as the "positive-side switches Sp" when there is no need to distinguish between them. Also, since the switching elements S4, S5, and S6 are connected to the negative electrode side of the DC power source 1, there are cases where the switching elements S4, S5, and S6 will be referred to as the "negative-side switches Sn" when there is no need to distinguish between them. The PWM signals P output from a control circuit 5' (Pup, Pvp, Pwp, Pun, Pvn, and Pwn) are input to the base terminals of the respective switching elements S1 to S6. Note that details of the PWM signals will be described later.

The bridge structure formed by the switching elements S1 and S4 is the U-phase arm, the bridge structure formed by the switching elements S2 and S5 is the V-phase arm, and the bridge structure formed by the switching elements S3 and S6 is the W-phase arm. A connection point U between the switching elements S1 and S4 in the U-phase arm is connected to the U-phase output line, a connection point V between the switching elements S2 and S5 in the V-phase arm is connected to the V-phase output line, and a connection point W between the switching elements S3 and S6 in the W-phase arm is connected to the N-phase output line.

The connection point U is connected to the point O via an intermediate-side switch made up of the switching elements S7 and S8. The switching elements S7 and S8 are connected to each other in series, with the collector terminals thereof being connected to each other. The emitter terminal of the switching element S7 is connected to the point O, and the emitter terminal of the switching element S8 is connected to the point U. Similarly, the connection point V is connected to the point O via an intermediate-side switch made up of the switching elements S9 and S10. The collector terminals of the switching elements S9 and S10 are connected to each other, the emitter terminal of the switching element S9 is connected to the point O, and the emitter terminal of the switching element S10 is connected to the point V. Also, the connection point W is connected to the point O via an intermediate-side switch made up of the switching elements S11 and S12. The collector terminals of the switching elements S11 and S12 are connected to each other, the emitter terminal of the switching element S11 is connected to the point O, and the emitter terminal of the switching element S12 is connected to the point W. The switching elements S7 and S8 switch on and off at the same time, supply power to the connection between the point O and the point U when in the on state, and prevent the supply of power to that connection when in the off state. Similarly, the switching elements S9 and S10 also switch on and off at the same time, supply power to the connection between the point O and the point V when in the on state, and prevent the supply of power to that connection when in the off state. The switching elements S11 and S12 also switch on and off at the same time, supply power to the connection between the point O and the point W when in the on state, and prevent the supply of power to that connection when in the off state. Note that there are cases where the intermediate-side switches are referred to as the "intermediate-side switches So" when there is no need to distinguish between them. The PWM signals P output from the control circuit 5' (Puo, Pvo, and Pwo) are respectively input to the base terminals of the switching elements S7 and S8, the base terminals of the switching elements S9 and S10, and the base terminals of the switching elements S11 and S12.

The switching elements S1 to S12 are switched between the on state and the off state based on the PWM signals P. In the case where the positive-side switches Sp are in the on state, and the negative-side switches Sn and the intermediate-side switches So are in the off state, the potential of the output line of the corresponding phase is the potential at the point P (i.e., the positive-side potential "E" of the DC power source 1). In the case where the negative-side switches Sn are in the on state and the positive-side switches Sp and the intermediate-side switches So are in the off state, the potential of the output line of the corresponding phase is the potential at the point N (i.e., the negative-side potential "0" of the DC power source 1). Also, in the case where the intermediate-side switches So are in the on state and the positive-side switches Sp and the negative-side switches Sn are in the off state, the potential of the output line of the corresponding phase is the potential at the point O (i.e., the intermediate potential "(½) E" between the positive electrode side and the negative electrode side of the DC power source 1). Accordingly, the output phase voltages that are output from the output lines are any of three levels of potentials, namely the positive-side potential "E" of the DC power source 1, the negative-side potential "0", and the intermediate potential "(½)E". Also, the output line voltage, which is the voltage between the output lines, is any of five levels of potentials.

The flyback diodes D1 to D12 are connected in anti-parallel between the collector terminals and the emitter terminals of the switching elements S1 to S12 respectively. Specifically, the anode terminals of the flyback diodes D1 to D12 are connected to the emitter terminals of the switching elements S1 to S12 respectively, and the cathode terminals of the flyback diodes D1 to D12 are connected to the collector terminals of the switching elements S1 to S12 respectively. The flyback diodes D1 to D12 are for preventing an opposite-direction high voltage from being applied to the switching elements S1 to S12 due to counter-electromotive force generated by the switching of the switching elements S1 to S12.

In the inverter circuit 2', the voltage applied to the switching elements S1 to S12 is "(½)E". This enables reducing the power loss that occurs during switching of the switching elements S1 to S6 (hereinafter, referred to as "switching loss"), compared to the inverter circuit 2 (see FIG. 6). Also, the amplitude of the switching frequency component that is removed by the filter circuit 3 (see FIG. 5) is reduced by half, thus enabling reducing the filter capacity of the filter circuit 3. This makes it possible to also reduce power loss that occurs due to the filter circuit 3. Furthermore, devices with a low withstanding voltage can be used as the switching elements S1 to S12.

Figure 32:
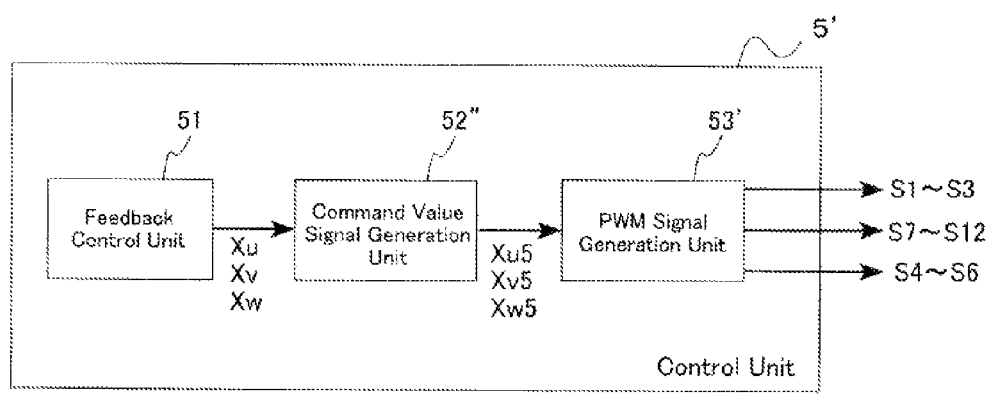
FIG. 32 is a block diagram for describing the internal configuration of a control circuit according to the sixth embodiment.

FIG. 32 is a block diagram for describing the internal configuration of the control circuit according to the sixth embodiment. The same reference numerals have been given to elements in this figure that are the same as or similar to those in the control circuit 5 shown in FIG. 7.

The control circuit 5' shown in FIG. 32 differs from the control circuit 5 shown in FIG. 7 in that the command value signal generation unit is provided with a configuration for setting the cycle and duty cycle of the flag signal fg, and the PWM signal generation unit generates PWM signals to be output to the intermediate-side switches So.

Figure 33:
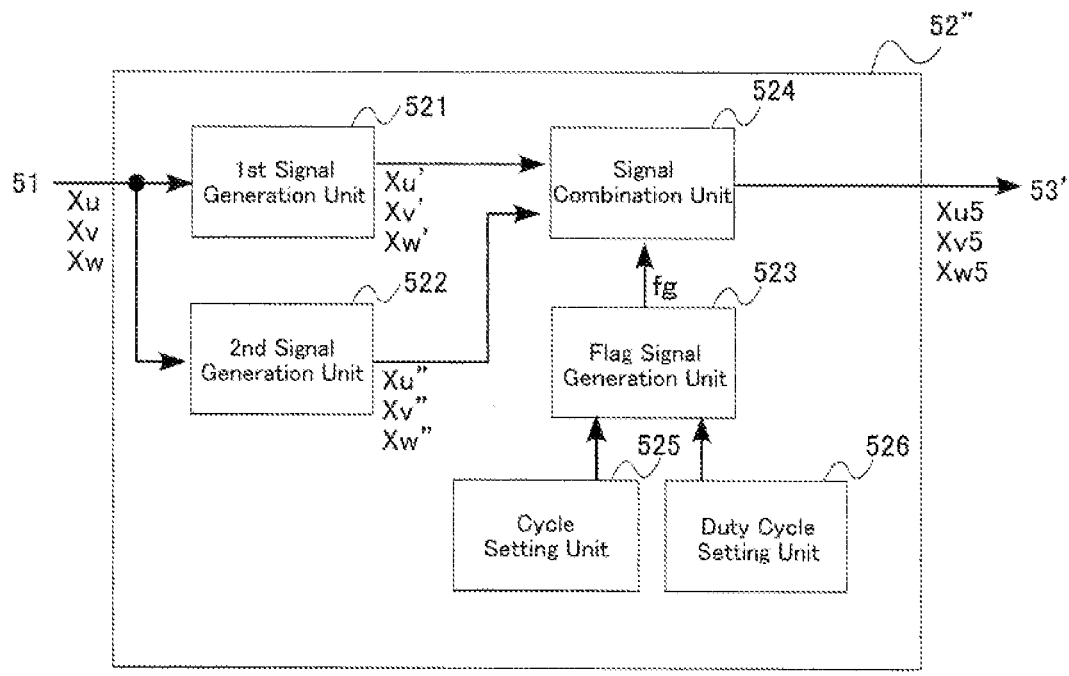
FIG. 33 is a block diagram for describing the internal configuration of a command value signal generation unit according to the sixth embodiment.

FIG. 33 is a block diagram for describing the internal configuration of the command value signal generation unit according to the sixth embodiment. The same reference numerals have been given to elements in this figure that are the same as or similar to those in the command value signal generation unit 52' shown in FIG. 21. The command value signal generation unit 52" shown in FIG. 33 differs from the command value signal generation unit 52' in that the command value signal generation unit 52'" is provided with a cycle setting unit 525 and a duty cycle setting unit 526.

The cycle setting unit 525 sets the cycle of the flag signal fg. The amplitude of the change in the potential at the point O (see FIG. 31) of the inverter circuit 2' changes according to the cycle of the flag signal fg. A value for setting the amplitude to a desired amplitude is acquired in advance through experimentation, and the cycle setting unit 525 sets that value as the cycle of the flag signal fg.

The duty cycle setting unit 526 sets the duty cycle of the flag signal fg. The central potential of the change in the potential at the point O changes according to the duty cycle of the flag signal fg. A value for setting the central potential to a desired potential is acquired in advance through experimentation, and the duty cycle setting unit 526 sets that value as the duty cycle of the flag signal fg.

The flag signal generation unit 523 generates, as the flag signal fg, a pulse signal having the cycle set by the cycle setting unit 525 and the duty cycle set by the duty cycle setting unit 526.

Figure 34:
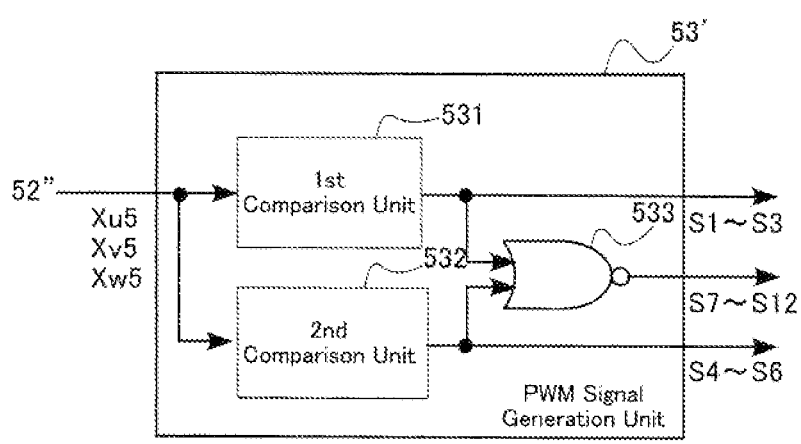
FIG. 34 is a block diagram for describing the internal configuration of a PWM signal generation unit according to the sixth embodiment.

FIG. 34 is a block diagram for describing the internal configuration of the PWM signal generation unit according to the sixth embodiment. The PWM signal generation unit 53' shown in this figure generates PWM signals P based on carrier signals (e.g., triangular wave signals), which are generated internally and have a predetermined frequency (e.g., 4 kHz), and the command value signals Xu5, Xv5, and Xw5 input from the command value signal generation unit 52", and outputs the generated PWM signals P to the inverter circuit 2'.

The command value signals Xu5, Xv5, and Xw5 change between the upper limit value of "2" and the lower limit value of "0" (see (b) of FIG. 24). The PWM signal generation unit 53' generates two carrier signals, namely a carrier signal whose upper limit value is the upper limit value "2" of the command value signals Xu5, Xv5, and Xw5 and whose lower limit value is the intermediate value (the intermediate value between the upper limit value "2" and the lower limit value "0") "1" of the command value signals Xu5, Xv5, and Xw5 (hereinafter, referred to as the "P-side carrier signal"), and a carrier signal whose upper limit value is the intermediate value "1" of the command value signals Xu5, Xv5, and Xw5 and whose lower limit value is the lower limit value "0" of the command value signals Xu5, Xv5, and Xw5 (hereinafter, referred to as the "N-side carrier signal"). The PWM signal generation unit 53' generates the PWM signals Pup, Pvp, and Pwp based on the P—side carrier signal and the command value signals Xu5, Xv5, and Xw5 respectively, and generates the PWM signals Pun, Pvn, and Pwn based on the N-side carrier signal and the command value signals Xu5, Xv5, and Xw5 respectively.

Figure 35:
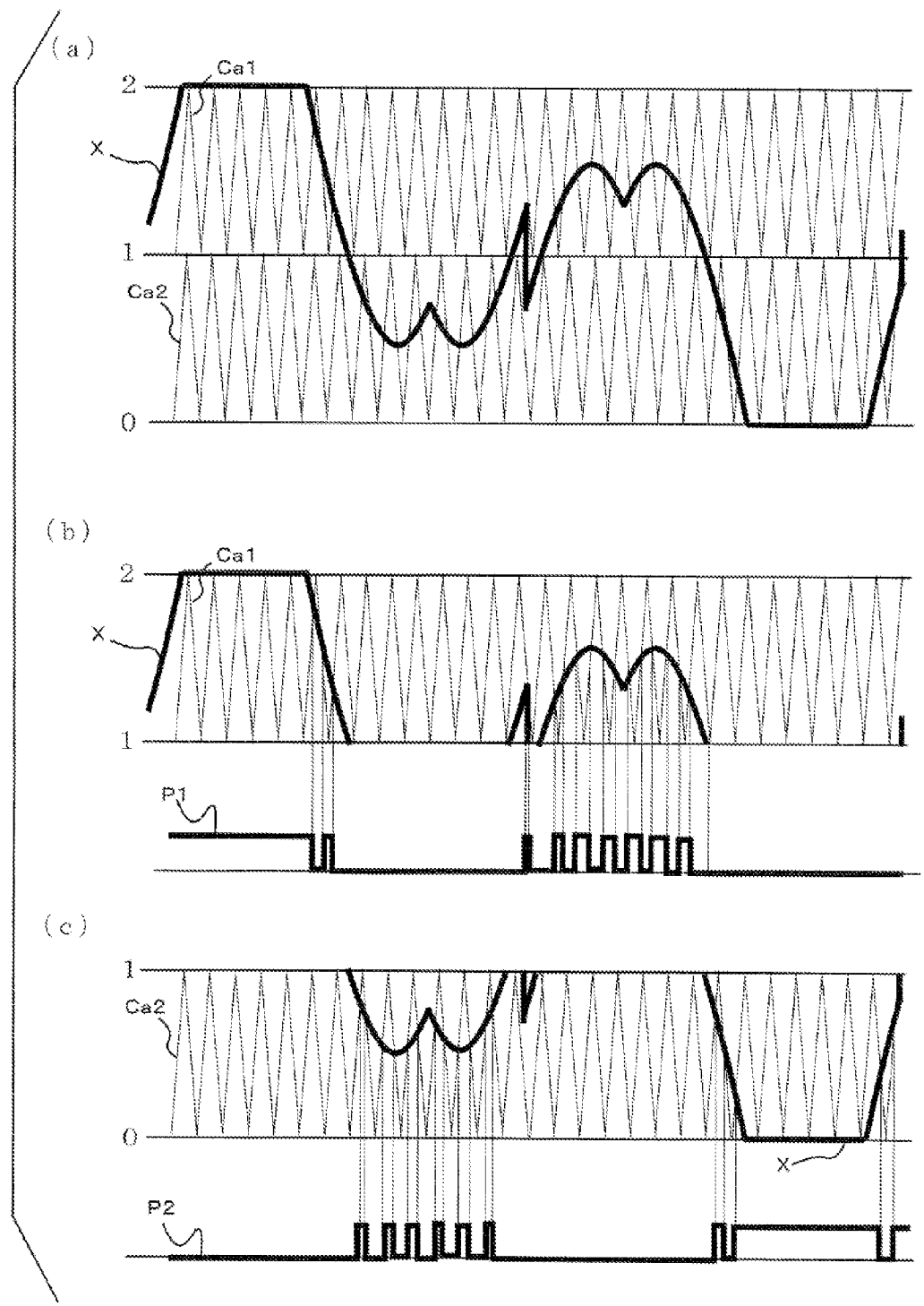
FIGS. 35A to 35C are diagrams for describing a method for generating PWM signals from command value signals and a carrier signal.

FIGS. 35A to 35C are diagrams for describing a method for generating the PWM signals Pup and Pun from the command value signal Xu5 and the P-side carrier signal and N-side carrier signal. In these figures, the command value signal Xu5 is indicated by the waveform X, the P-side carrier signal is indicated by the waveform Ca1, and the N-side carrier signal is indicated by the waveform Ca2.

As shown in FIG. 35A, the waveform Ca1 of the P-side carrier signal is a triangular wave that changes between "2" and "1", and the waveform Ca2 of the N-side carrier signal is a triangular wave that changes between "1" and "0". The PWM signals Pup and Pun are generated by the waveform X of the command value signal Xu5 being compared with the waveform Ca1 of the P-side carrier signal and the waveform Ca2 of the N-side carrier signal. Note that the carrier signals are not limited to being triangular wave signals, and may be sawtooth signals, for example.

Also, the PWM signal generation unit 53' generates the PWM signal Puo from the PWM signal Pup and the PWM signal Pun, generates the PWM signal Pvo from the PWM signal Pvp and the PWM signal Pvn, and generates the PWM signal Pwo from the PWM signal Pwp and the PWM signal Pwn.

As shown in FIG. 34, the PWM signal generation unit 53' includes a first comparison unit 531, a second comparison unit 532, and a NOR unit 533.

The first comparison unit 531 generates the PWM signals Pup, Pvp, and Pwp by comparing the command value signals Xu5, Xv5, and Xw5 input from the command value signal generation unit 52" with the P-side carrier signal.

FIG. 35B is a diagram for describing a method for generating the PWM signal. Pup from the command value signal Xu5 and the P-side carrier signal. In FIG. 35B, the PWM signal Pup is shown by the waveform P1. The first comparison unit 531 generates, as the PWM signal Pup, a pulse signal that is at the high level for the period for which the command value signal Xu5 is higher than or equal to the P-side carrier signal, and is at the low level for the period for which the command value signal Xu5 is lower than the P-side carrier signal. Accordingly, in FIG. 35B the waveform P1 is at the high level for the period for which the waveform X is higher than or equal to the waveform Ca1, and is at the low level for the period for which the waveform X is lower than the waveform Ca1.

The method for generating the PWM signal Pvp from the command value signal Xv5 and the P-side carrier signal and the method for generating the PWM signal Pwp from the command value signal Xw5 and the P-side carrier signal are similar to the above method. The generated PWM signals Pup, Pvp, and Pwp are input to the base terminals of the corresponding switching elements S1, S2, and S3 of the inverter circuit 2'. The PWM signals Pup, Pvp, and Pwp are also input to the NOR unit 533.

Note that the PWM signals Pup, Pvp, and Pwp may be generated by a method other than a method of comparing the command value signals Xu5, Xv5, and Xw5 with the P-side carrier signal. For example, a configuration is possible in which pulse widths are calculated from the portions of the command value signals Xu5, Xv5, and Xw5 that are higher than or equal to "1" using a PWM hold method, and the PWM signals Pup, Pvp, and Pwp are generated based on the pulse widths (see JP 2010-68630A).

The second comparison unit 532 generates the PWM signals Pun, Pvn, and Pwn by comparing the command value signals Xv5, and Xw5 input from the command value signal generation unit 52" with the N-side carrier signal.

FIG. 35C is a diagram for describing a method for generating the PWM signal Pun from the command value signal Xu5 and the N-side carrier signal. In FIG. 35C, the PWM signal Pun is shown by the waveform P2. The second comparison unit 532 generates, as the PWM signal Pun, a pulse signal that is at the low level for the period for which the command value signal Xu5 is higher than the N-side carrier signal, and is at the high level for the period for which the command value signal Xu5 is lower than or equal to the N-side carrier signal. Accordingly, in FIG. 35C the waveform P2 is at the low level for the period for which the waveform X is higher than the waveform Ca2, and is at the high level for the period for which the waveform X is lower than or equal to the waveform Ca2.

The method for generating the PWM signal Pvn from the command value signal Xv5 and the N-side carrier signal and the method for generating the PWM signal Pwn from the command value signal Xw5 and the N-side carrier signal are similar to the above method. The PWM signals Pun, Pvn, and Pwn are input to the base terminals of the corresponding switching elements S4, S5, and S6 of the inverter circuit 2'. The PWM signals Pun, Pvn, and Pwn are also input to the NOR unit 533.

Note that the PWM signals Pun, Pvn, and Pwn may be generated by a method other than a method of comparing the command value signals Xu5, Xv5, and Xw5 with the N-side carrier signal. For example, a configuration is possible in which pulse widths are calculated from the portions of the command value signals Xu5, Xv5, and Xw5 that are lower than "1" using a PWM hold method, and the PWM signals Pun, Pvn, and Pwn are generated based on the pulse widths.

The NOR unit 533 receives an input of the PWM signals Pup, Pvp, and Pwp from the first comparison unit 531, receives an input of the PWM signals Pun, Pvn, and Pwn from the second comparison unit 532, and generates the PWM signals Puo, Pvo, and Pwo.

Figure 36:
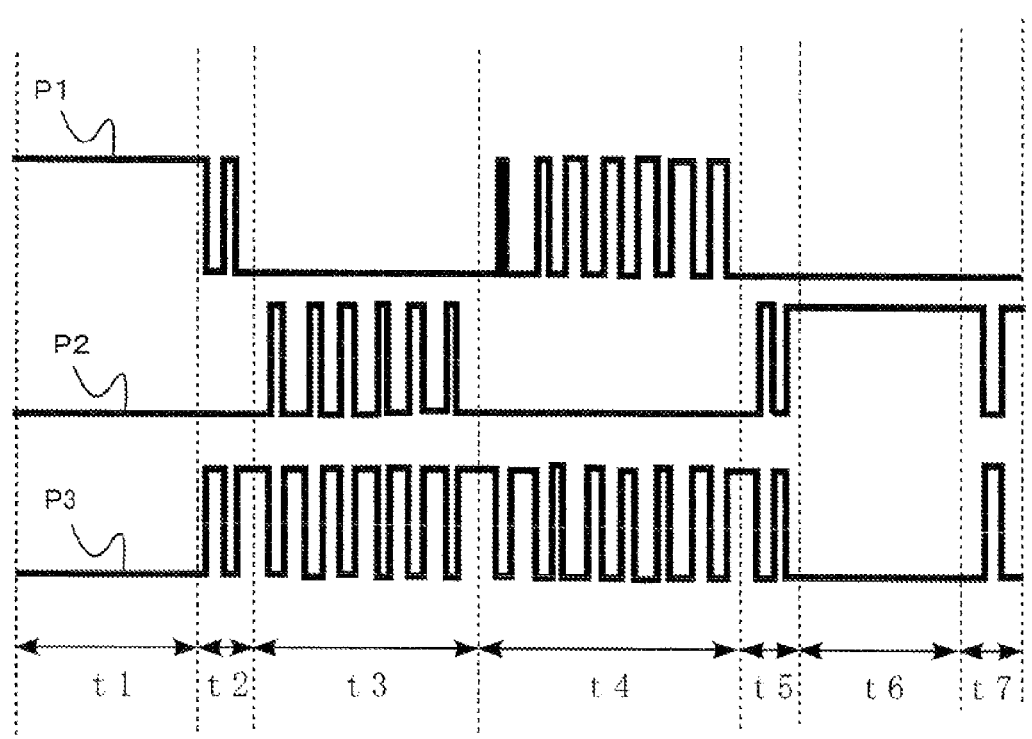
FIG. 36 is a diagram for describing a method for generating PWM signals for intermediate switches from PWM signals for positive-side switches and PWM signals for negative-side switches.

FIG. 36 is a diagram for describing a method for generating the PWM signal Puo from the PWM signal Pup and the PWM signal Pun. In this figure, the PWM signals Pup, Pun, and Puo are shown by the waveforms P1, P2, and P3 respectively. The NOR unit 533 generates the PWM signal Puo by performing a NOR operation on the PWM signal Pup and the PWM signal Pun. Accordingly, in this figure, the waveform P3 is at the high level only for the period for which the waveform P1 and the waveform P2 are both at the low level.

Similarly, the NOR unit 533 generates the PWM signal Pvo by performing a NOR operation on the PWM signal Pvp and the PWM signal Pvn, and generates the PWM signal Pwo by performing a NOR operation on the PWM signal Pwp and the PWM signal Pwn. The generated PWM signal Puo is input to the base terminals of the switching elements S7 and S8 of the inverter circuit 2', the PWM signal Pvo is input to the base terminals of the switching elements S9 and S10, and the PWM signal Pwo is input to the base terminals of the switching elements S11 and S12.

As shown in FIG. 35B, the PWM signal Pup (waveform P1) is only at the high level when the command value signal Xu5 (waveform X) is higher than or equal to "1" (i.e., is continuously at the low level when the command value signal Xu5 is lower than "1"). Also, as shown in FIG. 35C, the PWM signal Pun (waveform 22) is only at the high level when the command value signal Xu5 (waveform X) is less than "1" (i.e., is continuously at the low level when the command value signal Xu5 is higher than or equal to "1"). In other words, the high level periods of the PWM signal Pup and the PWM signal Pun do not overlap. Also, the PWM signal Puo is at the high level when the PWM signal Pup and the PWM signal Pun are both at the low level. Accordingly, only one among the PWM signal Pup, the PWM signal Pun, and the PWM signal Puo is at the high level at the same time (see FIG. 36).

When the PWM signal Pup is at the high level, the switching element S1 is in the on state and the switching element S4 and the switching elements S7 and S8 are in the off state, and therefore the U-phase output phase voltage is at the potential at the point P (i.e., the positive-side potential "E" of the DC power source 1) (see FIG. 31). When the PWM signal Pun is at the high level, the switching element S4 is in the on state, and the switching element S1 and the switching elements S7 and S8 are in the off state, and therefore the U-phase output phase voltage is at the potential at the point N (i.e., the negative-side potential "0" of the DC power source 1). Also, when the PWM signal Puo is at the high level, the switching elements S7 and S8 are in the on state, and the switching element S1 and the switching element S4 are in the off state, and therefore the U-phase output phase voltage is at the potential at the point O (i.e., the intermediate potential "($\frac{1}{2}$) E" between the positive electrode side and negative electrode side of the DC power source 1). Accordingly, the U-phase output phase voltage is any of three levels of potentials, namely the positive-side potential "E" of the DC power source 1, the negative-side potential "0", and the intermediate potential "($\frac{1}{2}$)E".

Similarly, the V-phase and W-phase output phase voltages are also any of three levels of potentials, namely the positive-side potential "E" of the DC power source 1, the negative-side potential "0", and the intermediate potential "($\frac{1}{2}$)E". Also, the U-phase output line voltage relative to the V-phase is the difference between the U-phase output phase voltage and the V-phase output phase voltage. Accordingly, the U-phase output line voltage relative to the V-phase is any of five levels of potentials, namely "−E", "−($\frac{1}{2}$)E", "0", "($\frac{1}{2}$)E", and "E". Note that the same follows for the V-phase output line voltage relative to the W-phase and the W-phase output line voltage relative to the U-phase.

In the period t1 in FIG. 36, the PWM signal Pup (waveform P1) is fixed at the high level, and the PWM signal Pun (waveform P2) and the PWM signal Puo (waveform P3) are fixed at the low level. In this case, switching is stopped in the switching elements S1, S4, S7, and S8 to which the PWM signals Pup, Pun, and Puo are input. In the period t6, the PWM signal Pup (waveform P1) and the PWM signal Puo (waveform P3) are fixed at the low level, and the PWM signal Pun (waveform P2) is fixed at the high level. In this case as well, switching of the switching elements S1, S4, S7, and S8 is stopped.

Note that the configuration of the PWM signal generation unit 53' is not limited to that described above. Another method may be used as long as it can generate PWM signals for driving the positive-side switches, the negative-side switches, and the intermediate-side switches from the command value signals Xu5, Xv5, and Xw5. For example, it is possible to use a configuration that applies an instantaneous spatial vector selection system.

Note that control circuit 5' may be realized as an analog circuit, or may be realized as a digital circuit. Also, a configuration is possible in which the processes performed by the various units are designed as a program, and a computer is caused to function as the control circuit 5' by being caused to execute the program. Also, a configuration is possible in which the program is recorded on a recording medium, and a computer is caused to load the program.

Next is a description of the waveforms of the command value signals Xu5, Xv5, and Xw5 and the waveform of change in the potential at the point O in the case of changing the cycle and the duty cycle of the flag signal fg, with reference to FIGS. 37 to 43.

If the intermediate-side switches So (switching elements S7 to S12) of any of the phases are in the on state, current flows to the point O when the positive-side switches Sp (switching elements S1 to S3) of the other phases are in the on state, and current flows from the point O when the negative-side switches Sn (switching elements S4 to S6) of the other phases are in the on state. While the flag signal fg is "1", any one of the command value signals Xu5, Xv5, and Xw5 is fixed at "2", and while the flag signal fg is "0", any one of the command value signals Xu5, Xv5, and Xw5 is fixed at "0". Accordingly, while the flag signal fg is "1", any one of the positive-side switches Sp is continuously in the on state, and therefore current flows to the point O and the potential rises, and while the flag signal fg is "0", any one of the negative-side switches Sn is continuously in the on state, and therefore current flows from the point O and the potential falls. Accordingly, the rise time and fall time of the potential at the point O becomes shorter as the cycle of the flag signal fg becomes shorter, and therefore the amplitude of the change in the potential at the point O decreases. Conversely, the rise time and fall time of the potential at the point O become longer as the cycle of the flag signal fg becomes longer, and therefore the amplitude of the change in the potential at the point O increases. In other words, the amplitude of the change in the potential at the point O changes according to the cycle of the flag signal fg.

Also, in the case where the duty cycle of the flag signal fg is "0.5", the time for which any of the positive-side switches Sp is in the on state and the time for which any of the negative-side switches Sn is in the on state are the same, balance is achieved between the current flowing to the point O and the current flowing from the point O, and there is almost no change in the central potential of the change in the potential at the point O. In the case where the duty cycle of the flag signal fg is greater than "0.5", the time for which the positive-side switches Sp are in the on state is longer than the time for which the negative-side switches Sn are in the on state, and the time for which current flows to the point O is longer than the time for which current flows from the point O, and therefore the central potential of the change in the potential at the point O increases. When the potential at the point O rises, the current flowing to the point O decreases, and therefore there is almost no change in the central potential of the change in the potential at the point O from a certain potential. On the other hand, in the case where the duty cycle of the flag signal fg is less than "0.5", the time for which the positive-side switches Sp are in the on state is shorter than the time for which the negative-side switches Sn are in the on state, and the time for which current flows to the point O is shorter than the time for which current flows from the point O, and therefore the central potential of the change in the potential at the point O decreases. When the potential at the point O falls, the current flowing from the point O decreases, and therefore there is almost no change in the central potential of the change in the potential at the point O from a certain potential. In other words, the central potential of the change in the potential at the point O is fixed at a certain potential that is changed according to the duty cycle of the flag signal fg.

FIGS. 37 to 43 are diagrams for describing the results of simulating the command value signals Xu5, Xv5, and Xw5. These figures show the waveforms of the command value signals Xu5, Xv5, and Xw5, the waveform of the flag signal fg, the waveform of the output line voltage, and the waveform of change in the potential at the point O in the case of changing the cycle and the duty cycle of the flag signal fg' These simulations were performed in the case where the input voltage was 400 V, and the voltage dividing capacitors C1 and C2 had a capacitance of 2200 μF.

Figure 37:
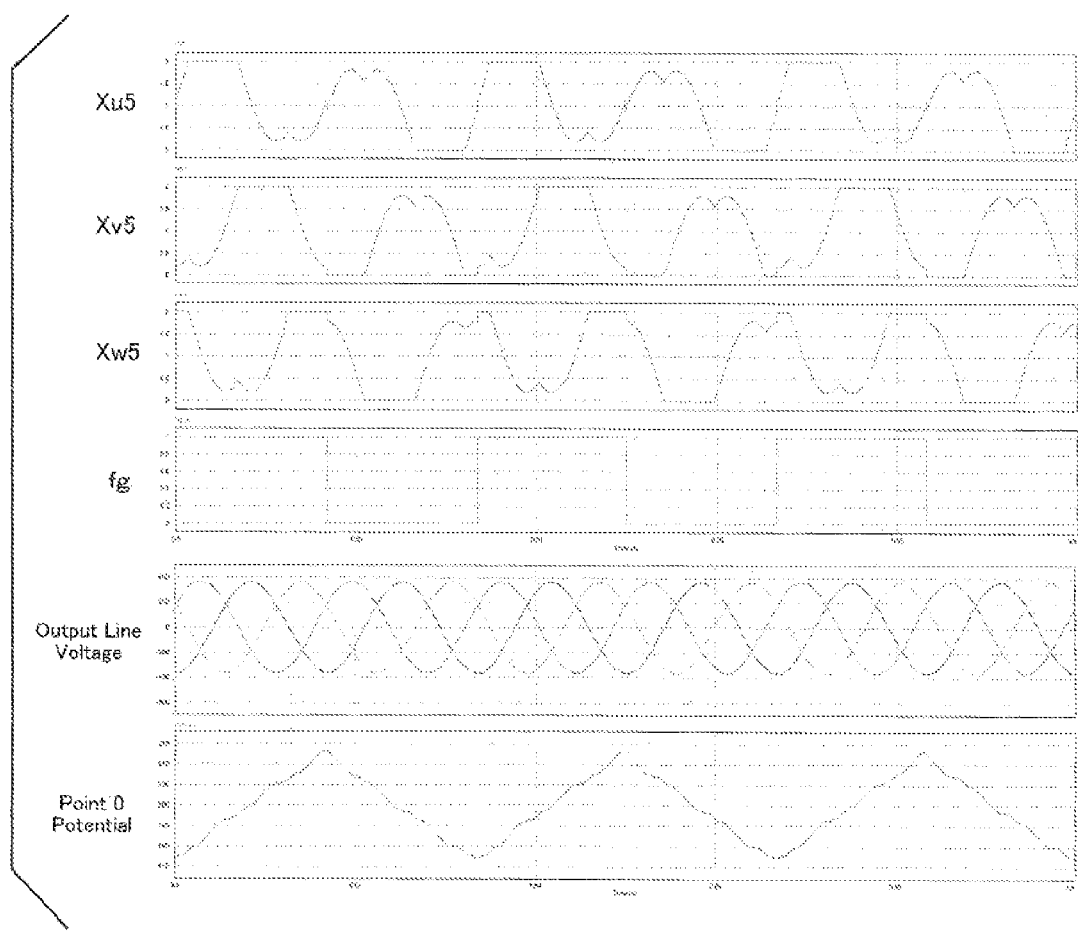
FIG. 37 is a diagram for describing the results of simulating command value signals.

FIG. 37 shows the case where the cycle of the flag signal fg is 2T (=1/30 [s], i.e., a frequency of 30 Hz), and the duty cycle is "0.5", and is the same as the case shown in FIG. 26A. Note that the phase of the flag signal fg is matched to the phase θ of the phase voltage command value signal Xu (i.e., the flag signal fg is switched to "1" when θ=0) (the same follows for FIGS. 38 to 43). In this case, the potential at the point O changes between approximately 187 V and approximately 213 V, the amplitude of the change is approximately 26 V, and the central potential of the change is approximately 200 V.

Figure 38:
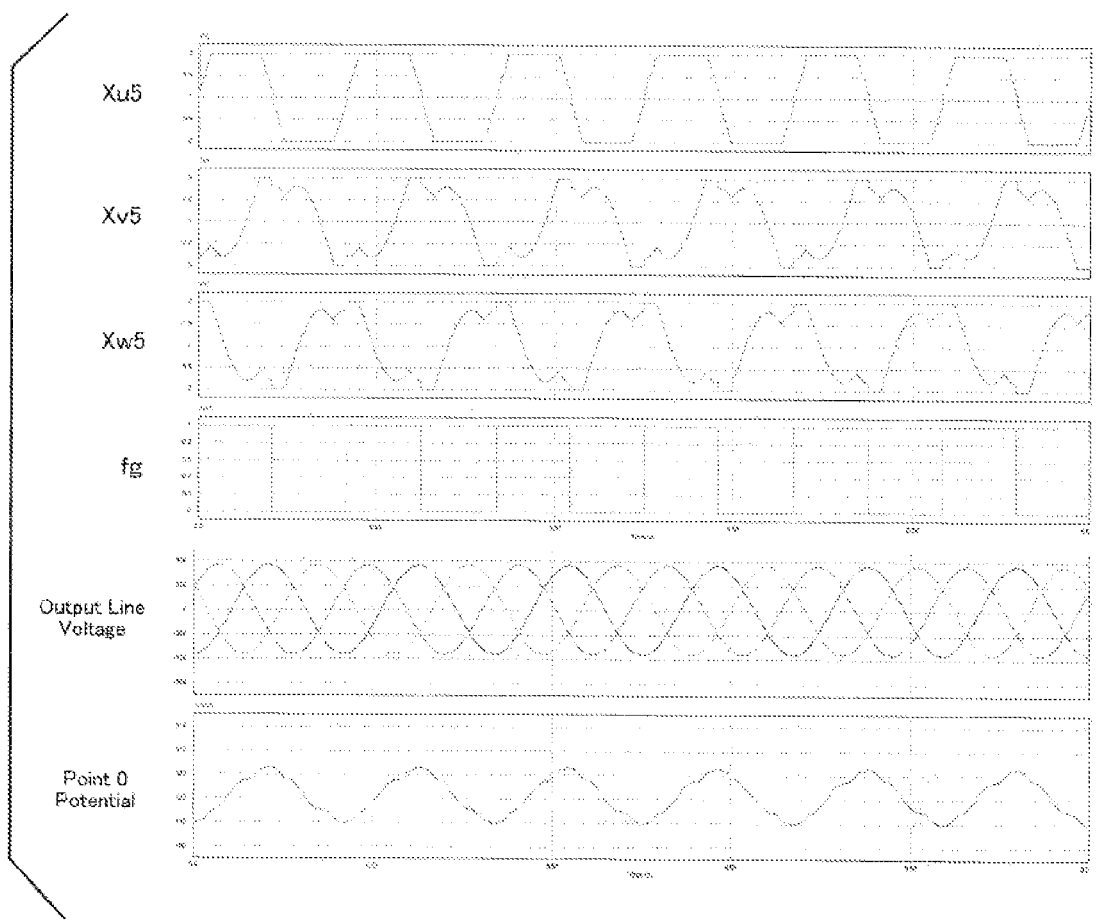
FIG. 38 is a diagram for describing the results of simulating command value signals.

FIG. 38 shows the same case as that shown in FIG. 26B, that is to say, the case where the cycle of the flag signal fg is T (=1/6 [s], i.e., a frequency of 60 Hz), and the duty cycle is "0.5". In this case, the potential at the point O changes between approximately 195 V and approximately 207 V, the amplitude of the change is approximately 12 V, and the central potential of the change is approximately 201 V. A comparison with the case shown in FIG. 37 shows that there is almost no change in the central potential of the change, and the amplitude of the change is smaller.

Figure 39:
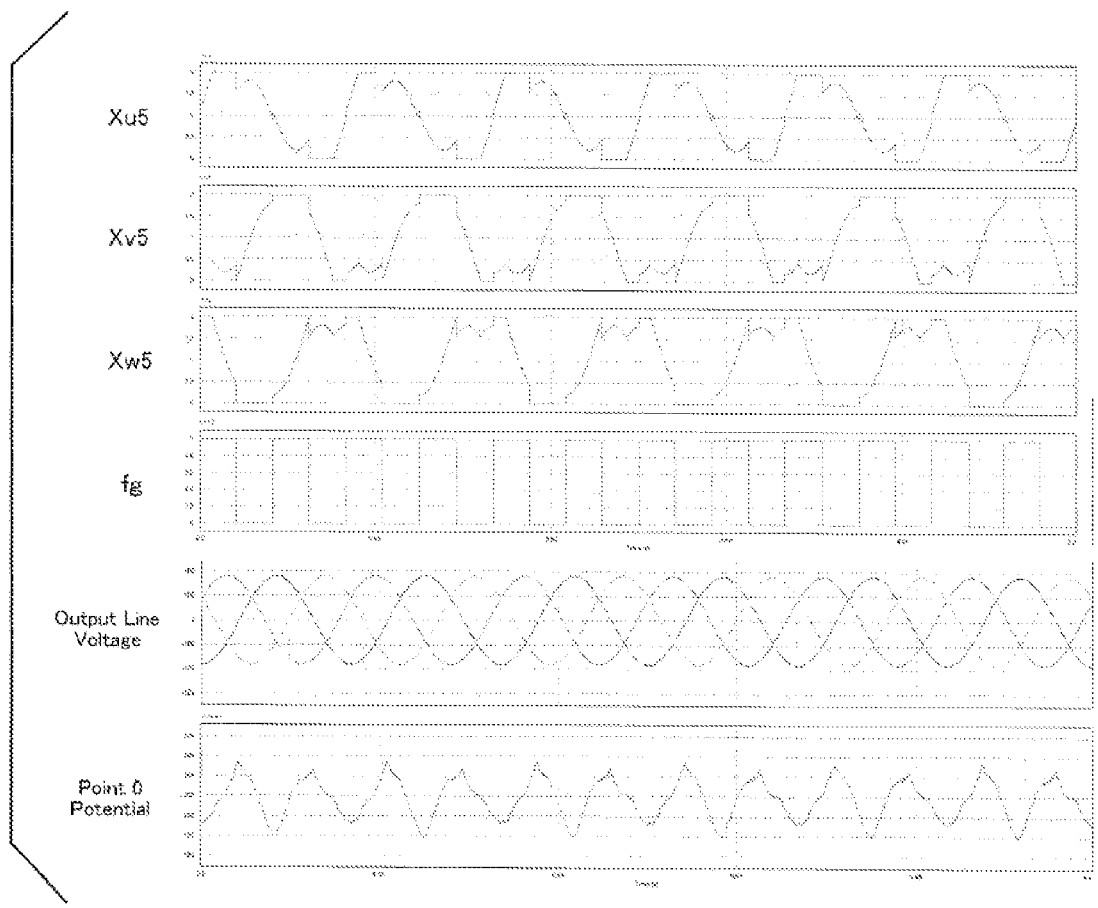
FIG. 39 is a diagram for describing the results of simulating command value signals.

FIG. 39 shows the same case as that shown in FIG. 26C, that is to say, the case where the cycle of the flag signal fg is 0.5T (=1/12 [s], i.e., a frequency of 120 Hz), and the duty cycle is "0.5". In this case, the potential at the point O changes between approximately 198 V and approximately 205.5 V, the amplitude of the change is approximately 7.5 V, and the central potential of the change is approximately 201.75 V. A comparison with the case shown in FIG. 37 shows that there is almost no change in the central potential of the change, and the amplitude of the change is significantly smaller.

Figure 40:
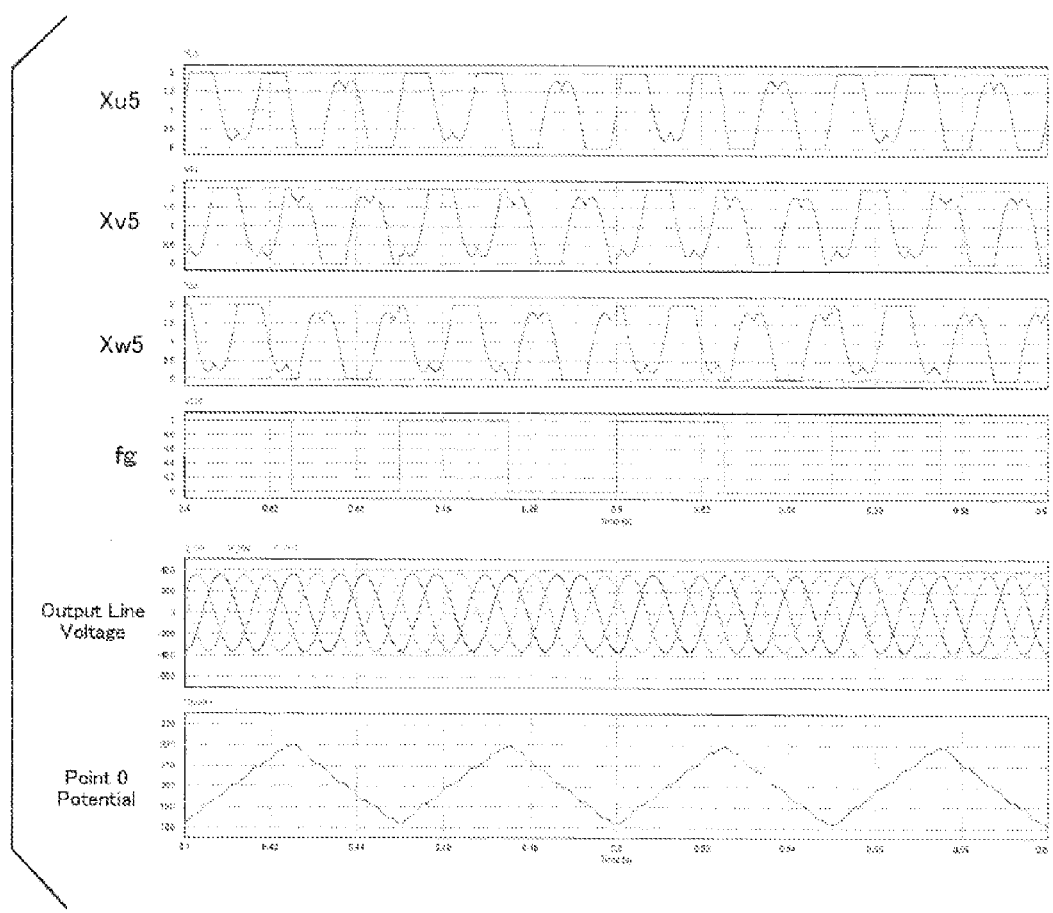
FIG. 40 is a diagram for describing the results of simulating command value signals.

FIG. 40 shows the same case as that shown in FIG. 27A, that is to say, the case where the cycle of the flag signal fg is 3T (=1/20 [s], i.e., a frequency of 20 Hz), and the duty cycle is "0.5". In this case, the potential at the point O changes between approximately 183 V and approximately 220 V, the amplitude of the change is approximately 37 V, and the central potential of the change is approximately 201.5 V. A comparison with the case shown in FIG. 37 shows that there is almost no change in the central potential of the change, and the amplitude of the change is larger.

Figure 41:
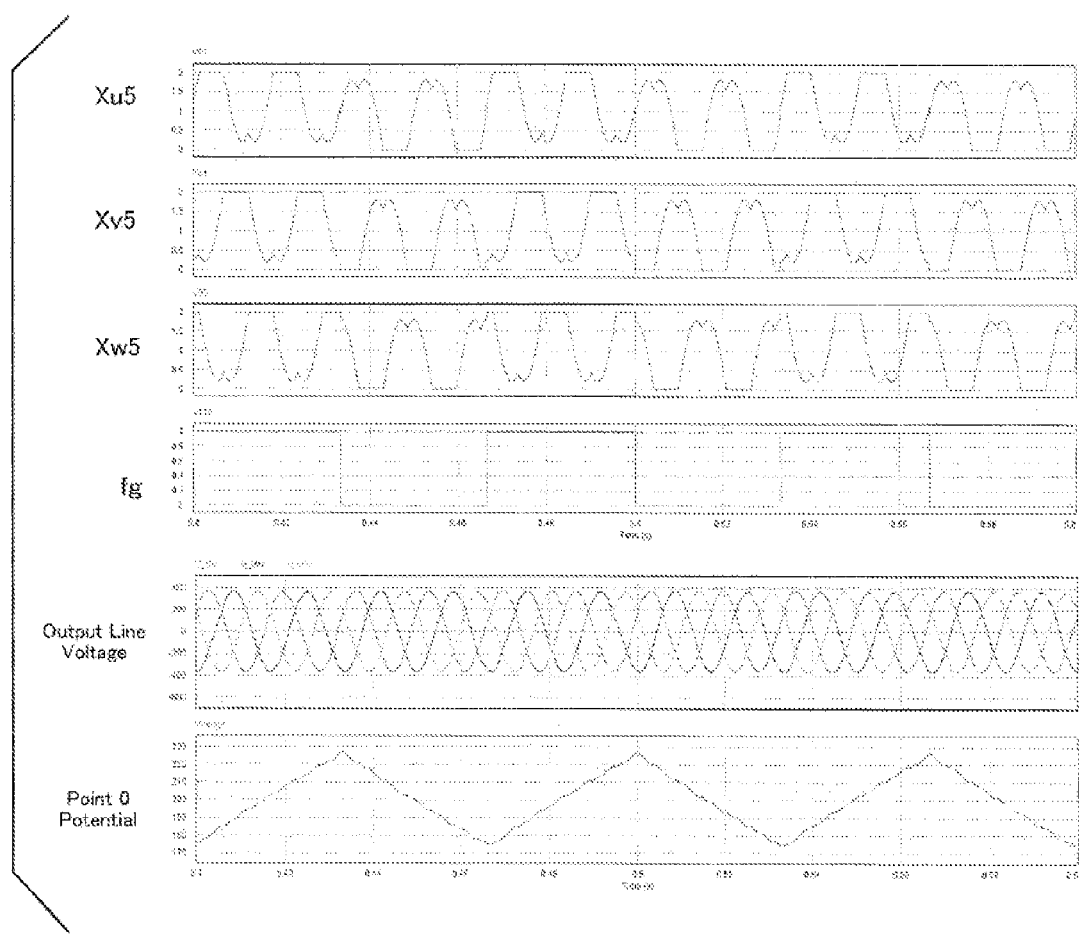
FIG. 41 is a diagram for describing the results of simulating command value signals.

FIG. 41 shows the same case as that shown in FIG. 27B, that is to say, the case where the cycle of the flag signal fg is 4T (=1/15 [s], i.e., a frequency of 15 Hz), and the duty cycle is "0.5". In this case, the potential at the point O changes between approximately 176 V and approximately 228 V, the amplitude of the change is approximately 52 V, and the central potential of the change is approximately 202 V. A comparison with the case shown in FIG. 37 shows that there is almost no change in the central potential of the change, and the amplitude of the change is significantly larger.

Note that the cycle of the flag signal fg is not limited to those described above. In the case where the duty cycle is "0.5", the waveforms of the command value signals Xu5, Xv5, and Xw5 differ according to the cycle of the flag signal fg, but the time for which any one of the positive-side switches Sp is in the on state and the time for which any one of the negative-side switches Sn is in the on state are the same. Accordingly, the central potential of the change in the potential at the point O is similar to that in the case shown in FIG. 37. On the other hand, the amplitude of the change in the potential at the point O decreases as the cycle of the flag signal fg decreases, and increases as the cycle of the flag signal fg increases. Also, the waveforms of the command value signals Xu5, Xv5, and Xw5 differ according to the phase of the flag signal fg, but in the case where the duty cycle is "0.5", the time for which any one of the positive-side switches Sp is in the on state and the time for which any one of the negative-side switches Sn is in the on state are the same. Accordingly, the central potential of the change in the potential at the point O is similar to that in the case shown in FIG. 37.

Figure 42:
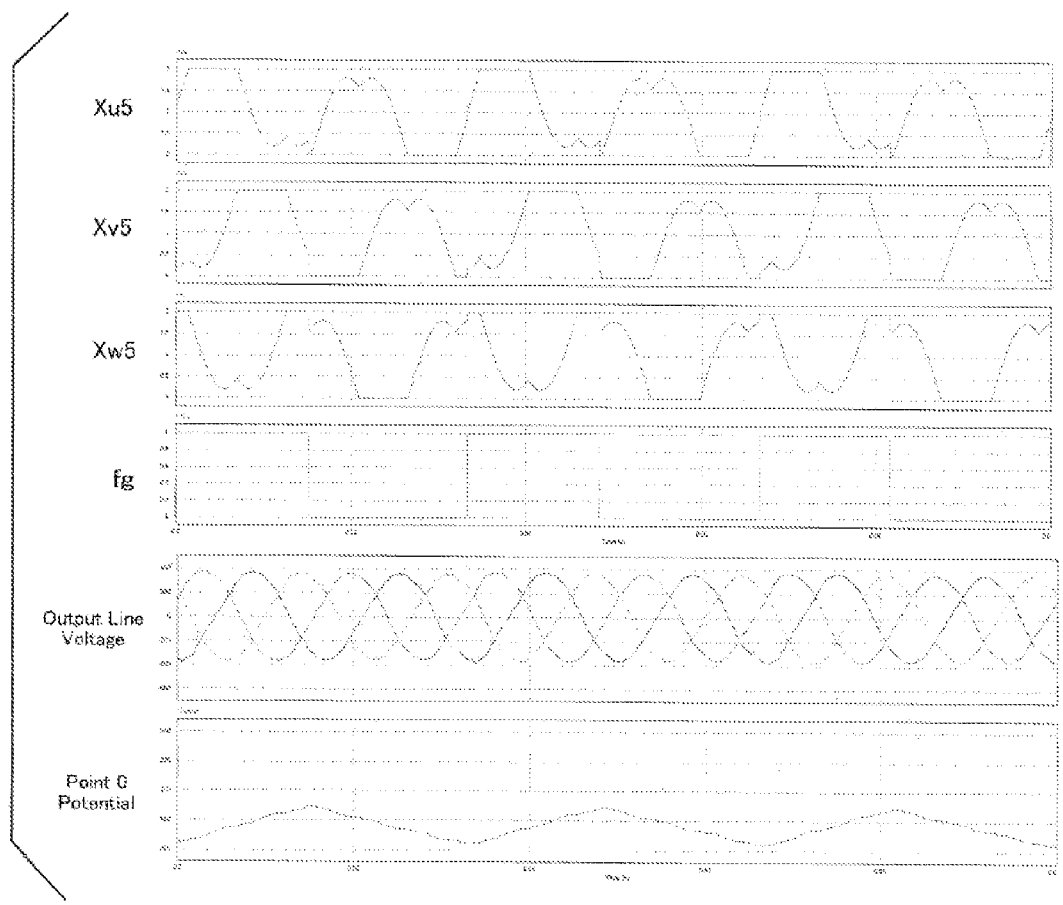
FIG. 42 is a diagram for describing the results of simulating command value signals.

FIG. 42 shows the same case as that in FIG. 30A, that is to say, the case where the duty cycle is "0.45" and the cycle is 2T. In this case, the potential at the point O changes between approximately 164 V and approximately 190 V, the amplitude of the change is approximately 26 V, and the central potential of the change is approximately 177 V. A comparison with the case shown in FIG. 37 shows that there is almost no change in the amplitude of the change, and the central potential of the change is smaller.

Figure 43:
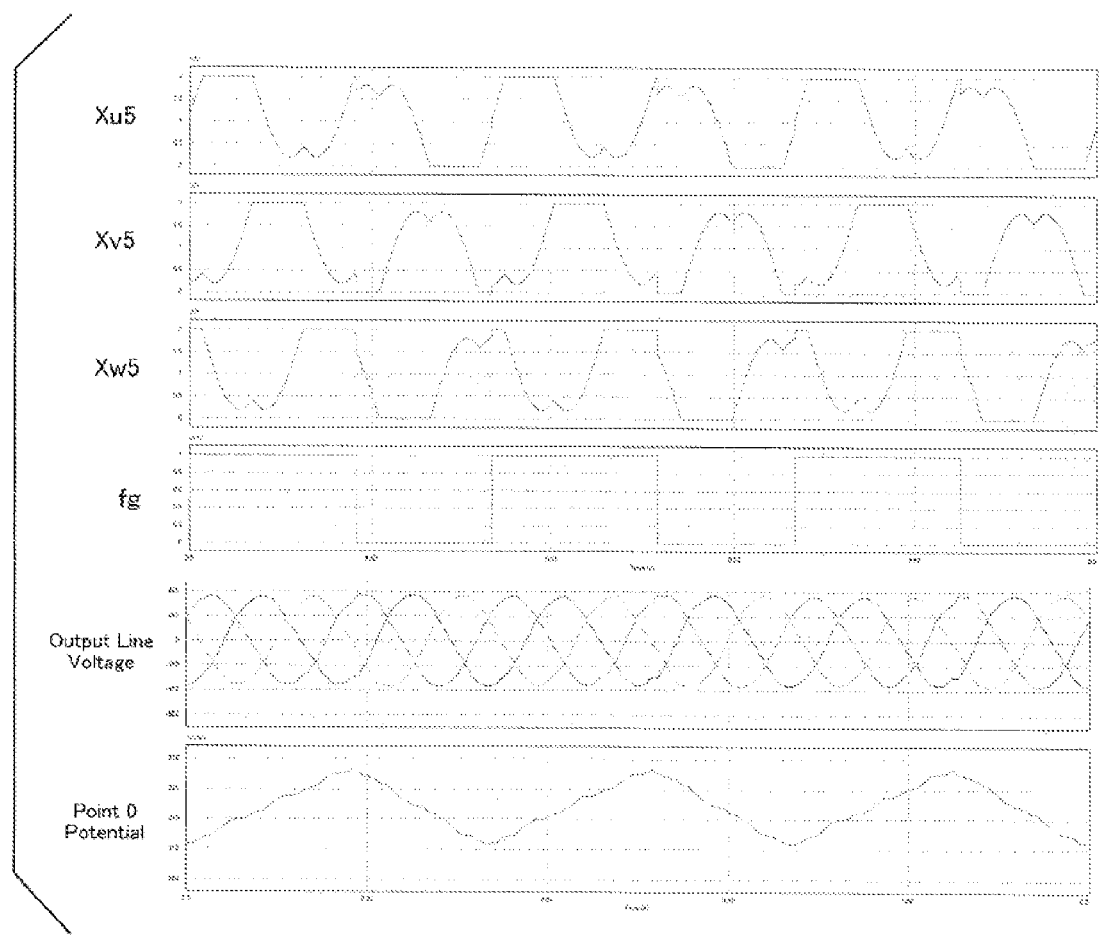
FIG. 43 is a diagram for describing the results of simulating command value signals.

FIG. 43 shows the same case as that in FIG. 30C, that is to say, the case where the duty cycle is "0.55" and the cycle is 2T. In this case, the potential at the point O changes between approximately 211 V and approximately 237 V, the amplitude of the change is approximately 26 V, and the central potential of the change is approximately 224 V. A comparison with the case shown in FIG. 37 shows that there is almost no change in the amplitude of the change, and the central potential of the change is larger.

Note that the duty cycle of the flag signal fg is not limited to those described above. The waveforms of the command value signals Xu5, Xv5, and Xw5 differ from each other depending on the duty cycle of the flag signal fg. The lower the duty cycle, the greater the degree to which the period for which the command value signals Xu5, Xv5, and Xw5 are fixed at "0" is longer than the period for which they are fixed at "2", and the lower the central potential of the change in the potential at the point O. Also, the greater the duty cycle, the greater the degree to which the period for which the command value signals Xu5, Xv5, and Xw5 are fixed at "0" is shorter than the period for which they are fixed at "2", and the higher the central potential of the change in the potential at the point O. Note that if the duty cycle deviates from "0.5", and the central potential of the change in the potential at the point O deviates from the intermediate potential of the input voltage, the waveform of the output line voltage becomes disrupted (see FIGS. 42 and 43). Accordingly, the duty cycle can only be changed within the range in which the output line voltage can be appropriately controlled. On the other hand, the amplitude of the change in the potential at the point O is similar to that in the case shown in FIG. 37, regardless of the duty cycle.

In the present embodiment, the command value signals Xu5, Xv5, and Xw5 are cyclical signals that are fixed at "0" for a predetermined period and fixed at "2" for another predetermined period (see FIG. 10). Accordingly, the PWM signals Pup, Pvp, and Pwp generated by comparing the command value signals Xu5, Xv5, and Xw5 with the P-side carrier signal are continuously at the high level for the period for which the command value signals Xu5, Xv5, and Xw5 are fixed at "2" (see FIG. 35B). Also, the PWM signals Pun, Pvn, and Pwn generated by comparing the command value signals Xu5, Xv5, and Xw5 with the N-side carrier signal are continuously at the high level for the period for which the command value signals Xu5, Xv5, and Xw5 are fixed at "0" (see FIG. 35C). Furthermore, the PWM signals Puo, Pvo, and Pwo generated by performing a NOR operation on the PWM signals Pup, Pvp, and Pwp and the PWM signals Pun, Pvn, and Pwn are continuously at the low level for the period for which the PWM signals Pup, Pvp, and Pwp are continuously at the high level and the period for which the PWM signals Pun, Pvn, and Pwn are continuously at the high level (see FIG. 36). Since switching of the switching elements is stopped for the periods for which the PWM signals are continuously at the high level or the low level, it is possible to reduce the number of times that switching is performed and reduce switching loss.

Also, in the present embodiment, the central potential of the change in the potential at the point O in the inverter circuit 2' (see FIG. 31) changes according to the duty cycle of the flag signal fg. This enables the value to be used for setting the central potential to a desired potential to be acquired and set in advance. Accordingly, the central potential of the change in the potential at the point O can be set to a desired potential. Also, the amplitude of the change in the potential at the point O in the inverter circuit 2' changes according to the cycle of the flag signal fg. This enables the value to be used for setting the amplitude to a desired amplitude to be acquired and set in advance. Accordingly, the amplitude of the change in the potential at the point can be set to a desired amplitude. This enables controlling the potential at the point O so as to be an arbitrary potential.

In the present embodiment, the voltage applied to the positive-side switches Sp and the voltage applied to the negative-side switches Sn can be caused to differ from each other by controlling the potential at the point O so as to be a desired potential. For example, controlling the potential at the point O such that the voltage applied to the positive-side switches Sp is low and the voltage applied to the negative-side switches Sn is high enables switching elements with a low withstanding voltage to be used as the positive-side switches Sp. In this case, a configuration is possible in which, for example, MOSFETs having a low withstanding voltage but fast switching speed are used as the positive-side switches Sp, and IGBTs having a slow switching speed but high withstanding voltage are used as the negative-side switches Sn.

Note that although the case where the frequency of the P-side carrier signal and the frequency of the N-side carrier signal are the same is described in the sixth embodiment, there is no limitation to this, and the two frequencies may be different. For example, a configuration is possible in which the frequency of the P-side carrier signal is higher than the frequency of the N-side carrier signal, such as the case where MOSFETs are used as the positive-side switches Sp and IGBTs are used as the negative-side switches Sn.

Also, although the case where the voltage dividing capacitors C1 and C2 have the same capacitance, and the potential at the point O is the intermediate potential "(½)E" between the potential "0" at the point N and the potential "E" at the point P is described in the sixth embodiment, there is no limitation to this. For example, the ratio of the capacitance of the voltage dividing capacitor C1 to the capacitance of the voltage dividing capacitor C2 may be 2:1, and the potential at the point O may be "(⅔)E". In this case, the lower limit value of the P-side carrier signal and the upper limit value of the N-side carrier signal need to be set to "4/3" (see FIG. 35A). In this case, the central potential of the change in the potential at the point O is "(⅔)E" when the duty cycle of the flag signal fg is "0.5". Accordingly, if the duty cycle is increased within the range in which the output line voltage can be appropriately controlled, the central potential of the change in the potential at the point O can be set to a higher value. Also, the voltage applied to the positive-side switches Sp can be set even lower, thus enabling switching elements having an even lower withstanding voltage to be used as the positive-side switches Sp.

Although the case where the upper limit value of the command value signals Xu5, Xv5, and Xw5 is "2" and the lower limit value thereof is "0" is described in the sixth embodiment, there is no limitation to this. For example, the command value signals Xu5, Xv5, and Xw5 may be generated such that the upper limit value is "1" and the lower limit value is "−1". In this case, the upper limit value and the lower limit value of the P-side carrier signal and the N-side carrier signal need to be changed. Specifically, the upper limit value and lower limit value of the P-side carrier signal need to be set to "1" and "0" respectively, and the upper limit value and lower limit value of the N-side carrier signal need to be set to "0" and "−1" respectively.

Although the case where the negative electrode of the DC power source 1 is grounded, and the potential at the point N is "0" is described in the sixth embodiment, there is no limitation to this. The present invention is applicable to, for example, the case where the positive electrode of the DC power source 1 is grounded and the potential at the point P is "0", and the case where the point O is grounded and the potential at the point O is "0".

The internal configuration of the inverter circuit is not limited to that of the inverter circuit 2' (see FIG. 31) of the sixth embodiment. The present invention is also applicable to cases where other types of three-level inverter circuits are used. The following describes an example of the case of using another type of three-level inverter circuit as the seventh embodiment, with reference to FIGS. 44 and 45.

Figure 44:
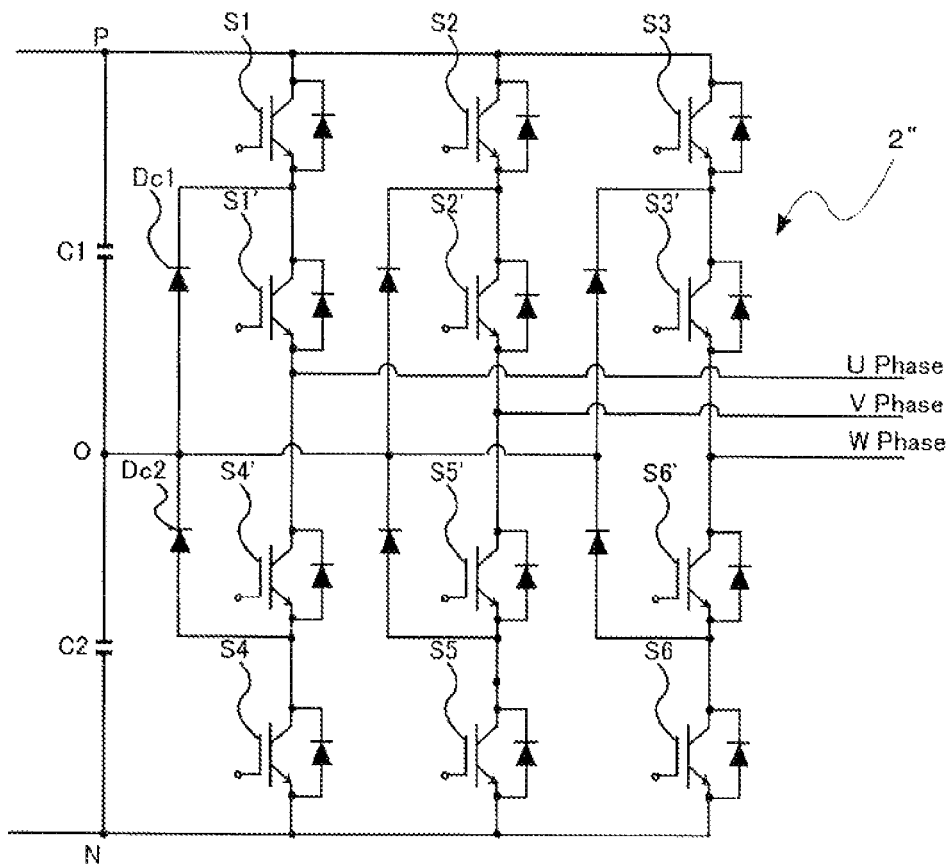
FIG. 44 is a circuit diagram for describing the internal configuration of an inverter circuit according to a seventh embodiment.

FIG. 44 is a circuit diagram for describing the internal configuration of an inverter circuit of the seventh embodiment.

An inverter circuit 2" is a three-phase PWM controlled inverter, that is to say, a three-level inverter circuit in which the output phase voltages of each phase can be any of three levels of potentials. As shown in FIG. 44, the arm of each phase in the inverter circuit 2" is made up of four switching elements that are connected in series (e.g., in the case of the U-phase arm, switching elements S1, S1', S4', and S4) and four diodes are that are respectively connected in anti-parallel to the switching elements. Also, the two voltage dividing capacitors C1 and C2 that have the same capacitance and are connected to each other in series are connected in parallel between the point P for connection to the positive electrode of the DC power source 1 and the point N for connection to the negative electrode. The connection point between the two switching elements on the positive electrode side of each arm (e.g., in the case of the U-phase arm, the switching elements S1 and S1') is connected to the connection point O between the voltage dividing capacitor C1 and the voltage dividing capacitor C2 via a clamp diode Dc1. Also, the connection point between the two switching elements on the negative electrode side of each arm (e.g., in the case of the U-phase arm, the switching elements S4' and S4) is connected to the connection point O via a clamp diode Dc2. The connection point between the two switching elements that are not connected to either electrode in each arm (e.g., in the case of the U-phase arm, the switching elements S1' and S4') is connected to the output line of the corresponding phase.

The U-phase output phase voltage of the inverter circuit 2" can be any of three levels of potentials depending on the state of the switching elements. In the case where the negative-side potential of the DC power source 1 is "0" and the positive-side potential thereof is "E", the potential of the output line is "E" if the switching elements S1 and S1' are in the on state and the switching elements S4 and S4' are in the off state, the potential of the output line is "0" if the switching elements S4 and S4' are in the on state and the switching elements S1 and S1' are in the off state, and the potential of the output line is "(½)E" if the switching elements S1' and S4' are in the on state and the switching elements S1 and S4 are in the off state.

Figure 45:
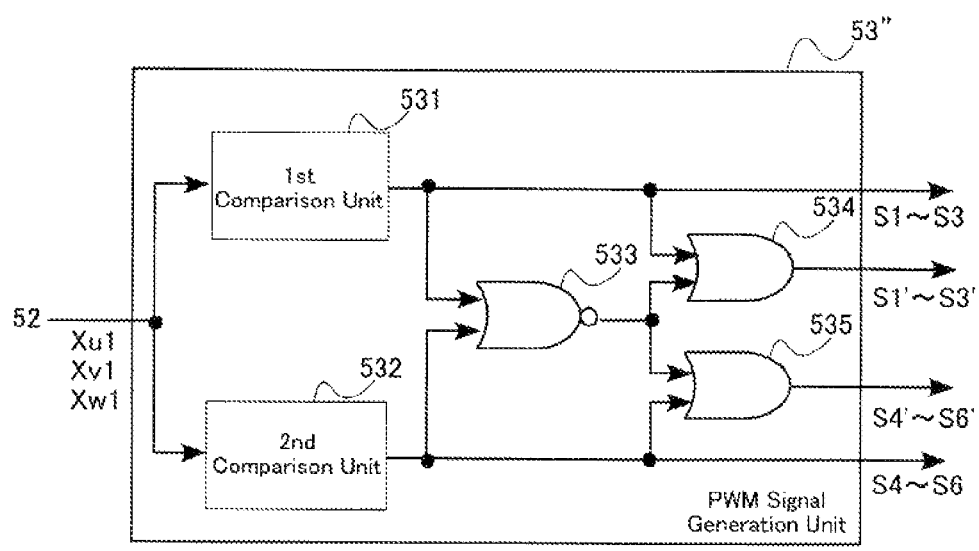
FIG. 45 is a block diagram for describing the internal configuration of a PWM signal generation unit according to the seventh embodiment.

FIG. 45 is a block diagram for describing internal configuration of a PWM signal generation unit according to the seventh embodiment. The same reference numerals have been given to elements in this figure that are the same as or similar to those in the PWM signal generation unit 53' shown in FIG. 34.

The PWM signal generation unit 53" differs from the PWM signal generation unit 53' shown in FIG. 34 in that the PWM signal generation unit 53" is provided with OR units 534 and 535 and generates PWM signals that are to be input to switching elements S1' to S6'.

The OR unit 534 receives an input of the PWM signals Pup, Pvp, and Pwp from the first comparison unit 531, receives an input of the PWM signals Puo, Pvo, and Pwo from the NOR unit 533, and generates PWM signals to be input to the switching elements S1' to S3'. The OR unit 534 generates the PWM signal to be input to the switching element S1' by performing an OR operation on the PWM signal Pup and the PWM signal Puo. Accordingly, the PWM signal to be input to the switching element S1' is at the high level when the PWM signal Pup is at the high level or when the PWM signal Puo is at the high level (i.e., when the PWM signal Pup and the PWM signal Pun are both at the low level). Similarly, the OR unit 534 generates the PWM signal to be input to the switching element S2' by performing an OR operation on the PWM signal Pvp and the PWM signal Pvo. The OR unit 534 also generates the PWM signal to be input to the switching element S3' by performing an OR operation on the PWM signal Pwp and the PWM signal Pwo.

The OR unit 535 receives an input of the PWM signals Pun, Pvn, and Pwn from the second comparison unit 532, receives an input of the PWM signals Puo, Pvo, and Pwo from the NOR unit 533, and generates PWM signals to be input to the switching elements S4' to S6'. The OR unit 535 generates the PWM signal to be input to the switching element S4' by performing an OR operation on the PWM signal Pun and the PWM signal Puo. Accordingly, the PWM signal to be input to the switching element S4' is at the high level when the PWM signal Pun is at the high level or when the PWM signal Puo is at the high level (i.e., when the PWM signal Pup and the PWM signal Pun are both at the low level). Similarly, the OR unit 535 generates the PWM signal to be input to the switching element S5' by performing an OR operation on the PWM signal Pvn and the PWM signal Pvo. The OR unit 535 also generates the PWM signal to be input to the switching element S6' by performing an OR operation on the PWM signal Pwn and the PWM signal Pwo.

Note that the configuration of the PWM signal generation unit 53" is not limited to that described above. Another method may be used as long as it enables generating PWM signals for driving the switching elements from the command value signals Xu5, Xv5, and Xw5.

In the seventh embodiment as well, since PWM signals generated based on the command value signals Xu5, Xv5, and Xw5 are received as input, it is possible to reduce the number of times that switching of the switching elements is performed and reduce switching loss. Also, the central potential and amplitude of the change in the potential at the point O in the inverter circuit 2''' (see FIG. 44) also respectively change according to the duty cycle and cycle of the flag signal fg. This enables controlling the potential at the point O so as to be an arbitrary potential.

Although the case where the cycle and duty cycle of the flag signal fg are set in advance is described in the sixth and seventh embodiments, the cycle and duty cycle of the flag signal fg may be changed according to the situation. An example of the case of changing the duty cycle of the flag signal fg according to the situation will be described below as an eighth embodiment with reference to FIGS. 46 and 47.

Figure 46:
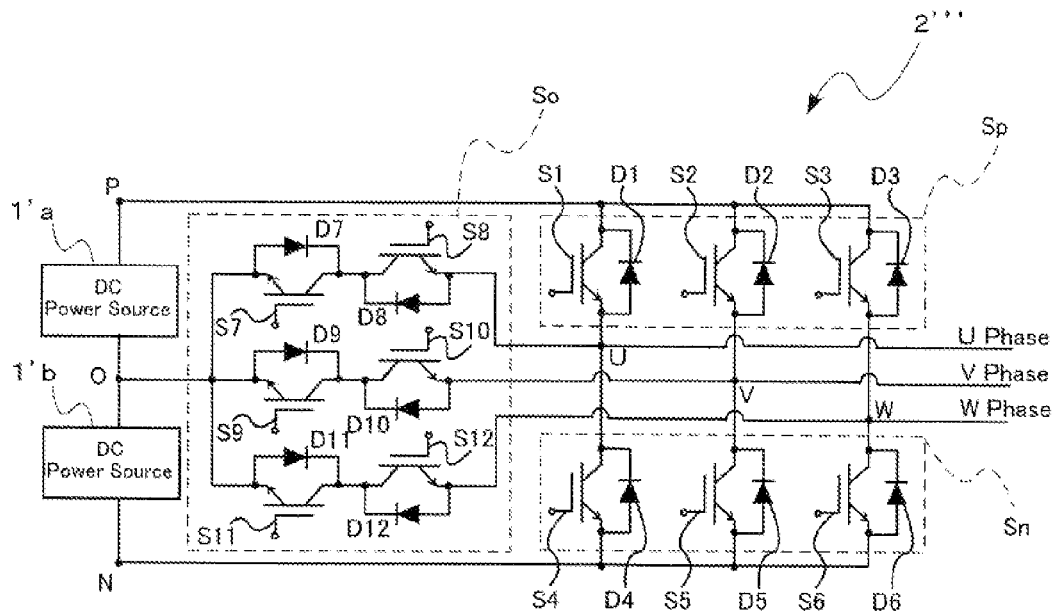
FIG. 46 is a block diagram for describing an inverter circuit and a DC power source according to an eighth embodiment.

FIG. 46 is a block diagram for describing an inverter circuit and a DC power source according to the eighth embodiment. The same reference numerals have been given to elements in this figure that are the same as or similar to those in the inverter circuit 2' shown in FIG. 31.

An inverter circuit 2''' differs from the inverter circuit 2' (see FIG. 31) of the sixth embodiment in that instead of the intermediate potential being the potential at the point O due to the voltage dividing capacitors C1 and C2 dividing the voltage of the DC voltage input from the DC power source 1, two DC power sources 1'a and 1'b are connected in series, and the intermediate potential is the potential at the point O that is the connection point therebetween. The DC power sources 1'a and 1'b include a solar battery.

Figure 47:
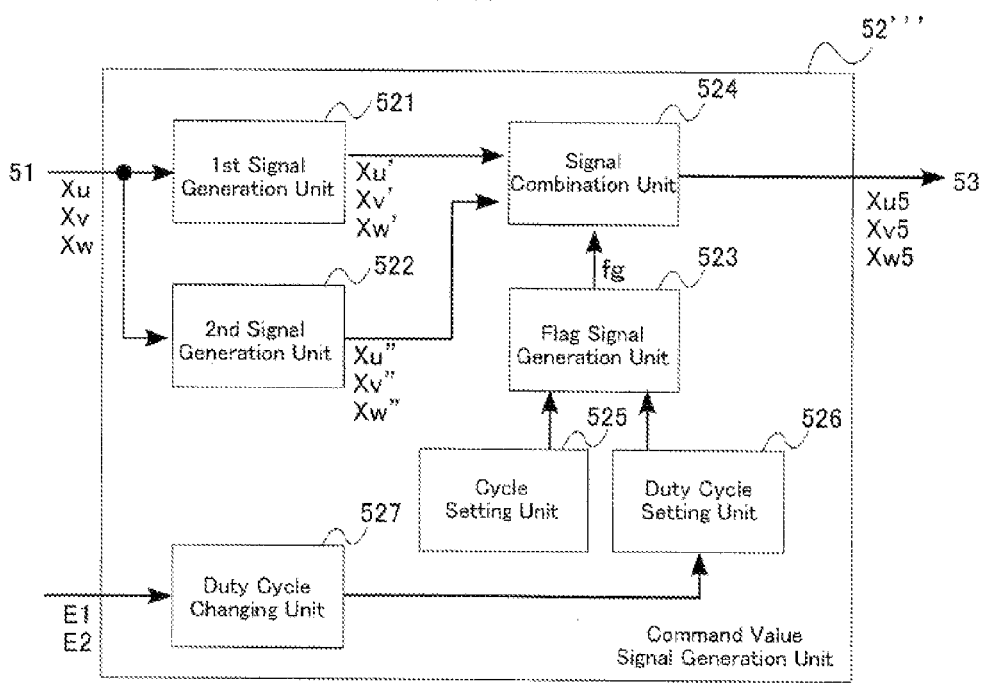
FIG. 47 is a block diagram for describing a command value signal generation unit according to the eighth embodiment.

FIG. 47 is a block diagram for describing a command value signal generation unit according to the eighth embodiment. The same reference numerals have been given to elements in this figure that are the same as or similar to those in the command value signal generation unit 52'' shown in FIG. 33.

A command value signal generation unit 52''' differs from the command value signal generation unit 52'' (see FIG. 33) in that the command value signal generation unit 52''' includes a duty cycle changing unit 527. The duty cycle changing unit 527 receives an input of a target voltage for causing the output of the DC power sources 1'a and 1'b to respectively follow the maximum power, and determines a duty cycle (for the flag signal fg) for setting the central potential of the change in the potential at the point O to an appropriate potential. The target voltage for following the maximum power is calculated through known maximum output following control (a detailed description of which will not be given). As previously described, the central potential of the change in the potential at the point O changes according to the duty cycle of the flag signal fg. The duty cycle changing unit 527 stores the correspondence relationship between duty cycles of the flag signal fg and target ratios R, which are the ratio of a target voltage E2 of the DC power source 1'b to the sum value of a target voltage E1 of the DC power source 1'a and the target voltage E2 (R=E2/(E1+E2)), calculates the target ratio R from the input target voltages E1 and E2, and determines the duty cycle in accordance with the target ratio R. For example, in the case where E1 and E2 are equal to each other, the duty cycle corresponding to the target ratio R (=0.5) is set to "0.5", and in the case where E1>E2, the duty cycle is set to D(<0.5) based on the stored correspondence relationship. The duty cycle changing unit 527 outputs the determined duty cycle to the duty cycle setting unit 526. The duty cycle setting unit 526 sets the input duty cycle as the duty cycle of the flag signal fg. Note that instead of storing the correspondence relationship between target ratios R and duty cycles, feedback control may be performed such that the target ratio R is set to a ratio calculated from the output voltages of the DC power source 1'a and the DC power source 1'b.

Effects similar to those of the sixth embodiment can be achieved in the eighth embodiment as well. Also, the output of the DC power sources 1'a and 1'b can respectively be caused to follow the maximum power by changing the duty cycle of the flag signal fg according to the situation.

Although the case where the inverter circuit 2' (2'', 2''') is a three-level inverter circuit is described in the sixth to eighth embodiments, there is no limitation to this. The present invention is applicable even in the case where the inverter circuit 2' (2'', 2''') is a multilevel inverter circuit other than a three-level inverter circuit. In this case as well, since PWM signals generated based on the command value signals Xu5, Xv5, and Xw5 are received as input, it is possible to reduce the number of times that switching of the switching elements is performed and reduce switching loss. It is also possible to control the central potential and amplitude of the change in the intermediate potential (a potential among the possible potentials, other than the negative electrode potential "0" and the positive electrode potential "E") of the phase voltage to be output from the inverter circuit.

Although the case of using the waveforms of the command value signals Xu5, Xv5, and Xw5 of the fifth embodiment is described in the sixth to eighth embodiments, there is no limitation to this. The command value signals of the first to fourth embodiments may be used in the inverter circuit 2' (2'', 2'''), which is a multilevel inverter. In this case, the intermediate potential cannot be controlled, but the difference between the time for which the positive-side switching elements are in the on state and the time for which the negative-side switching elements are in the on state can be reduced, thus enabling suppressing the situation in which the intermediate potential skews toward the positive electrode side or the negative electrode side.

A control circuit, an inverter apparatus, and an interconnection inverter system of the present invention are not limited to the embodiments described above. Various design modifications can be made to the specific configurations of various units of the control circuit, the inverter apparatus, and the interconnection inverter system of the present invention.

The invention claimed is:

1. A control circuit for controlling driving of a plurality of switches in a power conversion circuit related to three-phase alternating current power with use of PWM signals, the PWM signals being generated and output such that a waveform of an alternating current phase voltage output from or input to the power conversion circuit is a waveform that is continuously at a predetermined lower limit voltage value for a ⅙ period of one cycle and is continuously at a predetermined upper limit voltage value for another ⅙ period of the one cycle, the control circuit comprising a command value signal generator and a PWM signal generator, wherein:

the command value signal generator generates a first command value signal, a second command value signal, and a third command value signal, the first command value signal having a one-cycle waveform that is at a predetermined upper limit value for a ⅙ period and is at a predetermined lower limit value for another ⅙ period, the second command value signal being delayed in phase by $2\pi/3$ relative to the first command value signal, the third command value signal being delayed in phase by $4\pi/3$ relative to the first command value signal, the PWM signal generator generates the PWM signals based on the first to third command value signals, and the one-cycle waveform of the first command value signal is the lower limit value for a ⅙ period, a waveform obtained by shifting a waveform of a sine wave whose phase is in a section from $5\pi/3$ to $2\pi$ by a predetermined value in a next ⅙ period, a waveform obtained by shifting a waveform of a sine wave whose phase is in a section from $\pi/3$ to $2\pi/3$ by a predetermined value in a next ⅙ period, the upper limit value in a next ⅙ period, a waveform obtained by shifting a waveform of a sine wave whose phase is in a section from $2\pi/3$ to $\pi$ by a predetermined value in a next ⅙ period, and a waveform obtained by shifting a waveform of a sine wave whose phase is in a section from $4\pi/3$ to $5\pi/3$ by a predetermined value in a next ⅙ period, wherein the PWM signal generator generates the PWM signals by comparing each of the three command value signals with a predetermined carrier signal that has a frequency such that at least three cycles of waves of the carrier signal are contained within a ⅙ period of the one cycle, and wherein three times a reciprocal of the frequency is smaller than the ⅙ period of the one cycle.

2. The control circuit according to claim 1, wherein the command value signal generator generates, through the following method, the first to third command value signals using three phase voltage command value signals generated for specifying respective waveforms of three phases of phase voltages to be output from the power conversion circuit and using three line-to-line voltage command value signals that are difference signals between the phase voltage command value signals:

(a) hereinafter, the three phases are called a U phase, a V phase, and a W phase, the V phase being delayed by $2\pi/3$ relative to the U phase, and the W phase being delayed by $4\pi/3$ relative to the U phase; the phase voltage command value signals of the U phase, the V phase, and the W phase are called Xu, Xv, and Xw respectively; and a line-to-line voltage command value signal obtained by subtracting Xv from Xu is called Xuv, a line-to-line voltage command value signal obtained by subtracting Xw from Xv is called Xvw, and a line-to-line voltage command value signal obtained by subtracting Xu from Xw is called Xwu;

(b) in a case where an absolute value of Xuv is greater than an absolute value of Xvw and an absolute value of Xwu, if Xu is a positive value, the first command value signal Xu1 is set to the lower limit value+Xuv, the second command value signal Xv1 is set to the lower limit value, and the third command value signal Xw1 is set to the lower limit value+a negative value of Xvw;

(c) in a case where an absolute value of Xuv is greater than an absolute value of Xvw and an absolute value of Xwu, if Xu is a negative value, Xu1 is set to a value obtained by adding Xuv to the upper limit value, Xv1 is set to the upper limit value, and Xw1 is set to a value obtained by subtracting Xvw from the upper limit value;

(d) in a case where an absolute value of Xvw is greater than an absolute value of Xuv and an absolute value of Xwu, if Xv is a positive value, Xu1 is set to the lower limit value+a negative value of Xwu, Xv1 is set to Xvw+the lower limit value, and Xw1 is set to the lower limit value;

(e) in a case where an absolute value of Xvw is greater than an absolute value of Xuv and an absolute value of Xwu, if Xv is a negative value, Xu1 is set to a value obtained by subtracting Xwu from the upper limit value, Xv1 is set to a value obtained by adding Xvw to the upper limit value, and Xw1 is set to the upper limit value;

(f) in a case where an absolute value of Xwu is greater than an absolute value of Xuv and an absolute value of Xvw, if Xw is a positive value, Xu1 is set to the lower limit value, Xv1 is set to the lower limit value+a negative value of Xuv, and Xw1 is set to Xwu+the lower limit value; and (g) in a case where an absolute value of Xwu is greater than an absolute value of Xuv and an absolute value of Xvw, if Xw is a negative value, Xu1 is set to the upper limit value, Xv1 is set to a value obtained by subtracting Xuv from the upper limit value, and Xw1 is set to a value obtained by adding Xwu to the upper limit value.

3. The control circuit according to claim 1, wherein the carrier signal is a signal that changes between the predetermined upper limit value and the predetermined lower limit value.

4. An inverter apparatus comprising an inverter circuit serving as the power conversion circuit; and the control circuit according to claim 1.

5. The inverter apparatus according to claim 4, wherein the inverter circuit is a multilevel inverter circuit.

6. An interconnection inverter system comprising the inverter apparatus according to claim 4.

7. The interconnection inverter system according to claim 6, wherein a power source for supplying power to the inverter circuit comprises a solar battery.

* * * * *